(12) United States Patent
Katayama

(10) Patent No.: US 6,420,979 B1
(45) Date of Patent: Jul. 16, 2002

(54) METHOD FOR COMPRESSING AND DECOMPRESSING IMAGE SIGNALS AND APPARATUS FOR COMPRESSING AND DECOMPRESSING IMAGE SIGNALS

(75) Inventor: Yoichi Katayama, Tokyo (JP)

(73) Assignee: NEC Corporation (JP)

( * ) Notice: Subject to any disclaimer, the term of this patent is extended or adjusted under 35 U.S.C. 154(b) by 13 days.

(21) Appl. No.: 09/713,828

(22) Filed: Nov. 15, 2000

(51) Int. Cl.[7] .............................. H03M 7/34; G06K 9/36
(52) U.S. Cl. ........................ 341/51; 382/232; 382/250; 382/248
(58) Field of Search ..................... 341/50, 51; 382/232, 382/250, 248

(56) References Cited

U.S. PATENT DOCUMENTS 5,689,346 A  * 11/1997 Noda et al. ................. 358/426
5,694,149 A  * 12/1997 Cahill, III .................... 345/127
5,778,101 A  *  7/1998 Hwang ........................ 382/250
5,973,746 A  * 10/1999 Nakamoto et al. .......... 348/458

FOREIGN PATENT DOCUMENTS

JP        5181896       7/1993        ......... G06F/15/232
JP        6243160       9/1994        ......... G06F/15/232

* cited by examiner

*Primary Examiner*—Peguy JeanPierre
(74) *Attorney, Agent, or Firm*—Dickstein, Shapiro, Morin & Oshinsky, LLP

(57) ABSTRACT

A method is provided for achieving high-speed $2^N$-$2^N$ DCT and $2$-$2^{N-1}$-$2^N$ DCT in a miniaturized circuit.

An 8-8 DCT is performed by using multiplexers, registers, adding circuits, subtracting circuits, adding/subtracting circuits, fixed coefficient multiplying circuits, AND circuits or a like. A 2-4-8 DCT is performed by using a part of the circuit for performing the 8-8 DCT by switching operations of multiplexers, adding/subtracting circuits, fixed coefficient multiplying circuits, registers between operations for the 8-8 DCT and for the 2-4-8 DCT.

22 Claims, 16 Drawing Sheets

| REGISTER $30_1$ | $a_0+a_1$ | $a_3+a_2$ | $a_0-a_1$ | $a_3-a_2$ | | | |
|---|---|---|---|---|---|---|---|
| REGISTER $30_2$ | $a_0$ | $a_3$ | | $a_2$ | | | |
| REGISTER $30_3$ | $a_1$ | $a_2$ | | $a_3$ | | | |
| REGISTER $34_1$ | $(a_0+a_1)P_3$ | $(a_3+a_2)P_3$ | $(a_0-a_1)P_3$ | $(a_3-a_2)P_3$ | | | |
| REGISTER $34_2$ | $a_0P_5$ | $a_3P_5$ | | $a_2P_5$ | | | |
| REGISTER $34_3$ | $a_1P_1$ | $a_2P_1$ | | $a_3P_1$ | | | |
| REGISTER $40_1$ | | | $(a_0+a_1)P_3$ $+(a_3+a_2)P_3$ =$F_0$ | $(a_0-a_1)P_3$ $+(a_3-a_2)P_3$ =$F_4$ | | | |
| REGISTER $40_2$ | | | $a_0P_5+a_1P_1$ $-a_3P_5-a_2P_1$ =$F_2$ | $-a_1P_5+a_0P_1$ $+a_2P_5-b_3P_1$ =$F_6$ | | | |

FIG. 3

| REGISTER 304 | X | $a_4$ | X | $a_6$ | X | $a_5$ | X | $a_7$ | X | X |
|---|---|---|---|---|---|---|---|---|---|---|
| REGISTER 305 | X | $a_5$ | X | $a_4$ | X | $a_7$ | X | $a_6$ | X | X |
| REGISTER 306 | X | $a_6$ | X | $a_7$ | X | $a_4$ | X | $a_5$ | X | X |
| REGISTER 347 | X | $a_7$ | X | $a_5$ | X | $a_6$ | X | $a_4$ | X | X |
| REGISTER 344 | X | | X | $a_4P_6$ | X | $a_5P_6$ | X | $a_7P_6$ | X | X |
| REGISTER 345 | X | | X | $a_5P_4$ | X | $a_7P_4$ | X | $a_6P_4$ | X | X |
| REGISTER 346 | X | | X | $a_6P_2$ | X | $a_4P_2$ | X | $a_5P_2$ | X | X |
| REGISTER 347 | X | | X | $a_7P_0$ | X | $a_6P_0$ | X | $a_4P_0$ | X | X |
| REGISTER 402 | X | | X | $\begin{array}{c}a_4P_6+a_5P_4\\+a_6P_2+a_7P_0\end{array}$ | X | $\begin{array}{c}-a_6P_6+a_4P_4\\-a_7P_2-a_5P_0\end{array}$ | X | $\begin{array}{c}-a_5P_6+a_7P_4\\+a_4P_2+a_6P_0\end{array}$ | X | $\begin{array}{c}-a_7P_6+a_6P_4\\-a_5P_2+a_4P_0\end{array}$ |
|  |  |  |  | $=F_1$ |  | $=F_3$ |  | $=F_5$ |  | $=F_7$ |

*FIG. 4*

| REGISTER 304 | $b_4+b_5$ | $b_7+b_6$ | $b_4-b_5$ | $b_7-b_6$ | | |
|---|---|---|---|---|---|---|
| REGISTER 305 | $b_4$ | | $b_7$ | $b_6$ | | |
| REGISTER 306 | 0 | | 0 | 0 | | |
| REGISTER 307 | $b_5$ | | $b_6$ | | | |
| REGISTER 344 | $(b_4+b_5)P_3$ | $(b_7+b_6)P_3$ | $(b_4-b_6)P_3$ | $(b_7-b_6)P_3$ | | |
| REGISTER 345 | $b_4P_5$ | $b_7P_5$ | $b_5P_5$ | $b_6P_5$ | | |
| REGISTER 346 | 0 | 0 | 0 | 0 | | |
| REGISTER 347 | $b_5P_1$ | $b_6P_1$ | $b_4P_1$ | $b_7P_1$ | | |
| REGISTER 403 | | $(b_4+b_5)P_3 +(b_7+b_6)P_3 = F_4$ | $(b_4+b_5)P_3 +(b_7-b_6)P_3 = F_6$ | $(b_4-b_5)P_3 +(b_7-b_6)P_3$ | | |
| REGISTER 404 | | $b_4P_5+b_5P_1 -b_7P_5-b_6P_1 = F_5$ | $b_5P_5+b_5P_1 -b_7P_5-b_6P_1$ | $-b_5P_5+b_4P_1 +b_6P_5-b_7P_1 = F_7$ | | |

FIG. 6

| | | | | | | |
|---|---|---|---|---|---|---|
| REGISTER 301 | ✕ | $a_0+a_3$ | $a_0-a_3$ | $a_0-a_3$ | $a_0+a_3$ | ✕ |
| REGISTER 302 | ✕ | $a_2$ | $a_1$ | $a_1$ | $a_2$ | ✕ |
| REGISTER 303 | ✕ | $a_1$ | $a_2$ | $a_2$ | $a_1$ | ✕ |
| REGISTER 1341 | ✕ | $(a_0+a_3)P_3$ | $(a_0-a_3)P_3$ | $(a_0-a_3)P_3$ | $(a_0+a_3)P_3$ | ✕ |
| REGISTER 1342 | ✕ | $a_2P_5$ | $a_1P_5$ | $a_1P_5$ | $a_2P_5$ | ✕ |
| REGISTER 1343 | ✕ | $a_1P_1$ | $a_2P_1$ | $a_2P_1$ | $a_1P_1$ | ✕ |
| REGISTER 402 | ✕ | ✕ | $(a_0+a_3)P_3$ $+a_2P_5+a_1P_1$ | $(a_0-a_3)P_3$ $+a_1P_5+a_2P_1$ | $(a_0-a_3)P_3$ $-a_2P_5+a_1P_1$ | $(a_0+a_3)P_3$ $-a_1P_5+a_2P_1$ |

FIG. 9

| | | | | | |
|---|---|---|---|---|---|
| REGISTER 301 | × | $b_0+b_3$ | $b_0-b_3$ | $b_0+b_3$ | × |
| REGISTER 302 | × | $b_2$ | $b_1$ | $b_2$ | × |
| REGISTER 303 | × | $b_1$ | $b_2$ | $b_1$ | × |
| REGISTER 1341 | × | $(b_0+b_3)P_3$ | $(b_0-b_3)P_3$ | $(b_0+b_3)P_3$ | × |
| REGISTER 1342 | × | $b_2P_5$ | $b_1P_5$ | $b_2P_5$ | × |
| REGISTER 1343 | × | $b_1P_1$ | $b_2P_1$ | $b_1P_1$ | × |
| REGISTER 402 | | $(b_0+b_3)P_3$ $+b_2P_5+b_1P_1$ $=F_0$ | $(b_0-b_3)P_3$ $-b_1P_5+b_2P_1$ $=F_2$ | $(b_0-b_3)P_3$ $-b_1P_5-b_2P_1$ $=F_4$ | $(b_0+b_3)P_3$ $-b_2P_5-b_1P_1$ $=F_6$ |

*FIG. 11*

| REGISTER 304 | ╳ | $b_4+b_7$ | $b_4-b_7$ | $b_4+b_7$ | ╳ | ╳ | ╳ |
|---|---|---|---|---|---|---|---|
| REGISTER 305 | ╳ | $b_6$ | $b_5$ | $b_6$ | ╳ | ╳ | ╳ |
| REGISTER 306 | ╳ | 0 | 0 | 0 | ╳ | ╳ | ╳ |
| REGISTER 307 | ╳ | $b_5$ | $b_6$ | $b_5$ | ╳ | ╳ | ╳ |
| REGISTER 1344 | ╳ | $(b_4+b_7)P_3$ | $(b_4-b_7)P_3$ | $(b_4+b_7)P_3$ | ╳ | ╳ | ╳ |
| REGISTER 1345 | ╳ | $b_6P_5$ | $b_5P_5$ | $b_6P_5$ | ╳ | ╳ | ╳ |
| REGISTER 1346 | ╳ | 0 | 0 | 0 | ╳ | ╳ | ╳ |
| REGISTER 1347 | ╳ | $b_5P_1$ | $b_6P_1$ | $b_5P_1$ | ╳ | ╳ | ╳ |
| REGISTER 404 | ╳ | | | $(b_4+b_7)P_3$ $+b_6P_5+b_5P_1$ | $(b_4-b_7)P_3$ $-b_5P_5+b_6P_1$ | $(b_4-b_7)P_3$ $+b_5P_5-b_6P_1$ | $(b_4+b_7)P_3$ $-b_6P_5-b_5P_1$ |

FIG. 12

METHOD FOR COMPRESSING AND DECOMPRESSING IMAGE SIGNALS AND APPARATUS FOR COMPRESSING AND DECOMPRESSING IMAGE SIGNALS

BACKGROUND OF THE INVENTION

1. Field of the Invention

The present invention relates to a method for compressing of image signals and decompressing of image signals and to an apparatus to implement of image signals compressing of image signals and decompressing of image signals.

The present application claims the Convention Priority of Japanese Patent Application No. Hei11-326188 filed on Nov. 16, 1999, which is hereby incorporated by reference.

2. Description of the Related Art

Conventionally, when a digitized image is transmitted, since an amount of image information is enormous, the image information is compressed prior to its transmission. As one of methods for compressing image information, international standard coding systems called MPEG (Moving Picture Experts Group) and JPEG (Joint Photographic Experts Group) are known. In the international standard coding systems, input image data is compressed by DCT (Discrete Cosine Transformation) and compressed image data is returned to its original image data by IDCT (Inverse Discrete Cosine Transformation).

The DCT used in the international standard coding systems is performed in accordance with the following equation (17) provided for in International Standard (STD•IEC 61834-2-ENGL 1, 998) 8-8 DTC, which prescribes the international standard coding systems. The IDCT used in the international standard coding systems is performed in accordance with the following equation (18) provided for in the International Standard (STD•IEC 61834-2-ENGL 1, 998) 8-8 IDCT, which also prescribes the international standard coding systems.

$$F(h, v) = C(v)C(h) \sum_{y=0}^{7} \sum_{x=0}^{7} \{f(x, y)\cos\alpha\}\cos\beta \qquad (17)$$

where $$C(h) = \frac{1}{2\sqrt{2}} \quad (h = 0), \quad C(h) = \frac{1}{2} \quad (h = 1, 2, \ldots, 7)$$

$$C(v) = \frac{1}{2\sqrt{2}} \quad (v = 0), \quad C(v) = \frac{1}{2} \quad (v = 1, 2, \ldots, 7)$$

$$\alpha \equiv \frac{\pi v(2y+1)}{16}, \qquad \beta \equiv \frac{\pi h(2x+1)}{16}$$

$$f(x, y) = \sum_{v=0}^{7} \sum_{h=0}^{7} \{C(v)C(h)F(h, v)\cos\alpha \cdot \cos\beta\} \qquad (18)$$

where $$C(h) = \frac{1}{2\sqrt{2}} \quad (h = 0), \quad C(h) = \frac{1}{2} \quad (h = 1, 2, \ldots, 7)$$

$$C(v) = \frac{1}{2\sqrt{2}} \quad (v = 0), \quad C(v) = \frac{1}{2} \quad (h = 1, 2, \ldots, 7)$$

$$\alpha \equiv \frac{\pi v(2y+1)}{16}, \qquad \beta \equiv \frac{\pi h(2x+1)}{16}.$$

An example of an 8-8 DCT device (called a "first technology" in this application) is disclosed in the Japanese Patent Application Laid-open No. Hei5-181896, in which the 8-8 DCT is performed on every block composed of "8×8" picture element data constituting image data, which is constructed of a product obtained by multiplying eight pieces of picture element data arranged in a transverse direction by eight pieces of picture element data arranged in a longitudinal direction, in accordance with following equation (19) and equation (20).

$$\begin{bmatrix} F_0 \\ F_4 \\ F_2 \\ F_6 \end{bmatrix} = \begin{bmatrix} a_0 + a_1 + a_3 + a_2 & 0 & 0 \\ a_0 - a_1 + a_3 - a_2 & 0 & 0 \\ 0 & a_0 - a_3 & a_1 - a_2 \\ 0 & -a_1 - a_2 & a_0 - a_3 \end{bmatrix} \begin{bmatrix} P_3 \\ P_5 \\ P_1 \end{bmatrix} \qquad (19)$$

$$\begin{bmatrix} F_1 \\ F_3 \\ F_5 \\ F_7 \end{bmatrix} = \begin{bmatrix} a_4 & a_5 & a_6 & a_7 \\ -a_6 & a_4 & -a_7 & -a_5 \\ -a_5 & a_7 & a_4 & a_6 \\ a_7 & a_6 & -a_5 & a_4 \end{bmatrix} \begin{bmatrix} P_6 \\ P_4 \\ P_2 \\ P_0 \end{bmatrix}$$

$$\frac{1}{2}\begin{bmatrix} f_0 + f_4 \\ f_1 + f_5 \\ f_2 + f_6 \\ f_3 + f_7 \end{bmatrix} = \begin{bmatrix} a_0 + a_3 & a_2 & a_1 \\ a_0 - a_3 & -a_1 & a_2 \\ a_0 - a_3 & a_1 & -a_2 \\ a_0 + a_3 & -a_2 & -a_1 \end{bmatrix} \begin{bmatrix} P_3 \\ P_5 \\ P_1 \end{bmatrix} \qquad (20)$$

$$\frac{1}{2}\begin{bmatrix} f_0 - f_4 \\ f_1 - f_5 \\ f_2 - f_6 \\ f_3 - f_7 \end{bmatrix} = \begin{bmatrix} a_5 & a_7 & -a_6 & -a_4 \\ a_6 & a_5 & a_4 & -a_7 \\ -a_7 & -a_4 & a_5 & -a_6 \\ a_4 & -a_6 & -a_7 & a_5 \end{bmatrix} \begin{bmatrix} P_6 \\ P_4 \\ P_2 \\ P_0 \end{bmatrix}$$

In the 8-8 DCT devices, the 8-8 DCT and 8-8 IDCT are performed by arithmetic operations according to a determinant equation (19) and determinant equation (20) derived from the equation (17) and the equation (18).

The first technology disclosed in the above Japanese Patent Application Laid-open No. Hei5-181896 includes two 8-8 DCT devices. One of the two 8-8 DCT, which performs the 8-8 DCT by arithmetic operations according to the determinant equation (19), is composed of eight selecting circuits adapted to select one piece of input data out of 8 pieces of input data (a0 to a7), seven fixed coefficient multipliers connected to the selecting circuits and adapted to multiply each of selected signals output from the selecting circuits by a different coefficient and 5 types of adding/subtracting units connected to outputs of the fixed coefficient multipliers and adapted to perform adding and subtracting operations to each of output signals from the fixed coefficient multipliers in a variety of differently combined ways and is so configured that three types of the adding/subtracting units out of the five types of the adding/subtracting units are used for the cosine transformation and the remaining two types of the adding/subtracting units for the inverse cosine transformation and that eight cosine transformation coefficients are obtained by switching, four times, the way of selecting data in the selecting circuits and by switching, four times, the calculating way from the addition to subtraction or vice versa in the adding and subtracting units. However, input data (a0 to a7), when the cosine transformation is performed, include a0=x0+x7, a1=x1+x6, a2=x2+x5, a3=x3+x4, a4=x0−x7, a5=x1−x6, a6=x2−x5 and a7=x3−x4, which can be obtained from 8 input image data (x0 to x7). Input data (a0 to a7), when the inverse cosine transformation is performed, includes a0=x0, a1=x6, a2=x2, a3=x4, a4=−x7, a5=x1, a6=−x5 and a7=x3, which can be obtained from eight input image data (x0 to x7).

The other out of the two 8-8 DCT devices is composed of four selecting circuits adapted to select one piece of input data out of eight pieces of input data (a0 to a7), four fixed coefficient multipliers connected to the selecting circuits and adapted to multiply each of selected signals output from the selecting circuits by a different coefficient and five types of adding/subtracting units connected to outputs of the fixed coefficient multipliers and adapted to perform adding or subtracting operations to each of output signals from the fixed coefficient multipliers in a variety of differently combined ways and is so configured that two types of the adding/subtracting units out of the four types of the adding/subtracting units are used for the cosine transformation and the remaining two types of the adding/subtracting units for the inverse cosine transformation and that eight cosine transformation coefficients are obtained by switching, eight times, the way of selecting data in the selecting circuits, and by switching, eight times, the calculating way from the addition to subtraction or vice versa in the adding and subtracting units and by switching, eight times, the selection of two types of coefficients in the fixed coefficient multipliers. Eight pieces of input data (a0 to a7) for this DCT device are the same as those for the above one out of the two DCT devices.

In both these two DCT devices, DCT coefficients can be calculated by performing the DCT on input data obtained from each line composed of eight pieces of picture element data, which constitutes the block composed of 8×8 picture element data, arranged either in the transverse direction or in the longitudinal direction, that is, 64 DCT coefficients can be obtained by performing the DCT first on input data obtained from a first line composed of the eight picture element data arranged, for example, in the traverse direction and then sequentially on input data obtained from a second line, third line, . . . , eighth line, each being composed of the eight picture element data also arranged in the traverse direction. The DCT is used to transform data signals on a time-axis to signal components in the frequency region.

Therefore, the 64 DCT coefficients obtained by the DCT device represent frequency components in the frequency region. The 64 DCT coefficients are used for coding only low frequency components being centralized on the upper left of the block composed of 8×8 picture element data, which can provide image data in which information contained in the 8×8 picture element block is compressed. Then, by performing the DCT applied singly to the 8×8 picture element block also on all the 8×8 picture element blocks contained in the image, an image data having information compressed for every 8×8 picture element block can be obtained for transmission.

Moreover, an example of another DCT device (called a "second technology" in this application) which can use both the 8-8 DCT function and 2-4-8 DCT (described later in detail) function is disclosed in the Japanese Patent Application Laid-open No. Hei6-243160. The second technology device is composed of a factor switching controller, a first sorting circuit to sort data in accordance with control signals fed from the factor switching controller, a first fourth-degree inner product calculating circuit, a second sorting circuit to sort data in accordance with control signals fed from the factor switching controller, an inner product calculating circuit for the 2-4-8 DCT to perform the 2-4-8 DCT in accordance with control signals fed from the factor switching controller, an eighth-degree/fourth-degree inner product circuit to select an inner product calculating circuit for the 8-8 DCT, a fourth-degree inner product circuit to select either of functions of the inner product calculating circuit for 2-4-8 DCT or functions of the inner product calculating circuit for 8-8 DCT in accordance with control signals fed from the factor switching circuit and a third sorting circuit to sort data in accordance with control signals fed from the factor switching circuit.

However, in the one 8-8 DCT device out of the first technology, an inconvenience occurs in that the 2-4-8 DCT required in operations of a digital video cannot be easily performed. This is due to the following reason. That is, the 2-4-8 DCT is performed in accordance with the following equation (21) and the 2-4-8 IDCT in accordance with the following equation (22).

$$\left.\begin{array}{l}F(h,v)=C(v)C(h)\sum_{z=0}^{3}\sum_{x=0}^{7}\{f(x,2z)+f(x,2z+1)\}\cos\gamma\cdot\cos\beta\\[6pt]F(h,v+4)=C(v)C(h)\sum_{z=0}^{3}\sum_{x=0}^{7}\{f(x,2z)+f(x,2z+1)\}\cos\gamma\cdot\cos\beta\end{array}\right\} \quad (21)$$

where
 v=0,1, . . . , 7
 z=integer of y/2

$$C(h) = \frac{1}{2\sqrt{2}} \quad (h = 0),$$
$$C(h) = \frac{1}{2} \quad (h = 1, 2, \ldots, 7)$$
$$C(v) = \frac{1}{2\sqrt{2}} \quad (v = 0),$$
$$C(v) = \frac{1}{2} \quad (v = 1, 2, \ldots, 7)$$
$$\gamma \equiv \frac{\pi v(2z+1)}{8}, \quad \beta \equiv \frac{\pi h(2x+1)}{16}$$

$$\left.\begin{array}{l}f(x,2z)=\sum_{v=0}^{3}\sum_{h=0}^{7}\{C(v)C(h)(F(h,v)+F(h,v+4))\}\cos\gamma\cdot\cos\beta\\[6pt]f(x,2z+1)=\sum_{v=0}^{3}\sum_{h=0}^{7}\{C(v)C(h)(F(h,v)-F(h,v+4))\}\cos\gamma\cdot\cos\beta\end{array}\right\} \quad (22)$$

where
 v=0,1, . . . , 7
 z=integer of y/2

$$C(h) = \frac{1}{2\sqrt{2}} \quad (h = 0),$$
$$C(h) = \frac{1}{2} \quad (h = 1, 2, \ldots, 7)$$
$$C(v) = \frac{1}{2\sqrt{2}} \quad (v = 0),$$
$$C(v) = \frac{1}{2} \quad (v = 1, 2, \ldots, 7)$$
$$\gamma \equiv \frac{\pi v(2z+1)}{8}, \quad \beta \equiv \frac{\pi h(2x+1)}{16}$$

As is apparent from comparison between the equation (17) and equation (18) being used for the 8-8 DCT and 8-8 IDCT respectively and the equation (21) and equation (22) being used for the 2-4-8 DCT and 2-4-8 IDCT respectively, fixed coefficients {values expressed as cosine values in the equation (17) and equation (18)} of the fixed coefficient multipliers used in the 8-8 DCT device are different from those {values expressed as cosine values in the equation (21) and equation (22)} of the fixed coefficient multiplier used in the 2-4-8 DCT device and, moreover, data to be multiplied by the above fixed coefficients are also different. Therefore, when the 2-4-8 DCT is to be performed on image data, the 2-4-8 DCT device has to be separately fabricated in a manner being similar to the 8-8 DCT device disclosed in the above Japanese Patent Application Laid-open No. Hei6-243160.

Furthermore, in the DCT device disclosed as the second technology, both the 8-8 DCT and the 2-4-8 DCT can be used. However, the DCT device, while it is operated in a mode to operate as a two-dimensional 4×8 DCT device, is so configured that control signals, for example, signals with logic "1" are fed from the coefficient switching controller to the first sorting circuit, second sorting circuit, eighth-degree/fourth-degree inner product circuit, fourth-degree inner product circuit and third sorting circuit to implement the two-dimensional 4×8 DCT function and, when it is operated in a mode to operate as a two-dimensional 8×8 DCT device, is so configured that control signals, for example, signals with logic "0" are fed from the coefficient switching controller to the first sorting circuit, second sorting circuit, eighth-degree/fourth-degree inner product circuit, fourth-degree inner product circuit and third sorting circuit to implement the two-dimensional 4×8 DCT function. That is, the device is so constructed that, every time input data is sorted in a sorting order determined by the control signals fed from the coefficient switching controller, a predetermined inner product arithmetic operation is performed on the sorted data to obtain DCT coefficients corresponding to control signals output from the coefficient switching controller. As a result, the processing of data sorting is always required not only for the two-dimensional 4×8 DCT but also for the two-dimensional 8×8 DCT. The data sorting and the selection of circuits by control signals fed from the coefficient switching controller to implement functions of the two-dimensional 4×8 DCT or two-dimensional 8×8 DCT, are inseparable from each other. That is, the conventional DCT device is so configured that the selection of circuits adapted to implement the two-dimensional 4×8 DCT or two-dimensional 8×8 DCT is made in a state in which the processing of sorting data is required in an inseparable manner. Therefore, if the data sorting is carried out via a RAM (Random-Access Memory), repeated processing of sorting data is necessary, thus causing much time to be taken sorting the data and a delay in obtaining DCT coefficients and, if the data sorting is carried out via hardware, it causes an increased scale of circuits and a delay in the propagation of signals.

SUMMARY OF THE INVENTION

In view of the above, it is an object of the present invention to provide a method for compressing image signals, a method for decompressing compressed image signals, a compression processing apparatus and decompression processing apparatus which are capable of achieving high-speed transformation by using fixed coefficients in odd-numbered positions as the fixed coefficients used in both $2-2^{N-1}-2^N$ DCT and $2-2^{N-1}-2^N$ IDCT and which are capable of reducing a circuit scale and of performing high speed transformation by incorporating $2-2^{N-1}-2^N$ DCT and $2-1^{N-1}-2^N$ IDCT functions into basic $2^N-2^N$ DCT and $2^N-2^N$ IDCT devices.

According to a first aspect of the present invention, there is provided a method for compressing image signals including:

a selection process of selecting $2^N$ pieces of picture element data fj ($0 \leq j \leq 2^N - 1$) contained in one line or one string constituting a block of $2^N \times 2^N$ (N being a natural number) pieces of picture element data forming image data, for each of fixed coefficients Pk given in equation (1) and equation (2) shown below and determined in accordance with a discrete cosine transformation rule;

a multiplication process of multiplying each piece of the selected picture element data by each of corresponding fixed coefficients Pk to obtain products;

an addition/subtraction process of performing adding operations and/or subtracting operations between products obtained by the multiplication process and determined in accordance with the discrete cosine transformation rule; and an output process of outputting a value obtained by the addition/subtraction process as transformation coefficient data Fj for each line or each string constituting the block of $2^N \times 2^N$ picture element data;

wherein, in the selection process, first set and second set of picture element data composed of $2^N$ pieces of picture element data contained in one line or one string constituting the block of $2^N \times 2^N$ pieces of picture element data are selected for each of fixed coefficients, out of the fixed coefficients Pk, with k in odd-numbered positions in equation (1) and equation (2) shown below, in a predetermined order, and wherein, in the multiplication process, the first set and second set of picture element data selected for each of the fixed coefficients with k in odd-numbered positions in the equation (1) and equation (2) are multiplied by each of the fixed coefficients with k in odd-numbered positions in the equation (1) and equation (2) to obtain the product;

$$P_k = \cos\left(\frac{(N-1-k)\pi}{2^{N+1}}\right) \quad (23)$$

where $0 \leq k \leq 2^{N-1} - 2$ however, $k = 2^{N-1} - 1$ is excluded;

$$P_k = \frac{1}{\sqrt{2}} \quad (24)$$

where $(k = 2^{N-1} - 1)$.

In the foregoing, a preferable mode is one wherein a sum of $2^N$ pieces of picture element data having "j" data contained in the picture element data fj, one being lower-numbered data and the other being the next lower-numbered data and thereafter in the same manner, is selected as the first set of picture element data to be selected in the selection process and wherein a difference between $2^N$ pieces of picture element data having "j" data contained in the picture element data fj, one being lower-numbered data and the other being the next lower-numbered data and thereafter in the same manner, is selected as the second set of picture element data to be selected in the selection process.

According to a second aspect of the present invention, there is provided a method for decompressing image signals including:

a selection process of selecting $2^N$ pieces of transformation coefficient data Fj ($0 \leq j \leq 2^N - 1$) contained in one line or one string constituting a block of $2^N \times 2^N$ (N being a natural number) pieces of transformation coefficient data block forming transformation coefficient data transmitted after being transformed by a discrete cosine transformation rule, for each of fixed coefficients Pk given in equation (3) and equation (4) shown below and determined in accordance with the discrete cosine transformation rule;

a multiplication process of multiplying each of the selected transformation coefficient data by each of the corresponding fixed coefficients Pk to obtain products;

an addition/subtraction process of performing adding operation and/or subtracting operation between products obtained by the multiplication process which is determined in accordance with the discrete cosine transformation rule;

an output process of outputting a value obtained by the addition/subtraction process as picture element data fj for each line or each string constituting the block of $2^N \times 2^N$ picture element data;

wherein, in the selection process, first set and second set of transformation coefficient data composed of $2^N$ pieces of transformation coefficient data contained in one line or one string constituting the block of $2^N \times 2^N$ pieces of transformation coefficient data are selected for each of fixed coefficients, out of the fixed coefficients Pk, with k in odd-numbered positions in the equation (3) and equation (4), in a predetermined order, and wherein, in the multiplication process, each of the first set and second set of transformation coefficient data selected for each of the fixed coefficients with k in odd-numbered position in the equation (3) and equation (4) is multiplied by each of the fixed coefficients with k in odd-numbered positions in said equation (3) and equation (4) to obtain the product;

$$P_k = \cos\left(\frac{(N-1-k)\pi}{2^{N+1}}\right) \quad (25)$$

$$0 \leq k \leq 2^{N-1}-2$$

where $k=2^{N-1}-1$ is excluded;

$$P_k = \frac{1}{\sqrt{2}} \quad (26)$$

($k=2^{N-1}-1$).

In the foregoing, it is preferable that the first set of transformation coefficient data is a sum of transformation coefficient data composed of one data selected from a first transformation data set containing "j" data constituting first half of the $2^N$ pieces of transformation coefficient data Fj and containing $2^{N-1}$ pieces of transformation coefficient data and transformation coefficient data composed of one data selected from a second transformation data set containing "j" data constituting second half of the $2^N$ pieces of transformation coefficient data Fj and containing $2^{N-1}$ pieces of transformation coefficient data and wherein the second set of transformation data is a difference between transformation coefficient data composed of one data selected from the first set of transformation data and transformation coefficient data composed of one data selected from the second set of transformation data.

According to a third aspect of the present invention, there is provided a method for compressing image signals including:

a selection process of selecting $2^N$ pieces of picture element data fj ($0 \leq j \leq 2^{N-1}$) contained in one line or one string constituting a block of $2^N \times 2^N$ (N being a natural number) pieces of picture element data block forming image data, for each of fixed coefficients Pk given in equation (5) and equation (6) shown below and determined in accordance with the discrete cosine transformation rule;

a multiplication process of multiplying each of the selected picture element data by each of the corresponding fixed coefficients Pk to obtain products;

an addition/subtraction process of performing adding operation and/or subtracting operation between products obtained by the multiplication process and determined in accordance with the discrete cosine transformation rule; and an output process of outputting a value obtained by the addition/subtraction process as transformation coefficient data Fj for each line or each string constituting the block of $2^N \times 2^N$ picture element data;

wherein, in the selection process, in the case of $2^N\text{-}2^N$ discrete cosine transformation, $2^N$ pieces of picture element data are selected from $2^N$ pieces of picture element data contained in one line or one string constituting the block of $2^N \times 2^N$ picture element data for each of the fixed coefficients Pk determined by the $2^N\text{-}2^N$ discrete cosine transformation in a predetermined order and wherein, in the selection process, in the case of $2\text{-}2^{N-1}\text{-}2^N$ discrete cosine transformation, each of first set and second set of picture element data each being composed of $2^N$ pieces of picture element data to be multiplied by each of fixed coefficients, out of the fixed coefficients Pk, with k in odd-numbered positions in the equation (5) and equation (6), is selected from $2^N$ pieces of picture element data contained in one line or one string constituting the block of $2^N \times 2^N$ pieces of picture element data in a predetermined order, wherein, in the multiplication process, in the case of the $2^N\text{-}2^N$ discrete cosine transformation, each of the $2^N$ pieces of picture element data selected in the selection process is multiplied by each of the corresponding fixed coefficients out of the fixed coefficients Pk to obtain products and wherein, in the case of the $2\text{-}2^{N-1}\text{-}2^N$ discrete cosine transformation, each of the first set and second set of picture element data selected based on corresponding fixed coefficient, out of the fixed coefficients Pk, with k in odd-numbered positions in the equation (5) and equation (6) is multiplied by the fixed coefficients, out of the fixed coefficients Pk, with k in odd-numbered positions in the equation (5) and equation (6), and wherein, in the addition/subtraction process, in the case of the $2^N\text{-}2^N$ discrete cosine transformation, the adding operations and/or subtracting operations are performed between products obtained by the multiplication process and determined in accordance with the $2^N\text{-}2^N$ discrete cosine transformation and wherein, in the case of the $2\text{-}2^{N-1}\text{-}2^N$ discrete cosine transformation, the adding operations and/or subtracting operations are performed between products obtained by the multiplication process and determined in accordance with the $2\text{-}2^{N-1}\text{-}2^N$ discrete cosine transformation rule;

$$P_k = \cos\left(\frac{(N-1-k)\pi}{2^{N+1}}\right) \quad (27)$$

$$0 \leq k \leq 2^{N-1}-2$$

where $k=2^{N-1}-1$ is excluded;

$$P_k = \frac{1}{\sqrt{2}} \quad (28)$$

($k=2^{N-1}-1$).

Also, it is preferable that the picture element data to be selected in the block of $2^N\text{-}2^N$ discrete cosine transformation includes the first set of picture element data composed of the $2^N$ pieces of picture element data contained in one line or one string constituting the block of $2^N \times 2^N$ pieces of picture element data to be multiplied by each of the fixed coefficients, out of the fixed coefficients Pk, with k in odd-numbered positions in the equation (5) and equation (6) and the second set of picture element data composed of the $2^N$ pieces of picture element data to be multiplied by each of fixed coefficients, out of the fixed coefficients Pk, with k in odd-numbered positions in the equation (5) and equation (6).

Also, it is preferable that the picture element data selected in the selection process is a sum and difference between picture element data constituting a predetermined pair of picture element data.

Also, it is preferable that the picture element data constituting the predetermined pair of picture element data, in the case of the $2\text{-}2^{N-1}\text{-}2^N$ discrete cosine transformation, are $2^N$ pieces of picture element data having "j" data contained in the picture element data fj, one being lower-numbered data and the other being the next lower-numbered data.

Furthermore, it is preferable that the picture element data constituting the predetermined pair of picture element data, in the case of the $2^N$-$2^N$ discrete cosine transformation, are picture element data composed of one data selected from the first transformation data set containing "j" data which constitutes first half of the $2^N$ pieces of picture element data Fj and containing $2^{N-1}$ pieces of picture element data and picture element data composed of one data selected from the second picture element data set containing "j" data which constitutes second half of the $2^N$ pieces of picture element data fj and containing $2^{N-1}$ pieces of picture element data.

According to a fourth aspect of the present invention, there is provided a method for decompressing image signals including:

a selection process of selecting $2^N$ pieces of transformation coefficient data Fj ($0 \leq j \leq 2^N-1$) contained in one line or one string constituting a block of $2^N \times 2^N$ (N being a natural number) pieces of transformation coefficient data block forming transformation coefficient data transmitted after being transformed by a discrete cosine transformation rule, for each of fixed coefficients Pk given in equation (7) and equation (8) shown below and determined in accordance with the discrete cosine transformation rule;

a multiplication process of multiplying each of the selected transformation coefficient data by each of the corresponding fixed coefficients Pk to obtain products;

an addition/subtraction process of performing adding operations and/or subtracting operations between products obtained by the multiplication process and determined in accordance with the discrete cosine transformation rule; and an output process of outputting a value obtained by the addition/subtraction process as picture element data fj for each line or each string constituting the block of $2^N \times 2^N$ transformation coefficient data;

wherein, in the selection process, in the case of $2^N$-$2^N$ inverse discrete cosine transformation, each of the $2^N$ pieces of transformation coefficient data is selected from $2^N$ m pieces of transformation coefficient data contained in one line or one string constituting the block of $2^N \times 2^N$ transformation coefficient data for each of the fixed coefficients Pk determined by the $2^N$-$2^N$ inverse discrete cosine transformation method in a predetermined order, and wherein, in the selection process, in the case of $2$-$2^{N-1}$-$2^N$ inverse discrete cosine transformation, first set and second set of transformation coefficient data each being composed of $2^N$ pieces of transformation coefficient data contained in one line or one string constituting the block of $2^N \times 2^N$ pieces of transformation coefficient data are selected for each of fixed coefficients, out of the fixed coefficients Pk, with k in odd-numbered positions in the equation (7) and equation (8) in a predetermined order, wherein, in the multiplication process, in the case of the $2^N$-$2^N$ inverse discrete cosine transformation, each of the $2^N$ pieces of picture element data selected in the selection process is multiplied by each of corresponding fixed coefficients out of the fixed coefficients Pk to obtain products and wherein, in the case of the $2$-$2^{N-1}$-$2^N$ inverse discrete cosine transformation, each of the first set and second set of transformation coefficient data selected based on each of corresponding fixed coefficients, out of the fixed coefficients Pk, with k in odd-numbered positions in said equation (7) and equation (8) is multiplied by each of the fixed coefficients, out of the fixed coefficients Pk, with k in odd-numbered positions in the equation (7) and equation (8) to obtain products, wherein, in the addition/subtraction process, in the case of the $2^N$-$2^N$ inverse discrete cosine transformation, the adding operations and/or subtracting operations are performed between products obtained by the multiplication process and determined in accordance with the $2^N$-$2^N$ discrete cosine transformation rule and wherein, in the case of the $2$-$2^{N-1}$-$2^N$ inverse discrete cosine transformation, the adding operations and/or subtracting operations are performed between products obtained by the multiplication process and determined in accordance with the $2$-$2^{N-1}$-$2^N$ discrete cosine transformation rule;

$$P_k = \cos\left(\frac{(N-1-k)\pi}{2^{N+1}}\right) \tag{29}$$

$$0 \leq k \leq 2^{N-1}-2$$

where $k=2^{N-1}$ is excluded;

$$P_k = \frac{1}{\sqrt{2}} \tag{30}$$

($k=2^{N-1}$).

In the foregoing, a preferable mode is one wherein the transformation coefficient data to be selected in the $2^N$-$2^N$ inverse discrete cosine transformation includes the first set of transformation coefficient data composed of the $2^N$ pieces of transformation coefficient data contained in one line or one string constituting the block of $2^N \times 2^N$ pieces of transformation coefficient data to be multiplied by each of the fixed coefficients, out of the fixed coefficients Pk, with k in odd-numbered positions in the equation (7) and equation (8) and the second set of transformation coefficient data composed of the $2^N$ pieces of transformation coefficient data to be multiplied by each of fixed coefficients, out of the fixed coefficients Pk, with k in even-numbered positions in the equation (7) and equation (8).

According to a fifth aspect of the present invention, there is provided a device for compressing image signals comprising:

a selection circuit for selecting $2^N$ pieces of picture element data fj ($0 \leq j \leq 2^N-1$) contained in one line or one string constituting a block of $2^N \times 2^N$ (N being a natural number) pieces of picture element data block forming image data, for each of fixed coefficients Pk given in equation (9) and equation (10) shown below and determined in accordance with a discrete cosine transformation rule;

a multiplication circuit for multiplying each of the selected picture element data by each of the corresponding fixed coefficients Pk to obtain products;

an addition/subtraction circuit for performing adding operations and/or subtracting operations between products obtained by the multiplication process and determined in accordance with the discrete cosine transformation rule; and an output circuit for outputting a value obtained by the adding operations and/or subtracting operations as trans-formation coefficient data Fj for each line or each string constituting the block of $2^N \times 2^N$ picture element data;

wherein the selection circuit is that each of the first set and second set of picture element data composed of $2^N$ pieces of picture element data contained in one line or one string constituting the block of $2^N \times 2^N$ pieces of picture element data is selected for each of fixed coefficients, out of the fixed coefficients Pk, with k in odd-numbered positions in equation (9) and equation (10) shown below, in a predetermined order, and wherein, in the multiplication process, each of the first set and second set of picture element data selected for each of the fixed coefficients with k in odd-numbered positions in the equation (9) and equation (10) is multiplied by the fixed coefficient with k in odd-numbered positions in the equation (9) and equation (10) to obtain the product;

$$P_k = \cos\left(\frac{(N-1-k)\pi}{2^{N+1}}\right) \quad (31)$$

$$0 \leq k \leq 2^{N-1}-2$$

where $k=2^{N-1}-1$ is excluded;

$$P_k = \frac{1}{\sqrt{2}} \quad (32)$$

($k=2^{N-1}-1$).

In the foregoing, a preferable mode is one wherein a sum of $2^N$ pieces of picture element data having "j" data contained in the picture element data fj, one being lower-numbered data and the other being the next lower-numbered data and thereafter in the same manner, is selected by the selection circuit as the first set of picture element data and wherein a difference between $2^N$ pieces of picture element data having "j" data contained in the picture element data fj, one being lower-numbered data and the other being the next lower-numbered data, and thereafter in the same manner, is selected by the selection circuit as the second set of picture element.

According to a sixth aspect of the present invention, there is provided a device for decompressing image signals including:

a selection circuit for selecting $2^N$ pieces of transformation coefficient data Fj ($0 \leq j \leq 2^N-1$) contained in one line or one string constituting a block of $2^N \times 2^N$ (N being a natural number) pieces of transformation coefficient data block forming transformation coefficient data transmitted after being transformed by a discrete cosine transformation method, for each of fixed coefficients Pk given in equation (11) and equation (12) shown below and determined in accordance with a discrete cosine transformation rule;

a multiplication circuit for multiplying each of the selected transformation coefficient data by each of the corresponding fixed coefficient Pk to obtain products;

an addition/subtraction circuit for performing adding operations and/or subtracting operations between products obtained by the multiplication process which is determined in accordance with the discrete cosine transformation rule; and an output circuit for outputting a value obtained by the adding operations and/or subtracting operations as picture element data fj for each line or each string constituting the block of $2^N \times 2^N$ picture element data;

wherein the selection circuit is that each of the first set and second set of transformation coefficient data composed of $2^N$ pieces of transformation coefficient data contained in one line or one string constituting the block of $2^N \times 2^N$ pieces of transformation coefficient datablock is selected for each of fixed coefficients, out of the fixed coefficients Pk, with k in odd-numbered positions in the equation (11) and equation 12), in a predetermined order, and wherein the multiplication circuit is that each of the first set and second set of transformation coefficient data selected for each of the fixed coefficients with kin odd-numbered positions in the equation (11) and equation (12) is multiplied by each of the fixed coefficients with k in odd-numbered positions in the equation (11) and equation (12) to obtain the product;

$$P_k = \cos\left(\frac{(N-1-k)\pi}{2^{N+1}}\right) \quad (33)$$

$$0 \leq k \leq 2^{N-1}-2$$

where $k=2^{N-1}-1$ is excluded;

$$P_k = \frac{1}{\sqrt{2}} \quad (34)$$

($k=2^{N-1}-1$).

In the foregoing, a preferable mode is one wherein the selection circuit, selects, as the first set of transformation coefficient data, a sum of transformation coefficient data composed of one data selected from a first transformation data set containing "j" data which constitutes first half of the $2^N$ pieces of transformation coefficient data Fj and containing $2^{N-1}$ pieces of transformation coefficient data and transformation coefficient data composed of one data selected from a second transformation data set containing "j" data which constitutes second half of the $2^N$ pieces of transformation coefficient data Fj and containing $2^{N-1}$ pieces of transformation coefficient data and wherein the selection circuit, selects, as the second set of transformation data, a difference between transformation coefficient data composed of one data selected from the first transformation data set and transformation coefficient data composed of one data selected from the second transformation data set.

According to a seventh aspect of the present invention, there is provided a device for compressing image signals including:

a selection circuit for selecting $2^N$ pieces of picture element data fj ($0 \leq j \leq 2^N-1$) contained in one line or one string constituting a block of $2^N \times 2^N$ (N being a natural number) pieces of picture element data block forming image data, for each of fixed coefficients Pk given in equation (13) and equation (14) shown below and determined in accordance with a discrete cosine transformation rule;

a multiplication circuit for multiplying each of the selected picture element data by each of the corresponding fixed coefficients Pk to obtain products;

an addition/subtraction circuit for performing adding operations and/or subtracting operations between products obtained by the multiplication circuit and determined in accordance with the discrete cosine transformation rule; and an output circuit for outputting a value obtained by the adding operations and/or subtracting operations as trans-formation coefficient data Fj for each line or each string constituting the block of $2^N \times 2^N$ picture element data;

wherein the selection circuit, in the case of $2^N$-$2^N$ discrete cosine transformation, selects $2^N$ pieces of picture element data from $2^N$ pieces of picture element data contained in one line or one string constituting the block of $2^N \times 2^N$ picture element data block for each of the fixed coefficients Pk determined by the $2^N$-$2^N$ discrete cosine transformation method in a predetermined order and wherein the selection circuit, in the case of $2$-$2^{N-1}$-$2^N$ discrete cosine transformation, selects each of first set and second set of picture element data each being composed of $2^N$ pieces of picture element data to be multiplied by each of fixed coefficients, out of the fixed coefficients Pk, with k in odd-numbered positions in the equation (13) and equation (14), from $2^N$ pieces of picture element data contained in one line or one string constituting the block of $2^N \times 2^N$ pieces of picture element data block in a predetermined order, wherein the multiplication circuit, in the case of the $2^N$-$2^N$ discrete cosine transformation, multiplies each of the $2^N$ pieces of picture element data selected by the selection circuit by each of corresponding fixed coefficients out of the fixed coefficients Pk to obtain products and wherein the multiplication circuit, in the case of the $2$-$2^{N-1}$-$2^N$ discrete cosine transformation, multiplies each of the first set and second set of picture element data selected based on each of corresponding fixed coefficients, out of the fixed coefficients Pk, with k in odd-numbered positions in the equation (13) and equation (14) by each of the fixed coefficients, out of the fixed coefficients Pk, with k in odd-numbered positions the equation (13) and equation (14), and wherein the addition/subtraction circuit, in the case of the $2^N$-$2^N$ discrete cosine transformation, performs the adding operations and/or subtracting operations between products obtained by the multiplication process and determined in accordance with the $2^N$-$2^N$ discrete cosine transformation and wherein the addition/subtraction circuit, in the case of the $2$-$2^{N-1}$-$2^N$ discrete cosine transformation, performs the adding operations and/or subtracting operations between products obtained by the multiplication process and determined in accordance with the $2$-$2^{N-1}$-$2^N$ discrete cosine transformation rule;

$$P_k = \cos\left(\frac{(N-1-k)\pi}{2^{N+1}}\right) \quad (35)$$

$0 \leq k \leq 2^{N-1}-2$ where $k=2^{N-1}-1$ is excluded;

$$P_k = \frac{1}{\sqrt{2}} \quad (36)$$

($k=2^{N-1}-1$).

In the foregoing, a preferable mode is one wherein the picture element data to be selected in said $2^N$-$2^N$ discrete cosine transformation includes the first set of picture element data composed of the $2^N$ pieces of picture element data contained in one line or one string constituting the block of $2^N \times 2^N$ pieces of picture element data block to be multiplied by each of the fixed coefficients, out of the fixed coefficients Pk, with k in odd-numbered positions in the equation (13) and equation (14) and the second set of picture element data composed of the $2^N$ pieces of picture element data to be multiplied by each of fixed coefficients, out of the fixed coefficients Pk, with k in odd-numbered positions in the equation (13) and equation (14).

Also, a preferable mode is one wherein the selection circuit, selects, as the picture element data, a sum and difference between picture element data constituting a predetermined pair of picture element.

Also, a preferable mode is one wherein the selection circuit selects, as the picture element data constituting the predetermined pair of picture element data, in the case of the $2$-$2^{N-1}$-$2^N$ discrete cosine transformation, $2^N$ pieces of picture element data having "j" data contained in the picture element data fj, one being lower-numbered data and the other being the next lower-numbered data.

Also, a preferable mode is one wherein the selection circuit selects, as the picture element data constituting the predetermined pair of picture element data, in the case of the $2^N$-$2^N$ discrete cosine transformation, picture element data composed of one data selected from the first transformation data set containing "j" data constituting first half of the $2^N$ pieces of picture element data Fj and containing $2^{N-1}$ pieces of picture element data and picture element data composed of one data selected from the second picture element data set containing "j" data constituting second half of the $2^N$ pieces of picture element data fj and containing $2^N$ pieces of picture element data.

According to an eighth aspect of the present invention, there is provided a device for decompressing image signals including:

a selection circuit for selecting $2^N$ pieces of transformation coefficient data Fj ($0 \leq j \leq 2^N-1$) contained in one line or one string constituting a block of $2^N \times 2^N$ (N being a natural number) pieces of transformation coefficient data block forming transformation coefficient data transmitted after being transformed by a discrete cosine transformation method, for each of fixed coefficients Pk given in equation (15) and equation (16) shown below and determined in accordance with a discrete cosine transformation rule;

a multiplication circuit for multiplying each of the selected transformation coefficient data by each of the corresponding fixed coefficients Pk to obtain products;

an addition/subtraction circuit for performing adding operations and/or subtracting operations between products obtained by the multiplication circuit and determined in accordance with the discrete cosine transformation rule; and an output circuit for outputting a value obtained by the adding operations and/or subtracting operations as picture element data fj for each line or each string constituting the block of $2^N \times 2^N$ transformation coefficient data;

wherein the selection circuit, in the case of $2^N$-$2^N$ inverse discrete cosine transformation, selects $2^N$ pieces of transformation coefficient data from $2^N$ pieces of transformation coefficient data contained in one line or one string constituting the block of $2^N \times 2^N$ transformation coefficient data for each of the fixed coefficients Pk determined by the $2^N$-$2^N$ inverse discrete cosine transformation rule in a predetermined order, and wherein the selection circuit, in the case of $2$-$2^{N-1}$-$2^N$ inverse discrete cosine transformation, selects first set and second set of transformation coefficient data each being composed of $2^N$ pieces of transformation coefficient data contained in one line or one string constituting the block of $2^N \times 2^N$ pieces of transformation coefficient data for each of fixed coefficients, out of the fixed coefficients Pk, with k in odd-numbered positions in the equation (15) and equation (16) in a predetermined order, wherein, the multiplication circuit, in the case of the $2^N$-$2^N$ inverse discrete cosine transformation, multiplies each of $2^N$ pieces of picture element data selected in the selection process by each of corresponding fixed coefficients, out of the fixed coefficients Pk, to obtain products and wherein the multiplication circuit, in the case of the $2$-$2^{N-1}$-$2^N$ inverse discrete cosine transformation, multiplies each of the first set and second set of transformation coefficient data selected based on each of corresponding fixed coefficients, out of the fixed coefficients Pk, with k in odd-numbered positions in the equation (15) and equation (16) by each of the fixed coefficients, out of the fixed coefficients Pk, with k in odd-numbered positions in the equation (15) and equation (16) to obtain products, wherein, the addition/subtraction circuit, in the case of the $2^N$-$2^N$ inverse discrete cosine transformation, performs the adding operations and/or subtracting operations between products obtained by the multiplication circuit and determined in accordance with the $2^N$-$2^N$ discrete cosine transformation and wherein, the addition/subtraction circuit, in the case of the $2$-$2^{N-1}$-$2^N$ inverse discrete cosine transformation, performs the adding operations and/or subtracting operations between products obtained by the multiplication process and determined in accordance with the $2-2^{N-1}-2^N$ discrete cosine transformation;

$$P_k = \cos\left(\frac{(N-1-k)\pi}{2^{N+1}}\right) \quad (37)$$

$$0 \leq k \leq 2^{N-1}-2$$

where $k=2^{N-1}-1$ is excluded;

$$P_k = \frac{1}{\sqrt{2}} \quad (38)$$

($k=2^{N-1}-1$).

Furthermore, a preferable mode is one wherein the selection circuit, in said $2^N\text{-}2^N$ inverse discrete cosine transformation, as the transformation coefficient data, selects the first set of transformation coefficient data composed of the $2^N$ pieces of transformation coefficient data contained in one line or one string constituting the block of $2^N \times 2^N$ pieces of transformation coefficient data to be multiplied by each of the fixed coefficients, out of the fixed coefficients Pk, with k in odd-numbered positions in said equation (15) and equation (16) and the second set of transformation coefficient data composed of the $2^N$ pieces of transformation coefficient data to be multiplied by each of fixed coefficients, out of the fixed coefficients Pk, with k in even-numbered in said equation (15) and equation (16).

BRIEF DESCRIPTION OF THE DRAWINGS

The above and other objects, advantages and features of the present invention will be more apparent from the following description taken in conjunction with the accompanying drawings in which:

FIG. 3 shows apart of an operational timing chart explaining 8-8 DCT in the 8-8/2-4-8 DCT device according to the first embodiment of the present invention;

FIG. 4 shows a residual part of the operational timing chart explaining the 8-8 DCT in the 8-8/2-4-8 DCT device according to the first embodiment of the present invention;

FIG. 6 shows a residual part of the operational timing chart explaining the 2-4-8 DCT in the 8-8/2-4-8 DCT device according to the first embodiment of the present invention;

FIG. 9 is a part of a timing chart explaining operations of an 8-8 IDCT constituting the 8-8 /2-4-8 IDCT device according to the second embodiment of the present invention;

FIG. 11 is a part of a timing chart explaining operations of an 2-4-8 IDCT constituting the 8-8/2-4-8 IDCT according to the second embodiment of the present invention;

FIG. 12 is a residual part of the timing chart explaining operations of the 2-4-8 IDCT constituting the 8-8/2-4-8 IDCT according to the second embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
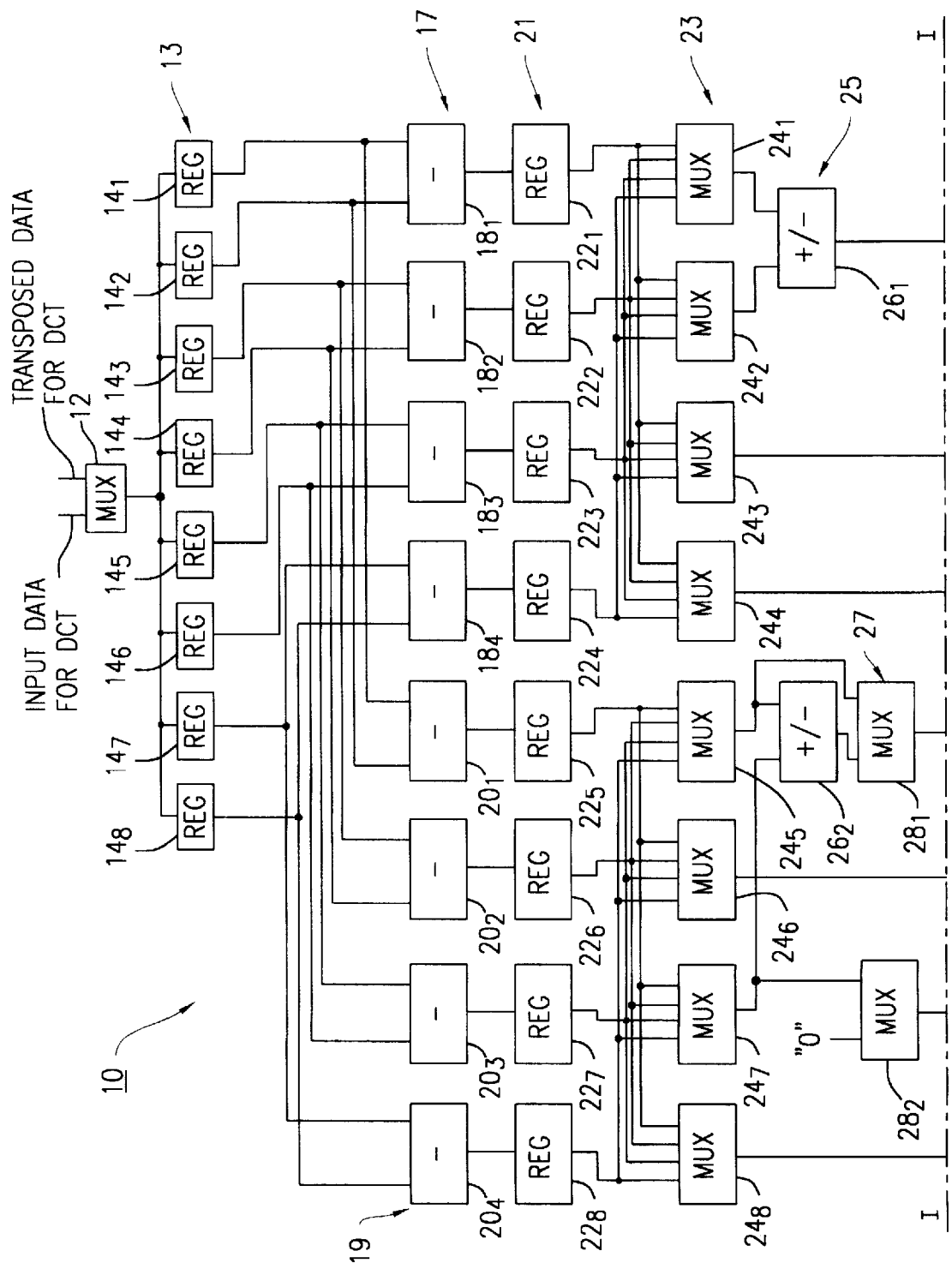
FIG. 1 is a schematic block diagram showing electrical configurations of an 8-8/2-4-8 DCT device according to a first embodiment of the present invention.
Figure 2:
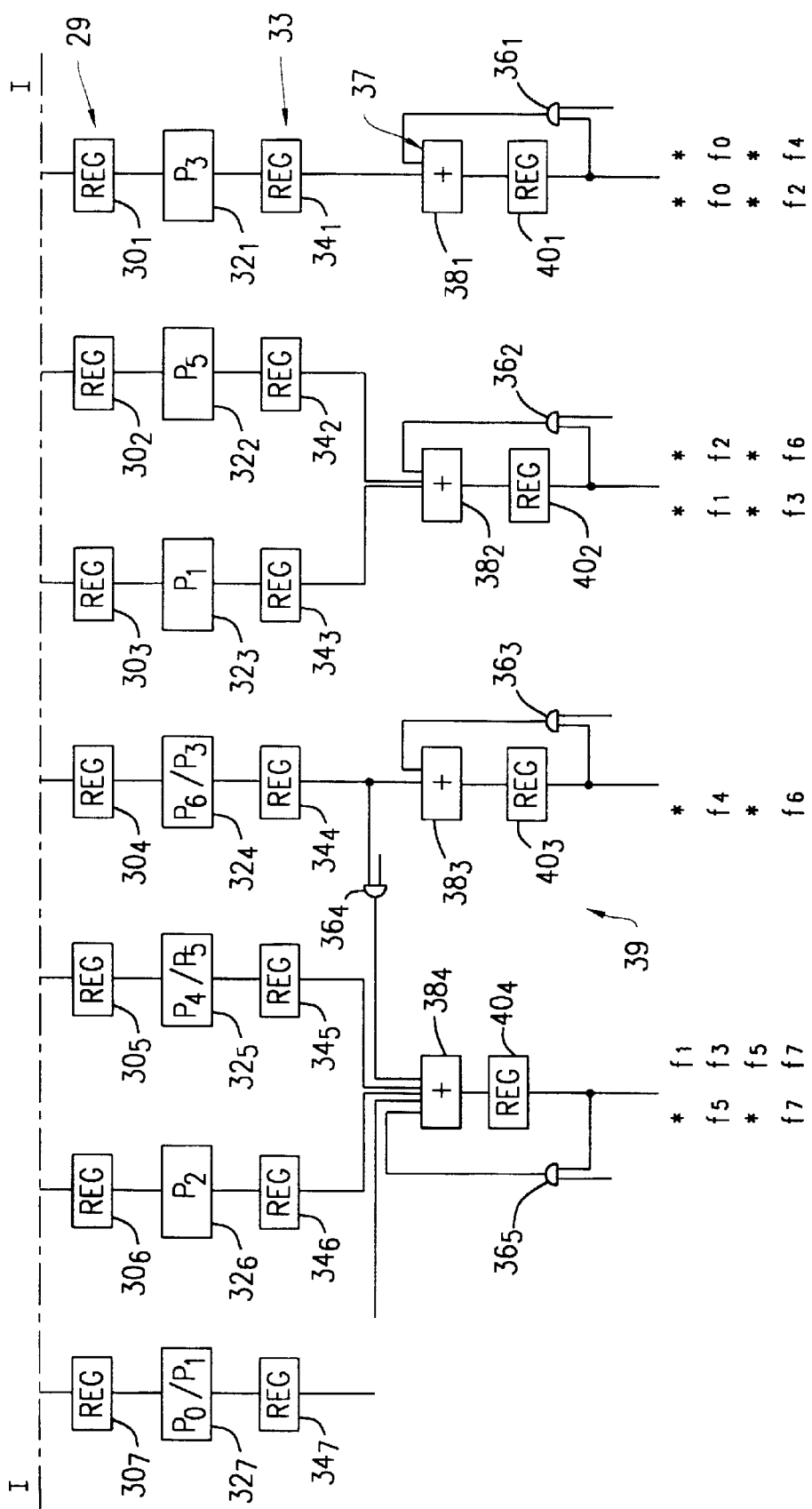
FIG. 2 is a schematic block diagram partially showing electrical configurations of the 8-8 /2-4-8 DCT device according to the first embodiment of the present invention.
Figure 5:
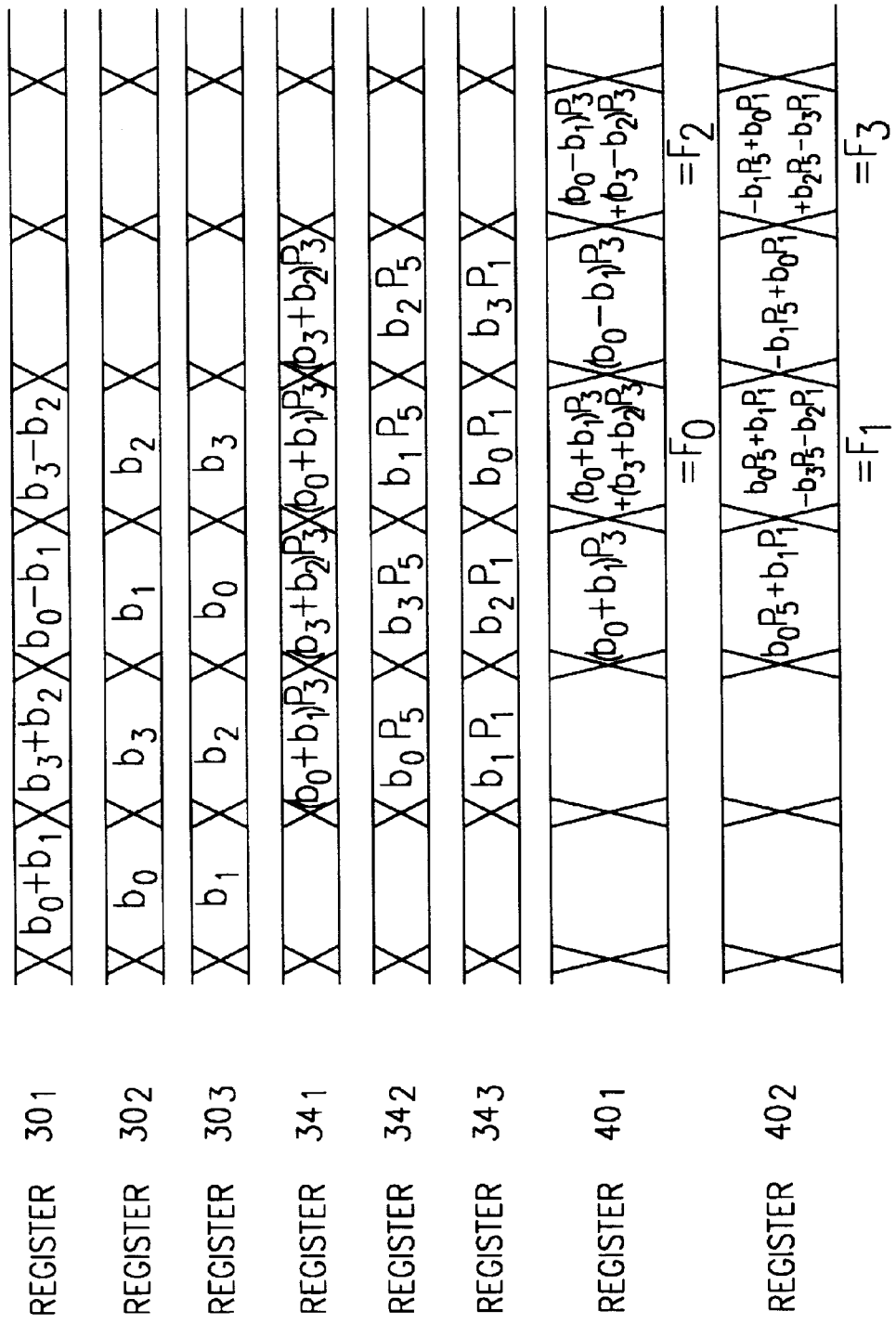
FIG. 5 shows apart of an operational timing chart explaining 2-4-8 DCT in the 8-8/2-4-8 DCT device according to the first embodiment of the present invention.

FIG. 1 is a schematic block diagram showing electrical configurations of an 8-8 DCT/2-4-8 DCT device according to a first embodiment of the present invention. FIG. 2 is a schematic block diagram partially showing electrical configurations of the 8-8 DCT/2-4-8 DCT device according to the first embodiment. FIG. 3 shows a part of an operational timing chart explaining the 8-8 DCT in the 8-8 DCT/2-4-8 DCT device according to the first embodiment. FIG. 4 shows the residual part of the operational timing chart explaining the 8-8 DCT in the 8-8 DCT/2-4-8 DCT device according to the first embodiment. FIG. 5 shows a part of an operational timing chart explaining the 2-4-8 DCT in the 8-8 DCT/2-4-8 DCT device according to the first embodiment. FIG. 6 shows the residual part of the operational timing chart explaining the 2-4-8 DCT in the 8-8 DCT/2-4-8 DCT device according to the first embodiment. By overlaying a line I—I in FIG. 1 on a line I—I in FIG. 2, an overall configuration of the 8-8 DCT/2-4-8 DCT device can be shown.

Thus, according to the first embodiment, since the 8-8 DCT/2-4-8 DCT device is so configured that a part of the 8-8 DCT circuit can be used for the 2-4-8 DCT, a high-speed calculating characteristic obtained through a pipeline processing type arithmetic operation in the 8-8 DCT can be maintained in the 2-4-8 DCT and the high-speed calculating characteristics can be still maintained in even miniaturized 8-8 DCT and 2-4-8 DCT devices.

Prior to description of configurations of the 8-8 DCT/2-4-8 DCT device, operational equations used to perform the 8-8 DCT on every one line or one string constituting 8×8 picture element data are first explained below.

By expressing the two-dimensional equation (17) described in the above "Description of the Related Art" in the form of one dimensional equation (39) and by decompressing the equation (39) with respect to h and x, the equation (39) is expressed by an equation (40). Where, $P_0$ to $P_6$ are as follows:

$P_0 = \cos(7\pi/16) = -\cos(9\pi/16) = 0.195090322\ldots$
$P_1 = \cos(6\pi/16) = -\cos(10\pi/16) = 0.382683432\ldots$
$P_2 = \cos(5\pi/16) = -\cos(11\pi/16) = 0.55557023\ldots$
$P_3 = \cos(4\pi/16) = -\cos(12\pi/16) = 0.707106781\ldots$
$P_4 = \cos(3\pi/16) = -\cos(13\pi/16) = 0.831469612\ldots$
$P_5 = \cos(2\pi/16) = -\cos(14\pi/16) = 0.923879532\ldots$
$P_6 = \cos(\pi/16) = -\cos(15\pi/16) = 0.980785280\ldots$ $$F(h) = C(h)\sum_{x=0}^{7} f(x,y)\cos\left(\frac{\pi h(2x+1)}{16}\right) \quad (39)$$

$$= C(h)\left\{f(0,y)\cos\left(\frac{\pi h}{16}\right) + f(1,y)\cos\left(\frac{3\pi h}{16}\right) + f(2,y)\cos\left(\frac{5\pi h}{16}\right) + f(3,y)\cos\left(\frac{7\pi h}{16}\right) + f(4,y)\cos\left(\frac{9\pi h}{16}\right) + f(5,y)\cos\left(\frac{11\pi h}{16}\right) + f(6,y)\cos\left(\frac{13\pi h}{16}\right) + f(7,y)\cos\left(\frac{15\pi h}{16}\right)\right\}$$

(40)

(i) $F(0) = \dfrac{1}{2\sqrt{2}}\{f(0,y)\cdot 1 + f(1,y)\cdot 1 + f(2,y)\cdot 1 + f(3,y)\cdot 1 + f(4,y)\cdot 1 + f(5,y)\cdot 1 + f(6,y)\cdot 1 + f(7,y)\cdot 1\}$ $= \dfrac{1}{2}\left\{f(0,y)\cdot\dfrac{1}{\sqrt{2}} + f(1,y)\cdot\dfrac{1}{\sqrt{2}} + f(2,y)\cdot\dfrac{1}{\sqrt{2}} + f(3,y)\cdot\dfrac{1}{\sqrt{2}} + f(4,y)\cdot\dfrac{1}{\sqrt{2}} + f(5,y)\cdot\dfrac{1}{\sqrt{2}} + f(6,y)\cdot\dfrac{1}{\sqrt{2}} + f(7,y)\cdot\dfrac{1}{\sqrt{2}}\right\}$ $= \dfrac{1}{2}\{f(0,y)\cdot P_3 + f(1,y)\cdot P_3 + f(2,y)\cdot P_3 + f(3,y)\cdot P_3 + f(4,y)\cdot P_3 + f(5,y)\cdot P_3 + f(6,y)\cdot P_3 + f(7,y)\cdot P_3\}$ (ii) $F(1) = \dfrac{1}{2}\{f(0,y)\cdot P_6 + f(1,y)\cdot P_4 + f(2,y)\cdot P_2 + f(3,y)\cdot P_0 + f(4,y)\cdot(-P_0) + f(5,y)\cdot(-P_2) + f(6,y)\cdot(-P_4) + f(7,y)\cdot(-P_6)\}$ (iii) $F(2) = \dfrac{1}{2}\{f(0,y)\cdot P_5 + f(1,y)\cdot P_6 + f(2,y)\cdot(-P_1) + f(3,y)\cdot(-P_5) + f(4,y)\cdot(-P_5) + f(5,y)\cdot(-P_1) + f(6,y)\cdot P_1 + f(7,y)\cdot P_5\}$ (iv) $F(3) = \dfrac{1}{2}\{f(0,y)\cdot P_4 + f(1,y)\cdot(-P_0) + f(2,y)\cdot(-P_6) + f(3,y)\cdot P_2 + f(4,y)\cdot(-P_2) + f(5,y)\cdot P_6 + f(6,y)\cdot P_0 + f(7,y)\cdot(-P_4)\}$ (v) $F(4) = \dfrac{1}{2}\{f(0,y)\cdot P_3 + f(1,y)\cdot(-P_3) + f(2,y)\cdot(-P_3) + f(3,y)\cdot P_3 + f(4,y)\cdot P_3 + f(5,y)\cdot(-P_3) + f(6,y)\cdot(-P_3) + f(7,y)\cdot P_3\}$ (vi) $F(5) = \dfrac{1}{2}\{f(0,y)\cdot P_2 + f(1,y)\cdot(-P_6) + f(2,y)\cdot(-P_0) + f(3,y)\cdot P_4 + f(4,y)\cdot(-P_4) + f(5,y)\cdot P_0 + f(6,y)\cdot P_6 + f(7,y)\cdot(-P_2)\}$ (vii) $F(6) = \dfrac{1}{2}\{f(0,y)\cdot P_1 + f(1,y)\cdot(-P_5) + f(2,y)\cdot(-P_5) + f(3,y)\cdot(-P_4) + f(4,y)\cdot(-P_1) + f(5,y)\cdot P_5 + f(6,y)\cdot(-P_5) + f(7,y)\cdot P_1\}$ (viii) $F(7) = \dfrac{1}{2}\{f(0,y)\cdot P_0 + f(1,y)\cdot P_2 + f(2,y)\cdot P_4 + f(3,y)\cdot P_6 + f(4,y)\cdot(-P_6) + f(5,y)\cdot(-P_4) + f(6,y)\cdot(-P_2) + f(7,y)\cdot(-P_0)\}$ Then, when the equation (40) is changed by setting so that $F(0)=F_0$, $F(1)=F_1$, $F(2)=F_2$, $F(3)=F_3$, $F(4)=F_4$, $F(5)=F_5$, $F(6)=F_6$ and $F(7)=F_7$ and so that $f(0, y)=f_0$, $f(1, y)=f_1$, $f(2, y)=f_2$, $f(3, y)=f_3$, $f(4, y)=f_4$, $f(5, y)=f_5$, $f(6, y)=f_6$ and $f(7, y)=f_7$, the equation (40) is expressed by an equation (41). By changing the right side of the equation (41), an equation (42) can be obtained.

$$\begin{bmatrix} F_0 \\ F_1 \\ F_2 \\ F_3 \\ F_4 \\ F_5 \\ F_6 \\ F_7 \end{bmatrix} = \begin{bmatrix} P_3 & P_3 & P_3 & P_3 & P_3 & P_3 & P_3 & P_3 \\ P_6 & P_4 & P_2 & P_0 & -P_0 & -P_2 & -P_4 & -P_6 \\ P_5 & P_1 & -P_1 & -P_5 & -P_5 & -P_1 & P_1 & P_5 \\ P_4 & -P_0 & -P_6 & P_2 & -P_2 & P_6 & P_0 & -P_4 \\ P_3 & -P_3 & -P_3 & P_3 & P_3 & -P_3 & -P_3 & P_3 \\ P_2 & -P_6 & -P_0 & P_4 & -P_4 & P_0 & P_6 & -P_2 \\ P_1 & -P_5 & P_5 & -P_4 & -P_1 & P_5 & -P_5 & P_1 \\ P_0 & P_2 & P_4 & P_6 & -P_6 & -P_4 & -P_2 & -P_0 \end{bmatrix} \begin{bmatrix} f_0 \\ f_1 \\ f_2 \\ f_3 \\ f_4 \\ f_5 \\ f_6 \\ f_7 \end{bmatrix} \quad (41)$$

$$\begin{bmatrix} F_0 \\ F_1 \\ F_2 \\ F_3 \\ F_4 \\ F_5 \\ F_6 \\ F_7 \end{bmatrix} = \begin{bmatrix} P_3 & P_3 & P_3 & P_3 & 0 & 0 & 0 & 0 \\ 0 & 0 & 0 & 0 & P_6 & P_4 & P_2 & P_0 \\ P_5 & -P_1 & -P_1 & -P_5 & 0 & 0 & 0 & 0 \\ 0 & 0 & 0 & 0 & P_4 & -P_0 & -P_6 & P_2 \\ P_3 & -P_3 & -P_3 & P_3 & 0 & 0 & 0 & 0 \\ 0 & 0 & 0 & 0 & P_2 & -P_6 & -P_0 & -P_4 \\ P_1 & -P_5 & P_5 & -P_1 & 0 & 0 & 0 & 0 \\ 0 & 0 & 0 & 0 & P_0 & P_2 & P_4 & P_6 \end{bmatrix} \begin{bmatrix} f_0 + f_7 \\ f_1 + f_6 \\ f_2 + f_5 \\ f_3 + f_4 \\ f_0 - f_7 \\ f_1 - f_6 \\ f_2 - f_5 \\ f_3 - f_4 \end{bmatrix} \quad (42)$$

By substituting figures expressed by an equation (43) for $f_0+f_7$, $f_1+f_6$, $f_2+f_5$, $f_3+f_4$, $f_0-f_7$, $f_1-f_6$, $f_2-d_5$ and $f_3-f_4$ contained in the equation (42) and then by changing the right side of the equation (42), an equation (44) can be obtained. By rearranging the equation (44), an equation (45) can be obtained. The 8-8 DCT/2-4-8 DCT device of the first embodiment is adapted to perform the 8-8 DCT in accordance with the equation (45).

Next, operational equations used to perform the 2-4-8 DCT on every one line or one string of 8×8 picture element data are described below.

By expressing the two-dimensional equation (21) described in the above "Description of the Related Art" in the form of a one-dimensional equation (46) and by setting $F(0)$, $F(1)$, $F(2)$, $F(3)$, $F(4)$, $F(5)$, $F(6)$, $F(7)$, $f(0, z)$, $f(1, z)$, $f(2, z)$, $f(3, z)$, $f(4, z)$, $f(5, z)$, $f(6, z)$ and $f(7, z)$ obtained by decompressing the equation (46) with respect to h and x so that $F(0)=F_0$, $F(1)=F_1$, $F(2)=F_2$, $F(3)=F_3$, $F(4)=F_4$, $F(5)=F_5$, $F(6)=F_6$ and $F(7)=F_7$, in the same manner as for the equation (40), and setting so that $f(0, z)=f_0$, $f(1, z)=f_1$, $f(2, z)=f_2$, $f(3, z)=f_3$, $f(4, z)=f_4$, $f(5, z)=f_5$, $f(6, z)=f_6$, and $f(7, z)=f_7$, an equation (47) can be obtained. Values of $P_0$ to $P_6$ in the equation (47) are the same as those in the equation (40).

$$\left. \begin{array}{l} F(h) = C(h) \sum_{x=0}^{7} \{f(x, 2z) + f(x, 2z+1)\} \cos\beta \\ \\ F(h, v+4) = C(h) \sum_{x=0}^{7} \{f(x, 2z) + f(x, 2z+1)\} \cos\beta \end{array} \right\} \quad (46)$$

where $\beta \equiv \dfrac{\pi h(2x+1)}{16}$ $$\begin{bmatrix} F_0 \\ F_1 \\ F_2 \\ F_3 \\ F_4 \\ F_5 \\ F_6 \\ F_7 \end{bmatrix} = \begin{bmatrix} P_3 & P_3 & P_3 & P_3 & 0 & 0 & 0 & 0 \\ P_5 & P_1 & -P_1 & -P_5 & 0 & 0 & 0 & 0 \\ P_3 & -P_3 & -P_3 & P_3 & 0 & 0 & 0 & 0 \\ P_1 & -P_5 & P_5 & -P_1 & 0 & 0 & 0 & 0 \\ 0 & 0 & 0 & 0 & P_3 & P_3 & P_3 & P_3 \\ 0 & 0 & 0 & 0 & P_5 & P_1 & -P_1 & -P_5 \\ 0 & 0 & 0 & 0 & P_3 & -P_3 & -P_3 & P_3 \\ 0 & 0 & 0 & 0 & P_1 & -P_5 & P_5 & -P_1 \end{bmatrix} \begin{bmatrix} f_0 + f_1 \\ f_2 + f_3 \\ f_4 + f_5 \\ f_6 + f_7 \\ f_0 - f_1 \\ f_2 - f_3 \\ f_4 - f_5 \\ f_6 - f_7 \end{bmatrix} \quad (47)$$

By changing the right side of the equation (47), an equation (48) can be obtained. By rearranging the equation (48), an equation (49) can be obtained.

$$\left. \begin{array}{l} a_0 = f_0 + f_7, \quad a_1 = f_1 + f_6, \quad a_2 = f_2 + f_5, \quad a_3 = f_3 + f_4, \\ a_4 = f_0 - f_7, \quad a_5 = f_1 - f_6, \quad a_6 = f_2 - f_5, \quad a_7 = f_3 - f_4 \end{array} \right\} \quad (43)$$

$$\begin{bmatrix} F_0 \\ F_2 \\ F_4 \\ F_6 \\ F_1 \\ F_3 \\ F_5 \\ F_7 \end{bmatrix} = \begin{bmatrix} a_0 + a_1 + a_3 + a_2 & 0 & 0 & 0 & 0 & 0 & 0 \\ 0 & a_0 - a_3 & a_1 - a_2 & 0 & 0 & 0 & 0 \\ a_0 - a_1 + a_3 - a_2 & 0 & 0 & 0 & 0 & 0 & 0 \\ 0 & -a_1 + a_2 & a_0 - a_3 & 0 & 0 & 0 & 0 \\ 0 & 0 & 0 & a_4 & a_5 & a_6 & a_7 \\ 0 & 0 & 0 & -a_6 & a_4 & -a_7 & -a_5 \\ 0 & 0 & 0 & -a_5 & a_7 & a_4 & a_6 \\ 0 & 0 & 0 & -a_7 & a_6 & -a_5 & a_4 \end{bmatrix} \begin{bmatrix} P_3 \\ P_5 \\ P_1 \\ P_6 \\ P_4 \\ P_2 \\ P_0 \end{bmatrix} \quad (44)$$

$$\left. \begin{array}{l} \begin{bmatrix} F_0 \\ F_4 \\ F_2 \\ F_6 \end{bmatrix} = \begin{bmatrix} a_0 + a_1 + a_3 + a_2 & 0 & 0 \\ a_0 - a_1 + a_3 - a_2 & 0 & 0 \\ 0 & a_0 - a_3 & a_1 - a_2 \\ 0 & -a_1 - a_2 & a_0 - a_3 \end{bmatrix} \begin{bmatrix} P_3 \\ P_5 \\ P_1 \end{bmatrix} \\ \\ \begin{bmatrix} F_1 \\ F_3 \\ F_5 \\ F_7 \end{bmatrix} = \begin{bmatrix} a_4 & a_5 & a_6 & a_7 \\ -a_6 & a_4 & -a_7 & -a_5 \\ -a_5 & a_7 & a_4 & a_6 \\ -a_7 & a_6 & -a_5 & a_4 \end{bmatrix} \begin{bmatrix} P_6 \\ P_4 \\ P_2 \\ P_0 \end{bmatrix} \end{array} \right\} \quad (45)$$

$$\begin{bmatrix} F_0 \\ F_1 \\ F_2 \\ F_3 \end{bmatrix} = \begin{bmatrix} (f_0+f_1)+(f_2+f_3)+(f_4+f_5)+(f_6+f_7) & 0 & 0 \\ 0 & (f_0+f_1)-(f_6+f_7) & (f_2+f_3)-(f_4+f_5) \\ (f_0+f_1)-(f_2+f_3)-(f_4+f_5)+(f_6+f_7) & 0 & 0 \\ 0 & -(f_2+f_3)+(f_4+f_5) & (f_0+f_1)-(f_6+f_7) \end{bmatrix} \begin{bmatrix} P_3 \\ P_5 \\ P_1 \end{bmatrix} \quad (48)$$

$$\begin{bmatrix} F_4 \\ F_5 \\ F_6 \\ F_7 \end{bmatrix} = \begin{bmatrix} (f_0-f_1)+(f_2-f_3)+(f_4-f_5)+(f_6-f_7) & 0 & 0 \\ 0 & (f_0-f_1)-(f_6-f_7) & (f_2-f_3)-(f_4-f_5) \\ (f_0-f_1)-(f_2-f_3)-(f_4-f_5)+(f_6-f_7) & 0 & 0 \\ 0 & -(f_2-f_3)+(f_4-f_5) & (f_0-f_1)-(f_6-f_7) \end{bmatrix} \begin{bmatrix} P_3 \\ P_5 \\ P_1 \end{bmatrix}$$

$$\begin{bmatrix} F_0 \\ F_2 \\ F_1 \\ F_3 \end{bmatrix} = \begin{bmatrix} (f_0+f_1)+(f_2+f_3)+(f_4+f_5)+(f_6+f_7) & 0 & 0 \\ (f_0+f_1)-(f_2+f_3)-(f_4+f_5)+(f_6+f_7) & 0 & 0 \\ 0 & (f_0+f_1)-(f_6+f_7) & (f_2+f_3)-(f_4+f_5) \\ 0 & -(f_2+f_3)+(f_4+f_5) & (f_0+f_1)-(f_6+f_7) \end{bmatrix} \begin{bmatrix} P_3 \\ P_5 \\ P_1 \end{bmatrix} \quad (49)$$

$$\begin{bmatrix} F_4 \\ F_6 \\ F_5 \\ F_7 \end{bmatrix} = \begin{bmatrix} (f_0-f_1)+(f_2-f_3)+(f_4-f_5)+(f_6-f_7) & 0 & 0 \\ (f_0-f_1)-(f_2-f_3)-(f_4-f_5)+(f_6-f_7) & 0 & 0 \\ 0 & (f_0-f_1)-(f_6-f_7) & (f_2-f_3)-(f_4-f_5) \\ 0 & -(f_2-f_3)+(f_4-f_5) & (f_0-f_1)-(f_6-f_7) \end{bmatrix} \begin{bmatrix} P_3 \\ P_5 \\ P_1 \end{bmatrix}$$

By substituting figures expressed by an equation (50) for $f_0+f_1$, $f_2+f_3$, $f_4+f_5$, $f_6+f_7$, $f_0-f_1$, $f_2-f_3$, $f_4-f_5$ and $f_6-f_7$ contained in the equation (49), an equation (51) can be obtained. The 8-8 DCT/2-4-8 DCT device of the first embodiment is adapted to perform the 2-4-8 DCT in accordance with the equation (51).

$$b_0 = f_0+f_1, \quad b_1 = f_2+f_3, \quad b_2 = f_4+f_5, \quad b_3 = f_6+f_7, \\ b_4 = f_0-f_1, \quad b_5 = f_2-f_3, \quad b_6 = f_4-f_5, \quad b_7 = f_6-f_7 \quad (50)$$

$$\begin{bmatrix} F_0 \\ F_2 \\ F_1 \\ F_3 \end{bmatrix} = \begin{bmatrix} b_0+b_1+b_3+b_2 & 0 & 0 \\ b_0-b_1+b_3-b_2 & 0 & 0 \\ 0 & b_0-b_3 & b_1-b_2 \\ 0 & -b_1+b_2 & b_0-b_3 \end{bmatrix} \begin{bmatrix} P_3 \\ P_5 \\ P_1 \end{bmatrix} \quad (51)$$

$$\begin{bmatrix} F_4 \\ F_6 \\ F_5 \\ F_7 \end{bmatrix} = \begin{bmatrix} b_4+b_5+b_7+b_6 & 0 & 0 \\ b_4-b_5+b_7-b_6 & 0 & 0 \\ 0 & b_4-b_7 & b_5-b_6 \\ 0 & -b_5+b_6 & b_4-b_7 \end{bmatrix} \begin{bmatrix} P_3 \\ P_5 \\ P_1 \end{bmatrix}$$

The 8-8 DCT/2-4-8 DCT described above is composed of a multiplexer 12, eight data registers $14_1$ to $14_8$ constituting a first data register group 13, four adding circuits $18_1$ to $18_4$ constituting a first adding circuit group 17, four subtracting circuits $20_1$ to $20_4$ constituting a subtracting circuit group 19, eight data registers $22_1$ to $22_8$ constituting a second data register group 21, eight multiplexers $24_1$ to $24_8$ constituting a first multiplexer group 23, two adding/subtracting circuits $26_1$ and $26_2$ constituting a first adding/subtracting circuit group 25, two multiplexers $28_1$ to $28_2$ constituting a second multiplexer group 27, seven data registers $30_1$ to $30_7$ constituting a third data register group 29, a $P_3$ coefficient multiplying circuit $32_1$, a $P_5$ coefficient multiplying circuit $32_2$, a $P_1$ coefficient multiplying circuit $32_3$, a $P_6/P_3$ coefficient multiplying circuit $32_4$, a $P_4/P_5$ coefficient multiplying circuit $32_5$, $P_2$ coefficient multiplying circuit $32_6$, a $P_0/P_1$ coefficient multiplying circuit $32_7$, saven data registers $34_1$ to $34_7$ constituting a fourth data register group 33, five AND circuits $36_1$ to $36_5$, four adding circuits $38_1$ to $38_4$ constituting a second adding circuit group 37 and five data registers $40_1$ to $40_5$ constituting a fifth data register group 39. Hereinafter, the data register is referred simply to as a register (shown as "REG" in figures) and the multiplexer simply to a MUX.

The MUX 12 outputs selectively eight pieces of picture element data contained in each of lines constituting an 8×8 picture element block on which a primary DCT is performed or eight pieces of picture element data contained in each of strings constituting 8×8 data block obtained by the primary DCT. Each of eight pieces of data output from the MUX 12 is referred to by $f_0$ to $f_7$. When the 8-8 DCT is performed, the MUX 12 stores data $f_0$ into the register $14_1$, data $f_7$ into the register $14_2$, data $f_1$ into the register $14_3$, data $f_6$ into the register $14_4$, data $f_2$ into the register $14_5$, data $f_5$ into the register $14_6$, data $f_3$ into the register $14_7$ and data $f_4$ into the register $14_8$ in the first register group 13 and, when the 2-4-8 DCT is performed, the MUX 12 stores data $f_1$ to $f_8$ into the register $14_1$ to $14_8$ which correspond to the data $f_1$ to $f_8$.

Each of the four adding circuits $18_1$ to $18_4$ constituting the first adding circuit group 17, in the case of both the 8-8 DCT and 2-4-8 DCT, performs adding operations on data output from two registers. That is, the adding circuit $18_1$ adds data stored in the register $14_1$ to data stored in the register $14_2$. The adding circuit $18_2$ adds data stored in the register $14_3$ to data stored in the register $14_4$. The adding circuit $18_3$ adds data stored in the register $14_5$ to data stored in the register $14_6$. The adding circuit $18_4$ adds data stored in the register $14_7$ to data stored in the register $14_8$.

Each of the four subtracting circuit $20_1$ to $20_4$ constituting the subtracting circuit group 19, in the case of both the 8-8 DCT and 2-4-8 DCT, performs subtracting operations on data output from two registers. That is, the subtracting circuit $20_1$ subtracts data stored in the register $14_2$ from data stored in the register $14_1$. The subtracting circuit $20_2$ subtracts data stored in the register $14_3$ from data stored in the register $14_4$. The subtracting circuit $20_3$ subtracts data stored in the register $14_6$ from data stored in the register $14_5$. The subtracting circuit $20_4$ subtracts data stored in the register $14_8$ from data stored in the register $14_7$.

Each of the registers $22_1$ to $22_8$ constituting the second register group 21 temporarily stores data output from each of the adding circuits $18_1$ to $18_4$ or data output from each of the subtracting circuits $20_1$ to $20_4$. The registers $22_1$ temporarily stores data output from the adding circuit $18_1$. The register $22_2$ temporarily stores data output from the adding circuit $18_2$. The register $22_3$ temporarily stores data output from the adding circuit $18_3$. The register $22_4$ temporarily stores data output from the adding circuit $18_4$. The register $22_5$ temporarily stores data output from the subtracting circuit $20_1$. The register $22_6$ temporarily stores data output from the subtracting circuit $20_2$. The register $22_7$ temporarily stores data output from the subtracting circuit $20_3$. The register $22_8$ temporarily stores data output from the subtracting circuit $20_4$. The MUX 12 and each of the registers $14_1$ to $14_8$, of the adding circuits $18_1$ to $18_4$, each of the subtracting circuits $20_1$ to $20_4$ and each of the registers $22_1$ to $22_8$ repeat the same operations for every four operation cycles and each of the operation cycles corresponds to four operation cycles performed by the MUXs $24_1$ to $24_8$ and thereafter.

An operation of selecting data performed by each of the MUXs $24_1$, $24_2$, $24_3$ and $24_4$ constituting a first MUX group 23 is the same in both the 8-8 DCT and 2-4-8 DCT. That is, the MUX $24_1$ is connected to an output of each of the registers $22_1$, $22_2$, $22_3$ and $22_4$ and is adapted to select the register in the order of the registers $22_1$, $22_4$, $22_1$ and $22_4$ and to output four pieces of data sequentially. The MUX $24_2$ is connected to outputs of the registers $22_1$, $22_2$, $22_3$ and $22_4$ and is adapted to select the register in the order of the registers $22_2$, $22_3$, $22_2$ and $22_3$ and to output four pieces of data sequentially. The MUX $24_3$ is connected to outputs of the registers $22_1$, $22_2$, $22_3$ and $22_4$ and is adapted to select the register in the order of the registers $22_1$, $22_4$, $22_2$ and $22_3$ and to output four pieces of data sequentially. The MUX $24_4$ is connected to outputs of the registers $22_1$, $22_2$, $22_3$ and $22_4$ and is adapted to select the register in the order of the registers $22_2$, $22_3$, $22_1$ and $22_2$ and to output four pieces of data sequentially.

An operation of selecting data of each of MUX $24_5$, MUX $24_6$, MUX $24_7$ and MUX $24_8$ constituting the first MUX group 23 is different in between the 8-8 DCT and 2-4-8 DCT.

The operation of selecting data of each of the MUX $24_5$, MUX $24_6$, MUX $24_7$ and MUX $24_8$ in the case of the 8-8 DCT is as follows. The MUX $24_5$ is connected to outputs of the registers $22_5$, $22_6$, $22_7$ and $22_8$ and is adapted to select the register in the order of the registers $22_5$, $22_7$, $22_6$ and $22_8$ and to output four pieces of data sequentially. The MUX $24_6$ is connected to outputs of the registers $22_5$, $22_6$, $22_7$ and $22_8$ and is adapted to select the register in the order of the registers $22_6$, $22_5$, $22_8$ and $22_7$ and to output four pieces of data sequentially. The MUX $24_7$ is connected to outputs of the registers $22_5$, $22_6$, $22_7$ and $22_8$ and is adapted to select the register in the order of the registers $22_7$, $22_8$, $22_5$ and $22_6$ and to output four pieces of data sequentially. The MUX$_8$ is connected to outputs of the registers $22_5$, $22_6$, $22_7$ and $22_8$ and is adapted to select the register in the order of the registers $22_8$, $22_6$, $22_7$ and $22_5$ and to output four pieces of data sequentially.

The operation of selecting data of each of the MUX $24_5$, MUX $24_6$, MUX $24_7$ and MUX $24_8$ in the case of the 2-4-8 DCT is as follows. The MUX $24_5$ is connected to outputs of the registers $22_5$, $22_6$, $22_7$ and $22_8$ and is adapted to select the register in the order of the registers $22_5$, $22_8$, $22_5$ and $22_8$ and to output four pieces of data sequentially. The MUX $24_6$ is connected to outputs of the registers $22_5$, $22_6$, $22_7$ and $22_8$ and is adapted to select the register in the order of the registers $22_5$, $22_8$, $22_6$ and $22_7$ and to output four pieces of data sequentially. The MUX $24_7$ is connected to outputs of the registers $22_5$, $22_6$, $22_7$ and $22_8$ and is adapted to select the register in the order of the registers $22_6$, $22_7$, $22_6$ and $22_7$ and to output four pieces of data sequentially. The MUX $24_8$ is connected to outputs of the registers $22_5$, $22_6$, $22_7$ and $22_8$ and is adapted to select the register in the order of the registers $22_6$, $22_7$, $22_5$ and $22_8$ and to output four pieces of data sequentially.

The adding/subtracting circuit $26_1$ constituting a first adding/subtracting group 25, in the case of both the 8-8 DCT and the 2-4-8 DCT, performs adding operations on data output in a first order and second order out of four pieces of data output from the MUX $24_1$ and on data output in the first order and second order out of four pieces of data output from the MUX $24_2$, respectively and performs subtracting operations on data output in a third order and fourth order out of the four pieces of data output from the MUX $24_1$ and on data output in the third order and fourth order out of the four pieces of data output from the MUX $24_2$. That is, data output in the first order from the MUX $24_1$ is added to data output in the first order from the MUX $24_2$ and the same adding operations are performed on the data output in the second order. In the subtracting operations to be performed by the adding/subtracting circuit $26_1$, data output from the MUX $24_2$ is subtracted from data output from the MUX $24_1$. The adding/subtracting circuit $26_2$, in the case of the 2-4-8 DCT, performs adding operations on data output in the first order and second order out of four pieces of data output from MUX $24_5$ and on data output in the first order and second order out of the four pieces of data output from MUX $24_7$ and performs subtracting operations on data output in the third order and fourth order out of four pieces of data output from the MUX $24_5$ and on data output in the third order and fourth order out of the four pieces of data output from the MUX $24_7$. In the subtracting operations to be performed by the adding/subtracting circuit $26_2$, data output from the MUX $24_7$ is subtracted from data output from the MUX $24_5$.

The MUX $28_1$ constituting the second MUX group 27, in the case of the 8-8 DCT, selects four pieces of data output sequentially from the MUX $24_5$ and, in the case of the 2-4-8 DCT, selects data output sequentially from the adding/subtracting circuit $26_2$. The MUX $28_2$, in the case of the 8-8 DCT, selects four pieces of data output sequentially from the MUX $24_7$ and, in the case of the 2-4-8 DCT, does not select four pieces of data output from the MUX $24_7$ but selects "0" four times which corresponds to four operation cycles of the MUX $28_2$ (the operation cycle in the 2-4-8 DCT is called a "second operation cycle").

The register $30_1$ constituting the third register group 29 sequentially stores four pieces of data on arithmetic operation results. The register $30_2$ sequentially stores four pieces of data output sequentially from the MUX $24_3$. The register $30_3$ sequentially stores four pieces of data output sequentially from the MUX $24_4$. The register $30_4$ sequentially stores four pieces of data output sequentially from the MUX $28_1$. The register $30_5$ sequentially stores four pieces of data output sequentially from the MUX $24_6$. The register $30_6$ sequentially stores four pieces of data output sequentially from the MUX $28_2$. The register $30_7$ sequentially stores four pieces of data output sequentially from the MUX $24_8$.

The $P_3$ coefficient multiplying circuit $32_1$ multiplies each of four pieces of data output sequentially from the register $30_1$ by a fixed coefficient $P_3$. The $P_5$ coefficient multiplying circuit $32_2$ multiplies each of four pieces of data output sequentially from the register $30_2$ by a fixed coefficient $P_5$. The $P_1$ coefficient multiplying circuit $32_3$ multiplies each of four pieces of data output sequentially from the register $30_3$ by a fixed coefficient $P_5$. The $P_6/P_3$ coefficient multiplying circuit $32_4$ switches fixed coefficients between the 8-8 DCT and the 2-4-8 DCT and, in the case of the 8-8 DCT, multiplies each of four pieces of data output from the register $30_4$ by a fixed coefficient $P_6$ and, in the case of the 2-4-8 DCT, multiplies each of four pieces of data output from the register $30_4$ by a fixed coefficient $P_3$. The $P_4/P_5$ coefficient multiplying circuit $32_5$ switches fixed coefficients between the 8-8 DCT and the 2-4-8 DCT and, in the case of the 8-8 DCT, multiplies each of four pieces of data output from the register $30_5$ by a fixed coefficient $P_4$ and, in the case of the 2-4-8 DCT, multiplies each of four pieces of data output from the register $30_5$ by a fixed coefficient $P_5$. The $P_2$ coefficient multiplying circuit $32_6$ multiplies each of four pieces of data output sequentially from the register $30_6$ by a fixed coefficient $P_2$. The $P_0P_1$ coefficient multiplying circuit $32_7$ switches fixed coefficients between the 8-8 DCT and the 2-4-8 DCT and, in the case of the 8-8 DCT, multiplies each of four pieces of data output from the register $30_7$ by a fixed coefficient $P_0$ and, in the case of the 2-4-8 DCT, multiplies each of four pieces of data output from the register $30_7$ by a fixed coefficient $P_1$.

The register $34_1$ constituting the fourth register group $33$, in both the 8-6 DCT and 2-4-8 DCT, stores, in order, each of four pieces of data output sequentially from the $P_3$ coefficient multiplying circuit $32_1$ and outputs each data as a positive value. The register $34_2$, in both the 8-8 DCT and the 2-4-8 DCT, stores each of four pieces of data output sequentially from the $P_5$ coefficient circuit $74$ and outputs data to be output in a first order and fourth order as positive values and data to be output in a second order and third order as negative values. The register $34_3$, in both the 8-8 DCT and the 2-4-8 DCT, sequentially stores each of four pieces of data output, in order, from the $P_1$ coefficient circuit $32_3$ and outputs data to be output in a first order and third order as positive values and data to be output in a second order and fourth order as negative values.

The register $34_4$ stores, in order, each of four pieces of data output sequentially from the $P_6/P_3$ coefficient multiplying circuit $32_4$ and outputs, in the case of the 8-8 DCT, data to be output in a first order as a positive value and data to be output in a second order to fourth order as negative values, and in the case of the 2-4-8 DCT, each of the four pieces of data to be output in a first order to fourth order as a positive value. The register $34_5$ stores, in order, each of four pieces of data output sequentially from the $P_4/P_5$ coefficient multiplying circuit $32_5$ and outputs, in the case of the 8-8 DCT, data to be output in a first order to fourth order as positive values and, in the case of the 2-4-8 DCT, each of the four pieces of data to be output in a first order and fourth order as positive values and data to be output in a second order and third order as negative values. The register $34_6$ stores, in order, each of four pieces of data output sequentially from the $P_2$ coefficient multiplying circuit $32_6$, outputs data to be output in the first order and third order as positive values and data to be output in the second order and fourth order as negative values. The register $34_7$ stores, in order, each of four pieces of data output sequentially from the $P_0/P_1$ multiplying circuit $32_7$ and, in the case of the 8-8 DCT, outputs data to be output in a first order and fourth order as positive values and data to be output in the second order and third order as negative orders and, in the case of the 2-4-8 DCT, outputs data to be output in a first order and third order as positive values and data to be output in a second order and fourth order as negative values.

The adding circuit $38_1$ contained in the second adding circuit group $37$ constitutes an accumulative circuit for data together with the register $40_1$ contained in the fifth register group $39$ and with the AND circuit $36_1$. In both the 8-8 DCT and the 2-4-8 DCT, to one input of the AND circuit $36_1$ is fed data from the register $40_1$ and, to the other input of the AND circuit $36_1$ are fed signals "0", "1", "0" and "1" sequentially in every operation cycle in the order of a first operation cycle to a fourth operation cycle out of four operation cycles, which are output from a binary signal string generating circuit (not shown). That is, an accumulative value is output from the register $40_1$ which is obtained by adding, in the adding circuit $38_1$, data output from the register $34_1$ and fed to one input of the adding circuit $38_1$ to data stored in the register $40_1$ on one previous clock and fed to the other input of the adding circuit $38_1$ through the AND circuit $36_1$ on the next clock.

The adding circuit $38_2$ constitutes an accumulative circuit for data together with the register $40_2$ and with the AND circuit $36_2$. Also, in both the case of the 8-8 DCT and the 2-4-8 DCT, to one input of the AND circuit $36_2$ is fed data from the register $40_2$ and to the other input of the AND circuit $36_2$ are fed signals "0", "1", "0" and "1" sequentially in every operation cycle in the order of a first operation cycle to a fourth operation cycle out of four operation cycles, which are output from a binary signal string generating circuit (not shown). That is, an accumulative value is output from the register $40_2$ which is obtained by adding, in the adding circuit $38_2$, data output from the register $34_4$ and the register $34_3$ and fed to a first input and second input of the adding circuit $38_2$ to data stored in the register $40_2$ on one previous clock and fed, on the next clock, to a third input of the adding circuit $38_2$ through the AND circuit $36_2$.

The adding circuit $38_3$ constitutes an accumulative circuit for data together with the register $40_3$ and with the AND circuit $36_3$. In the case of the 8-8 DCT, to one input of the AND circuit $36_3$ is fed data from the register $34_3$ and to the other input of the AND circuit $36_3$ is fed a "0" signal in every operation cycle in the order of a first operation cycle to a fourth operation cycle out of four operation cycles. In the case of the 2-4-8 DCT, to one input of the AND circuit $36_3$ is fed data from the register $34_3$ and to the other input of the AND circuit $36_3$ are fed signals "0", "1", "0" and "1" sequentially in every operation cycle in the order of a first operation cycle to a four operation cycle out of four second operation cycles, which are output from a binary signal string generating circuit (not shown). That is, in the case of the 8-8 DCT, data from the register $34_2$ passes by the adding circuit $38_3$ and is stored in the register $40_3$. In the case of the 2-4-8 DCT, an accumulative value is output from the register $40_3$, which is obtained by adding, in the adding circuit $38_3$, data output from the register $34_2$ and fed to one input of the adding circuit $38_3$ to data stored in the register $40_3$ on one previous clock and fed to the other input of the adding circuit $38_3$ through the AND circuit $36_3$ on the next clock.

The adding circuit $38_4$ constitutes an accumulative circuit for data together with the register $40_4$ and with the AND circuit $36_4$ and AND circuit $36_5$. To one input of the AND circuit $36_4$ is fed data from the register $34_4$ and, in the case of the 8-8 DCT, to the other input of the AND circuit $36_4$ is fed a "1" signal in every operation cycle from a first operation cycle to fourth operation cycle out of four operation cycles and, in the case of the 2-4-8 DCT, are fed signals "0" in every operation cycle in the order of a first operation cycle to fourth operation cycle out of four second operation cycles, which is output from a binary signal string generating circuit (not shown). To one input of the AND circuit $36_5$ is fed data from the register $40_4$ and, in the case of the 8-8 DCT, to the other input of the AND circuit $36_5$ is fed a "0" signal in every operation cycle from a first operation cycle to a fourth operation cycle out of four operation cycles and, in the case of the 2-4-8 DCT, are fed signals "0", "1", "0" and "1" in every operation cycle in the order of a first operation cycle to a fourth operation cycle out of four second operation cycles, which is output from a binary signal string generating circuit (not shown).

In the case of the 8-8 DCT, each of data output sequentially in every operation cycle from the registers $34_4$, $34_5$, $34_6$ and $34_7$ is input to a first input, second input, third input and fourth input of the adding circuit $38_4$ in every operation cycle, is added and stored in the register $40_4$ in order and, in the case of the 2-4-8 DCT, an accumulated value is output from the register $40_4$, which is obtained by adding, in the adding circuit $38_4$, data output sequentially from the registers $34_5$, $34_6$ and $34_7$ in every operation cycle and fed to a second input, third input and fourth input of the adding circuit $38_4$ to data stored in the register $40_5$ on one previous clock and fed, on the next clock, to a fifth input of the adding circuit $38_4$ through the AND circuit $36_4$.

Though delays in each circuit of the MUX 12 to the register $40_1$ to register $40_4$ and deviations in their operation cycles occur, in the following description of operations, such delays and deviations will not be mentioned in detail.

Next, operations in the first embodiment will be described by referring to FIGS. 1 to 4. First, operations for the 8-8 DCT will be explained.

Each of eight pieces of picture element data $f_0$ to $f_7$ contained in each line constituting the 8×8 picture element data block, output sequentially from the MUX 12, is stored into each of registers $14_1$ to $14_8$ constituting the first register group 13. That is, data $f_0$ is stored in the register $14_1$, data $f_7$ in the register $14_2$, data $f_1$ in the register $14_3$, data $f_6$ in the register $14_4$, data $f_2$ in the register $14_5$, data $f_5$ in the register $14_6$, data $f_3$ in the register $14_7$ and data $f_4$ in the register $14_8$. The data $f_0$ stored in the register $14_1$ is fed to a summand input of the adding circuit $18_1$ and data $f_7$ stored in the register $14_2$ is fed to an addend input of the adding circuit $18_1$ and then data $f_0+f_7=a_0$ is output from the adding circuit $18_1$. The data $f_1$ stored in the register $14_3$ is fed to a summand input of the adding circuit $18_2$ and the data $f_6$ stored in the register $14_4$ is fed to an addend input of the adding circuit $18_2$ and then an added value $f_1+f_6=a_1$ is output from the adding circuit $18_2$. The data $f_2$ stored in the register $14_5$ is fed to a summand input of the adding circuit $18_3$ and the data $f_5$ stored in the register $14_6$ is fed to an addend input of the adding circuit $18_3$ and then data $f_2+f_5=a_2$ is output from the adding circuit $18_3$. The data $f_3$ stored in the register $14_7$ is fed to a summand input of the adding circuit $18_4$ and the data $f_4$ stored in the register $14_7$ and then data $f_3+f_4=a_3$ is output from the adding circuit $18_4$. The data $f_0$ stored in the register $14_1$ is fed to a minuend input of the subtracting circuit $20_1$ and data $f_7$ stored in the register $14_2$ is fed to a subtrahend input of the subtracting circuit $20_1$ and then data $f_0-f_7=a_4$ is output from the subtracting circuit $20_1$. The data $f_1$ stored in the register $14_3$ is fed to a minuend input of the subtracting circuit $20_2$ and data $f_6$ stored in the register $14_4$ is fed to a subtrahend input of the subtracting circuit $20_2$ and then data $f_1-f_6=a_5$ is output from the subtracting circuit $20_2$. The data $f_2$ stored in the register $14_5$ is fed to a minuend input of the subtracting circuit $20_3$ and data $f_5$ stored in the register $14_6$ is fed to a subtrahend input of the subtracting circuit $20_3$ and then data $f_2-f_5=a_6$ is output from the subtracting circuit $20_3$. The data $f_3$ stored in the register $14_7$ is fed to a minuend input of the subtracting circuit $20_4$ and data $f_4$ stored in the register $14_7$ is fed to a subtrahend input of the subtracting circuit $20_4$ and then data $f_3-f_4=a_4$ is output from the subtracting circuit $20_4$.

Data $a_0$ to $a_3$ output from the adding circuit $18_1$ to adding circuit $18_4$ are input into the MUX $24_1$ to MUX $24_4$ through the register $22_1$ to register $22_4$. The MUX $24_1$ selects the registers in the order of the register $22_1$, $22_4$, $22_1$ and $22_4$ and outputs sequentially four pieces of corresponding data $a_0$, $a_3$, $a_0$ and $a_3$. The MUX $24_2$ selects the registers in the order of the register $22_2$, $22_3$, $22_3$ and $22_3$ and outputs sequentially four pieces of corresponding data $a_1$, $a_2$, $a_1$ and $a_2$. The MUX $24_3$ selects the registers in the order of the register $22_1$, $22_4$, $22_2$ and $22_3$ and outputs sequentially four pieces of corresponding data $a_0$, $a_3$, $a_1$ and $a_2$. The MUX $24_4$ selects the registers in the order of the register $22_2$, $22_3$, $22_1$ and $22_4$ and outputs sequentially four pieces of corresponding data $a_1$, $a_2$, $a_0$ and $a_3$.

The MUX $24_5$ selects the registers in the order of the register $22_5$, $22_7$, $22_6$ and $22_8$ and outputs sequentially four pieces of corresponding data $a_4$, $a_6$, $a_5$ and $a_7$. The MUX $24_6$ selects the registers in the order of the register $22_6$, $22_5$, $22_8$ and $22_7$ and outputs sequentially four pieces of corresponding data $a_5$, $a_4$, $a_7$ and $a_6$. The MUX $24_7$ selects the registers in the order of the register $22_7$, $22_8$, $22_5$ and $22_6$ and outputs sequentially four pieces of corresponding data $a_6$, $a_7$, $a_4$ and $a_5$. The MUX $24_8$ selects the registers in the order of the register $22_8$, $22_6$, $22_7$ and $22_5$ and outputs sequentially four pieces of corresponding data $a_7$, $a_5$, $a_6$ and $a_4$.

The adding/subtracting circuit $26_1$ performs adding operations on data output in the first order and second order out of four pieces of data $a_0$, $a_2$, $a_0$ and $a_3$ output sequentially from the MUX $24_1$ and on data output in the first order and second order out of four pieces of data $a_1$, $a_2$, $a_1$ and $a_2$ output from the MUX $24_2$ and performs subtracting operations on data output in the third order and fourth order out of four pieces of data $a_0$, $a_2$, $a_0$ and $a_3$ output sequentially from the MUX $24_1$ and on data output in the third order and fourth order out of four pieces of data $a_1$, $a_2$, $a_1$ and $a_2$ output from the MUX $24_2$ and, as a result, outputs data $a_0+a_1$, data $a_3+a_2$, data $a_0-a_1$ and data $a_3-a_2$ sequentially. That is, data output in the first order from the MUX $24_1$ is added to data output in the first order from the MUX $24_2$ and the same adding operations are performed on the data output in the second order and further the similar subtracting operations are performed on the data output in the third and fourth order. Each of the data $a_0+a_1$, $a_3+a_2$, $a_0-a_1$ and $a_3-a_2$ output in every operation cycle from a first operation cycle to fourth operation cycle out of four operation cycles from the adding/subtracting circuit $26_1$, after being stored sequentially into the register $30_1$ (see the register $30_1$ shown in FIG. 3), is multiplied by the fixed coefficient $P_3$ in the $P_3$ coefficient multiplying circuit $32_1$ and stored, in order, into the register $34_1$ (see the register $34_1$ in FIG. 3). Each of the data $a_0$, $a_3$, $a_1$ and $a_2$ output sequentially from the MUX $24_3$, after being stored sequentially into the register $30_2$ (see the register $30_2$ shown in FIG. 3), is multiplied by the fixed coefficient $P_5$ in the $P_5$ coefficient multiplying circuit $32_2$ and stored sequentially into the register $34_2$ (see the register $34_1$ in FIG. 3). Each of the data $a_1$, $a_2$, $a_0$ and $a_3$ output sequentially from the MUX $24_4$, after being stored sequentially into the register $30_3$ (see the register $30_3$ shown in FIG. 3), is multiplied by the fixed coefficient $P_1$ in the $P_1$ coefficient multiplying circuit $32_3$ and stored sequentially into the register $34_3$ (see the register $34_3$ in FIG. 3).

Each of the data $a_4$, $a_6$, $a_5$ and $a_7$ output, in order, from the MUX $24_5$, after being stored sequentially into the register $30_4$ (see the register $30_4$ shown in FIG. 4), is multiplied by the fixed coefficient $P_6$ in the $P_6/P_3$ coefficient multiplying circuit $32_4$ and stored sequentially into the register $34_4$ (see the register $34_4$ in FIG. 4). Each of the data $a_5$, $a_4$, $a_7$ and $a_6$ output, in order, from the MUX $24_6$, after being stored sequentially into the register $30_5$ (see the register $30_5$ shown in FIG. 4), is multiplied by the fixed coefficient $P_4$ in the $P_4/P_5$ coefficient multiplying circuit $32_5$ and stored sequentially into the register $34_5$ (see the register $34_5$ in FIG. 3). Each of the data $a_6$, $a_7$, $a_4$ and $a_5$ output, in order, from the MUX $24_7$, after being stored sequentially into the register $30_6$ (see the register $30_6$ shown in FIG. 4), is multiplied by the fixed coefficient $P_2$ by the $P_2$ coefficient multiplying circuit $32_6$ and stored sequentially into the register $34_6$ (see the register $34_6$ in FIG. 4). Each of the data $a_7$, $a_5$, $a_6$ and $a_4$ output, in order, from the MUX $24_8$ after being stored sequentially into the register $30_7$ (see the register $30_7$ shown in FIG. 4), is multiplied by the fixed coefficient $P_0$ by the $P_0/P_1$ coefficient multiplying circuit $32_7$ and stored sequentially into the register $34_7$ (see the register $34_7$ in FIG. 4).

Out of data $(a_0+a_1)$ $P_3$, data $(a_3+a_2)$ $P_3$, data $(a_0-a_1)$ $P_3$, data $(a_3-a_2)$ $P_3$ output from the register $34_1$ in every operation cycle from a first operation cycle to a fourth operation cycle out of the four operation cycles, the data $(a_0+a_1)$ $P_3$ is stored into the register $40_1$ in a first operation cycle out of four operation cycles performed by the adding circuit $38_1$, register $40_1$ and AND circuit $36_1$, data $(a_0+a_1)$ $P_3+(a_3+a_2)$ $P_3$ is stored into the register $40_1$ in a second operation cycle, data $(a_0-a_1)$ $P_3$ is stored into the register $40_1$ in a third operation cycle and data $(a_0-a_1)$ $P_3+(a_3-a_2)$ $P_3$ is registered into the register $40_1$ in a fourth operation cycle (see the register $40_1$ in FIG. 3). Of data stored sequentially into the register $40_1$ and output therefrom, the data $(a_0+a_1)$ $P_3$ stored in the first operation cycle and the data $(a_0-a_1)$ $P_3$ stored into the register $40_1$ in the third operation cycle are undefined values and are not used, as transformation coefficient data, in the discrete cosine transformation. The above data are indicated with asterisks (*) on a lower right side of the output line of the register $40_1$ in FIG. 2.

The data $(a_0+a_1)$ $P_3+(a_3+a_2)$ $P_3$ stored in the second operation cycle and the data $(a_0-a_1)$ $P_3+(a_3-a_2)$ $P_3$ stored in the fourth operation cycle are used as the transformation coefficient data $F_0$ and $F_4$ of operation values contained in the equation (45). The transformation coefficient data $F_0$ and $F_4$ are shown on the lower right side of the output line of the register $40_1$ in FIG. 2.

Out of data $a_0P_5$, data $a_3P_5$, data $a_1P_5$, data $a_2P_5$ output from the register $34_2$ in every operation cycle from a first operation cycle to a fourth operation cycle out of the four operation cycles and data $a_1P_1$, data $a_2P_1$, data $a_0P_1$, data $a_3P_1$ output from the register $34_3$ in every operation cycle from a first operation cycle to a fourth operation cycle out of the four operation cycles, the data $a_0P_5+a_1P_1$ are stored into the register $40_2$ in a first operation cycle out of four second operation cycles performed by the adding circuit $38_2$, register $40_2$ and AND circuit $36_2$, the data $a_0P_5+a_1P_1-a_3P_5-a_2P_1$ are stored into the register $40_9$ in a second operation cycle, the data $-a_2P_1+a_0P_1$ are stored into the register $40_2$ in a third operation cycle and the data $-a_1P_5+a_0P_1+a_2P_5-a_3P_1$ are stored into the register $40_2$ in the fourth cycle (see the register $40_2$ in FIG. 3).

Of data stored sequentially into the register $40_2$ and output therefrom, the data $a_0P_5+a_1P_1$ and the data $a_0P_1-a_1P_5$ stored in the first operation cycle and third operation cycle are undefined values and are not used, as transformation coefficient data, in the discrete cosine transformation. The above data are indicated with asterisks (*) on a lower right side of the output line of the register $40_2$ in FIG. 2. The data $a_0P_5+a_1P_1-a_3P_5-a_2P_1$ and the data $-a_1P_5+a_0P_1+a_2P_5-a_3P_1$ stored in the second operation cycle and fourth operation cycle are used as the transformation coefficient data $F_2$ and transformation coefficient data $F_6$ of operation values contained in the equation (45). The transformation coefficient data $F_2$ and $F_6$ are shown on the lower right side of the output line of the register $40_2$.

Data $a_4P_6$, data $-a_6P_6$, data $-a_5P_6$, data $-a_7P_6$ output from the register $34_4$ in every operation cycle from a first operation cycle to a fourth operation cycle out of the four operation cycles, since signals "0" are fed to other input of the AND circuit $36_3$ in every operation cycle from the first operation cycle to the fourth operation cycle out of the four operation cycles, pass by the adding circuit $38_3$ and are stored in the register $40_3$. Any data stored sequentially into the register $40_3$ in every operation cycle from the first operation cycle to the fourth operation cycle out of the four operation cycles is an undefined value and is not used, as transformation coefficient data, in the discrete cosine transformation. The above data are indicated with asterisks (*) on a lower right side of the output line of the register $40_3$ in FIG. 2.

Data $a_4P_6$, data $-a_6P_6$, data $-a_5P_6$, and data $-a_7P_6$ output sequentially from the register $34_4$ in every operation cycle from the first operation cycle to the fourth operation cycle out of the four operation cycles and fed through the AND circuit $36_4$, data $a_5P_4$, data $a_4P_4$, data $a_7P_4$, and data $a_6P_4$ output from the register $34_5$ in every operation cycle from the first operation cycle to the fourth operation cycle out of the four operation cycles, data $a_6P_2$, data $-a_7P_2$, data $a_4P_2$, and data $-a_5P_2$ output from the register $34_6$ in every operation cycle from the first operation cycle to the fourth operation cycle out of the four operation cycles, data $a_7P_0$, data $-a_5P_0$, data $a_6P_0$, and data $a_4P_0$ output from the register $34_7$ in every operation cycle from the first operation cycle to the fourth operation cycle out of the four operation cycles, are added, in the adding circuit $38_4$, by every operation cycle from the first operation cycle to fourth operation cycle out of the four operation cycles and the results of the adding operation are stored sequentially into the register $40_4$ (see the register $40_4$ in FIG. 4).

Data $a_4P_6+a_5P_4+a_6P_2+a_7P_0$ stored in the register $40_4$ and output in the first operation cycle out of the four operation cycles are used as the transformation coefficient data $F_1$ of operation values contained in the equation (45), data $-a_6P_6+a_4P_4-a_7P_2-a_5P_0$ output from the register $40_4$ in the second operation cycle are used as the transformation coefficient data $F_3$ of operation values contained in the equation (45), data $-a_5P_6+a_7P_4+a_4P_2+a_6P_0$ output from the register $40_4$ in the third operation cycle are used as the transformation coefficient data $F_5$ of operation values contained in the equation (45) and data $-a_7P_6+a_6P_4-a_5P_2+a_4P_0$ output from the register $40_4$ in the fourth operation cycle are used as the transformation coefficient data $F_7$ of operation values contained in the equation (45). The transformation coefficient data $F_1$, $F_3$, $F_5$ and $F_7$ are shown on a lower right side of the output line of the register $40_4$.

By completing the above arithmetic operations, the primary 8-8 DCT on eight pieces of data contained in one line constituting the 8×8 data block is terminated. The same primary 8-8 DCT as described above is performed on each of lines subsequent to a next line constituting the 8×8 data block and thereafter, and the primary 8-8 DCT on all eight lines constituting the 8×8 data block is terminated in the similar manner. After the completion of the primary 8-8 DCT on the all eight lines, a secondary 8-8 DCT is performed on each string of eight data strings constituting the 8×8 data block. The transformation coefficient data obtained by completing the primary 8-8 DCT and secondary 8-8 DCT is used for compression of input 8×8 picture data. Thus, transmission of compressed picture element data is made possible by using the transformation coefficient data obtained by performing the primary 8-8 DCT and secondary 8-8 DCT on the 8×8 picture element data within an image to be transmitted for compression of the 8×8 picture element data block.

Next, operations for the 2-4-8 DCT will be described. Each of eight pieces of picture element data $f_0$ to $f_7$ contained in each line of picture elements constituting the 8×8 picture element data block output sequentially from the MUX 12 is stored into each of the registers $14_1$ to $14_8$ in a manner that each of the picture element data $f_0$ to $f_7$ corresponds to each of the registers $14_1$ to $14_8$.

Data $f_0$ stored in the register $14_1$ is fed to the summand input of the adding circuit $18_1$ and data $f_1$ supplied to the register $14_2$ is fed to the addend input of the adding circuit $18_1$ and then data $f_0+f_1=b_0$ are output from the adding circuit $18_1$. Data $f_2$ stored in the register $14_3$ is fed to the summand input of the adding circuit $18_2$ and data $f_3$ supplied to the register $14_4$ is fed to the addend input of the adding circuit $18_2$ and then data $f_2+f_3=b_1$ are output from the adding circuit $18_2$. Data $f_4$ stored in the register $14_5$ is fed to the summand input of the adding circuit $18_3$ and data $f_5$ stored in the register $14_6$ is fed to the addend input of the adding circuit $18_3$ and then data $f_4+f_5=b_2$ are output from the adding circuit $18_2$. Data $f_6$ stored in the register $14_7$ is fed to the summand input of the adding circuit $18_4$ and data $f_7$ stored in the register $14_8$ is fed to the addend input of the adding circuit $18_4$ and then data $f_6+f_7=b_3$ are output from the adding circuit $18_4$. Data $f_0$ stored in the register $14_1$ is fed to the minuend input of the subtracting circuit $20_1$ and data $f_1$ stored in the register $14_2$ is fed to the subtrahend input of the subtracting circuit $20_1$ and then data $f_0-f_1=b_4$ are output from the subtracting circuit $20_1$. Data $f_2$ stored in the register $14_3$ is fed to the minuend input of the subtracting circuit $20_2$ and data $f_3$ stored in the register $14_4$ is fed to the subtrahend input of the subtracting circuit $20_2$ and then data $f_2-f_3=b_5$ are output from the subtracting circuit $20_2$. Data $f_4$ stored in the register $14_5$ is fed to the minuend input of the subtracting circuit $20_3$ and data $f_5$ stored in the register $14_6$ is fed to the subtrahend input of the subtracting circuit $20_3$ and then data $f_4-f_4=b_6$ are output from the subtracting circuit $20_3$. Data $f_6$ stored in the register $14_7$ is fed to the minuend input of the subtracting circuit $20_4$ and data $f_6$ stored in the register $14_7$ is fed to the subtrahend input of the subtracting circuit $20_4$ and then data $f_6-f_7=b_7$ are output from the subtracting circuit $20_3$.

Data $b_0$ to data $b_3$ output from the adding circuit $18_1$ to adding circuit $18_4$ are input through the register $22_1$ to register $22_4$ to the MUX $24_1$ to MUX $24_4$. MUX $24_1$ selects the register in the order of the register $22_1$, $22_4$, $22_1$ and $22_4$ and sequentially outputs four pieces of data $b_0$, $b_3$, $b_0$ and $b_3$. MUX $24_2$ selects the register in the order of the register $22_3$, $22_3$, $22_3$ and $22_3$ and sequentially outputs four pieces of data $b_1$, $b_2$, $b_1$ and $b_2$. MUX $24_3$ selects the register in the order of the register $22_1$, $22_4$, $22_2$ and $22_3$ and sequentially outputs four pieces of data $b_0$, $b_3$, $b_1$ and $b_2$. MUX $24_4$ selects the register in the order of the register $22_2$, $22_3$, $22_1$ and $22_4$ and sequentially outputs four pieces of data $b_1$, $b_2$, $b_0$ and $b_3$.

The adding/subtracting circuit $26_1$ performs adding operations on data output in the first order and second order out of four pieces of data $b_0$, $b_3$, $b_0$ and $b_3$ given in every operation cycle from a first operation cycle to a second operation cycle out of four operation cycles from the MUX $24_1$ and on data output in the first order and second order out of four pieces of data $b_1$, $b_2$, $b_1$ and $b_2$ given in every operation cycle from a first operation cycle to a second operation cycle out of four operation cycles from the MUX $24_2$ and performs subtracting operation on data output in the third order and fourth order out of four pieces of data $b_0$, $b_3$, $b_0$ and $b_3$ given in every operation cycle from a first operation cycle to a second operation cycle out of four operation cycles from the MUX $24_1$ and on data output in the third order and fourth order out of four pieces of data $b_1$, $b_2$, $b_1$ and $b_2$ given in every operation cycle from a first operation cycle to a second operation cycle out of four operation cycles from the MUX $24_2$ and, as a result, outputs data $b_0+b_1$, data $b_3+b_2$, data $b_0-b_1$ and data $b_3-b_2$. That is, data output in the first order from the MUX $24_1$ is added to data output in the second order from the MUX $24_2$ and the same adding and subtracting operations are performed on other data.

Each of the data $b_0+b_1$, data $b_3+b_2$, data $b_0-b_1$ and data $b_3-b_2$ output sequentially from the adding/subtracting circuit $26_1$, after being stored in the register $30_1$ (see the register $30_1$), is multiplied by a fixed coefficient $P_3$ in the $P_3$ coefficient multiplying circuit $32_1$ and stored in order into the register $34_1$ (see the register $34_1$ in FIG. 5).

Each of data $b_0$, $b_3$, $b_1$ and $b_2$ output sequentially from the MUX $24_3$, after being stored in order into the register $30_2$ (see the register $30_2$), is multiplied by a fixed coefficient $P_5$ in the $P_5$ coefficient multiplying circuit $32_2$ and stored in order into the register $34_2$ (see the register $34_2$). Each of data $b_1$, $b_2$, $b_0$ and $b_3$ output sequentially from the MUX $24_4$, after being stored in order into the register $30_3$ (see the register $30_3$), is multiplied by a fixed coefficient $P_1$ in the $P_1$ coefficient multiplying circuit $32_3$ and stored in order into the register $34_3$ (see the register $34_3$).

The MUX $24_5$ selects the register in the order of the register $22_5$, register $22_8$, register $22_5$, register $22_8$ and sequentially outputs four pieces of data $b_4$, $b_7$, $b_4$ and $b_7$. The MUX $24_7$ selects the register in the order of the register $22_6$, register $22_7$, register $22_6$, register $24_7$ and sequentially outputs four pieces of data $b_5$, $b_6$, $b_5$ and $b_6$.

The adding/subtracting circuit $26_2$ performs adding operations on data output in the first order and second order out of four pieces of data $b_4$, $b_7$, $b_4$ and $b_7$ given from the MUX $24_5$ and on data output in the first order and second order out of four pieces of data $b_5$, $b_6$, $b_5$ and $b_6$ given from the MUX $24_7$ and performs subtracting operations on data output in the first order and second order out of four pieces of data $b_4$, $b_7$, $b_4$ and $b_7$ given from the MUX $24_5$ and on data output in the first order and second order out of four pieces of data $b_5$, $b_6$, $b_5$ and $b_6$ given from the MUX $24_7$ and, as a result, outputs data $b_4+b_5$, data $b_7+b_6$, data $b_4-b_5$ and data $b_7-b_6$. The data $b_4+b_5$, data $b_7+b_6$, data $b_4-b_5$ and data $b_7-b_6$ output in order are stored through the MUX $28_1$ sequentially into the register $30_4$ (see the register $30_4$).

The MUX $24_6$ selects the register in the order of the registers $22_5$, $22_8$, $22_6$ and $22_7$ and sequentially outputs four pieces of data $b_4$, $b_7$, $b_5$ and $b_6$. The four pieces of data $b_4$, $b_7$, $b_5$ and $b_6$ sequentially output are stored into the register $30_5$ (see the register $30_5$). The MUX $28_2$ selects a "0" four times and sequentially outputs the "0" data. Four pieces of the "0" data output sequentially are stored in the register $30_6$ in order (see the register $30_6$ in FIG. 6). The MUX $24_8$ selects the register in the order of the registers $22_6$, $22_7$, $22_5$ and $22_8$ and sequentially outputs four pieces of data $b_5$, $b_6$, $b_4$ and $b_7$. The four pieces of data $b_5$, $b_6$, $b_4$ and $b_7$ output in order are stored into the register $30_7$ (see the register $30_7$).

Of data $(b_0+b_1) P_3$, data $(b_3+b_2) P_3$, data $(b_0-b_1) P_3$ and data $(b_3-b_2) P_3$ output sequentially from the register $34_1$, data $(b_0+b_1) P_3$ is stored into the register $40_1$ in a first operation cycle out of the four operation cycles performed by the register $40_1$ and the AND circuit $36_1$, data $(b_0+b_1) P_3+(b_3+b_2) P_3$ are stored into the register $40_1$ in the second operation cycle, data $(b_0+b_1) P_3$ is stored into the register $40_1$ in the third operation cycle and data $(b_0-b_1) P_3+(b_3-b_2) P_3$ are stored into the register $40_1$ in the fourth operation cycle (see the register $40_1$ in FIG. 5).

Of data stored in the register $40_1$ and output therefrom, the data $(b_0+b_1) P_3$ stored in the register $40_1$ in the first operation cycle and the data $(b_0-b_1) P_3$ stored into the register $40_1$ in the third operation cycle are undefined values and are not used, as transformation coefficient data, in the discrete cosine transformation method. The above data are indicated with asterisks (*) on a lower left side of the output line of the register $40_1$ in FIG. 2.

The data $(b_0+b_1) P_3+(b_3+b_2) P_3$ stored in the second operation cycle and the data $(b_0-b_1) P_3+(b_3-b_2) P_3$ stored in the fourth operation cycle are used as the transformation coefficient data $F_0$ and $F_2$ of operation values contained in the equation (51). The transformation coefficient data $F_0$ and $F_2$ are shown on the lower left side of the output line of the register $40_1$.

Of data $b_0P_5$, data $b_3P_5$, data $b_1P_5$, data $b_2P_5$ output sequentially from the register $34_2$, data $b_1P_1$, data $b_2P_1$, data $b_0P_1$ and $b_3P_1$ output sequentially from the register $34_3$, data $b_0P_5$, $+b_1P_1$ is stored into the register $40_2$ in a first operation cycle out of the four operation cycles performed by the adding circuit $38_2$, the register $40_2$ and the AND circuit $36_2$, data $b_0P_5+b_1P_1-b_3P_5-b_2P_1$ is stored into the register $40_2$ in a second operation cycle, data $-b_1P_5+b_0P_1$ is stored into the register $40_2$ in a third operation cycle, data $-b_1P_5+b_0P_1+b_2P_5-b_3P_1$ are stored in the fourth operation cycle (see the register $40_2$).

Of data stored into the register $40_2$ and output therefrom, the data $b_0P_5$, $+b_1P_1$ and data $-b_1P_5+b_0P_1$ stored in the first operation and third operation are undefined values and are not used, as transformation coefficient data, in the discrete cosine transformation method. The above data are indicated with asterisks (*) on a lower left side of the output line of the register $40_2$ in FIG. 2.

The data $b_0P_5+b_1P_1-b_3P_5-b_2P_1$ stored in the second operation cycle and the data $-b_1P_5+b_0P_1+b_2P_5-b_3P_1$ stored in the fourth operation cycle are used as the transformation coefficient data $F_1$ and $F_3$ of operation values contained in the equation (45). The transformation coefficient data $F_1$ and $F_3$ are shown on the lower right side of the output line of the register $40_1$ in FIG. 2.

Each of data $b_4+b_5$, data $b_7+b_6$, data $b_4-b_5$ and data $b_7-b_6$ stored sequentially into the register $30_4$ and output sequentially therefrom is multiplied by the fixed coefficient $P_3$ in the $P_6/P_3$ coefficient multiplying circuit $32_4$. In the first operation cycle out of the four operation cycles, data $(b_4+b_5) P_3$ output from the $P_6/P_3$ coefficient multiplying circuit $32_4$ and stored in the register $34_4$ (see the register $34_4$ in FIG. 6) is added to "0" data output from the AND circuit $36_3$ and stored into the register $40_3$ (see the register $40_3$ in FIG. 6). The data fed to the register $40_3$ in the first operation cycle is not used as a transformation coefficient data in the 2-4-8 DCT. The above data are indicated with asterisks (*) on the lower side of the output line of the register $40_3$ in FIG. 2.

Data $(b_4+b_5) P_3$ input through the AND circuit $36_3$ in a second operation cycle out of the four operation cycles and data $(b_7+b_6) P_3$ output from the register $34_4$ in a second operation cycle out of the four operation cycles are fed to the adding circuit $38_3$ and data $(b_4+b_5) P_3+(b_7+b_6) P_3$ are output from the adding circuit $38_3$ and stored into the register $40_3$ (see the register $40_3$). Data fed to the register $40_3$ in the second operation cycle is used as transformation coefficient data $F_4$ in the 2-4-8 DCT. The transformation coefficient data $F_4$ is shown on the lower side of the output line of the register $40_3$ in FIG. 2.

Data $(b_4-b_5) P_3$ and "0" data are fed to the adding circuit $38_3$ in a third operation cycle out of the four operation cycles and data $(b_4-b_5) P_3$ is output from the adding circuit $38_3$ and stored into the register $40_3$ (see the register $40_3$ in FIG. 6). The data fed to the register $40_3$ in the third operation cycle is not used as the transformation coefficient data in the 2-4-8 DCT. The above data are indicated with asterisks (*) on a lower side of the output line of the register $40_3$ in FIG. 2.

Data $(b_4-b_5) P_3$ input through the AND circuit $36_3$ in the fourth operation cycle in the four operation cycles and data $(b_7-b6) P_3$ output from the register $34_4$ in the fourth operation cycle are fed to the adding circuit $38_3$ and then data $(b_4-b_5) P_3+(b_7-br) P3$ is output from the adding circuit $38_3$ and stored in the register $40_3$ (see the register $40_3$). Data fed to the register $40_3$ in the fourth operation cycle is used as transformation coefficient data $F_6$ in the 2-4-8 DCT. The transformation coefficient data $F_6$ is shown in the lower side of the output line of the register $40_3$ in FIG. 2.

Each of data $b_4$, $b_7$, $b_5$ and $b_6$ stored into the register $30_5$ in every cycle from a first operation cycle to fourth operation cycle out of four operation cycles and output sequentially is multiplied by the fixed coefficient $P_5$ in the $P_4/P_5$ coefficient multiplying circuit $32_5$. Each of four pieces of "0" data (see the register $30_6$) stored in every operation cycle from a first operation cycle to fourth operation cycle out of the four operation cycles and output sequentially is multiplied by the fixed coefficient $P_5$ in the $P_4/P_5$ coefficient multiplying circuit $32_5$. Each of four pieces of data $b_5$, $b_6$, $b_4$ and $b_7$ stored into the register $30_7$ in every operation cycle from a first operation cycle to fourth operation cycle out of the four operation cycles and output sequentially is multiplied by the fixed coefficient $P_1$ in the $P_0/P_1$ coefficient multiplying circuit $32_7$.

In the 2-4-8 DCT, since the "0" is fed to other input of the AND circuit $36_4$ in every operation cycle from a first operation cycle to fourth operation cycle out of the four operation cycles and therefore data output from the $P_6/P_3$ coefficient multiplying circuit $32_4$ is not fed to the adding circuit $38_4$, data $b_4P_5$, $b_7P_5$, $b_5P_5$ and $b_6P_5$ (see the register $34_5$ in FIG. 6) output sequentially from the $P_4/P_5$ coefficient multiplying circuit $32_5$ and stored in order into the register $34_5$ and data $b_5P_1$, $b_6P_1$, $b_4P_1$ and $b_7P_1$ (see the register $34_7$ in FIG. 6) output from the $P_0/P_1$ coefficient multiplying circuit $32_7$ and stored in order into the register $34_7$ are fed to the adding circuit $38_4$ in every operation cycle.

Data $b_4P_5+b_5P_1$ is output from the adding circuit $38_4$ and stored into the register $40_4$ (see the register $40_4$ in FIG. 6) in a first operation cycle out of the four operation cycles.

Data fed to the register $40_4$ in the first operation cycle is not used as transformation coefficient data in the 2-4-8 DCT. The transformation coefficient data is shown in a lower left side of the output line of the register $40_4$ in FIG. 2.

Data $b_4P_5+b_5P_1$ input through the AND circuit $36_5$ in a second operation cycle out of four operation cycles and data $-b_7P_5$ output from the register $34_5$ in the second operation cycle and data $-b_6P_1$ output from the register $34_7$ in the second operation cycle and data are fed to the adding circuit $38_4$, and data $b_4P_5+b_5P_1-b_7P_5-b_6P_1$ is output from the adding circuit $38_4$ and stored into the register $40_4$ (see the register $40_4$). Data fed to the register $40_4$ in the second operation cycle is used as transformation coefficient data $F_5$ in the 2-4-8 DCT. The transformation coefficient data is shown in the lower left side of the output line of the register $40_4$ in FIG. 2.

In a third operation cycle out of the four operation cycles, data $-b_5P_5+b_4P_1$ is output from the adding circuit $38_4$ and stored into the register $40_4$ (see the register $40_4$). Data fed to the register $40_4$ in the third operation cycle is used as transformation coefficient data in the 2-4-8 DCT. The above data are indicated with asterisks (*) on the lower left side of the output line of the register $40_3$ in FIG. 2.

Data $-b_5P_5+b_4P_1$ input through the AND circuit $36_5$ in a fourth operation cycle out of the four operation cycles and data $b_6P_5$ output from the register $34_5$ in the fourth operation cycle and $-b_7P_1$ output from the register $34_7$ in the fourth operation cycle are fed to the adding circuit $38_4$, and then data $-b_5P_5+b_4P_1+b_6P_5-b_7P_1$ is output from the adding circuit $38_4$ and stored into the register $40_4$ (see the register $40_4$ in FIG. 6). The data fed to the register $40_4$ in the fourth operation cycle is used as transformation coefficient data $F_7$ in the 2-4-8 DCT. The DCT coefficient $F_7$ is shown in the lower left side of the output line of the register $40_4$ in FIG. 2.

By completing the above arithmetic operations, the primary 2-4-8 DCT on eight pieces of data contained in one line constituting the 8×8 data block is terminated. The same primary 2-4-8 DCT as described above is performed on each of lines subsequent to a next line constituting the 8×8 data block and thereafter, and the primary 2-4-8 DCT on all eight lines constituting the 8×8 data block is terminated in the similar manner. After the completion of the primary 2-4-8 DCT on the all eight lines, a secondary 2-4-8 DCT is performed on each string of eight data strings constituting the 8×8 data block and the secondary 2-4-8 DCT is terminated. The transformation coefficient data obtained by completing the secondary 2-4-8 DCT is used for compression of the input 8×8 picture element data. By performing the primary 2-4-8 DCT and secondary 2-4-8 DCT on each of the 8×8 picture element data in an image data to be transmitted, the image data is compressed and can be transmitted. Thus, according to the present invention, since the 8-8 DCT device and 2-4-8 DCT device are so configured that a part of the fixed coefficient multiplying circuit used in the 8-8 DCT circuit can be used, by being switched, as a fixed coefficient multiplying circuit required in the 2-4-8 DCT, a high-speed calculating characteristic obtained through a pipeline processing type arithmetic operation in the 8-8 DCT can be maintained in the 2-4-8 DCT and the high-speed calculating characteristic can be still maintained in even miniaturized 8-8 DCT and 2-4-8 DCT devices.

Second Embodiment

Figure 7:
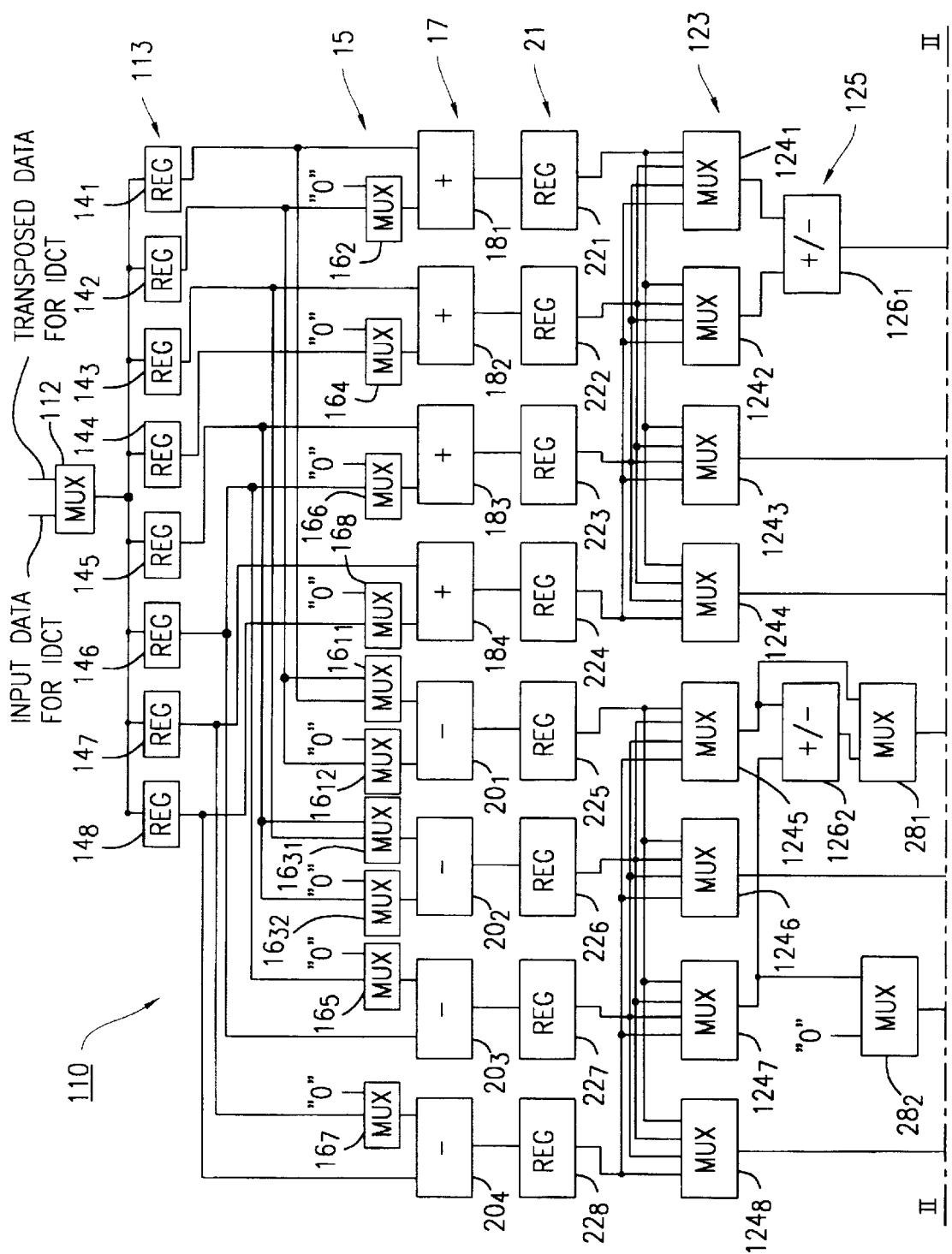
FIG. 7 is a schematic block diagram partially showing configurations of the 8-8/2-4-8 IDCT device according to a second embodiment of the present invention.
Figure 8:
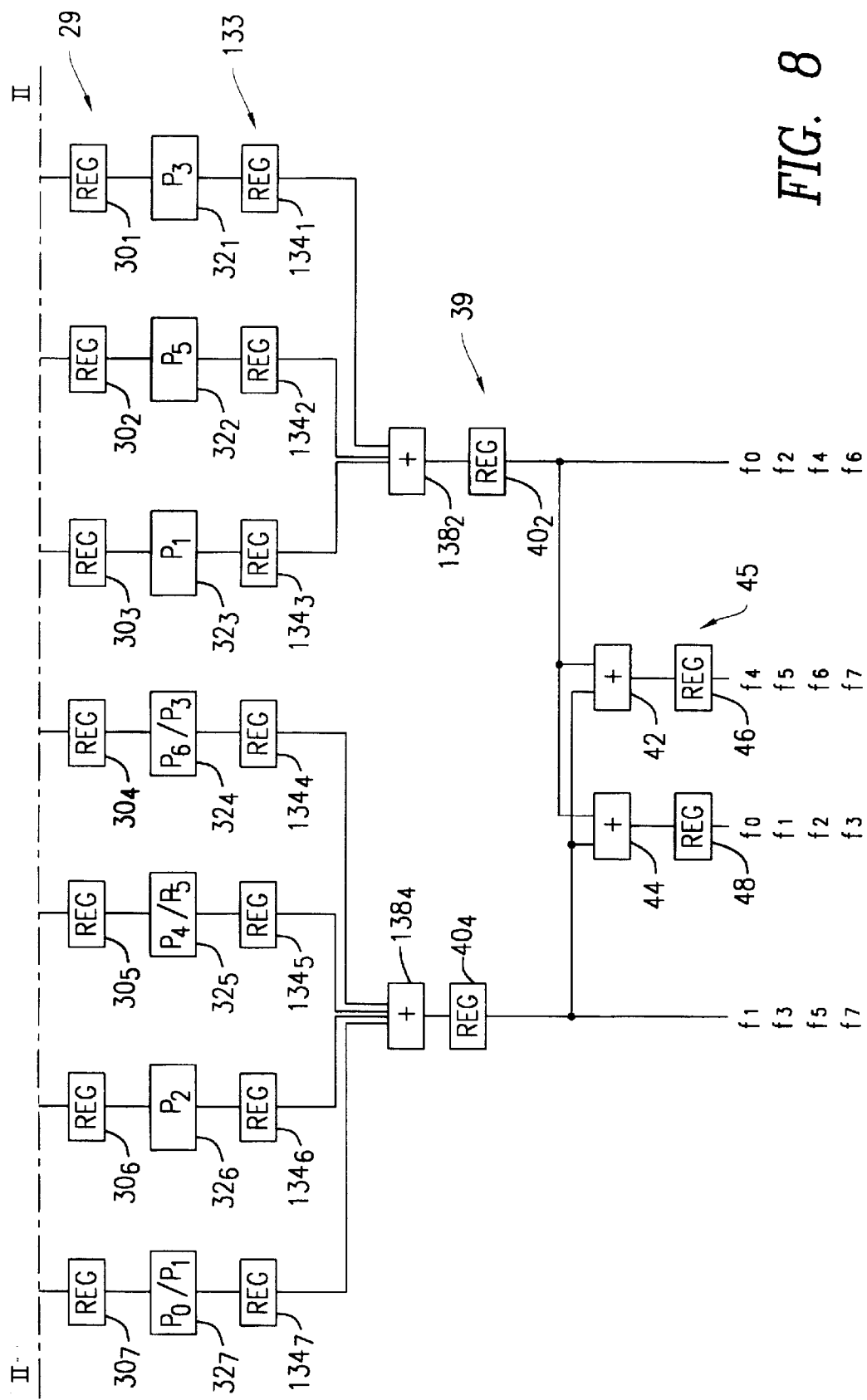
FIG. 8 is also a schematic block diagram partially showing configurations of an 8-8/2-4-8 IDCT device according to the second embodiment of the present invention.
Figure 10:
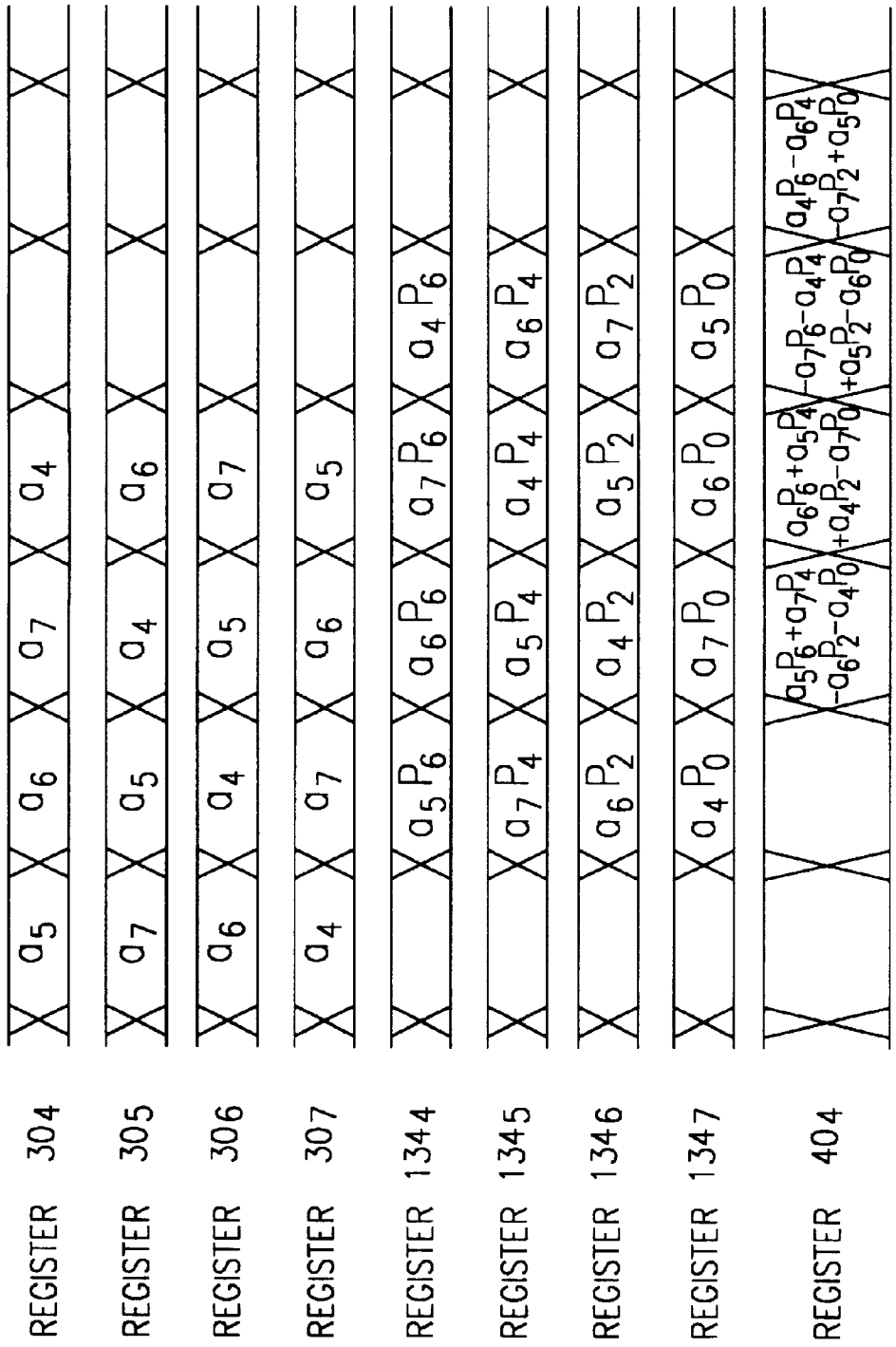
FIG. 10 is a residual part of the timing chart explaining operations of the 8-8 IDCT constituting the 8-8/2-4-8 IDCT according to the second embodiment of the present invention.

FIG. 7 is a schematic block diagram partially showing configurations of an 8-8/2-4-8 IDCT device according to a second embodiment of the present invention. FIG. 8 is also a schematic block diagram partially showing configurations of the 8-8/2-4-8 IDCT device according to the second embodiment. FIG. 9 is a part of a timing chart explaining operations of an 8-8 IDCT constituting the 8-8/2-4-8 IDCT device according to the second embodiment. FIG. 10 is a remaining part of the timing chart explaining operations of the 8-8 IDCT constituting the 8-8/2-4-8 IDCT according to the second embodiment. FIG. 11 is a part of a timing chart explaining operations of an 2-4-8 IDCT constituting the 8-8/2-4-8 IDCT according to the second embodiment. FIG. 12 is a remaining part of the timing chart explaining operations of the 2-4-8 IDCT constituting the 8-8/2-4-8 IDCT according to the second embodiment. By overlaying a line II—II in FIG. 7 on a line II—II in FIG. 8, an overall configuration of the 8-8 DCT/2-4-8 IDCT device can be shown.

Thus, according to the embodiment, since the 8-8 IDCT/2-4-8 IDCT device are so configured that a part of the fixed coefficient multiplying circuit used in the 8-8 IDCT circuit can be used, by being switched, as a fixed coefficient multiplying circuit required in the 2-4-8 IDCT, a high-speed calculating characteristic obtained through a pipeline processing type arithmetic operation in the 8-8 IDCT can be maintained in the 2-4-8 IDCT and the high-speed calculating characteristic can be still maintained in even miniaturized 8-8 IDCT devices and 2-4-8 IDCT devices.

Prior to description of configurations of the 8-8 IDCT/2-4-8 IDCT device, operational equations used to perform the 8-8 IDCT on every one line or one string of 8×8 picture element data are first described below.

When f(0), f(1), f(2), f(3), f(4), f(5), f(6) f(7) and F(0, v), F(1, v), F(2, v), F(3, v), F(4, v), F(5, v), F(6, v) and F(7, v) obtained by expressing two-dimensional equation (18) described in the above "Description of the Related Art" in a form of one-dimensional equation (52) and by decompressing the equation (52) with respect to h and x, as in case of the equation (40), are set so that $f(0)=f_0$, $f(1)=f_1$, $f(2)=f_2$, $f(3)=f_3$, $f(4)=f_4$, $f(5)=f_5$, $f(6)=f_6$, $f(7)=f_7$ and $F(0, v)=F_0$, $F(1, v)=F_1$, $F(2, v)=F_2$, $F(3, v)=F_3$, $F(4, v)=F_4$, $F(5, v)=F_5$, $F(6, v)=F_6$ and $F(7, v)=F_7$, and the resulting equation is changed and rearranged to obtain equation (53). $P_0$ to $P_6$ in the equation (53) are the same values as in the equation (40).

$$f(x) = \sum_{h=0}^{7} C(h)F(h, v)\cos\beta \quad (52)$$

$$\text{where } \beta \equiv \frac{\pi h(2x+1)}{16}$$

$$\begin{bmatrix} f_0 \\ f_1 \\ f_2 \\ f_3 \\ f_4 \\ f_5 \\ f_6 \\ f_7 \end{bmatrix} = \begin{bmatrix} P_3 & P_6 & P_5 & P_4 & P_3 & P_2 & P_1 & P_0 \\ P_3 & P_4 & P_1 & -P_0 & -P_3 & -P_6 & -P_5 & -P_2 \\ P_3 & P_2 & -P_1 & -P_6 & -P_3 & P_0 & P_5 & P_4 \\ P_3 & P_0 & -P_5 & -P_2 & P_3 & P_4 & -P_1 & -P_6 \\ P_3 & -P_0 & -P_5 & P_2 & P_3 & -P_4 & -P_1 & P_6 \\ P_3 & -P_2 & -P_1 & P_6 & -P_3 & -P_0 & P_5 & -P_4 \\ p_3 & -P_4 & P_1 & P_0 & -P_3 & P_6 & -P_5 & P_2 \\ P_3 & -P_6 & P_5 & -P_4 & P_3 & -P_2 & P_1 & -P_0 \end{bmatrix} \begin{bmatrix} F_0 \\ F_1 \\ F_2 \\ F_3 \\ F_4 \\ F_5 \\ F_6 \\ F_7 \end{bmatrix} \quad (53)$$

An equation (54) is obtained by changing a right side of the above equation (53) and an equation (55) is obtained by rearranging a right side of the equation (54).

$$\frac{1}{2}\begin{bmatrix} f_0+f_4 \\ f_1+f_5 \\ f_2+f_6 \\ f_3+f_7 \\ f_0-f_4 \\ f_1-f_5 \\ f_2-f_6 \\ f_3-f_7 \end{bmatrix} = \begin{bmatrix} P_3 & 0 & P_5 & 0 & P_3 & 0 & P_1 & 0 \\ P_3 & 0 & P_1 & 0 & -P_3 & 0 & -P_5 & 0 \\ P_3 & 0 & -P_1 & 0 & -P_3 & 0 & -P_5 & 0 \\ P_3 & 0 & -P_5 & 0 & P_3 & 0 & -P_1 & 0 \\ 0 & P_6 & 0 & P_4 & 0 & P_2 & 0 & P_0 \\ 0 & P_4 & 0 & -P_0 & 0 & -P_6 & 0 & -P_2 \\ 0 & P_2 & 0 & -P_6 & 0 & P_0 & 0 & P_4 \\ 0 & P_0 & 0 & -P_2 & 0 & P_4 & 0 & -P_6 \end{bmatrix} \begin{bmatrix} F_0 \\ F_1 \\ F_2 \\ F_3 \\ F_4 \\ F_5 \\ F_6 \\ F_7 \end{bmatrix} \quad (54)$$

$$\frac{1}{2}\begin{bmatrix} f_0+f_4 \\ f_1+f_5 \\ f_2+f_6 \\ f_3+f_7 \end{bmatrix} = \begin{bmatrix} P_3 & P_5 & P_3 & P_1 \\ P_3 & P_1 & -P_3 & -P_5 \\ P_3 & -P_1 & -P_3 & P_5 \\ P_3 & -P_5 & P_3 & -P_1 \end{bmatrix} \begin{bmatrix} F_0 \\ F_2 \\ F_4 \\ F_6 \end{bmatrix} \quad (55)$$

$$\frac{1}{2}\begin{bmatrix} f_0-f_4 \\ f_1-f_5 \\ f_2-f_6 \\ f_3-f_7 \end{bmatrix} = \begin{bmatrix} P_6 & P_4 & P_2 & P_6 \\ P_4 & -P_0 & -P_6 & P_2 \\ P_2 & -P_6 & P_0 & P_4 \\ P_0 & -P_2 & P_4 & -P_6 \end{bmatrix} \begin{bmatrix} F_1 \\ F_3 \\ F_5 \\ F_7 \end{bmatrix}$$

By further rearranging a right side of the equation (55), an equation (56) is obtained. By setting $F_0$, $F_1$, $F_2$, $F_3$, $F_4$, $F_5$, $F_6$ and $F_7$ in the equation (56) to those in equation (57), an equation (58) is obtained.

$$\frac{1}{2}\begin{bmatrix} f_0+f_4 \\ f_1+f_5 \\ f_2+f_6 \\ f_3+f_7 \end{bmatrix} = \begin{bmatrix} (F_0+F_4) & F_2 & F_6 \\ (F_0-F_4) & -F_6 & F_2 \\ (F_0-F_4) & F_6 & -F_2 \\ (F_0+F_4) & -F_2 & -F_6 \end{bmatrix}\begin{bmatrix} P_3 \\ P_5 \\ P_1 \end{bmatrix}$$
$$\frac{1}{2}\begin{bmatrix} f_0-f_4 \\ f_1-f_5 \\ f_2-f_6 \\ f_3-f_7 \end{bmatrix} = \begin{bmatrix} F_1 & F_3 & -F_5 & -F_7 \\ F_5 & F_1 & F_7 & -F_3 \\ -F_3 & -F_7 & F_1 & -F_5 \\ F_7 & -F_5 & -F_3 & F_1 \end{bmatrix}\begin{bmatrix} P_6 \\ P_4 \\ P_2 \\ P_0 \end{bmatrix} \quad (56)$$

$$c_0=F_0,\ c_1=F_6,\ c_2=F_2,\ c_3=F_4, \\ c_4=-F_7,\ c_5=F_1,\ c_6=F_5,\ c_7=F_3 \quad (57)$$

$$\frac{1}{2}\begin{bmatrix} f_0+f_4 \\ f_1+f_5 \\ f_2+f_6 \\ f_3+f_7 \end{bmatrix} = \begin{bmatrix} c_0+c_3 & c_2 & c_1 \\ c_0-c_3 & -c_1 & c_2 \\ c_0-c_3 & c_1 & -c_2 \\ c_0+c_3 & -c_2 & -c_1 \end{bmatrix}\begin{bmatrix} P_3 \\ P_5 \\ P_1 \end{bmatrix}$$
$$\frac{1}{2}\begin{bmatrix} f_0-f_4 \\ f_1-f_5 \\ f_2-f_6 \\ f_3-f_7 \end{bmatrix} = \begin{bmatrix} c_5 & c_7 & -c_6 & -c_4 \\ c_6 & c_5 & c_4 & -c_7 \\ -c_7 & -c_4 & c_5 & -c_6 \\ c_4 & -c_6 & c_7 & c_5 \end{bmatrix}\begin{bmatrix} P_6 \\ P_4 \\ P_2 \\ P_0 \end{bmatrix} \quad (58)$$

The 8-8 IDCT device constituting the 8-8 IDCT /2-4-8 IDCT device 110 according to the second embodiment is operated in accordance with the equation (58).

Next, operational equations used to perform the 2-4-8 IDCT on every one line or one string constituting 8×8 picture element data are first described below.

When f(0), f(1), f(2), f(3), f(4), f(5), f(6) f(7) and f(0, z), f(1, z), f(2, z), f(3, z), f(4, z), f(5, z), f(6, z) and f(7, z) obtained by expressing the two-dimensional equation (18) described in the above "Description of the Related Art" in the form of one-dimensional equation (52) and by decompressing the equation (52) with respect to h and x, as in the case of the equation (40), are set so that f(0)=$f_0$, f(1)=$f_1$, f(2)=$f_2$, f(3)=$f_3$, f(4)=$f_4$, f(5)=$f_5$, f(6)=$f_6$, f(7)=$f_7$ and F(0, v)=$F_0$, F(1, v)=$F_1$, F(2, v)=$F_2$, F(3, v)=$F_3$, F(4, v)=$F_4$, F(5, v)=$F_5$, F(6, v)=$F_6$ and F(7, v)=$F_7$, and the resulting equation is changed and rearranged, equation (60) is obtained. $P_0$ to $P_6$ in the equation (60) are the same values as in the equation (40).

$$f(x)=\sum_{h=0}^{7}\{C(h)F(h,v)+F(h,v+4)\}\cos\beta$$
$$f(x)=\sum_{h=0}^{7}\{C(h)F(h,v)-F(h,v+4)\}\cos\beta \quad (59)$$
$$\text{where } \beta \equiv \frac{\pi h(2x+1)}{16}$$

$$\begin{bmatrix} f_0 \\ f_1 \\ f_2 \\ f_3 \\ f_4 \\ f_5 \\ f_6 \\ f_7 \end{bmatrix} = \begin{bmatrix} P_3 & P_5 & P_3 & P_1 & 0 & 0 & 0 & 0 \\ 0 & 0 & 0 & 0 & P_3 & P_5 & P_3 & P_1 \\ P_3 & P_1 & -P_3 & -P_5 & 0 & 0 & 0 & 0 \\ 0 & 0 & 0 & 0 & P_3 & P_1 & -P_3 & -P_5 \\ P_3 & -P_1 & -P_3 & P_5 & 0 & 0 & 0 & 0 \\ 0 & 0 & 0 & 0 & P_3 & -P_1 & -P_3 & P_5 \\ P_3 & -P_5 & P_3 & -P_1 & 0 & 0 & 0 & 0 \\ 0 & 0 & 0 & 0 & P_3 & -P_5 & P_3 & -P_1 \end{bmatrix}\begin{bmatrix} F_0+F_4 \\ F_1+F_5 \\ F_2+F_6 \\ F_3+F_7 \\ F_0-F_4 \\ F_1-F_5 \\ F_2-F_6 \\ F_3-F_7 \end{bmatrix} \quad (60)$$

An equation (61) is obtained by changing a right side of the above equation (60) and an equation (62) is obtained by rearranging a right side of the equation (61).

$$\begin{bmatrix} f_0 \\ f_2 \\ f_4 \\ f_6 \\ f_1 \\ f_3 \\ f_5 \\ f_7 \end{bmatrix} = \begin{bmatrix} P_3 & P_5 & P_3 & P_1 & 0 & 0 & 0 & 0 \\ P_3 & P_1 & -P_3 & -P_5 & 0 & 0 & 0 & 0 \\ P_3 & -P_1 & -P_3 & P_5 & 0 & 0 & 0 & 0 \\ P_3 & -P_5 & P_3 & -P_1 & 0 & 0 & 0 & 0 \\ 0 & 0 & 0 & 0 & P_3 & P_5 & P_3 & P_1 \\ 0 & 0 & 0 & 0 & P_3 & P_1 & -P_3 & -P_5 \\ 0 & 0 & 0 & 0 & P_3 & -P_1 & -P_3 & P_5 \\ 0 & 0 & 0 & 0 & P_3 & -P_5 & P_3 & -P_1 \end{bmatrix}\begin{bmatrix} F_0+F_4 \\ F_1+F_5 \\ F_2+F_6 \\ F_3+F_7 \\ F_0-F_4 \\ F_1-F_5 \\ F_2-F_6 \\ F_3-F_7 \end{bmatrix} \quad (61)$$

$$\begin{bmatrix} f_0 \\ f_2 \\ f_4 \\ f_6 \end{bmatrix} = \begin{bmatrix} (F_0+F_4)+(F_2+F_6) & (F_1-F_5) & (F_3-F_7) \\ (F_0+F_4)-(F_2+F_6) & -(F_3-F_7) & (F_1-F_5) \\ (F_0+F_4)-(F_2+F_6) & (F_3-F_7) & -(F_1-F_5) \\ (F_0+F_4)+(F_2+F_6) & -(F_1-F_5) & -(F_3-F_7) \end{bmatrix}\begin{bmatrix} P_3 \\ P_5 \\ P_1 \end{bmatrix}$$
$$\begin{bmatrix} f_1 \\ f_3 \\ f_5 \\ f_7 \end{bmatrix} = \begin{bmatrix} (F_0+F_4)+(F_2+F_6) & (F_1-F_5) & (F_3-F_7) \\ (F_0-F_4)-(F_2+F_6) & -(F_3-F_7) & (F_1-F_5) \\ (F_0-F_4)-(F_2+F_6) & (F_3-F_7) & -(F_1-F_5) \\ (F_0+F_4)+(F_2+F_6) & -(F_1-F_5) & -(F_3-F_7) \end{bmatrix}\begin{bmatrix} P_3 \\ P_5 \\ P_1 \end{bmatrix} \quad (62)$$

By setting $F_0+F_4$, $F_3+F_7$, $F_1+F_5$, $F_2+F_6$, $F_0-F_4$, $F_3-F_7$, $F_1-F_5$, and $F_2-F_6$ in the equation (62) in the same manner as those in equation (63), an equation (64) is obtained. The 2-4-8 IDCT device constituting the 8-8 IDCT/2-4-8 IDCT device 110 according to the second embodiment is operated in accordance with the equation (64).

$$d_0=F_0+F_4,\ d_1=F_3+F_7,\ d_2=F_1+F_5,\ d_3=F_2+F_6, \\ d_4=F_0-F_4,\ d_5=F_3-F_7,\ d_6=F_1-F_5,\ d_7=F_2-F_6 \quad (63)$$

$$\begin{bmatrix} f_0 \\ f_2 \\ f_4 \\ f_6 \end{bmatrix} = \begin{bmatrix} d_0+d_3 & d_2 & d_1 \\ d_0-d_3 & -d_1 & d_2 \\ d_0-d_3 & d_1 & -d_2 \\ d_0+d_3 & -d_2 & -d_1 \end{bmatrix}\begin{bmatrix} P_3 \\ P_5 \\ P_1 \end{bmatrix}$$
$$\begin{bmatrix} f_1 \\ f_3 \\ f_5 \\ f_7 \end{bmatrix} = \begin{bmatrix} d_4+d_7 & d_6 & d_5 \\ d_4-d_7 & -d_5 & d_6 \\ d_4-d_7 & d_5 & -d_6 \\ d_4+d_7 & -d_6 & -d_5 \end{bmatrix}\begin{bmatrix} P_3 \\ P_5 \\ P_1 \end{bmatrix} \quad (64)$$

An MUX 112, in the case of the 8-8 IDCT, selectively outputs each of eight pieces of data to be used for a primary IDCT out of 8×8 transformation coefficient data (hereafter called as "8×8 data") to which the 8-8 IDCT is performed or each of eight pieces of data contained in each line constituting the 8-8 data obtained by the primary IDCT to each of corresponding registers $14_1$ to $14_8$ and, in the case of the 2-4-8 IDCT, selectively outputs data $F_0$ out of the eight pieces of data $F_0$ to $F_7$ to the register $14_1$ constituting a first register group 113, data $F_1$ to the register $14_5$, data $F_2$ to the register $14_3$, data $F_3$ to the register $14_7$, data $F_4$ to the register $14_2$, data $F_5$ to the register $14_6$, data $F_6$ to the register $14_4$ and data $F_7$ to the register $14_8$.

MUXs $16_{12}$, $16_2$, $16_{32}$, $16_4$, $16_5$, $16_6$, $16_7$, $16_8$ constituting a first MUX group 15, in the case of the 8-8 IDCT, select "0" data and MUX $16_{11}$ and MUX $16_{31}$, in the case of the 8-8 IDCT, select a register $14_2$ and a register $14_4$ respectively. The MUX $16_2$, $16_4$ to $16_8$, in the 2-4-8 IDCT, select corresponding registers $14_2$ and $14_4$ to $14_8$, respectively. The MUX $16_{11}$, $16_{12}$, $16_{31}$ and $16_{32}$, in the case of the 2-4-8 IDCT, select the registers $14_1$, $14_2$, $14_3$ and $14_4$, respectively. A MUX $12_4$, constituting a second MUX group $12_3$ is connected to an output of each of the registers $22_1$, $22_2$, $22_3$ and $22_4$ and, in both the 8-8 IDCT and 2-4-8 IDCT, selects the register $22_1$ four times and outputs four pieces of data sequentially. An MUX $12_{42}$ is connected to the output of each of the register $22_1$, $22_2$, $22_3$ and $22_4$ and, in the case of the 8-8 IDCT, selects the register $22_3$ four times and outputs four pieces of data sequentially and, in the case of the 2-4-8 IDCT , selects the register $22_2$ four times and outputs four pieces of data sequentially. An MUX $12_{43}$ is connected to the output of each of the registers $22_1$, $22_2$, $22_3$ and $22_4$ and, in the case of 8-8 IDCT, selects the register in the order of the registers $22_2$, $22_4$, $22_4$ and $22_2$ and outputs four pieces of data in order and, in the case of the 2-4-8 IDCT, selects the register in the order of the registers $22_3$, $22_4$, $22_4$ and $22_3$ and outputs four pieces of data sequentially. An MUX $12_{44}$ is connected to the output of each of the registers $22_1$, $22_2$, $22_3$ and $22_4$ and, in the case of the 8-8 IDCT, selects the register in the order of the registers $22_4$, $22_2$, $22_2$ and $22_4$ and outputs four pieces of data sequentially and, in the case of the 2-4-8 IDCT, selects the register in the order of the registers $22_4$, $22_3$, $22_3$ and $22_4$ and outputs four pieces of data in order. An MUX $12_{45}$ is connected to the output of each of registers $22_5$, $22_6$, $22_7$ and $22_8$ and, in the case of the 8-8 IDCT, selects the register in the order of the registers $22_5$, $22_7$, $22_6$ and $22_8$ and outputs four pieces of data in order and, in the case of the 2-4-8 IDCT, selects the register $22_3$ four times and outputs four pieces of data sequentially. An MUX $124_6$ is connected to the output of each of the registers $22_5$, $22_6$, $22_7$ and $22_8$ and, in the 8-8 IDCT, selects the register in the order of the registers $22_6$, $22_5$, $22_8$ and $22_7$ and outputs four pieces of data sequentially and, in the case of the 2-4-8 IDCT, selects the register in the order of the registers $22_7$, $22_8$, $22_8$ and $22_7$ and outputs four pieces of data in order. An MUX $124_7$ is connected to the output of each of the registers $22_5$, $22_6$, $22_7$ and $22_8$ and, in the case of the 8-8 IDCT, selects the register in the order of the registers $22_7$, $22_8$, $22_5$ and $22_6$ and outputs four pieces of data and, in the case of the 2-4-8 IDCT, selects the register $22_6$ four times and outputs four pieces of data in order. An MUX $124_8$ is connected to the output of each of the registers $22_5$, $22_6$, $22_7$ and $22_8$ and, in the case of the 8-8 IDCT, selects the register in the order of the registers $22_8$, $22_6$, $22_7$ and $22_{65}$ and outputs four pieces of data sequentially and, in the case of the 2-4-8 IDCT, selects the register $22_8$, $22_7$, $22_7$ and $22_8$ and outputs four pieces of data sequentially.

An adding/subtracting circuit $126_1$ constituting a first adding/subtracting circuit group 125 performs adding operations on data out of four pieces of data output sequentially from the MUX $124_1$ and on data out of four pieces of data output sequentially from the MUX $124_2$ in a first order and fourth order, and performs subtracting operations on data output in a second order and third order out of four pieces of data output from the MUX $124_1$ and from the MUX $124_2$; that is, data output in the first order from the MUX $124_1$ is added to data output in the first order from the MUX $124_2$ and thus same adding operations are performed on data output in the fourth order, and the similar subtracting operations are performed on data output in the second order and third order. In the subtracting operation performed by the adding/subtracting circuit $126_1$, data output from the MUX $124_2$ is subtracted from data output from the MUX $124_1$.

An adding/subtracting circuit $126_2$ constituting the first adding/subtracting circuit group 125 performs adding operations on data out of four pieces of data output sequentially from the MUX $124_5$ and on data out of four pieces of data output sequentially from the MUX $124_7$ in a first order and fourth order, and performs subtracting operations on data output in a second order and third order out of four pieces of data output from the MUX $124_5$ and from the MUX $124_7$; that is, data output in the first order from the MUX $124_1$ is added to data output in the first order from the MUX $124_7$ and thus same adding operations are performed on data output in the fourth order, and the similar subtracting operations are performed on data output in the second order and third order. In the subtracting operation performed by the adding/subtracting circuit $126_2$, data output from the MUX $124_7$ is subtracted from data output from the MUX $124_5$.

A register $134_1$ constituting a fourth register group 133, in both the 8-8 IDCT and 2-4-8 IDCT, stores each of four pieces of data output sequentially from a $P_5$ coefficient multiplying circuit $32_2$ and outputs each of all the data as positive values. A register $134_2$ constituting the fourth register group 133, in both the 8-8 IDCT and 2-4-8 IDCT, stores each of four pieces of data output sequentially from a $P_5$ coefficient multiplying circuit $32_2$ and outputs data stored in a first order and third order as positive values and data stored in a second order and fourth order as negative values. A register $134_3$, in both the 8-8 IDCT and the 2-4-8 IDCT, stores each of four pieces of data output sequentially from a $P_1$ coefficient multiplying circuit $32_3$ and outputs data stored in the first order and second order as positive values and data stored in the third order and fourth order as negative values.

A register $134_4$ stores each of four pieces of data output sequentially from a $P_6/P_3$ coefficient multiplying circuit $32_4$ and, in the case of the 8-8 IDCT, outputs data to be output in a first order, second order and fourth order as positive values and data to be output in a third order as negative values and, in the case of the 2-4-8 IDCT, outputs each of all the data stored as positive values. A register $134_5$ stores each of four pieces of data output sequentially from a $P_4/P_5$ and, in the case of the 8-8 IDCT, outputs data to be output in a first order and second order as positive values and data output in a third order and fourth order as negative values and, in the case of the 2-4-8 IDCT, outputs data in the first order and third order as positive values and data to be output in the second and fourth order as negative values. A register $134_6$ stores each of four pieces of data output sequentially from a $P_2$ coefficient multiplying circuit $32_6$ and outputs data to be output in a first order and fourth order as negative values and data to be output in the second order and third order as positive orders. A register $134_7$ stores each of four pieces of data output sequentially from a $P_0/P_1$ coefficient multiplying circuit $32_7$ and, in the case of the 8-8 IDCT, outputs data to be output in a first order to third order as negative values and data output in a fourth order as a positive value and, in the case of the 2-4-8 IDCT, outputs data in the first order and second order and data output in a third order and fourth order as negative values.

An adding circuit $138_2$ performs adding operations on data stored in the register $134_1$, data stored in the register $134_2$ and data stored in the register $134_3$. Data output sequentially from the adding circuit $138_2$ is stored into a register $40_2$ in order. An adding circuit $138_4$ performs adding operations on data stored in the register $134_4$, data stored in the register $134_5$, data stored into a register $134_6$ and data stored in the register $134_7$. Data output from the adding circuit $138_4$ is stored in the register $40_4$.

Data from the register $40_2$ is fed to a summand input of an adding circuit 44 and to a minuend input of a subtracting circuit 42 and data from the register $40_4$ is fed to an addend input of the adding circuit 44 and to a subtrahend input of the subtracting circuit 42. Data output from the subtracting circuit 42 is fed to a register 46 constituting a sixth register group 45 and data from the adding circuit 44 is fed to a register 48 constituting the sixth register group 45.

Moreover, configurations of the second embodiment are the same as those in the first embodiment except those described above. Therefore, in FIG. 7 and FIG. 8, same numbers are given to components being same as those in FIG. 1 and FIG. 2 in the first embodiment and descriptions of them are omitted.

However, configurations of the register $134_1$ are the same as those of the register $34_1$. The adding circuit $18_1$ is connected to the output of the register $14_1$ and of the MUX $16_2$, the adding circuit $18_2$ is connected to the output of the register $14_3$ and of the MUX $16_4$, the adding circuit $18_3$ is connected to the output of the register $14_5$ and of the MUX $16_4$ and the adding circuit $18_4$ is connected to the output of the register $14_7$ and of the MUX $16_8$. Moreover, the subtracting circuit $20_1$ is connected to the output of each of the MUX $16_{11}$ and MUX $16_{12}$, the subtracting circuit $20_2$ is connected to the output of the MUX $16_{31}$ and MUX $16_{32}$, the subtracting circuit $20_3$ is connected to the register $14_6$ and the MUX $16_{22}$, the subtracting circuit $20_3$ is connected to the output of the register $14_6$ and of the MUX $16_5$ and the subtracting circuit $20_4$ is connected to the output of the register $14_8$ and of the MUX $16_8$.

Next, operations in the second embodiment will be described by referring to FIG. 7 to FIG. 12. First, operations in the 8-8 IDCT will be explained.

Each of eight pieces of data $F_0$ to $F_7$ existing in a string direction out of 8×8 image data compressed by the 8-8 DCT is stored into each of corresponding register $14_1$ to register $14_8$ constituting the first register group 113.

Since the MUXs $16_{12}$, $16_2$, $16_{32}$, $16_4$, $16_5$, $16_6$, $16_7$ and $16_8$ have selected the "0" data and the MUX $16_{11}$ and MUX $16_{31}$ have selected the register $14_2$ and register $14_4$ respectively, data $F_0=a_0$ is output from the adding circuit $18_1$, data $F_2=a_2$ from the adding circuit $18_2$, data $F_4=a_3$ from the adding circuit $18_3$ and data $F_6=a_1$ from the adding circuit $18_4$, and data $F_1=a_5$ is output from the subtracting circuit $20_1$, $F_3=a_7$ from the subtracting circuit $20_2$, data $-F_5=a_6$ from the subtracting circuit $20_3$ and data $-F_7=a_4$ from the subtracting circuit $20_4$.

Data $a_0$ to $a_3$ output sequentially from the adding circuit $18_1$ to $18_4$ are input to the MUX $12_4$, to MUX $124_4$ through the register $22_1$ to register $22_4$. The adding/subtracting circuit 126 performs adding operations and subtracting operations to data $a_0$ output sequentially in every operation cycle from a first cycle to fourth operation cycle out of the four operation cycles from the MUX $124_1$ and to data $a_3$ output sequentially in every operation cycle from a first operation cycle fourth operation cycle out of the four operation cycles from $124_2$ and, as a result, data $a_0+a_3$, data $a_0-a_3$, data $a_0-a_3$ and data $a_0+a_3$ are output in order.

Data $a_0+a_3$, data $a_0-a_3$, data $a_0-a_3$ and data $a_0+a_3$ output sequentially from the adding/subtracting circuit $126_1$ are stored in the $30_1$ (see the register $30_1$ in FIG. 9). Data $a_2$, data $a_1$, data $a_1$ and data $a_2$ output in every operation cycle from a first operation cycle to fourth operation cycle out of the four operation cycles from the MUX $124_3$ and data $a_1$, data $a_2$, data $a_2$ and data $a_1$ output in every operation cycle from a first operation cycle to fourth operation cycle out of the four operation cycles from the MUX $124_4$ are stored into the register $30_3$ sequentially (see the register $30_3$ in FIG. 9).

Data $a_5$, data $a_6$, data $a_7$ and data $a_4$ output in every operation cycle from a first operation cycle to fourth operation cycle out of the four operation cycles from the MUX $124_5$ are stored into the register $30_4$ sequentially (see the register $30_4$ in FIG. 10). Data $a_7$, data $a_5$, data $a_4$ and data $a_6$ output in every operation cycle from a first operation cycle to fourth operation cycle out of the four operation cycles from the MUX $124_6$ are stored into the register $30_5$ sequentially (see the register $30_5$ in FIG. 10). Data $a_6$, data $a_4$, data $a_5$ and data $a_7$ output in every operation cycle from a first operation cycle to fourth operation cycle out of the four operation cycles are stored into the register $30_6$ (see the register $30_6$ in FIG. 10). Data $a_4$, data $a_7$, data $a_6$ and data $a_5$ output in every operation cycle from a first operation cycle to fourth operation out of the four operation cycles are stored into the register $30_7$ sequentially (see the register $30_7$ in FIG. 10).

Data stored sequentially into the register $30_1$ is multiplied by a fixed coefficient $P_3$ in the $P_3$ coefficient multiplying circuit $32_1$ and resulting data is stored in order into the register $13_4$, (see the register $13_4$, in FIG. 9). Data stored sequentially into the register $30_2$ is multiplied by a fixed coefficient $P_5$ in the $P_5$ coefficient multiplying circuit $32_2$ and resulting data is stored in order into the register $134_2$ (see the register $134_2$ in FIG. 9). Data stored sequentially into the register $30_3$ is multiplied by a fixed coefficient $P_1$ in the $P_1$ coefficient multiplying circuit $32_3$ and resulting data is stored in order into the register $134_3$ (see the register $134_3$ in FIG. 9). Data stored sequentially into the register $30_4$ is multiplied by a fixed coefficient $P_6$ in the $P_6$ coefficient multiplying circuit $32_4$ and resulting data is stored into the register $134_4$ sequentially (see the register $134_4$ in FIG. 10). Data stored sequentially into the register $30_5$ is multiplied by a fixed coefficient $P_4$ in the $P_4/P_5$ coefficient multiplying circuit $32_5$ and resulting data is stored in order into the register $134_5$ (see the register $34_5$ in FIG. 10). Data stored sequentially stored in the register $30_6$ is multiplied by a fixed coefficient $P_2$ in the $P_2$ coefficient multiplying circuit $32_6$ and resulting data is stored in order into the register $134_6$ (see the register $134_6$ in FIG. 10). Data stored in order into the register $30_7$ is multiplied by a fixed coefficient $P_0$ in the $P_0/P_1$ coefficient multiplying circuit $32_7$ and resulting data is stored in order into the register $134_7$ (see the register 134 in FIG. 10).

The adding circuit $138_2$ performs adding operations on each of data fed from the register $134_1$, register $134_2$ and register $134_3$ in the order of a first operation cycle to fourth operation cycle out of the four operation cycles and output data $(a_0+a_3)\ P_3+a_2P_5+a_1P_1$, $(a_0-a_3)\ P_3-a_1P_5+a_2P_1$, $(a_0-a_3)\ P_3+a_1P_5-a_2P_1$, $(a_0+a_3)\ P_3-a_2P_5-a_1P_1$) are stored in order into the register $40_2$ (see the register $40_2$ in FIG. 9).

The adding circuit $138_4$ performs adding operations on each of data fed from the register $134_4$, register $134_5$ and register $134_6$ in the order of a first operation cycle to fourth operation cycle out of the four operation cycles and output data $a_5P_6+a_7P_4-a_6P_2-a_4P_0$, $a_6P_6+a_5P_4+a_4P_2-a_7P_0$, $-a_7P_6-a_4P_4+a_5P_2-a_6-P_0$, $a_4P_6-a_6P_4-a_7P_2+a_5P_0$ are stored in order into the register $40_4$ (see the register $40_4$ in FIG. 9).

When data stored into the register $40_2$ and output in every second operation cycle is multiplied by data being stored in the register $40_4$ and output in every second operation cycle in the adding circuit 44, data $f_0$ out of data $f_0$ to data $f_7$ existing before a compression is performed on eight pieces of data $F_0$ to data $F_7$ arranged in a string direction constituting input 8×8 data block is obtained in a first operation cycle, data $f_1$ out of data $f_0$ to data $f_7$ existing before the compression is performed on input eight pieces of data $F_0$ to data $F_7$ is obtained in a second operation cycle, data $f_2$ out of data $f_0$ to data $f_7$ existing before the compression is performed on input eight pieces of data $F_0$ to data $F_7$ is obtained in a third operation cycle and data $f_3$ out of data $f_0$ to data $f_7$ existing before the compression is performed on input eight pieces of data $F_0$ to data $F_7$ is obtained in a fourth operation cycle. The data $f_0$, data $f_1$, data $f_2$ and data $f_3$ are stored sequentially into the register 48. In FIG. 8, the image data $f_0$ to image data $f_3$ to be stored in the register 48, corresponding to eight pieces of data $F_0$ to data $F_7$, are shown in a lower part of the output line of the register 48.

Moreover, when data being stored in the register $40_4$ and output in a second operation cycle is subtracted from data being stored in the register $40_2$ and output in a second operation cycle in the subtracting circuit 42, data $f_4$ out of data $f_0$ to data $f_7$ existing before a compression is performed on eight pieces of data $F_0$ to data $F_7$ arranged in a string direction constituting input 8×8 data block is obtained in a first operation cycle, data $f_5$ out of data $f_0$ to data $f_7$ existing before the compression is performed on input eight pieces of data $F_0$ to data $F_7$ is obtained in a second operation cycle, data $f_6$ out of data $f_0$ to data $f_7$ existing before the compression is performed on input eight pieces of data $F_0$ to data $F_7$ is obtained in a third operation cycle and data $f_7$ out of data $f_0$ to data $f_7$ existing before the compression is performed on input eight pieces of data $F_0$ to data $F_7$ is obtained in a fourth operation cycle. Data $f_4$, data $f_5$, data $f_6$ and data $f_7$ are stored sequentially into the register 46 (see the register 46 in FIG. 10). In FIG. 8, the image data $f_4$ to image data $f_7$ to be stored in the register 46, corresponding to eight pieces of data $F_0$ to data $F_7$, are shown in the lower part of the output line of the register 48.

By completing the above arithmetic operations, the primary 8-8 IDCT on eight pieces of data contained in one string constituting the 8×8 data block is terminated. The same primary 8-8 IDCT as described above is performed on each of strings subsequent to a next string constituting the 8×8 data block and thereafter, and the primary 8-8 IDCT on all eight strings constituting the 8×8 data block is terminated in the similar manner. After the completion of the primary 8-8 IDCT on the all eight strings, a secondary 8-8 IDCT is performed on eight pieces of data (transposed data for IDCT) contained in each line constituting the 8×8 data block. By completing the primary 8-8 IDCT and secondary 8-8 IDCT to be performed on each of the 8×8 pieces of data, the transmitted image data compressed by the 8-8 DCT can be reproduced.

Next, operations in the 2-4-8 IDCT will be described below. Each of eight pieces of data $F_0$ to data $F_7$ out of 8×8 data block obtained by performing the 2-4-8 DCT, arranged in the string direction in 8×8 transformation coefficient data transmitted sequentially from the MUX 112 is stored into each of the register $14_1$ to register $14_8$ constituting the first register group 113 as follows: That is, the data $F_0$ is stored into the register $14_1$, data $F_4$ into the register $14_2$, data $F_2$ into the register $14_3$, data $F_6$ into the register $14_4$, data $F_1$ into the register $14_5$, data $F_5$ into the register $14_6$, data $F_3$ into the register $14_7$ and data $F_7$ into the register $14_8$.

Since the MUX $16_2$, MUX $16_4$ to MUX $16_8$ have selected the corresponding register $14_1$, register $14_4$ to register $14_8$ and the MUX $16_{11}$, MUX $16_{12}$, MUX $16_{31}$, MUX $16_{32}$ have selected the corresponding register $14_1$, register $14_3$, register $14_3$, register $14_4$, data $F_0+F_4=b_0$ is output from the adding circuit $18_1$, data $F_2+F_6=b_3$ from the adding circuit $18_2$, data $F_1+F_5=b_2$ from the adding circuit $18_3$, data $F_3+F_7=b_1$ from the adding circuit $18_4$, data $F_0-F_4=b_4$ from the subtracting circuit $20_1$, data $F_2-F_6=b_7$ from the subtracting circuit $20_2$ and data $F_3-F_7=b_5$ from the subtracting circuit $20_4$.

Data $b_0$ to data $b_3$ output from the adding circuit $18_1$ to adding circuit $18_4$ are input to the MUX $124_1$ to MUX $124_4$ through the register $22_1$ to register $22_4$. Adding operations and subtracting operations are performed, by the adding and subtracting circuits $126_1$, sequentially on data $b_0$ output from the MUX $124_1$ in every operation cycle from a first operation cycle to fourth operation cycle out of the four operation cycles and on data $b_3$ output from the MUX $124_2$ in every operation cycle from a first operation cycle to fourth operation cycle out of the four operation cycles and, as a result, data $b_0+b_3$, data $b_0-b_3$, data $b_0-b_3$ and data $b_0+b_3$ are output in order. Data $b_0+b_3$, data $b_0-b_3$, data $b_0-b_3$ and $b_0+b_3$ output sequentially from the adding/subtracting $126_1$ are stored in the register $30_1$ (see the register $30_1$ in FIG. 11).

Data $b_2$, data $b_1$, data $b_1$ and data $b_2$ output from the MUX $124_3$ in every operation cycle from a first operation cycle to fourth operation cycle out of the four operation cycles are stored in order into the register $30_2$ (see the register $30_2$ in FIG. 11) and data $b_1$, data $b_2$, data $b_2$ and data $b_1$ output from the MUX $124_4$ in every operation cycle from a first operation to fourth operation cycle out of the four operation cycles are stored in order into the register $30_3$ (see the register $30_3$ in FIG. 11).

Adding operations and subtracting operations are performed by the adding/subtracting circuit $126_2$ on data $b_4$, data $b_4$, data $b_4$ and data $b_4$ output from the MUX $124_5$ in every operation cycle from a first operation cycle to fourth operation cycle out of the four operation cycles and on data $b_7$, data $b_7$, data $b_7$ and data $b_7$ output from the MUX $124_7$ in every operation cycle from a first operation cycle to fourth operation cycle out of the four operation cycles, and data $b_4+b_7$, data $b_4-b_7$, data $b_4-b_7$ and data $b_4+b_7$ are output from the adding/subtracting circuit $126_2$. Data $b_4+b_7$, data $b_4-b_7$, data $b_4-b_7$ and data $b_4+b_7$ are stored sequentially into the register $30_4$ (see the register $30_4$ in FIG. 11).

Data $b_6$, data $b_5$, data $b_5$ and data $b_6$ output from the MUX $124_6$ in every operation cycle from a first operation cycle to fourth operation cycle out of the four operation cycles are stored sequentially into the register $30_5$ (see the register $30_5$ in FIG. 11). Data $b_7$, data $b_7$, $b_7$ and $b_7$ output from the MUX $124_7$ in every operation cycle from a first operation to fourth operation out of the four operation cycles are all not selected by the MUX $28_2$ and four pieces of "0" data selected by the MUX $28_2$ are stored sequentially into the register $30_6$ (see the register $30_6$ in FIG. 11). Data $b_5$, data $b_6$, data $b_6$ and data $b_5$ output from the MUX $124_8$ in every operation cycle from a first operation to fourth operation out of the four operation cycles are stored sequentially into the register $30_7$ (see the register $30_7$ in FIG. 11).

Each of data sequentially stored into the register $30_1$ is multiplied by a fixed coefficient $P_3$ in the $P_3$ coefficient multiplying circuit $32_1$ and the resulting data are stored in order into the register $13_4$ (see the register $134_1$ in FIG. 11). Each of data sequentially stored into the register $30_2$ is multiplied by a fixed coefficient $P_5$ in the $P_5$ coefficient multiplying circuit $32_2$ and the resulting data are stored in order into the register $134_2$ (see the register $134_2$ in FIG. 11). Each of data stored in order into the register $30_3$ is multiplied by a fixed coefficient $P_1$ in the $P_1$ coefficient multiplying circuit $32_1$ and the resulting data are stored in order into the register $134_3$ (see the register $134_3$ in FIG. 11). Each of data stored in order in the register $30_4$ is multiplied by a fixed coefficient $P_3$ in the $P_6/P_3$ coefficient multiplying circuit $32_4$ and the resulting data are stored sequentially into the register $134_4$ (see the register $134_4$ in FIG. 12). Each of data stored in order into the register $30_5$ is multiplied by a fixed coefficient $P_5$ in the $P_4/P_5$ coefficient multiplying circuit $32_5$ and the resulting data are stored sequentially into the register $134_5$ (see the register $134_5$ in FIG. 12). Each of data stored in order into the register $30_6$ is multiplied by a fixed coefficient $P_2$ in the $P_2$ coefficient multiplying circuit $32_6$ and the resulting data are stored sequentially into the register $134_6$ (see the register $134_6$ in FIG. 12). Each of data stored in order into the register $30_7$ is multiplied by a fixed coefficient $P_1$ in the $P_0/P_1$ coefficient multiplying circuit $32_7$ and the resulting data is stored sequentially into the register $134_7$ (see the register $134_7$ in FIG. 12).

Data output from the registers $134_1$, $134_2$ and $134_3$ in every operation cycle from a first operation to fourth operation out of four operation cycles are added in the adding circuit $138_2$, and data $(b_0+b_3)$ $P_3+b_2P_5+b_1P_1$ as data obtained in the first operation cycle is output from the adding circuit $138_2$, $(b_0-b_3)$ $P_3-b_1P_5+b_2P_1$ as data obtained in the second operation cycle is output, data $(b_0-b_3)$ $P_3+b_1P_5-b_2P_1$ as data obtained in the third operation cycle is output and data $(b_0+b_3)$ $P_3-b_2P_5-b_1P_1$ as data obtained in the fourth operation cycle is output and the data are stored sequentially into the register $40_2$. Data to be stored sequentially into the register $40_2$ include data $f_0$, data $f_2$, data $f_4$ and data $f_6$ (corresponding to $f_0$, $f_2$, $f_4$ and $f_6$ in the equation (64)), in the order of storing, out of picture element data $f_0$ to picture element data $f_7$ corresponding to input eight pieces of data $F_0$ to data $F_7$. In FIG. 8, the picture element data $f_0$, picture element data $f_2$, picture element data $f_4$ and picture element data $f_6$ are shown in a lower part of an output line of the register $40_2$.

Data output from the register $134_4$, register $134_5$ and register $134_6$ in every operation cycle from a first operation to fourth operation out of four operation cycles are added in the adding circuit $138_4$, and data $(b_4+b_7)$ $P_3+b_6P_5+b_5P_1$ as data obtained in the first operation cycle is output from the adding circuit $138_4$, $(b_4-b_7)$ $P_3-b_5P_5+b_6P_1$ as data obtained in the second operation cycle is output, data $(b_4-b_7)$ $P_3+b_5P_5-b_6P_1$ as data obtained in the third operation cycle is output and data $(b_4+b_7)$ $P_3-b_6P_5-b_5P_1$ as data obtained in the fourth operation cycle is output and the data are stored sequentially into the register $40_4$. Data to be stored sequentially into the register $40_4$ include data $f_1$, data $f_3$, data $f_5$ and data $f_7$ (corresponding to $f_1$, $f_3$, $f_5$ and $f_7$ in the equation (64)), in the order of storing, out of picture element data $f_0$ to picture element data $f_7$ corresponding to input eight pieces of data $F_0$ to data $F_7$. In FIG. 8, the picture element data $f_1$, picture element data $f_3$, picture element data $f_5$ and picture element data $f_7$ are shown in a lower part of an output line of the register $40_4$.

By completing the above arithmetic operations, the primary 2-4-8 IDCT on eight pieces of data contained in one string constituting the 8×8 data block is terminated. The same primary 2-4-8 IDCT as described above is performed on each of strings subsequent to a next string constituting the 8×8 data block and thereafter, and the primary 2-4-8 IDCT on all eight strings constituting the 8×8 data block is terminated in the similar manner. After the completion of the primary 2-4-8 IDCT on all eight strings, a secondary 2-4-8 IDCT is performed on eight data (transposed data for IDCT) contained in each line constituting the 8×8 data block. By completing the primary 2-4-8 IDCT and secondary 2-4-8 IDCT to be performed on each of the 8×8 data, the transmitted image data compressed by the 2-4-8 DCT can be reproduced.

Thus, according to the present invention, since the 8-8 IDCT device and 2-4-8 IDCT device are so configured that a part of the fixed coefficient multiplying circuit used in the 8-8 IDCT circuit can be used, by being switched, as a fixed coefficient multiplying circuit required in the 2-4-8 IDCT, a high-speed calculating characteristic obtained through a pipeline-processing type arithmetic operation in the 8-8 IDCT can be maintained in the 2-4-8 IDCT and the high-speed calculating characteristic can be still maintained in even miniaturized 8-8 IDCT devices and 2-4-8 IDCT devices.

Third Embodiment

Figure 13:
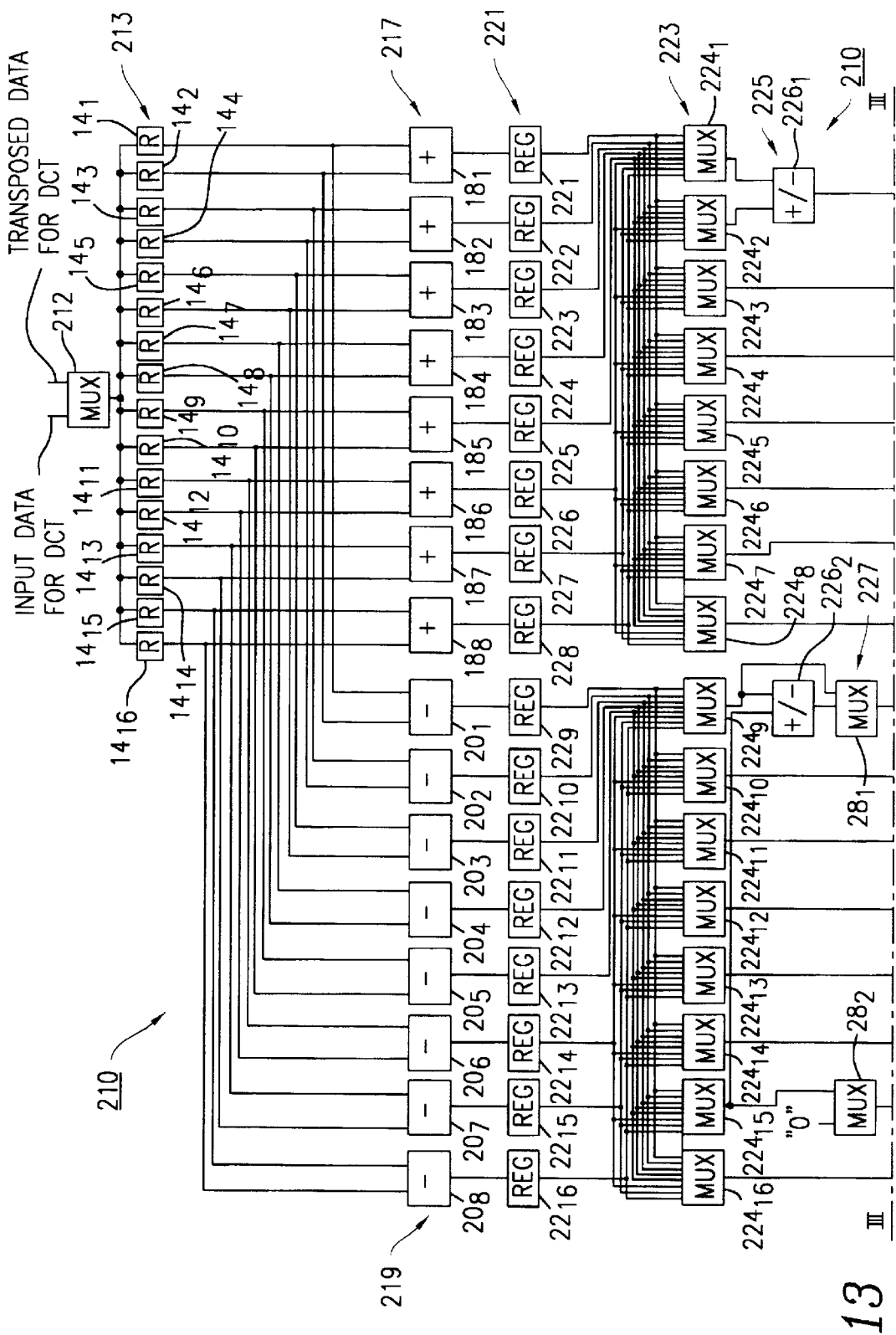
FIG. 13 is a schematic block diagram partially showing electrical configurations of a 16-16/2-8-16 DCT device according to a third embodiment of the present invention.
Figure 14:
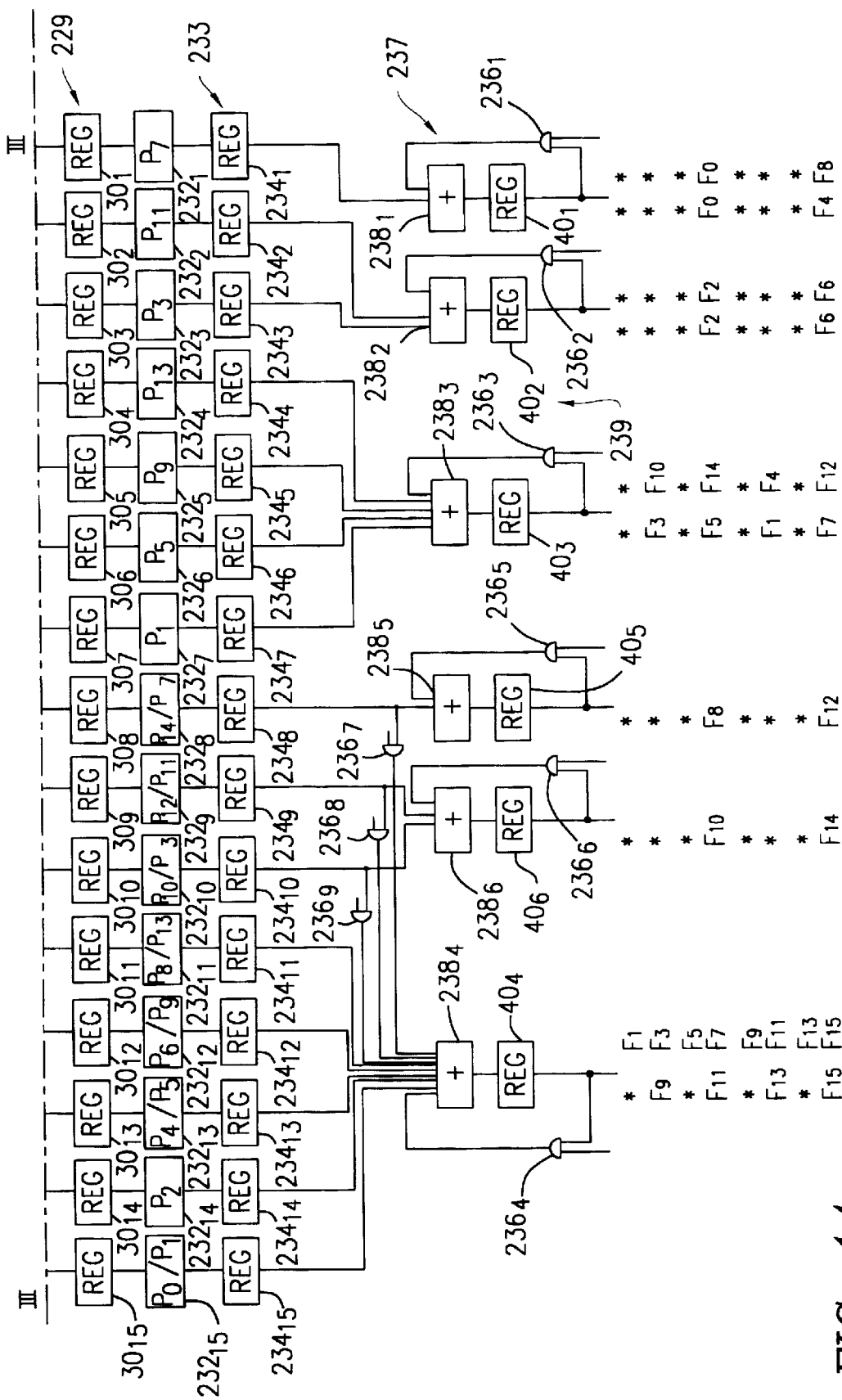
FIG. 14 is a schematic block diagram partially showing electrical configurations of the 16-16/2-8-16 DCT device according to the third embodiment of the present invention.

FIG. 13 is a schematic block diagram partially showing electrical configurations of a 16-16/2-8-16 DCT device according to a third embodiment of the present invention. FIG. 14 is a schematic block diagram partially showing electrical configurations of the 16-16/2-8-16 DCT device according to the third embodiment. By overlaying a line III—III in FIG. 13 on a line III—III in FIG. 14, overall configurations of the 16-16/2-8-16 DCT device can be shown. Configurations of the 16-16/2-8-16 DCT of the third embodiment differ greatly from those in the first embodiment and second embodiment in that the 16-16 DCT or 2-8-16 DCT is performed on 16×16 pieces of picture element data to be input. The 16-16 DCT/2-8-16 DCT device 210, in the case of the 16-16 DCT, performs arithmetic operations according to a determinant equation (65) obtained by decompressing and rearranging the equation (17) and, in the case of the 2-8-16 DCT, performs arithmetic operations according to a determinant equation (66) obtained by decompressing and rearranging the equation (21). Value $e_0$ to value $e_{15}$ in the determinant equation (66) are given by the equation (67) and values $g_0$ to value $g_{15}$ in the determinant equation (66) are given by the equation (68).

$$\begin{bmatrix} F_0 \\ F_8 \\ F_2 \\ F_6 \\ F_{10} \\ F_{14} \\ F_4 \\ F_{12} \end{bmatrix} = \begin{bmatrix} e_0+e_1+e_2+e_3+e_4+e_5+e_6+e_7 & 0 & 0 & 0 & 0 & 0 & 0 \\ e_0-e_1-e_2+e_3+e_4-e_5-e_6+e_7 & 0 & 0 & 0 & 0 & 0 & 0 \\ 0 & e_0-e_3-e_4+e_7 & e_1-e_2-e_5+e_6 & 0 & 0 & 0 & 0 \\ 0 & -e_1+e_2-e_5+e_6 & e_0-e_2-e_4+e_7 & 0 & 0 & 0 & 0 \\ 0 & 0 & 0 & e_0-e_7 & e_1-e_6 & e_2-e_5 & e_3-e_4 \\ 0 & 0 & 0 & e_5-e_2 & e_0-e_6 & e_3-e_4 & e_6-e_1 \\ 0 & 0 & 0 & e_6-e_1 & e_3-e_4 & e_0-e_7 & e_2-e_5 \\ 0 & 0 & 0 & e_4-e_3 & e_2-e_5 & e_6-e_1 & e_0-e_7 \end{bmatrix} \begin{bmatrix} P_7 \\ P_{11} \\ P_3 \\ P_{13} \\ P_9 \\ P_5 \\ P_1 \end{bmatrix} \quad (65)$$

$$\begin{bmatrix} F_1 \\ F_3 \\ F_5 \\ F_7 \\ F_9 \\ F_{11} \\ F_{13} \\ F_{15} \end{bmatrix} = \begin{bmatrix} e_8 & e_9 & e_{10} & e_{11} & e_{12} & e_{13} & e_{14} & e_{15} \\ -e_{13} & e_8 & -e_{12} & -e_{14} & e_9 & -e_{11} & -e_{15} & e_{10} \\ e_{14} & -e_{11} & e_8 & -e_{10} & e_{13} & e_{15} & -e_{12} & e_9 \\ e_{12} & -e_{10} & -e_{14} & e_8 & -e_{15} & -e_9 & e_{13} & e_{11} \\ e_{11} & -e_{13} & -e_9 & e_{15} & e_8 & e_{14} & -e_{10} & -e_{12} \\ -e_9 & -e_{12} & -e_{15} & e_{13} & e_{10} & e_8 & e_{11} & e_{14} \\ e_{10} & e_{15} & -e_{11} & -e_9 & -e_{14} & e_{12} & e_8 & e_{13} \\ -e_{15} & e_{14} & -e_{13} & -e_{12} & -e_{11} & e_{10} & -e_9 & e_8 \end{bmatrix} \begin{bmatrix} P_{14} \\ P_{12} \\ P_{10} \\ P_8 \\ P_6 \\ P_4 \\ P_2 \\ P_0 \end{bmatrix}$$

$$\begin{bmatrix} F_0 \\ F_4 \\ F_2 \\ F_6 \\ F_3 \\ F_5 \\ F_1 \\ F_7 \end{bmatrix} = \begin{bmatrix} g_0+g_1+g_2+g_3+g_4+g_5+g_6+g_7 & 0 & 0 & 0 & 0 & 0 & 0 & 0 \\ g_0-g_1-g_2+g_3+g_4-g_5-g_6+g_7 & 0 & 0 & 0 & 0 & 0 & 0 & 0 \\ 0 & g_0+g_7-g_3-g_4 & -g_1-g_2-g_5+g_6 & 0 & 0 & 0 & 0 & 0 \\ 0 & -g_1+g_2+g_5-g_6 & g_0-g_3-g_4-g_7 & 0 & 0 & 0 & 0 & 0 \\ 0 & 0 & 0 & -g_2+g_5 & g_0-g_7 & -g_3+g_4 & -g_1+g_6 \\ 0 & 0 & 0 & -g_1+g_6 & g_3-g_4 & g_0-g_7 & g_2-g_5 \\ 0 & 0 & 0 & g_0-g_7 & g_1-g_6 & g_2-g_5 & g_3-g_4 \\ 0 & 0 & 0 & -g_3+g_4 & g_2-g_5 & -g_2+g_6 & g_0-g_7 \end{bmatrix} \begin{bmatrix} P_7 \\ P_{11} \\ P_3 \\ P_{13} \\ P_9 \\ P_5 \\ P_1 \end{bmatrix} \quad (66)$$

$$\begin{bmatrix} F_8 \\ F_{12} \\ F_{10} \\ F_{14} \\ F_9 \\ F_{11} \\ F_{13} \\ F_{15} \end{bmatrix} = \begin{bmatrix} g_8+g_9+g_{10}+g_{11}+g_{12}+g_{13}+g_{14}+g_{15} & 0 & 0 & 0 & 0 & 0 & 0 & 0 \\ g_8-g_9-g_{10}+g_{11}+g_{12}-g_{13}-g_{14}+g_{15} & 0 & 0 & 0 & 0 & 0 & 0 & 0 \\ 0 & g_8-g_{11}-g_{12}+g_{15} & g_9-g_{10}-g_{13}+g_{14} & 0 & 0 & 0 & 0 & 0 \\ 0 & -g_9+g_{10}+g_{13}-g_{14} & g_8+g_{11}+g_{12}+g_{15} & 0 & 0 & 0 & 0 & 0 \\ 0 & 0 & 0 & g_8-g_{15} & g_9-g_{14} & g_{10}-g_{13} & g_{11}-g_{12} \\ 0 & 0 & 0 & -g_{10}+g_{13} & g_8-g_{15} & -g_{11}+g_{12} & -g_9+g_{14} \\ 0 & 0 & 0 & -g_9+g_{14} & g_{11}-g_{12} & g_8-g_{15} & g_{10}-g_{13} \\ 0 & 0 & 0 & -g_{11}+g_{12} & g_{10}-g_{13} & -g_9+g_{14} & g_8-g_{15} \end{bmatrix} \begin{bmatrix} P_7 \\ P_{11} \\ P_3 \\ P_{13} \\ P_9 \\ P_5 \\ P_1 \end{bmatrix}$$

$$e_0 = f_0 + f_{15}, \quad e_1 = f_1 + f_{14}, \quad e_2 = f_2 + f_{13}, \ldots, e_7 = f_7 + f_8, \\ e_8 = f_0 - f_{15}, \quad e_9 = f_1 - f_{14}, \quad e_{10} = f_2 - f_{13}, \ldots, e_{15} = f_7 - f_8 \quad (67)$$

$$g_0 = f_0 + f_1, \quad g_1 = f_2 + f_3, \quad g_2 = f_4 + f_5, \ldots, g_7 = f_{14} + f_{15}, \\ g_8 = f_0 - f_1, \quad g_9 = f_2 - f_3, \quad g_{10} = f_4 - f_5, \ldots, g_{15} = f_{14} - f_{15} \quad (68)$$

The values $P_0$ to $P_{15}$ in the equation (65) and equation (66) are as follows:

$P_0=\cos(15\pi/32)=-\cos(17\pi/32)=0.09801714034\ldots$ $P_1=\cos(14\pi/32)=-\cos(18\pi/32)=0.195090322\ldots$ $P_2=\cos(13\pi/32)=-\cos(19\pi/32)=0.2902846773\ldots$ $P_3=\cos(12\pi/32)=-\cos(20\pi/32)=0.3826834324\ldots$ $P_4=\cos(11\pi/32)=-\cos(21\pi/32)=0.4713967368\ldots$ $P_5=\cos(10\pi/32)=-\cos(22\pi/32)=0.555570233\ldots$ $P_6=\cos(9\pi/32)=-\cos(23\pi/32)=0.634393842\ldots$ $P_7=\cos(8\pi/32)=-\cos(24\pi/32)=0.707106781\ldots$ $P_8=\cos(7\pi/32)=-\cos(25\pi/32)=0.7730104534\ldots$ $P_9=\cos(6\pi/32)=-\cos(26\pi/32)=0.8314696123\ldots$ $P_{10}=\cos(5\pi/32)=-\cos(27\pi/32)=0.8819212644\ldots$ $P_{11}=\cos(4\pi/32)=-\cos(28\pi/32)=0.9238795325\ldots$ $P_{12}=\cos(3\pi/32)=-\cos(29\pi/32)=0.9567403357\ldots$ $P_{13}=\cos(2\pi/32)=-\cos(30\pi/32)=0.9807852804\ldots$ $P_{14}=\cos(\pi/16)=-\cos(31\pi/32)=0.9951847276\ldots$ $P_{15}=\cos(0\pi)=-\cos(\pi)=1$ The 16-16 DCT/2-8-16 DCT 210 of this embodiment is so constructed that a part of a fixed coefficient multiplying circuit is used in the common by both the 16-16 DCT and the 2-8-16 DCT to perform a pipeline-type high-speed arithmetic operations and that the 16-16 DCT and the 2-8-16 DCT can be performed even in the miniaturized circuit.

The 16-16 DCT/2-8-16 DCT device of the third embodiment is composed of a MUX 212, sixteen registers 14₁ to register 14₁₆ constituting a first register group 213, eight adding circuits 18₁ to 18₈ constituting a first adding circuit group 217, eight subtracting circuits 20₁ to subtracting circuit 20₈ constituting a subtracting circuit group 219, sixteen registers 22₁ to register 22₁₆ constituting a second register group 221, sixteen MUXs 224₁ to MUX 224₁₆ constituting a first MUX group 223, two adding/subtracting circuits, adding/subtracting circuit 226₁ and adding/subtracting circuit 226₂ constituting a first adding/subtracting circuit group 225, two MUXs, MUX 28₁ and MUX 28₂ constituting a second MUX group 227, fifteen registers 30₁ to register 30₁₅ constituting a third register group 229, a $P_7$ coefficient multiplying circuit 232₁, a $P_{11}$ coefficient multiplying circuit 232₂, a $P_3$ coefficient multiplying circuit 232₃, a $P_{13}$ coefficient multiplying circuit 232₄, a $P_9$ coefficient multiplying circuit 232₅, a $P_5$ coefficient multiplying circuit 232₆, a $P_1$ coefficient multiplying circuit 232₇, a $P_{14}/P_7$ coefficient multiplying circuit 232₈, a $P_{12}/P_{11}$ coefficient multiplying circuit 232₉, a $P_{10}/P_3$ coefficient multiplying circuit 232₁₀, a $P_8/P_{13}$ coefficient multiplying circuit 232₁₁, a $P_6/P_9$ coefficient multiplying circuit 232₁₂, a $P_4/P_5$ coefficient multiplying circuit 232₁₃, a $P_2$ coefficient multiplying circuit 232₁₄, a $P_0/P_1$ coefficient multiplying circuit 232₁₅, fifteen registers 234₁ to register 234₁₅ constituting a fourth register group 233, six adding circuits 238₁ to adding circuit 238₆ constituting a second adding circuit group 237, eight AND circuits 236₁ to AND circuit 236₉ and six registers 40₁ to register 40₆ constituting a fifth register group 39. In FIG. 13, each of register 14₁ to register 14₆ are shown as R.

The MUX 212 selectively outputs each of sixteen pieces of picture data, to which a primary DCT is performed, which is contained in each line constituting a block composed of 16×16 pieces of picture data or each of sixteen pieces of picture data, obtained from the primary DCT, which is contained in each string constituting the block composed of the 16×16 pieces of picture data. Hereinafter, each of sixteen pieces of data output from the MUX 212 is referred to as data $f_0$ to data $f_{16}$. The MUX 212, in the case of the 16-16 DCT, stores data $f_0$ into the register 14₁ constituting the first register group 213, data $f_{15}$ into the register $14_2$, data $f_1$ into the register $14_3$, data $f_{14}$ into the register $14_4$, data $f_2$ into the register $14_5$, data $f_{13}$ into the register $14_6$, data $f_3$ into the register $14_7$, data $f_{12}$ into the register $14_8$, data $f_4$ into the register $14_9$, data $f_{11}$ into the register $14_{10}$, data $f_5$ into the register $14_{11}$, data $f_{10}$ into the register $14_{12}$, data $f_6$ into the register $14_{13}$, data $f_9$ into the register $14_{14}$, data $f_7$ into the register $14_{15}$ and data $f_8$ into the register $14_{16}$ and, in the case of the 2-4-8 DCT, stores data $f_0$ to data $f_{15}$ to corresponding register $14_1$ to register $14_{16}$.

Each of the adding circuits $18_1$ to adding circuit $18_8$ constituting the first adding circuit group 217, in both the 16-16 DCT and 2-8-16 DCT, performs adding operations on data stored in two registers. That is, the adding circuit $18_1$ adds data stored in the register $14_1$ to data stored in the register $14_2$. The adding circuit $18_2$ adds stored in the register $14_3$ to data stored in the register $14_4$. The adding circuit $18_3$ adds data stored in the register $14_5$ to data stored in the register $14_6$. The adding circuit $18_4$ adds data in the register $14_7$ to data stored in the register $14_8$. The adding circuit $18_5$ adds data stored in the register $14_9$ to data stored in the register $14_{10}$. The adding circuit $18_6$ adds data stored in the register $14_{11}$ to data stored in the register $14_{12}$. The adding circuit $18_7$ adds data stored in the register $14_{13}$ to data stored in the register $14_{14}$. The adding circuit $18_8$ adds data stored in the register $14_{15}$ to data stored in the register $14_{16}$.

Each of the subtracting circuit $20_1$ to subtracting circuit $20_8$, in the case of both the 16-16 DCT and the 2-4-8 DCT, performs subtracting operations on data stored in two registers. That is, the subtracting circuit $20_1$ subtracts data stored in the register $14_2$ from data stored in the register $14_1$. The subtracting circuit $20_2$ subtracts data stored in the register $14_4$ from data stored in the register $14_3$. The subtracting circuit $20_3$ subtracts data stored in the register $14_6$ from data stored in the register $14_5$. The subtracting circuit $20_4$ subtracts data stored in the register $14_8$ from data stored in the register $14_7$. The subtracting circuit $20_5$ subtracts data stored in the register $14_{10}$ from data stored in the register $14_9$. The subtracting circuit $20_6$ subtracts data stored in the register $14_{12}$ from data stored in the register $14_{11}$. The subtracting circuit $20_7$ subtracts data stored in the register $14_{14}$ from data stored in the register $14_{13}$. The subtracting circuit $20_8$ subtracts data stored in the register $14_{16}$ from data stored in the register $14_{15}$.

The register $22_1$ constituting the second register group 221 stores temporarily data output from the adding circuit $18_1$. The register $22_2$ stores temporarily data output from the adding circuit $18_2$. The register $22_3$ stores temporarily data output from the adding circuit $18_3$. The register $22_4$ stores temporarily data output from the adding circuit $18_4$. The register $22_5$ temporarily stores data output from the adding circuit $18_5$. The register $22_6$ temporarily stores data output from the adding circuit $18_6$. The register $22_7$ temporarily stores data output from the adding circuit $18_7$. The register $22_8$ temporarily stores data output from the adding circuit $18_8$.

The register $22_9$ temporarily stores data output from the subtracting circuit $20_1$. The register $22_{10}$ temporarily stores data output from the subtracting circuit $20_2$. The register $22_{11}$ temporarily stores data output from the subtracting circuit $20_3$. The register $22_{12}$ temporarily stores data output from the subtracting circuit $20_4$. The register $22_{13}$ temporarily stores data output from the subtracting circuit $20_5$. The register $22_{14}$ temporarily stores data output from the subtracting circuit $20_6$. The register $22_{15}$ temporarily stores data output from the subtracting circuit $20_7$. The register $22_{16}$ temporarily stores output from the subtracting circuit $20_8$.

Operations of selecting data in the MUX $224_1$, to MUX $224_4$ constituting the first MUX group 223, in the case of the 16-16 DCT, are as follows:

The MUX $224_1$ is connected to each of outputs of the register $22_1$ to resister $22_8$ and selects the register in the order of the registers $22_1$, $22_4$, $22_5$, $22_8$, $22_1$, $22_4$, $22_5$ and $22_8$ and outputs sequentially eight pieces of data. The MUX $224_2$ is connected to each of outputs of the register $22_1$ to register $22_8$ and selects the register in the order of the registers $22_2$, $22_3$, $22_6$, $22_7$, $22_2$, $22_3$, $22_6$ and $22_7$ and outputs sequentially eight pieces of data. The MUX $224_3$ is connected to each of outputs of the register $22_1$ to register $22_8$ and selects the register in the order of the registers $22_1$, $22_4$, $22_5$, $22_8$, $22_2$, $22_3$, $22_6$ and $22_7$ and outputs sequentially eight pieces of data. The MUX $224_4$ is connected to each of outputs of the register $22_1$ to register $22_8$ and selects the register in the order of the registers $22_2$, $22_3$, $22_6$, $22_7$, $22_1$, $22_4$, $22_5$ and $22_8$ and outputs sequentially eight pieces of data.

Operations for selecting data in the MUX $22_4$, to MUX $224_8$ in the case of the 2-8-16 DCT are as follows:

The MUX $224_1$ is connected to each of outputs of the register $22_1$ to register $22_8$, selects the register in the order of the registers $22_1$, $22_4$, $22_5$, $22_8$, $22_1$, $22_4$ $22_5$ and $22_8$ and outputs eight pieces of data sequentially. The MUX $224_2$ is connected to each of the outputs of the register $22_1$ to register $22_8$, and selects the register in the order of the registers $22_2$, $22_3$, $22_5$, $22_7$, $22_2$, $22_2$, $22_3$, $22_6$ and $22_7$ and outputs eight pieces of data sequentially. The MUX $224_3$ is connected to each of the outputs of the register $22_1$ to register $22_8$, selects the register in the order of the registers $22_1$, $22_8$, $22_4$, $22_5$, $22_2$, $22_3$, $22_6$, and $22_7$ and outputs eight pieces of data sequentially. The MUX $224_4$ is connected to each of the outputs of the register $22_1$ to register $22_8$, selects the register in the order of the registers $22_2$, $22_3$, $22_6$, $22_7$, $22_1$, $22_4$, $22_5$, and $22_8$ and outputs eight pieces of data sequentially.

Operations for selecting data in the MUX $224_5$ to MUX $224_8$, in the case of the 16-16 DCT, are as follows:

The MUX $224_5$ is connected to each of outputs of the register $22_1$ to register $22_8$ and selects the register in the order of the registers $22_1$, $22_8$, $22_6$, $22_3$, $22_7$, $22_2$, $22_5$ and $22_4$ and outputs sequentially eight pieces of data. The MUX $224_6$ is connected to each of outputs of the register $22_1$ to register $22_8$ and selects the register in the order of the registers $22_2$, $22_7$, $22_1$, $22_7$, $22_4$, $22_5$, $22_3$ and $22_6$ and outputs sequentially eight pieces of data. The MUX $224_7$ is connected to each of outputs of the register $22_1$ to register $22_8$ and selects the register in the order of the registers $22_3$, $22_6$, $22_4$, $22_5$, $22_1$, $22_8$, $22_2$ and $22_2$ and outputs sequentially eight pieces of data. The MUX $224_8$ is connected to each of outputs of the register $22_1$ to register $22_8$ and selects the register in the order of the registers $22_4$, $22_5$, $22_7$, $22_2$, $22_3$, $22_6$, $22_1$ and $22_8$ and outputs sequentially eight pieces of data.

Operations for selecting data in the MUX $224_5$ to MUX $224_8$, in the case of the 2-8-16 DCT are as follows:

The MUX $224_5$ is connected to each of outputs of the register $22_1$ to register $22_8$ and selects the register in the order of the registers $22_3$, $22_6$, $22_2$, $22_7$, $22_1$, $22_8$, $22_4$ and $22_5$ and outputs sequentially eight pieces of data. The MUX $224_6$ is connected to each of the outputs of the register $22_1$ to register $22_8$ and selects the register in the order of the registers $22_2$, $22_8$, $22_4$, $22_5$, $22_2$, $22_7$, $22_3$ and $22_6$ and outputs sequentially eight pieces of data. The MUX $224_7$ is connected to each of the outputs of the register $22_1$ to register $22_8$ and selects the register in the order of the registers $22_4$, $22_5$, $22_1$, $22_8$, $22_3$, $22_6$, $22_2$ and $22_7$ and outputs sequentially eight pieces of data. The MUX $224_8$ is connected to each of the outputs of the register $22_1$ to register $22_8$ and selects the register in the order of the registers $22_2$, $22_7$, $22_3$, $22_6$, $22_4$, $22_5$, $22_1$ and $22_8$ and outputs sequentially eight pieces of data.

Operations of selecting data in the MUX $224_9$ to MUX $224_{16}$ constituting the first MUX group 223 are different between the 16-16 DCT and the 2-8-16 DCT. First, operations of selecting data in the MUX $22_9$ to MUX $22_{16}$ for the 16-16 DCT are as follows:

The MUX $224_9$ is connected to each of outputs of the register $22_9$ to register $22_{16}$ and selects the register in the order of $22_9$, $22_{14}$, $22_{15}$, $22_{13}$, $22_{12}$, $22_{10}$, $22_{11}$ and $22_{16}$ and sequentially outputs eight pieces of data. The MUX $224_{10}$ is connected to each of the outputs of the register $22_9$ to register $22_{16}$ and selects the register in the order of $22_{10}$, $22_9$, $22_{12}$, $22_{11}$, $22_{14}$, $22_{13}$, $22_{16}$ and $22_{15}$ and sequentially outputs eight pieces of data. The MUX $224_{11}$ is connected to each of the outputs of the register $22_9$ to register $22_{16}$ and selects the register in the order of $22_{11}$, $22_{13}$, $22_9$, $22_{15}$, $22_{10}$, $22_{16}$, $22_{12}$ and $22_{14}$ and sequentially outputs eight pieces of data. The MUX $224_{12}$ is connected to each of the outputs of the register $22_9$ to register $22_{16}$ and selects the register in the order of $22_{12}$, $22_{15}$, $22_{11}$, $22_9$, $22_{16}$, $22_{14}$, $22_{10}$ and $22_{13}$ and outputs eight pieces of data. The MUX $224_{13}$ is connected to each of the outputs of the register $22_9$ to register $22_{16}$ and selects the register in the order of $22_{13}$, $22_{10}$, $22_{14}$, $22_{16}$, $22_9$, $22_{11}$, $22_{15}$ and $22_{12}$ and sequentially outputs eight pieces of data. The MUX $224_{14}$ is connected to each of the outputs of the register $22_9$ to register $22_{16}$ and selects the register in the order of $22_{14}$, $22_{12}$, $22_{16}$, $22_{10}$, $22_{15}$, $22_9$, $22_{13}$ and $22_{11}$ and sequentially outputs eight pieces of data. The MUX $224_{15}$ is connected to each of the outputs of the register $22_9$ to register $22_{16}$ and selects the register in the order of $22_{15}$, $22_{16}$, $22_{13}$, $22_{14}$, $22_{11}$, $22_{12}$, $22_9$ and $22_{10}$ and sequentially outputs eight pieces of data. The MUX $224_{16}$ is connected to each of the outputs of the register $22_9$ to register $22_{16}$ and selects the register in the order of $22_{16}$, $22_{11}$, $22_{10}$, $22_{12}$, $22_{13}$, $22_{15}$, $22_{14}$ and $22_9$ and sequentially outputs eight pieces of data.

Next, operations of selecting data in the MUX $22_9$ to MUX $22_{16}$ for the 2-8-16 DCT will be described below.

The MUX $224_9$ is connected to each of outputs of the register $22_9$ to register $22_{16}$ and selects the register in the order of $22_9$, $22_{12}$, $22_{13}$, $22_{16}$, $22_9$, $22_{12}$, $22_{13}$ and $22_{16}$ and sequentially outputs eight pieces of data. The MUX $224_{10}$ is connected to each of the outputs of the register $22_9$ to register $22_{16}$ and selects the register in the order of $22_9$, $22_{16}$, $22_{12}$, $22_{13}$, $22_{10}$, $22_{11}$, $22_{14}$ and $22_{15}$ and sequentially outputs eight pieces of data. The MUX $224_{11}$ is connected to each of the outputs of the register $22_9$ to register $22_{16}$ and selects the register in the order of $22_{10}$, $22_{11}$, $22_{14}$, $22_{15}$, $22_9$, $22_{12}$, $22_{13}$ and $22_{16}$ and sequentially outputs eight pieces of data. The MUX $224_{12}$ is connected to each of the outputs of the register $22_9$ to register $22_{16}$ and selects the register in the order of $22_9$, $22_{16}$, $22_{11}$, $22_{14}$, $22_{10}$, $22_{15}$, $22_{12}$ and $22_{13}$ and sequentially outputs eight pieces of data. The MUX $224_{13}$ is connected to each of the outputs of the register $22_9$ to register $22_{16}$ and selects the register in the order of $22_{10}$, $22_{15}$, $22_9$, $22_{16}$, $22_{12}$, $22_{13}$, $22_{11}$ and $22_{14}$ and sequentially outputs eight pieces of data. The MUX $224_{14}$ is connected to each of the outputs of the register $22_9$ to register $22_{16}$ and selects the register in the order of $22_{11}$, $22_{14}$, $22_{12}$, $22_{13}$, $22_9$, $22_{16}$, $22_{10}$ and $22_{15}$ and sequentially outputs eight pieces of data. The MUX $224_{15}$ is connected to each of the outputs of the register $22_9$ to register $22_{16}$ and selects the register in the order of $22_{10}$, $22_{11}$, $22_{14}$, $22_{15}$, $22_{10}$, $22_{11}$, $22_{13}$ and $22_{14}$ and sequentially outputs eight pieces of data. The MUX $224_{16}$ is connected to each of the outputs of the register $22_9$ to register $22_{16}$ and selects the register in the order of $22_{12}$, $22_{13}$, $22_{10}$, $22_{15}$, $22_{11}$, $22_{14}$, $22_9$ and $22_{16}$ and sequentially outputs eight pieces of data.

The adding/subtracting circuit $226_1$ constituting an adding/subtracting circuit group 225, in both the 16-16 DCT and 2-4-8 DCT, performs adding operations on data output in a first order to fourth order out of eight pieces of data output sequentially from the MUX $224_1$ and out of eight pieces of data output sequentially from the MUX $224_2$ and performs subtracting operations on data output in a fifth order to eighth order out of eight pieces of data output sequentially from the MUX $224_1$ and out of eight pieces of data output sequentially from the MUX $224_2$. That is, the adding/subtracting circuit $226_1$ subtracts data output from the MUX $224_2$ from data output from the MUX $224_1$. The adding/subtracting circuit $226_2$, in both the 16-16 DCT and 2-4-8 DCT, performs adding operations on data output in a first order to fourth order out of eight pieces of data output sequentially from the MUX $224_9$ and out of eight pieces of data output sequentially from the MUX $224_{15}$ and performs subtracting operations on data output in a fifth order to eighth order out of eight pieces of data output sequentially from the MUX $224_9$ and out of eight pieces of data output sequentially from the MUX $224_{15}$. The adding/subtracting circuit $226_2$ subtracts data output from the MUX $224_{15}$ from data output from the MUX $224_9$.

The MUX $28_1$ constituting the second MUX group 227, in the case of the 16-16 DCT, selects eight pieces of data output sequentially from the MUX $224_9$ and, in the case of the 2-4-8 DCT, selects data output sequentially from the adding/subtracting circuit $226_2$.

The MUX $28_1$ constituting the second MUX group 227, in the case of the 16-16 DCT, selects eight pieces of data output sequentially from the MUX $224_9$ and, in the case of the 2-8-16 DCT, selects data output sequentially from the adding/subtracting circuit $226_2$. The MUX $28_2$, in the case of the 16-16 DCT, selects eight pieces of data output sequentially from the MUX $224_{15}$ and, in the 2-4-8 DCT, does not select eight pieces of data output sequentially from the $224_{15}$ but selects a "0" eight times which corresponds to the eight operation cycles of the MUX $28_2$.

The register $30_1$ constituting the third register group 229 sequentially stores results of the operations on eight pieces of data output in order from the adding/subtracting circuit $226_1$. The register $30_2$ sequentially stores eight pieces of data output in order from the MUX $224_3$. The register $30_3$ sequentially stores eight pieces of data output, in order, from the MUX $224_4$. The register $30_4$ sequentially stores eight pieces of data output in order from the MUX $224_5$. The register $30_5$ sequentially stores eight pieces of data output, in order, from the MUX $224_6$. The register $30_6$ sequentially stores eight pieces of data output in order from the MUX $224_7$. The register $30_7$ sequentially stores eight pieces of data output in order from the MUX $224_8$.

The register $30_8$ sequentially stores results of operations on eight pieces of data output, in order, from the MUX $224_9$. The register $30_9$ sequentially stores eight pieces of data output in order from the MUX $224_{10}$. The register $30_{10}$ sequentially stores eight pieces of data output, in order, from the MUX $224_{11}$. The register $30_{11}$ sequentially stores eight pieces of data output, in order, from the MUX $224_{12}$. The register $30_{12}$ sequentially stores eight pieces of data output, in order, from the MUX $224_{13}$. The register $30_{13}$ sequentially stores eight pieces of data output in order from the MUX $224_{14}$. The register $30_{15}$ sequentially stores eight pieces of data output, in order, from the MUX $224_{16}$.

Each of the $P_7$ coefficient multiplying circuit $232_1$ to the $P_1$ coefficient multiplying circuit $232_7$, in the case of both the 16-16 DCT and 2-8-16 DCT, multiplies data output from each of the registers by a same fixed coefficient. That is, the $P_7$ coefficient multiplying circuit $232_1$ multiplies each of eight pieces of data output sequentially from the register $30_1$ by a fixed coefficient $P_7$. The $P_{11}$ coefficient multiplying circuit $232_2$ multiplies each of eight pieces of data output from the register $30_2$ by a fixed coefficient $P_{11}$. The $P_3$ coefficient multiplying circuit $232_3$ multiplies each of eight pieces of data output from the register $30_3$ by a fixed coefficient $P_3$. The $P_{13}$ coefficient multiplying circuit $232_4$ multiplies each of eight pieces of data output sequentially from the register $30_4$ by a fixed coefficient $P_{13}$. The $P_9$ coefficient multiplying circuit $232_5$ multiplies each of eight pieces of data output sequentially from the register $30_5$ by a fixed coefficient $P_9$. The $P_5$ coefficient multiplying circuit $232_6$ multiplies each of eight pieces of data by a fixed coefficient $P_5$. The $P_1$ coefficient multiplying circuit $232_7$ multiplies each of eight pieces of data output sequentially from the register $30_7$ by a fixed coefficient $P_1$.

Each of the $P_{14}/P_7$ coefficient multiplying circuits $232_8$ to the $P_4/P_5$ coefficient multiplying circuit $232_{15}$, in the case of the both 16-16 DCT and the 2-8-16 DCT, is adapted to switch a fixed coefficient and performs a multiplication using another fixed coefficient. That is, the $P_{14}/P_7$ coefficient multiplying circuit $232_8$, in the case of the 16-16 DCT, multiplies each of eight pieces of data output sequentially from the register $30_8$ by the fixed coefficient $P_{14}$ and, in the case of the 2-4-16 DCT, multiplies each of eight pieces of data output sequentially from the register $30_8$ by the fixed coefficient $P_7$. The $P_{12}/P_{11}$ coefficient multiplying circuit $232_9$, in the case of the 16-16 DCT, multiplies each of eight pieces of data output sequentially from the register $30_9$ by the fixed coefficient $P_{12}$ and, in the case of the 2-4-8 DCT, multiplies each of eight pieces of data output sequentially from the register $30_9$ by the fixed coefficient $P_{11}$. The $P_{10}/P_3$ coefficient multiplying circuit $232_{10}$, in the case of the 16-16 DCT, multiplies each of eight pieces of data output sequentially from the register $30_{10}$ by the fixed coefficient $P_{10}$ and, in the case of the 2-8-16 DCT, multiplies each of eight pieces of data output sequentially from the register $30_{10}$ by the fixed coefficient $P_3$. The $P_8/P_{13}$ coefficient multiplying circuit $232_{11}$, in the case of the 16-16 DCT, multiplies each of eight pieces of data output sequentially from the register $30_{11}$ and, in the case of the 2-4-8 DCT, multiplies each of eight pieces of data output sequentially from the register $30_{11}$ by the fixed coefficient $P_{13}$. The $P_6/P_9$ coefficient multiplying circuit $232_{12}$, in the case of the 16-16 DCT, multiplies each of eight pieces of data output sequentially from the register $30_{12}$ by the fixed coefficient $P_6$ and, in the case of the 2-8-16 DCT, multiplies each of eight pieces of data output sequentially from the register $30_{12}$ by the fixed coefficient $P_9$. The $P_4/P_5$ coefficient multiplying circuit $232_{13}$, in the case of the 16-16 DCT, multiplies each of eight pieces of data output sequentially from the register $30_{13}$ by the fixed coefficient $P_4$ and, in the case of the 2-4-8 DCT, multiplies each of eight pieces of data output sequentially from the register $30_{13}$ by the fixed coefficient $P_5$. The $P_2$ coefficient multiplying circuit $232_{14}$ multiplies each of eight pieces of data output sequentially from the register $30_{14}$ by the fixed coefficient $P_2$. The $P_0/P_1$ coefficient multiplying circuit $232_{15}$ multiplies each of eight pieces of data output sequentially from the register $30_{15}$ by the fixed coefficient $P_0$ and, in the case of the 2-4-8 DCT, multiplies each of eight pieces of data output sequentially from the register $30_{15}$ by the fixed coefficient $P_1$.

Each of the registers $234_1$, $234_3$, $234_5$ and $234_{14}$ constituting the fourth register group 233, in the case of both the 16-16 DCT and the 2-4-8 DCT, sequentially stores and outputs data as follows:

The register $234_1$ sequentially stores each of eight pieces of data output in order from the $P_7$ coefficient multiplying circuit $232_1$ and sequentially outputs each of the data as a positive value. The register $234_3$ sequentially stores each of eight pieces of data output sequentially from the $P_3$ coefficient multiplying circuit $232_3$ and outputs data to be output in a first order, fourth order, fifth order and eighth order as positive values and data to be output in a second order, third order, sixth order and seventh order as negative values. The register $234_5$ sequentially stores each of eight pieces of data output sequentially from the $P_9$ coefficient multiplying circuit $232_5$ and outputs data to be output in a first order, third order, fifth order and seventh order as positive values and data to be output in a second order, fourth order, sixth order and eighth order as negative values. The register $234_{14}$ sequentially stores each of eight pieces of data output sequentially from the $P_2$ coefficient multiplying circuit $232_{14}$ and outputs data to be output in a first order, fourth order, fifth order and eighth order as positive values and data to be output in a second order, third order, sixth order and seventh order as negative values.

The register $234_2$ sequentially stores each of eight pieces of data output in order from the $P_{11}$ coefficient multiplying circuit $234_2$ and, in the case of the 16-16 DCT, outputs data to be output in a first order, fourth order, sixth order as positive values and data to be output in a second order, third order, fifth order, seventh order and eighth order as negative values and, in the case of the 2-8-16 DCT, outputs data to be output in a first order, second order, sixth order and seventh order as positive values and data to be output in a third order, fourth order fifth order and eighth order as negative values.

The register $234_4$ sequentially stores each of eight pieces of data output in order from the $P_{13}$ coefficient multiplying circuit $234_4$ and, in the case of the 16-16 DCT, outputs data to be output in a first order, third order, fifth order and seventh order as positive values and data to be output in a second order, fourth order, sixth order and eighth order as negative values and, in the case of the 2-8-16 DCT, outputs data to be output in a second order, fourth order, fifth order and eighth order as positive values and data to be output in a first order, third order, sixth order and seventh order as negative values.

The register $234_6$ sequentially stores each of eight pieces of data output, in order, from the $P_5$ coefficient multiplying circuit $234_6$ and, in the case of the 16-16 DCT, outputs data to be output in a first order, third order, fifth order and seventh order as positive values and data to be output in a second order, fourth order, sixth order and eighth order as negative values and, in the case of the 2-8-16 DCT, outputs data to be output in a second order, third order, fifth order and eighth order as positive values and data to be output in a first order, fourth order, sixth order and seventh order as negative values.

The register $234_7$ sequentially stores each of eight pieces of data output, in order, from the $P_1$ coefficient multiplying circuit $234_7$ and, in the case of the 16-16 DCT, outputs data to be output in a first order, third order, fifth order and seventh order as positive values and data to be output in a second order, fourth order, sixth order and eighth order as negative values and, in the case of the 2-8-16 DCT, outputs data to be output in a second order, third order, fifth order and seventh order as positive values and data to be output in a first order, fourth order, sixth order and eighth order as negative values.

The register $234_8$ sequentially stores each of eight pieces of data output, in order, from the $P_{14}/P_7$ coefficient multiplying circuit $234_8$ and, in the case of the 16-16 DCT, outputs data to be output in a first order, third order, fourth order, fifth order and seventh order as positive values and data to be output in a second order, sixth order and eighth order as negative values and, in the case of the 2-8-16 DCT, outputs each data to be output as positive values.

The register $234_9$ sequentially stores each of eight pieces of data output, in order, from the $P_{12}/P_{11}$ coefficient multiplying circuit $234_9$ and, in the case of the 16-16 DCT, outputs data to be output in a first order, second order, seventh order and eighth order as positive values and data to be output in a third order to sixth order as negative values and, in the case of the 2-8-16 DCT, outputs each data to be output in a second order, second order, fourth order, sixth order and seventh order as positive values and data to be output in a third order, fifth order and eighth order as negative values.

The register $234_{10}$ sequentially stores each of eight pieces of data output, in order, from the $P_{10}/P_3$ coefficient multiplying circuit $234_{10}$ and, in the case of the 16-16 DCT, outputs data to be output in a first order and third order as positive values and data to be output in a second order and fourth order to eighth order as negative values and, in the case of the 2-8-16DCT, outputs each data to be output in a first order and fourth order to eighth order as positive values and data to be output in a second order and third order as negative values.

The register $234_{11}$ sequentially stores each of order pieces of data output, in order, from the $P_8/P_{13}$ coefficient multiplying circuit $234_{11}$ and, in the case of the 16-16 DCT, outputs data to be output in a first order and fourth order to sixth order as positive values and data to be output in a second order, third order, seventh order and eighth order as negative values and, in the case of the 2-8-16 DCT, outputs each data to be output in a first order, fourth order, sixth order and eighth order as positive values and data to be output in a second order, third order, fifth order and seventh order as negative values.

The register $234_{12}$ sequentially stores each of eight pieces of data output, in order, from the $P_6/P_9$ coefficient multiplying circuit $234_{12}$ and, in the case of the 16-16 DCT, outputs data to be output in a first order to third order, fifth order and sixth order as positive values and data to be output in a fourth order, seventh order and eighth order as negative values and, in the case of the 2-8-16 DCT, outputs each data to be output in a first order, third order, fifth order and seventh order as positive values and data to be output in a second order, fourth order, sixth order and seventh order as negative values.

The register $234_{13}$ sequentially stores each of eight pieces of data output, in order, from the $P_4/P_5$ coefficient multiplying circuit $234_{13}$ and, in the case of the 16-16 DCT, outputs data to be output in a first order, third order and fifth order to eighth order as positive values and data to be output in a second order and fourth order as negative values and, in the case of the 2-8-16 DCT, outputs each data to be output in a first order, fourth order, fifth order and eighth order as positive values and data to be output in a second order, third order, sixth order and seventh order as negative values.

The register $234_{15}$ sequentially stores each of eight pieces of data output, in order, from the $P_0/P_1$ coefficient multiplying circuit $234_{15}$ and, in the case of the 16-16 DCT, outputs data to be output in a first order to fourth order and sixth order to eighth order as positive values and data to be output in a fifth order as negative values and, in the case of the 2-8-16 DCT, outputs each data to be output in a first order, fourth order, fifth order and seventh order as positive values and data to be output in a second order, third order, sixth order and eighth order as negative values.

The adding circuit $238_1$ contained in the second adding circuit group 237 constitutes an accumulative circuit together with the register $40_1$ constituting the fifth group 239 and with the AND circuit $236_1$. To one input of the AND circuit $236_1$ is fed data from the register $40_1$ and, in the case of both the 16-16 DCT and the 2-8-16 DCT, to the other input of the AND circuit $236_1$ are signals "0", "1", "1", "0", "1", "1" and "1" which are fed from a binary signal string generating circuit (not shown) and correspond to the order from a first operation cycle to eighth operation cycle out of eight operation cycles. An accumulative value is output from the resister $40_1$, which is obtained by addition in the adding circuit $238_1$, of data output from the register $234_1$ and fed to one input of the adding circuit $238_1$ to data stored in the register $40_1$ on one previous clock and fed, on the next clock, to the other input of the adding circuit $238_1$ through the AND circuit $236_1$.

The adding circuit $238_2$ constitutes an accumulative circuit together with the register $40_2$ and with the AND circuit $236_2$. To one input of the AND circuit $236_2$ is fed data from the register $40_2$ and, in the case of both the 16-16 DCT and the 2-8-16 DCT, to the other input of the AND circuit $236_2$ are signals "0", "1", "1", "0", "1", "1" and "1" which are fed from a binary signal string generating circuit (not shown) and correspond to the order from a first operation cycle to eighth operation cycle out of eight operation cycles. An accumulative value is output from the register $40_2$, which is obtained by addition, in the adding circuit $238_2$, of data output from the register $234_2$ and register $234_3$ and fed to a first input and second input of the adding circuit $238_2$ to data stored in the register $40_2$ on one previous clock and fed, on the next clock, to the other input of the adding circuit $238_2$ through the AND circuit $236_2$.

The adding circuit $238_3$ constitutes an accumulative circuit together with the register $40_3$ and with the AND circuit $236_3$. To one input of the AND circuit $236_3$ is fed data from the register $40_3$ and, in the case of both the 16-16 DCT and the 2-8-16 DCT, to the other input of the AND circuit $236_3$ are signals "0", "1", "1", "0", "1", "1" and "1" which are fed from a binary signal string generating circuit (not shown) and correspond to the order from a first operation cycle to eighth operation cycle out of eight operation cycles. An accumulative value is output from the register $40_3$, which is obtained by addition, in the adding circuit $238_2$, of data output from the register $234_4$ to register $234_7$ and fed to the first inputs of the adding circuit $238_3$ to data stored in the register $40_3$ on one previous clock and fed, on the next clock, to the fifth input of the adding circuit $238_3$ through the AND circuit $236_3$.

The adding circuit $238_4$, in the case of the 16-16 DCT, performs adding operations on data output from the register $234_8$ to register $234_{15}$ and stores the result into the register $40_4$, and in the case of the 2-8-16 DCT, constitutes an accumulative circuit together with the register $234_8$ to register $234_{15}$ and with the AND circuit $236_5$. That is, to one input of the AND circuit $236_5$ is fed data output from the register $40_5$ and to the other input of the AND circuit $236_5$, in the case of the 16-16 DCT, is fed a signal "0" in a first operation cycle to eighth operation cycle out of eight operation cycles by a binary string generating circuit (not shown)

and, in the case of the 2-8-16 DCT, are fed signals "0", "1", "0", "1", "0", "1", "0" and "1" which correspond to the order from a first operation cycle to eighth operation cycle out of eight operation cycles and are fed by the binary string generating circuit (not shown).

To one input of the AND circuit $236_7$ is fed data from the register 234, to one input of the AND circuit $236_8$ is fed data from the register 234 and to one input of the AND circuit $236_9$ is fed data from the register $30_{10}$. To the other input of each of the AND circuit $236_7$, AND circuit $236_8$ and AND circuit $236_9$ is fed a signal "0" in a first operation cycle to eighth operation cycle out of eight operation cycles by the binary string generating circuit (not shown) in the case of the 16-16 DCT and is fed a signal "1" in a first operation cycle to eighth operation cycle out of eight operation cycles by the binary string generating circuit (not shown).

In the case of the 16-16 DCT, data output sequentially from each of the register $234_8$ to register $234_{15}$ in every operation cycle out of eight operation cycles is fed, in every operation cycle, to one of a first input to eighth input of the adding circuit $238_4$ and undergoes an adding operation and then the resulting data is stored sequentially into the register $40_4$, while, in the case of the 2-8-16 DCT, data output sequentially from each of the register $234_{11}$ to register $234_{15}$ in every operation cycle out of the eight operation cycles and input to one of a fourth input to eighth input of the adding circuit $238_4$ is added to data stored in one previous clock into the register $40_4$ and is fed, on the next clock, to a ninth input of the adding circuit $238_4$ through the AND circuit $236_5$ in the adding circuit $238_4$ and the resulting data is output from the register $40_4$.

Next, operations of the 16-16 DCT and the 2-4-8 DCT of the first embodiment will be described by referring to FIGS. 13 to 14. First, operations of the 16-16 DCT will be explained below.

Each of sixteen pieces of data $F_0$ to data $F_{15}$ (input data for DCT) contained in each line constituting a block composed of 16×16 pieces of data transmitted sequentially from the MUX 212 is stored into each of the register $14_1$ to register $14_{15}$ contained in the first register group 213. That is, data $f_0$ is stored into the register $14_1$ constituting the first register group 213, data $f_{15}$ into the register $14_2$, data $f_1$ into the register $14_3$, data $f_{14}$ into the register $14_4$, data $f_2$ into the register $14_5$, data $f_{13}$ into the register $14_6$, data $f_3$ into the register $14_7$, data $f_{12}$ into the register $14_8$, data $f_4$ into the register $14_9$, data $f_{11}$ into the register $14_{10}$, data $f_5$ into the register $14_{11}$ data $f_{10}$ into the register $14_{12}$, data $f_6$ into the register $14_{13}$, data $f_9$ into the register $14_{14}$, data $f_7$ into the register $14_{15}$ and $f_8$ into the register 16.

Thus, when each of the sixteen pieces of picture element data is stored into each of the register $14_1$ to register $14_{16}$, data $f_0+f_{15}=e_0$ is output from the adding circuit $18_1$, data $f_1+f_{14}=e_1$ from the adding circuit $18_2$, data $f_2+f_{13}=e_2$ from the adding circuit $18_3$, data $f_3+f_{12}=e_3$ from the adding circuit $18_4$, data $f_4+f_{11}=e_4$ from the adding circuit $18_5$, data $f_5+f_{10}=e_5$ from the adding circuit $18_6$, data $f_6+f_9=e_6$ from the adding circuit $18_7$, and data $f_7+f_8=e_7$ from the adding circuit $18_8$.

Data $f_0-f_{15}=e_8$ is output from the subtracting circuit $20_1$, data $f_1-f_{14}=e_9$ from the subtracting circuit $20_2$, data $f_2-f_{13}=e_{10}$ from the subtracting circuit $20_3$, data $f_3-f_{12}=e_{11}$ from the subtracting circuit $20_4$, data $f_4-f_{11}=e_{12}$ from the subtracting circuit $20_5$, data $f_5-f_{10}=e_{13}$ from the subtracting circuit $20_6$, data $f_6-f_9=e_{14}$ from the subtracting circuit $20_7$ and data $f_6-f_9=e_{14}$ from the subtracting circuit $20_7$.

Data $e_0$ output from the adding circuit $18_1$ is stored in the register $22_1$, data $e_1$ output from the adding circuit $18_2$ is stored in the register $22_2$, data $e_2$ output from the adding circuit $18_3$ is stored in the register $22_3$, data $e_3$ output from the adding circuit $18_4$ is stored in the register $22_4$, data $e_4$ output from the adding circuit $18_5$ is stored in the register $22_5$, data $e_5$ output from the adding circuit $18_6$ is stored in the register $22_6$, data $e_6$ output from the adding circuit $18_7$ is stored in the register $22_7$ and data $e_7$ output from the adding circuit $18_8$ is stored in the register $22_8$.

Data $e_8$ output from the subtracting circuit $20_1$ is stored in the register $22_9$, data $e_9$ output from the subtracting circuit $20_2$ is stored in the register $22_{10}$, data $e_{10}$ output from the subtracting circuit $20_3$ is stored in the register $22_{11}$, data $e_{11}$ output from the subtracting circuit $20_4$ is stored in the register $22_{12}$, data $e_{12}$ output from the subtracting circuit $20_5$ is stored in the register $22_{13}$, data $e_{13}$ output from the subtracting circuit $20_6$ is stored in the register $22_{14}$, data $e_{14}$ output from the subtracting circuit $20_7$ is stored in the register $22_{15}$ and data $e_{15}$ output from the subtracting circuit $20_8$ is stored in the register $22_{16}$.

Data $e_0$ to data $e_7$ output from the adding circuit $18_1$ to adding circuit $18_8$ are input to the MUX $224_1$ to MUX $224_8$ through the register $22_1$ to register $22_8$, the following data are output from the MUX $224_1$, to MUX $224_8$. Eight pieces of data $e_0$, $e_3$, $e_4$, $e_7$, $e_0$, $e_3$, $e_4$ and $e_7$ output from the MUX $224_1$ sequentially in every operation cycle out of eight operation cycles are fed to the adding/subtracting circuits $226_1$ and eight pieces of data $e_1$, $e_2$, $e_5$, $e_6$, $e_1$, $e_2$, $e_5$ and $e_6$ output from the MUX $224_2$ sequentially in every operation cycle out of eight operation cycles are fed to the adding/subtracting circuits $226_1$ and then data $e_0+e_1$, data $e_3+e_2$, data $e_4+e_5$, data $e_7+e_6$, data $e_0-e_1$, data $e_3-e_2$, data $e_4-e_5$, and data $e_7-e_6$ are output sequentially from the adding/subtracting circuit $226_1$ in every operation cycle out of eight operation cycles and are stored in the register $30_1$.

Data $e_0$, $e_1$, $e_2$, $e_3$, $e_4$, $e_5$, $e_6$ and $e_7$ output from the register $22_1$ to register $22_8$ in every operation cycle out of eight operation cycles are selected by the MUX $224_3$ in every operation cycle out of eight operation cycles and data $e_0$, $e_3$, $e_4$, $e_7$, $e_1$, $e_2$, $e_5$ and $e_6$ are output sequentially from the MUX $224_3$ and stored in the register $30_2$. Data $e_0$, $e_1$, $e_2$, $e_3$, $e_4$, $e_5$, $e_6$ and $e_7$ output from the register $22_1$ to register $22_8$ in every operation cycle out of eight operation cycles are selected by the MUX $224_4$ in every operation cycle out of eight operation cycles and data $e_1$, $e_2$, $e_5$, $e_6$, $e_0$, $e_3$, $e_4$ and $e_7$ are output sequentially from the MUX $224_3$ and stored in the register $30_3$. Data $e_0$, $e_1$, $e_2$, $e_3$, $e_4$, $e_5$, $e_6$ and $e_7$ output from the register $22_1$ to register $22_8$ in every operation cycle out of eight operation cycles are selected by the MUX $224_5$ in every operation cycle out of eight operation cycles and data $e_0$, $e_7$, $e_5$, $e_2$, $e_6$, $e_1$, $e_4$ and $e_3$ are output sequentially from the MUX $224_5$ and stored in the register $30_4$. Data $e_0$, $e_1$, $e_2$, $e_3$, $e_4$, $e_5$, $e_6$ and $e_7$ output from the register $22_1$ to register $22_8$ in every operation cycle out of eight operation cycles are selected by the MUX $224_6$ in every operation cycle out of eight operation cycles and data $e_1$, $e_6$, $e_0$, $e_6$, $e_3$, $e_4$, $e_2$ and $e_5$ are output sequentially from the MUX $224_6$ and stored in the register $30_5$. Data $e_0$, $e_1$, $e_2$, $e_3$, $e_4$, $e_5$, $e_6$ and $e_7$ output from the register $22_1$ to register $22_8$ in every operation cycle out of eight operation cycles are selected by the MUX $224_7$ in every operation cycle out of eight operation cycles and data $e_2$, $e_5$, $e_3$, $e_4$, $e_0$, $e_7$, $e_6$ and $e_1$ are output sequentially from the MUX $224_6$ and stored in the register $30_6$.

Data $e_0$, $e_1$, $e_2$, $e_3$, $e_4$, $e_5$, $e_6$ and $e_7$ output from the register $22_1$ to register $22_8$ in every operation cycle out of eight operation cycles are selected by the MUX $224_8$ in every operation cycle out of eight operation cycles and data $e_3$, $e_4$, $e_6$, $e_1$, $e_2$, $e_5$, $e_0$ and $e_7$ are output sequentially from the MUX $224_6$ and stored in the register $30_7$.

Data $e_8$, $e_9$, $e_{10}$, $e_{11}$, $e_{12}$, $e_{13}$, $e_{14}$ and $e_{15}$ output from the register $22_9$ to register $22_{12}$ in every operation cycle out of eight operation cycles are selected by the MUX $224_9$ in every operation cycle out of eight operation cycles and data $e_8$, $e_{13}$, $e_{14}$, $e_{12}$, $e_{11}$, $e_9$, $e_{10}$ and $e_{15}$ are output sequentially from the MUX $224_6$ and stored through the MUX $28_1$ into the register $30_8$. Data $e_8$, $e_9$, $e_{10}$, $e_{11}$, $e_{12}$, $e_{13}$, $e_{14}$ and $e_{15}$ output from the register $22_9$ to register $22_{12}$ in every operation cycle out of eight operation cycles are selected by the MUX $224_{10}$ in every operation cycle out of eight operation cycles and data $e_9$, $e_8$, $e_{11}$, $e_{10}$, $e_{13}$, $e_{12}$, $e_{15}$ and $e_{14}$ are output sequentially from the MUX $224_{10}$ and stored in the register $30_9$. Data $e_8$, $e_9$, $e_{10}$, $e_{11}$, $e_{12}$, $e_{13}$, $e_{14}$ and $e_{15}$ output from the register $22_9$ to register $22_{12}$ in every operation cycle out of eight operation cycles are selected by the MUX $224_{11}$ in every operation cycle out of eight operation cycles and data $e_{10}$, $e_{12}$, $e_8$, $e_{14}$, $e_9$, $e_{15}$, $e_{11}$ and $e_{13}$ are output sequentially from the MUX $224_{11}$ and stored in the register $30_{10}$. Data $e_8$, $e_9$, $e_{10}$, $e_{11}$, $e_{12}$, $e_{13}$, $e_{14}$ and $e_{15}$ output from the register $22_9$ to register $22_{12}$ in every operation cycle out of eight operation cycles are selected by the MUX $224_{12}$ in every operation cycle out of eight operation cycles and data $e_{11}$, $e_{14}$, $e_{10}$, $e_8$, $e_{15}$, $e_{13}$, $e_9$ and $e_{12}$ are output sequentially from the MUX $224_{12}$ and stored in the register $30_{11}$. Data $e_8$, $e_9$, $e_{10}$, $e_{11}$, $e_{12}$, $e_{13}$, $e_{14}$ and $e_{15}$ output from the register $22_9$ to register $22_{12}$ in every operation cycle out of eight operation cycles are selected by the MUX $224_{13}$ in every operation cycle out of eight operation cycles and data $e_{12}$, $e_9$, $e_{13}$, $e_{15}$, $e_8$, $e_{10}$, $e_{14}$ and $e_{11}$ are output sequentially from the MUX $224_{13}$ and stored in the register $30_{12}$. Data $e_8$, $e_9$, $e_{10}$, $e_{11}$, $e_{12}$, $e_{13}$, $e_{14}$ and $e_{15}$ output from the register $22_9$ to register $22_{12}$ in every operation cycle out of eight operation cycles are selected by the MUX $224_{14}$ in every operation cycle out of eight operation cycles and data $e_{13}$, $e_{11}$, $e_{15}$, $e_9$, $e_{14}$, $e_8$, $e_{12}$ and $e_{10}$ are output sequentially from the MUX $224_{14}$ and stored in the register $30_{13}$. Data $e_8$, $e_9$, $e_{10}$, $e_{11}$, $e_{12}$, $e_{13}$, $e_{14}$ and $e_{15}$ output from the register $22_9$ to register $22_{12}$ in every operation cycle out of eight operation cycles are selected by the MUX $224_{15}$ in every operation cycle out of eight operation cycles and data $e_{14}$, $e_{15}$, $e_{12}$, $e_{13}$, $e_{10}$, $e_{11}$, $e_8$ and $e_9$ are output sequentially from the MUX $224_{15}$ and stored through the MUX $282$ into the register $30_{14}$. Data $e_1$, $e_3$, $e_5$, $e_7$, $e_9$, $e_{11}$, $e_{13}$ and $e_{15}$ output from the register $22_9$ to register $22_{12}$ in every operation cycle out of eight operation cycles are selected by the MUX $224_{16}$ in every operation cycle out of eight operation cycles and data $e_{15}$, $e_{10}$, $e_9$, $e_{11}$, $e_{12}$, $e_{14}$, $e_{13}$ and $e_8$ are output sequentially from the MUX $224_{16}$ and stored in the register $30_{15}$.

Each piece of data output from the register $30_1$ to register $30_7$ in every operation cycle out of eight operation cycles is multiplied by each of corresponding fixed coefficients $P_7$, $P_{11}$, $P_{13}$, $P_3$, $P_9$, $P_5$ and $P_1$ in every operation cycle out eight operation cycles in each of the corresponding fixed coefficient multiplying circuits $232_1$ to $232_7$ and is stored into each of the corresponding register $234_1$ to register $234_7$. That is, each piece of data stored sequentially into the register $234_1$ undergoes adding operations in every operation cycle out of eight operation cycles in the adding circuit $238_1$ and the resulting data is stored into the register $40_1$.

Data $(e_0+e_1) P_7$ is output from the adding circuit $238_1$ in a first operation cycle out of eight operation cycles, data $(e_0+e_1+e_3+e_2) P_7$ in a second operation cycle out of the eight operation cycles, data $(e_0+e_1+e_3+e_2+e_4+e_5) P_7$ in a third operation cycle out of the eight operation cycles, data $(e_0+e_1+e_3+e_2+e_4+e_5+e_7+e_6) P_7$ in a fourth operation cycle out of the eight operation cycles, data $(e_0-e_1) P_7$ in a fifth operation cycle out of the eight operation cycles, data $(e_0-e_1+e_3-e_2) P_7$ in a sixth operation cycle out the eight operation cycles, data $(e_0-e_1+e_3-e_2+e_4-e_5) P_7$ in a seventh operation cycle out of the eight operation cycles and data $(e_0-e_1+e_3-e_2+e_4-e_5+e_7-e_6) P_7$ in a eighth operation cycle out of the eight operation cycles. Out of data output from the adding circuit $238_1$ in every operation cycle out of eight operation cycles, data output in the fourth operation cycle and eighth operation cycle represent operation value $F_0$ and operation value $F_8$ expressed in the equation (65) which are shown as $F_0$ and $F_8$ on a lower right of an output line of the register $40_1$ and data output in the first operation cycle to third operation cycle and fifth operation cycle to seventh operation cycle represent undefined values which are shown by asterisk marks "*" on the lower right of the output line of the register $40_1$ in FIG. 14.

Each piece of data stored sequentially into the register $234_2$ and register $234_3$ undergoes adding operations in every operation cycle out of eight operation cycles in the adding circuit $238_2$ and the resulting data is stored into the register $40_2$.

Data $e_0P_{11}+e_1P_3$ is output from the adding circuit $238_2$ in a first operation cycle out of the eight operation cycles, data $e_0P_{11}+e_1P_3-e_3P_{11}-e_2P_3$ in a second operation cycle out of the eight operation cycles, data $e_0P_{11}+e_1P_3-e_3P_{11}-e_2P_3-e_4P_{11}-e_5P_3$ in a third operation cycle out of the eight operation cycles, data $e_0P_{11}+e_1P_3-e_3P_{11}-e_2P_3-e_4P_{11}-e_5P_3+e_7P_{11}+e_6P_3$ in a fourth operation cycle out the eight operation cycles, data $-e_1P_{11}+e_0P_3$ in a fifth operation cycle out of the eight operation cycles, data $-e_1P_{11}+e_0P_3+e_2P_{11}-e_3P_3$ in a sixth operation cycle out of the eight operation cycles, data $-e_1P_{11}+e_0P_3+e_2P_{11}-e_3P_3-e_5P_{11}-e_4P_3$ in a seventh operation cycle out of the eight operation cycles and data $-e_1P_{11}+e_0P_3+e_2P_{11}-e_3P_3-e_5P_{11}-e_4P_3-e_6P_{11}+e_7P_3$ in an eighth operation cycle out of the eight operation cycles.

Out of data output from the adding circuit $238_2$ in every operation cycle out of eight operation cycles, data output in the fourth operation cycle and eighth operation cycle represent operation value $F_2$ and operation value $F_6$ expressed in the equation (65) which are shown as $F_2$ and $F_6$ on a lower right of an output line of the register $40_2$ and data output in the first operation cycle to third operation cycle and fifth operation cycle to seventh operation cycle represent undefined values which are shown by asterisk marks "*" on the lower right of the output line of the register $40_2$ in FIG. 14.

Each piece of data stored sequentially into the register $234_4$ to register $234_7$ undergoes adding operations in every operation cycle out of eight operation cycles in the adding circuit $238_3$ and the resulting data is stored into the register $40_3$.

Data $e_0P_{13}+e_1P_9+e_2P_5+e_3P_1$ is output from the adding circuit $238_3$ in a first operation cycle out of the eight operation cycles, data $e_0P_{13}+e_1P_9+e_2P_5+e_3P_1-e_7P_{13}-e_6P_9-e_5P_5-e_4P_1$ in a second operation cycle out of the eight operation cycles, data $e_5P_{13}+e_0P_9+e_3P_5+e_5P_1$ in a third operation cycle out of the eight operation cycles, data $e_5P_{13}+e_0P_9+e_3P_5+e_6P_1-e_2P_{13}-e_6P_9-e_4P_5-e_1P_1$ in a fourth operation cycle out the eight operation cycles, data $e_6P_{13}+e_2P_9+e_0P_5+e_3P_1$ in a fifth operation cycle out of the eight operation cycles, data $e_6P_{13}+e_2P_9+e_0P_5+e_3P_1-e_1P_{13}-e_4P_9-e_7P_5-e_5P_1$ in a sixth operation cycle out of the eight operation cycles, data $e_4P_{13}+e_2P_9-e_1P_5+e_0P_1$ in a seventh operation cycle out of the eight operation cycles and data $e_4P_{13}+e_2P_9-e_1P_5+e_0P_1-e_3P_{13}-e_5P_9+e_6P_5-e_7P_1$ in an eighth operation cycle out of the eight operation cycles.

Out of data output from the adding circuit $238_3$ in every operation cycle out of eight operation cycles, data output in the second operation cycle, fourth operation cycle, sixth operation cycle and eighth operation cycle represent operation value $F_{10}$, operation value $F_{14}$, operation value $F_4$ and operation value $F_{12}$ expressed in the equation (65) which are shown as $F_{10}$, $F_{14}$, $F_4$ and $F_{12}$ on a lower right of an output line of the register $40_3$ and data output in the first operation cycle, third operation cycle, fifth operation cycle and seventh operation cycle represent undefined values which are shown by asterisk marks "*" on the lower right of the output line of the register $40_3$ in FIG. 14.

Each piece of data stored sequentially into the register $234_8$ to register $234_{15}$ undergoes adding operations in every operation cycle out of eight operation cycles in the adding circuit $238_4$ and the resulting data is stored into the register $40_4$.

Data $e_8P_{14}+e_9P_{12}+e_{10}P_{10}+e_{11}P_8+e_{12}P_6+e_{13}P_4+e_{14}P_2+e_{15}P_0$ is output from the adding circuit $238_4$ in a first operation cycle out of the eight operation cycles, data $-e_{13}P_{14}+e_8P_{12}-e_{12}P_{10}-e_{14}P_8+e_9P_6-e_{11}P_4-e_{15}P_2+e_{10}P_0$ in a second operation cycle out of the eight operation cycles, data $e_{14}P_{14}-e_{11}P_{12}+e_8P_{10}-e_{10}P_8+e_{13}P_6+e_{15}P_4-e_{12}P_2+e_9P_0$ in a third operation cycle out of the eight operation cycles, data $e_{12}P_{14}-e_{10}P_{12}-e_{14}P_{10}+e_8P_8-e_{15}P_6-e_9P_4+e_{13}P_2+e_{11}P_0$ in a fourth operation cycle out the eight operation cycles, data $e_{11}P_{14}-e_{13}P_{12}-e_9P_{10}+e_{15}P_8+e_8P_6+e_{14}P_4-e_{10}P_2-e_{12}P_0$ in a fifth operation cycle out of the eight operation cycles, data $-e_9P_{14}-e_{12}P_{12}-e_{15}P_{10}+e_{13}P_8+e_{10}P_6+e_8P_4+e_{11}P_2+e_{14}P_0$ in a sixth operation cycle out of the eight operation cycles, data $e_{10}P_{14}+e_{15}P_{12}-e_{11}P_{10}-e_9P_8-e_{14}P_6+e_{12}P_4+e_8P_2+e_{13}P_0$ in seventh operation cycle out of the eight operation cycles and data $-e_{15}P_{14}+e_{14}P_{12}-e_{13}P_{10}-e_{12}P_8-e_{11}P_6+e_{10}P_4-e_9P_2+e_8P_0$ in an eight operation cycle out of the eight operation cycles. Data output from the adding circuit $238_4$ in every operation cycle out the eight operation cycles represent the operation values $F_1$, $F_3$, $F_5$, $F_7$, $F_9$, $F_{11}$, $F_{13}$ and $F_{15}$ in the equation (65) respectively which are shown as $F_1$, $F_3$, $F_5$, $F_7$, $F_9$, $F_{11}$, $F_{13}$ and $F_{15}$ in a lower right of an output line of the register $40_4$ in FIG. 14.

By completing the above arithmetic operations, the primary 16-16 DCT on eight pieces of data in one line constituting the 16×16 data block is terminated. The same primary 16-16 DCT as described above is performed on each of lines subsequent to a next line constituting the 16×16 data block and thereafter, and the primary 16-16 DCT on all eight lines constituting the 16×16 data block is terminated in the similar manner. After the completion of the primary 16-16 DCT on the all eight lines, a secondary 16-16 DCT is performed on each string of eight data strings constituting the 16×16 data block. The transformation coefficient data obtained by completing the secondary 16-16 DCT is used for compression of input 16×16 picture data. Thus, transmission of compressed picture element data is made possible by using the transformation coefficient data obtained by performing the primary 16-16 DCT and secondary 16-16 DCT on the 16×16 picture element data within an image to be transmitted for compression of the 16×16 picture element data block.

Next, operations of the 2-8-16 DCT will be described. Each of sixteen pieces of data $F_0$ to data $F_{15}$ (input data for DCT) of each line constituting 16×16 data block transmitted sequentially from the MUX 212 is stored into each of the register $14_1$ to register $14_{15}$ contained in the first register group 213.

When each of the sixteen pieces of picture element data $f_0$ to picture element data $f_{15}$ is stored into each of the register $14_1$ to register $14_{16}$, data $f_0+f_1=g_0$ is output from the adding circuit $18_1$, data $f_2+f_3=g_1$ from the adding circuit $18_2$, data $f_4+f_5=g_2$ from the adding circuit $18_3$, data $f_6+f_7=g_3$ from the adding circuit $18_4$, data $f_8+f_9=g_4$ from the adding circuit $18_5$, data $f_{10}+f_{11}=g_5$ from the adding circuit $18_6$, data $f_{12}+f_{13}=g_6$ from the adding circuit $18_7$ and data $f_{14}+f_{15}=g_7$ from the adding circuit $18_8$. Data $f_0-f_1=g_8$ is output from the subtracting circuit $20_1$, data $f_2-f_3=g_9$ from the subtracting circuit $20_2$, data $f_4-f_5=g_{10}$ from the subtracting circuit $20_3$, data $f_6-f_7=g_{11}$ from the subtracting circuit $20_4$, data $f_8-f_9=g_{12}$ from the subtracting circuit $20_5$, data $f_{10}-f_{11}=g_{11}$ from the subtracting circuit $20_6$, data $f_{12}-f_{13}=g_{14}$ from the subtracting circuit $20_7$ and $f_{14}-f_{15}=g_{15}$ from the subtracting circuit $20_8$.

Data $g_0$ output from the adding circuit $18_1$ is stored into the register $22_1$, data $g_1$ output from the adding circuit $18_2$ is stored into the register $22_2$, data $g_2$ output from the adding circuit $18_3$ is stored into the register $22_3$, data $g_3$ output from the adding circuit $18_4$ is stored into the register $22_4$, data $g_4$ output from the adding circuit $18_5$ is stored into the register $22_5$, data $g_5$ output from the adding circuit $18_6$ is stored into the register $22_5$, data $g_6$ output from the adding circuit $18_7$ is stored into the register $22_6$ and data $g_7$ output from the adding circuit $18_8$ is stored into the register $22_8$.

Data $g_8$ output from the subtracting circuit $20_1$ is stored into the register $22_9$, data $g_9$ output from the subtracting circuit $20_2$ is stored into the register $22_{10}$, data $g_{10}$ output from the subtracting circuit $20_3$ is stored into the register $22_{11}$, data $g_{11}$ output from the subtracting circuit $20_5$ is stored into the register $22_{12}$, data $g_{12}$ output from the subtracting circuit $20_5$ is stored into the register $22_{13}$, data $g_{13}$ output from the subtracting circuit $20_6$ is stored into the register $22_{14}$, data $g_{14}$ output from the subtracting circuit $20_8$ is stored into the register $22_{15}$ and data $g_{15}$ output from the subtracting circuit $20_8$ is stored into the register $22_{16}$.

When data $g_0$ to data $g_7$ output from the adding circuit $18_1$ to adding circuit $18_8$ are input to the MUX $224_1$ to MUX $224_8$ through the register $22_1$ to register $22_8$, the following data are output from the MUX $224_1$ to MUX $224_8$. When eight pieces of data $g_0$, $g_3$, $g_4$, $g_7$, $g_0$, $g_3$, $g_4$ and $g_7$ output sequentially from the MUX $224_1$ in every operation cycle out of eight operation cycles are fed to the adding/subtracting circuit $226_1$ and eight pieces of data $g_1$, $g_2$, $g_5$, $g_6$, $g_1$, $g_2$, $g_5$ and $g_6$ are fed to the adding/subtracting circuit $226_1$, data $g_0+g_1$, data $g_3+g_2$, data $g_5+g_4$, data $g_7+g_6$, data $g_1-g_0$, data $g_3-g_2$, data $g_5-g_4$ and data $g_7-g_6$ are output sequentially and stored into the register $30_1$.

Each of data $g_0$, $g_3$, $g_4$, $g_7$, $g_0$, $g_3$, $g_4$ and $g_7$ output from the register $22_1$ to register $22_8$ in every operation cycle out of eight operation cycles is selected by the MUX $224_3$ in every operation cycle out of the eight operation cycles and each of data $g_0$, $g_7$, $g_3$, $g_4$, $g_1$, $g_2$, $g_5$ and $g_6$ is output sequentially from the MUX $224_3$ and stored into the register $30_2$. Each of data $g_0$, $g_1$, $g_2$, $g_3$, $g_4$, $g_5$, $g_6$ and $g_7$ output from the register $22_1$ to register $22_8$ in every operation cycle out of eight operation cycles is selected by the MUX $224_4$ in every operation cycle out of the eight operation cycles and each of data $g_1$, $g_2$, $g_5$, $g_6$, $g_0$, $g_3$, $g_4$ and $g_7$ is output sequentially from the MUX $224_4$ and stored into the register $30_3$. Each of data $g_0$, $g_1$, $g_2$, $g_3$, $g_4$, $g_5$, $g_6$ and $g_7$ output from the register $22_1$ to register $22_8$ in every operation cycle out of eight operation cycles is selected by the MUX $224_5$ in every operation cycle out of the eight operation cycles and each of data $g_2$, $g_5$, $g_1$, $g_6$, $g_0$, $g_7$, $g_3$ and $g_4$ is output sequentially from the MUX $224_4$ and stored into the register $30_4$. Each of data $g_0$, $g_1$, $g_2$, $g_3$, $g_4$, $g_5$, $g_6$ and $g_7$ output from the register $22_1$ to register $22_8$ in every operation cycle out of eight operation cycles is selected by the MUX $224_6$ in every operation cycle out of the eight operation cycles and each of data $g_0$, $g_7$, $g_3$, $g_4$, $g_1$, $g_6$, $g_2$ and $g_5$ is output sequentially from the MUX $224_4$ and stored into the register $30_5$. Each of data $g_0$, $g_1$, $g_2$, $g_3$, $g_4$, $g_5$, $g_6$ and $g_7$ output from the register $22_1$ to register $22_8$ in every operation cycle out of eight operation cycles is selected by the MUX $224_7$ in every operation cycle out of the eight operation cycles and each of data $g_3$, $g_4$, $g_0$, $g_7$, $g_2$, $g_5$, $g_1$ and $g_6$ is output sequentially from the MUX $224_7$ and stored into the register $30_6$. Each of data $g_0$, $g_1$, $g_2$, $g_3$, $g_4$, $g_5$, $g_6$ and $g_7$ output from the register $22_1$ to register $22_8$ in every operation cycle out of eight operation cycles is selected by the MUX $224_8$ in every operation cycle out of the eight operation cycles and each of data $g_1$, $g_6$, $g_2$, $g_5$, $g_3$, $g_4$, $g_0$ and $g_7$ is output sequentially from the MUX $224_8$ and stored into the register $30_7$. Each of data $g_8$, $g_9$, $g_{10}$, $g_{11}$, $g_{12}$, $g_{13}$, $g_{14}$ and $g_{15}$ output from the register $22_9$ to register $22_{16}$ in every operation cycle out of eight operation cycles is selected by the MUX $224_9$ in every operation cycle out of the eight operation cycles and each of data $g_8$, $g_{11}$, $g_{12}$, $g_{15}$, $g_8$, $g_{11}$, $g_{12}$ and $g_{15}$ is output sequentially from the MUX $224_9$ and stored into the register $30_8$. Each of data $g_8$, $g_9$, $g_{10}$, $g_{11}$, $g_{12}$, $g_{13}$, $g_{14}$ and $g_{15}$ output from the register $22_9$ to register $22_{16}$ in every operation cycle out of eight operation cycles is selected by the MUX $224_{10}$ in every operation cycle out of the eight operation cycles and each of data $g_8$, $g_{15}$, $g_{11}$, $g_{12}$, $g_9$, $g_{10}$, $g_{13}$ and $g_{14}$ is output sequentially from the MUX $224_{10}$ and stored into the register $30_9$. Each of data $g_8$, $g_9$, $g_{10}$, $g_{11}$, $g_{12}$, $g_{13}$, $g_{14}$ and $g_{15}$ output from the register $22_9$ to register $22_{16}$ in every operation cycle out of eight operation cycles is selected by the MUX $224_{10}$ in every operation cycle out of the eight operation cycles and each of data $g_8$, $g_{15}$, $g_{11}$, $g_{12}$, $g_9$, $g_{10}$, $g_{13}$ and $g_{14}$ is output sequentially from the MUX $224_{10}$ and stored into the register $30_9$. Each of data $g_8$, $g_9$, $g_{10}$, $g_{11}$, $g_{12}$, $g_{13}$, $g_{14}$ and $g_{15}$ output from the register $22_9$ to register $22_{16}$ in every operation cycle out of eight operation cycles is selected by the MUX $224_{11}$ in every operation cycle out of the eight operation cycles and each of data $g_9$, $g_{10}$, $g_{13}$, $g_{14}$, $g_8$, $g_{11}$, $g_{12}$ and $g_{15}$ is output sequentially from the MUX $224_{11}$ and stored into the register $30_{10}$. Each of data $g_8$, $g_9$, $g_{10}$, $g_{11}$, $g_{12}$, $g_{13}$, $g_{14}$ and $g_{15}$ output from the register $22_9$ to register $22_{16}$ in every operation cycle out of eight operation cycles is selected by the MUX $224_{12}$ in every operation cycle out of the eight operation cycles and each of data $g_8$, $g_{15}$, $g_{10}$, $g_{13}$, $g_9$, $g_{14}$, $g_{11}$ and $g_{12}$ is output sequentially from the MUX $224_{11}$ and stored into the register $30_{11}$. Each of data $g_8$, $g_9$, $g_{10}$, $g_{11}$, $g_{12}$, $g_{13}$, $g_{14}$ and $g_{15}$ output from the register $22_9$ to register $22_{16}$ in every operation cycle out of eight operation cycles is selected by the MUX $224_{13}$ in every operation cycle out of the eight operation cycles and each of data $g_9$, $g_{14}$, $g_8$, $g_{15}$, $g_{11}$, $g_{12}$, $g_{10}$ and $g_{13}$ is output sequentially from the MUX $224_{11}$ and stored into the register $30_{12}$. Each of data $g_8$, $g_9$, $g_{10}$, $g_{11}$, $g_{12}$, $g_{13}$, $g_{14}$ and $g_{15}$ output from the register $22_9$ to register $22_{16}$ in every operation cycle out of eight operation cycles is selected by the MUX $224_{14}$ in every operation cycle out of the eight operation cycles and each of data $g_{10}$, $g_{13}$, $g_{11}$, $g_{12}$, $g_9$, $g_{15}$, $g_8$ and $g_{14}$ is output sequentially from the MUX $224_{11}$ and stored into the register $30_{13}$.

Each of data $g_8$, $g_9$, $g_{10}$, $g_{11}$, $g_{12}$, $g_{13}$, $g_{14}$ and $g_{15}$ output from the register $22_9$ to register $22_{16}$ in every operation cycle out of eight operation cycles is not selected by the MUX $224_{15}$ in every operation cycle out of the eight operation cycles and data "0" is selected eight times and output sequentially and then stored into the register $30_{14}$. Each of data $g_8$, $g_9$, $g_{10}$, $g_{11}$, $g_{12}$, $g_{13}$, $g_{14}$ and $g_{15}$ output from the registers $22_9$ to $22_{16}$ in every operation cycle out of eight operation cycles is selected by the MUX $224_{16}$ in every operation cycle out of the eight operation cycles and each of data $g_{11}$, $g_{12}$, $g_9$, $g_{14}$, $g_{10}$, $g_{13}$, $g_8$ and $g_{15}$ is output sequentially from the MUX $224_{16}$ and stored into the register $30_{15}$.

Each of data output from the register $30_1$ to register $30_7$ in every operation cycle out of eight operation cycles is multiplied $P_9$, $P_5$ and $P_1$ in each of the corresponding fixed coefficient multiplying circuit $232_1$ to corresponding fixed coefficient multiplying circuit $232_7$ and then stored into each of the corresponding register $234_1$ to corresponding register $234_7$. Each of data stored sequentially into the register $234_1$ undergoes adding operations in the adding circuit $238_1$ in every operation cycle out of eight operation cycles and is stored into the register $40_1$.

Data $(g_0+g_1) P_7$ is output from the adding circuit $238_1$ in a first operation cycle out of eight operation cycles, data $(g_0+g_1+g_3+g_2) P_7$ in a second operation cycle out of the eight operation cycles, data $(g_0+g_1+g_3+g_2+g_4+g_5) P_7$ in a third operation cycle out of the eight operation cycles, data $(g_0+g_1+g_3+g_2+g_4+g_5+g_7+g_6) P_7$ in a fourth operation cycle out of the eight operation cycles, data $(g_0-g_1) P_7$ in a fifth operation cycle out of the eight operation cycles, data $(g_0-g_1+g_3-g_2) P_7$ in a sixth operation cycle out of the eight operation cycles, data $(g_0-g_1+g_3-g_2+g_4-g_5) P_7$ in a seventh operation cycle out of the eight operation cycles and data $(g_0-g_1+g_3-g_2+g_4-g_5+g_7-g_6) P_7$ in a eighth operation cycle out of the eight operation cycles. Out of data output from the adding circuit $238_1$ in every operation cycle out of the eight operation cycles, data output in the fourth operation cycle and eighth operation cycle represent operation value $F_0$ and operation value $F_4$ expressed in the equation (66) which are shown as $F_0$ and $F_4$ on a lower left of the output line of the register $40_1$ and data output in the first operation cycle to third operation cycle and fifth operation cycle to seventh operation cycle represent undefined values which are shown by asterisk marks "*" on the lower left of the output line of the register $40_1$ in FIG. 14.

Each of data stored sequentially into the register $234_2$ and register $234_3$ undergoes adding operations in the adding circuit $238_2$ in every operation cycle out of eight operation cycles and is stored into the register $40_2$.

Data $g_0P_{11}+g_1P_3$ is output from the adding circuit $238_2$ in a first operation cycle out of eight operation cycles, data $g_0P_{11}+g_1P_3+g_7P_{11}-g_2P_3$ in a second operation cycle out of the eight operation cycles, data $g_0P_{11}+g_1P_3+g_7P_{11}-g_2P_3-g_3P_{11}-g_5P_3$ in a third operation cycle out of the eight operation cycles, data $g_0P_{11}+g_1P_3+g_7P_{11}-g_2P_3-g_3P_{11}-g_5P_3-g_4P_{11}+g_6P_3$ in a fourth operation cycle out of the eight operation cycles, data $-g_1P_{11}+g_0P_3$ in a fifth operation cycle out of the eight operation cycles, data $-g_1P_{11}+g_0P_3+g_2P_{11}-g_3P_3$ in a sixth operation cycle out of the eight operation cycles, data $-g_1P_{11}+g_0P_3+g_2P_{11}-g_3P_3+g_5P_{11}-g_4P_3$ in a seventh operation cycle out of the eight operation cycles and data $-g_1P_{11}+g_0P_3+g_2P_{11}-g_3P_3+g_5P_{11}-g_4P_3-g_6P_{11}+g_7P_3$ in an eighth operation cycles. Out of data output from the adding circuit $238_2$ in every operation cycle out of eight operation cycles, data output in the fourth operation cycle and eighth operation cycle represent operation value $F_0$ and operation value $F_4$ expressed in the equation (66) which are shown as $F_2$ and $F_6$ on a lower left of the output line of the register $40_2$ and data output in the first operation cycle to third operation cycle and fifth operation cycle to seventh operation cycle represent undefined values which are shown by asterisk marks "*" on the lower left of the output line of the register $40_2$ in FIG. 14.

Each of data stored sequentially into the register $234_4$ to register $234_7$ undergoes adding operations in the adding circuit $238_3$ in every operation cycle out of eight operation cycles and is stored into the register $40_3$.

Data $-g_0P_{13}+g_0P_9-g_3P_5-g_1P_1$ is output from the adding circuit $238_3$ in a first operation cycle out of eight operation cycles, data $-g_2P_{13}+g_0P_9-g_3P_5-g_1P_1+g_5P_{13}-g_7P_9+g_4P_5+g_6P_1$ in a second operation cycle out of the eight operation cycles, data $-g_1P_{13}+g_3P_9+g_0P_5+g_2P_1$ in a third operation cycle out of the eight operation cycles, data $-g_1P_{13}+g_3P_9+g_0P_5+g_2P_1+g_6P_{13}-g_4P_9-g_7P_5-g_5P_1$ in a fourth operation cycle out of the eight operation cycles, data $g_0P_{13}+g_1P_9+g_2P_5+g_3P_1$ in a fifth operation cycle out of the eight operation cycles, data $g_0P_{13}+g_1P_9+g_2P_5+g_3P_1-g_7P_{13}-g_6P_9-g_5P_5-g_4P_1$ in a sixth operation cycle out of the eight operation cycles, data $-g_3P_{13}+g_2P_9-g_1P_5+g_0P_1$ in a seventh operation cycle out of the eight operation cycles and data $-g_3P_{13}+g_2P_9-g_1P_5+g_0P_1+g_4P_{13}-g_5P_9+g_6P_5-g_7P_1$ in an eighth operation cycles. Out of data output from the adding circuit $238_3$ in every operation cycle out of the eight operation cycles, data output in the second operation cycle, fourth operation cycle, sixth operation cycle and eighth operation cycle represent operation value $F_3$, operation value $F_5$, operation value $F_1$ and operation value $F_7$ expressed in the equation (66) which are shown as $F_3$, $F_5$, $F_1$ and $F_7$ on a lower left of the output line of the register $40_3$ and data output in the first operation cycle, third operation cycle, fifth operation cycle and seventh operation cycle represent undefined values which are shown by asterisk marks "*" on the lower left of the output line of the register $40_3$ in FIG. 14.

Each of data output from the MUX $224_9$ and MUX $224_{15}$, after having undergone adding operations and subtracting operations in the adding/subtracting circuit $226_1$ and having been stored in the register $30_8$ through the MUX $28_1$ and having multiplexed by the fixed coefficient $P_7$ in the $P_{14}/P_7$ fixed coefficient multiplying circuit $232_8$, undergoes adding operations in the adding circuit $238_5$ in every operation cycle out of the eight operation cycles and is stored in the register $40_5$.

Data $(g_8+g_9)$ is output from the adding circuit $238_5$ in a first operation cycle out of eight operation cycles, data $(g_8+g_9+g_{11}+g_{10})\,P_7$ in a second operation cycle out of the eight operation cycles, data $(g_8+g_9+g_{11}+g_{10}+g_{12}+g_{13})\,P_7$ in a third operation cycle out of the eight operation cycles, data $(g_8+g_9+g_{11}+g_{10}+g_{12}+g_{13}+g_{15}+g_{14})\,P_7$ in a fourth operation cycle out of the eight operation cycles, data $(g_8-g_9)$ in a fifth operation cycle out of the eight operation cycles, data $(g_8-g_9+g_{11}-g_{10})\,P_7$ in a sixth operation cycle out of the eight operation cycles, data $(g_8-g_9+g_{11}-g_{10}+g_{12}-g_{13})\,P_7$ in a seventh operation cycle out of the eight operation cycles and data $(g_8-g_9+g_{11}-g_{10}+g_{12}-g_{13}+g_{15}-g_{14})\,P_7$ in an eighth operation cycles. Out of data output from the adding circuit $238_5$ in every operation cycle out of the eight operation cycles, data output in the fourth operation cycle and eighth operation cycle represent operation value $F_8$ and operation value $F_{12}$ expressed in the equation (66) which are shown as $F_8$ and $F_{12}$ on a lower left of the output line of the register $40_5$ and data output in the first operation cycle to third operation cycle and fifth operation cycle to seventh operation cycle represent undefined values which are shown by asterisk marks "*" on the lower left of the output line of the register $40_5$ in FIG. 14.

Each of data stored sequentially into the register $234_9$ to register $234_{10}$ undergoes adding operations in the adding circuit $238_6$ in every operation cycle out of eight operation cycles and is stored into the register $40_6$.

Data $g_8P_{11}+g_9P_3$ is output from the adding circuit $238_6$ in a first operation cycle out of eight operation cycles, data $g_8P_{11}+g_9P_3+g_{15}P_{11}-g_{10}P_3$ in a second operation cycle out of the eight operation cycles, data $g_8P_{11}+g_9P_3+g_{15}P_{11}-g_{10}P_3-g_{11}P_{11}-g_{13}P_3$ in a third operation cycle out of the eight operation cycles, data $g_8P_{11}+g_9P_3+g_{15}P_{11}-g_{10}P_3-g_{11}P_{11}-g_{13}P_3-g_{12}P_{11}+g_{14}P_3$ in a fourth operation cycle out of the eight operation cycles, data $-g_8P_{11}+g_9P_3$ in a fifth operation cycle out of the eight operation cycles, data $-g_9P_{11}+g_8P_3+g_{10}P_{11}+g_{11}P_3$ in a sixth operation cycle out of the eight operation cycles, data $-g_9P_{11}+g_8P_3+g_{10}P_{11}+g_{11}P_3+g_{13}P_{11}+g_{12}P_3$ in a seventh operation cycle out of the eight operation cycles and data $-g_9P_{11}+g_8P_3+g_{10}P_{11}+g_{11}P_3+g_{13}P_{11}+g_{12}P_3-g_{14}P_{11}+g_{15}P_3$ in an eighth operation cycle. Out of data output from the adding circuit $238_6$ in every operation cycle out of the eight operation cycles, data output in the fourth operation cycle and eighth operation cycle represent operation value $F_{10}$ and operation value $F_{14}$ expressed in the equation (66) which are shown as $F_{10}$ and $F_{14}$ on a lower left of the output line of the register $40_3$ and data output in the first operation cycle to third operation cycle and fifth operation cycle to seventh operation cycle represent undefined values which are shown by asterisk marks "*" on the lower left of the output line of the register $40_3$ in FIG. 14. Each of data output from the MUX $224_{12}$, MUX $224_{13}$, MUX $224_{14}$ and MUX $224_{16}$ is stored into the register $30_{11}$, register $30_{12}$, register $30_{13}$ and register $30_{15}$ and then is multiplied by each of fixed coefficient $P_{13}$, fixed coefficient $P_9$, fixed coefficient $P_5$ and fixed coefficient $P_1$ in each of the corresponding $P_8/P_{13}$ fixed coefficient multiplying circuits $232_{11}$, $P_6/P_9$ fixed coefficient multiplying circuit $232_{12}$, $P_4/P_5$ fixed coefficient multiplying circuit $232_{13}$ and $P_0/P_1$ fixed coefficient multiplying circuit $232_{15}$. Each of the resulting data is stored in the register $234_{11}$ to register $234_{15}$ undergoes adding operations in every operation cycle out of the eight operation cycles and then is stored in the register $40_4$.

Data $g_8P_{13}+g_9P_9+g_{10}P_5+g_{11}P_1$ is output from the adding circuit $238_4$ in a first operation cycle out of eight operation cycles, data $g_8P_{13}+g_9P_9+g_{10}P_5+g_{11}P_1-g_{15}P_{13}-g_{14}P_9-g_{13}P_5-g_{12}P_1$ in a second operation cycle out of the eight operation cycles, data $-g_{10}P_{13}+g_8P_9-g_{11}P_5-g_9P_1$ in a third operation cycle out of the eight operation cycles, data $-g_{10}P_{13}+g_8P_9-g_{11}P_5-g_9P_1+g_{13}P_{13}-g_{15}P_9+g_{12}P_5+g_{14}P_1$ in a fourth operation cycle out of the eight operation cycles, data $-g_9P_{13}+g_{11}P_9+g_8P_3+g_{10}P_1$ in a fifth operation cycle out of the eight operation cycles, data $-g_9P_{13}+g_{11}P_9+g_8P_5+g_{10}P_1+g_{14}P_{13}-g_{12}P_9-g_{15}P_5-g_{13}P_1$ in a sixth operation cycle out of the eight operation cycles, data $-g_{11}P_{13}+g_{10}P_9-g_9P_5+g_8P_1$ in a seventh operation cycle out of the eight operation cycles and data $-g_{11}P_{13}+g_{10}P_9-g_9P_5+g_8P_1+g_{12}P_{12}-g_{13}P_9+g_{14}P_5-g_{15}P_1$ in an eighth operation cycle. Out of data output from the adding circuit $238_4$ in every operation cycle out of the eight operation cycles, data output in the second operation cycle, fourth operation cycle, sixth operation cycle and eighth operation cycle represent operation values $F_{11}$, $F_{13}$ and $F_{15}$ expressed in the equation (66) which are shown as $F_{11}$, $F_{13}$ and $F_{15}$ on a lower right of the output line of the register $40_4$ and data output in the first operation cycle, third operation cycle, fifth operation cycle and seventh operation cycle represent undefined values which are shown by asterisk marks "*" on the lower left of the output line of the register $40_4$ in FIG. 14.

By completing the above arithmetic operations, the primary 2-8-16 DCT on sixteen pieces of data contained in one line constituting the block composed of 16×16 pieces of data is terminated. The same primary 2-8-16 DCT as described above is performed on each of lines subsequent to a next line constituting the 16×16 data block and thereafter, and the primary 2-8-6 DCT on all eight lines constituting the 8×8 data block is terminated in the similar manner. After the completion of the primary 2-8-16 DCT on the all sixteen lines, a secondary 2-8-16 DCT is performed on each string of sixteen data strings constituting the 16×16 data block. The transformation coefficient data obtained by completing the secondary 2-8-16 DCT is used for compression of input 16×16 picture data. Thus, transmission of compressed picture element data is made possible by using the transformation coefficient data obtained by performing the primary 2-8-16 DCT and secondary 2-8-16 DCT on the 16×16 picture element data within an image to be transmitted for compression of the 16×16 picture element data block.

Thus, according to the third embodiment, since the 16-16 DCT/2-8-16 DCT device is so configured that a part of the fixed coefficient multiplying circuit used in the 16-16 DCT is also used as the fixed coefficient multiplying circuit required in the 2-8-16 DCT device, a high-speed calculating characteristic obtained through the pipeline processing type arithmetic operation in the 16-16 DCT device can be fully maintained even in a miniaturized scale of the entire device for 16-16 DCT devices and for the 2-8-16 DCT devices.

Fourth Embodiment

Figure 15:
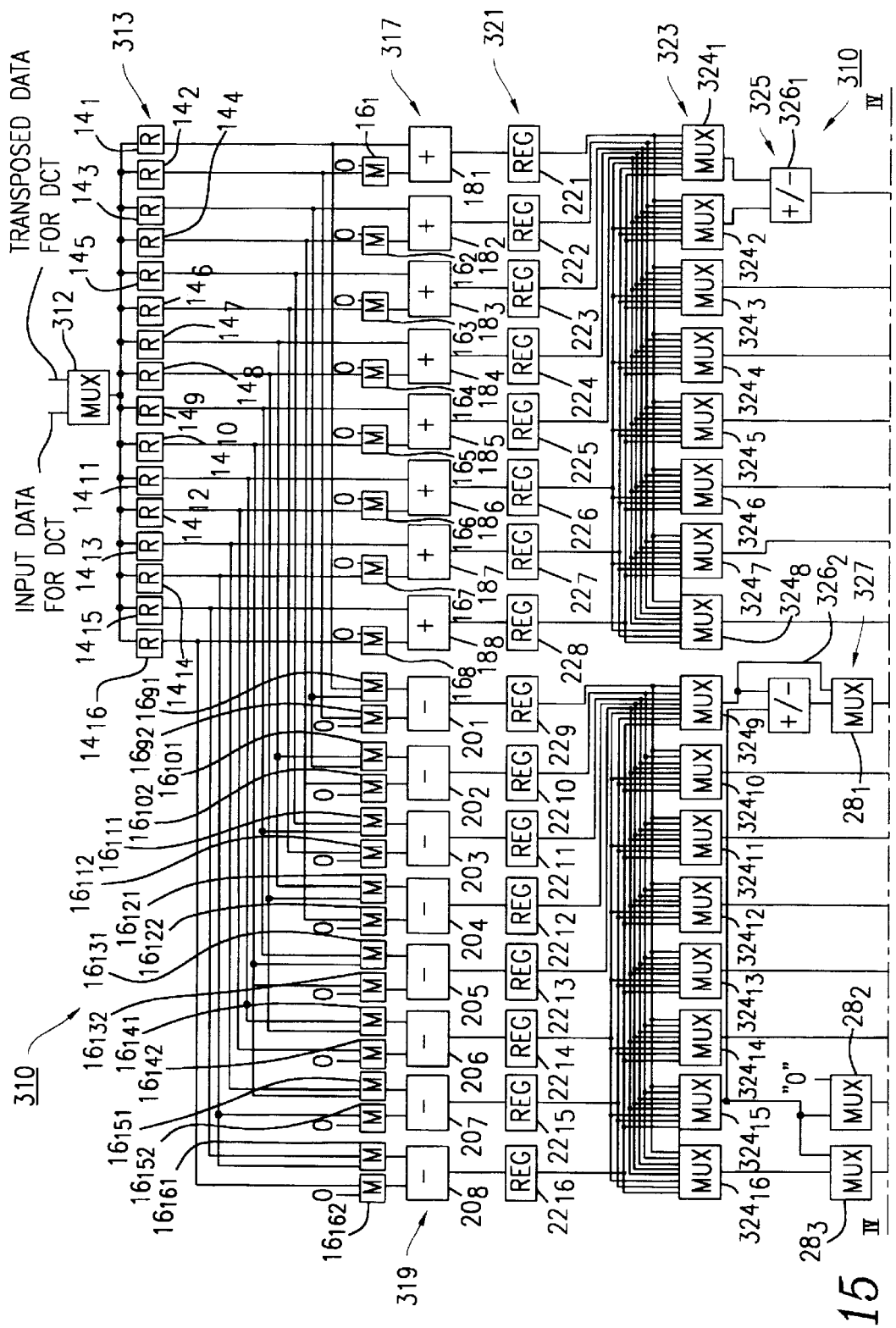
FIG. 15 is a schematic block diagram partially showing electrical configurations of a 16-16/2-8-16 IDCT device according to a fourth embodiment of the present invention.
Figure 16:
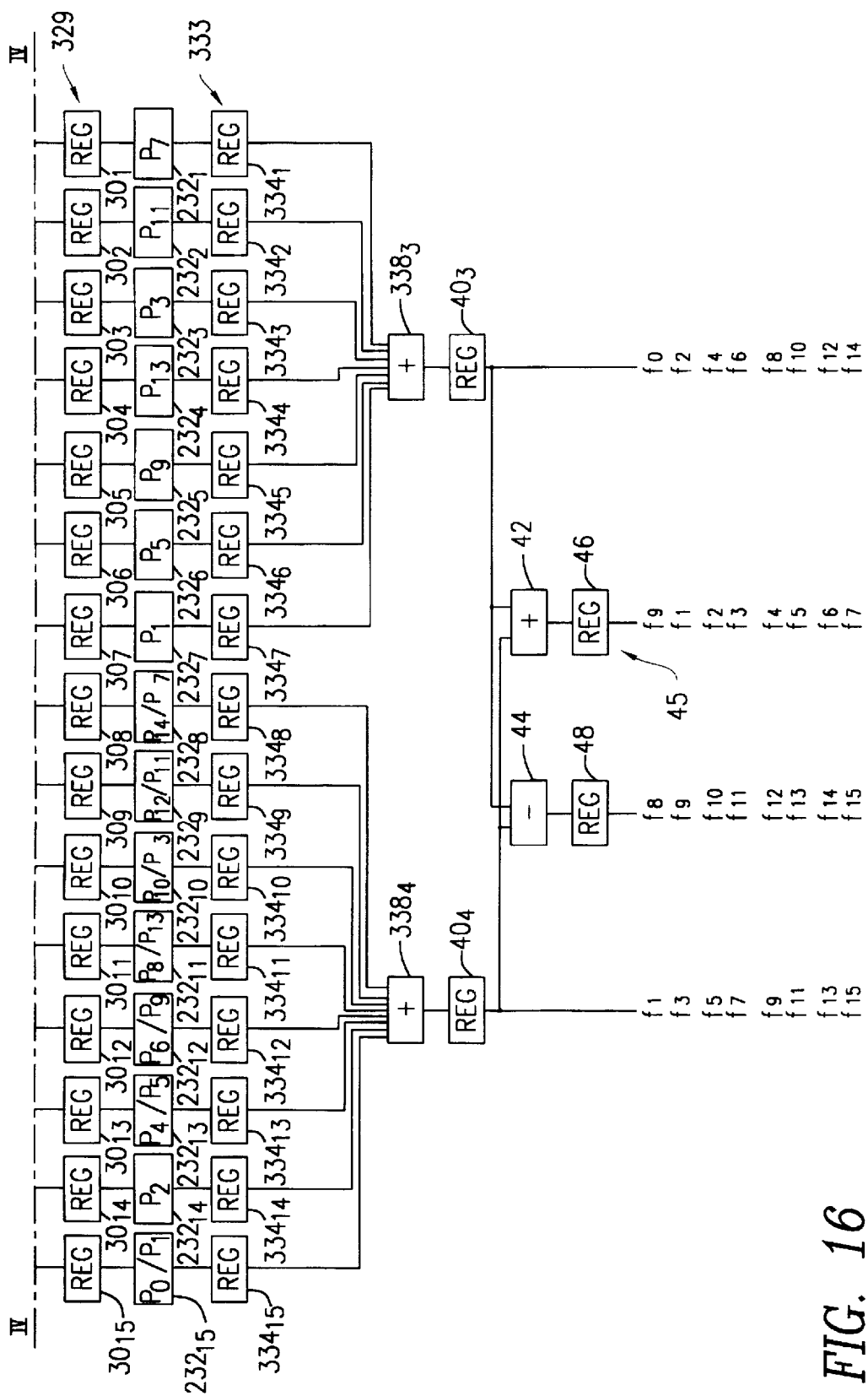
FIG. 16 is a schematic block diagram partially showing electrical configurations of the 16-16/2-8-16 IDCT device according to the fourth embodiment of the present invention.

FIG. 15 is a schematic block diagram partially showing electrical configurations of a 16-16/2-8-16 IDCT device according to a fourth embodiment of the present invention. FIG. 16 is a schematic block diagram partially showing electrical configurations of the 16-16/2-8-16 IDCT device according to the fourth embodiment. By overlaying a line IV—IV in FIG. 15 on a line IV—IV in FIG. 16, overall configurations of the 16-16/2-8-16 IDCT device of the embodiment can be shown. Configurations of the fourth embodiment differ greatly from those in the third embodiment in that the 16-16/2-8-16 IDCT, to obtain the original image data from the image data which is compressed in the 16-16/2-8-16 DCT by performing the 16-16/2-8-16 DCT on the input data in the third embodiment, is performed on the compressed image data.

The 16-16 IDCT/2-8-16 IDCT of the embodiment, in the case of the 16-16 IDCT, performs arithmetic operations according to a determinant equation (69) obtained by decompressing and rearranging the equation (18) and, in the case of the 2-8-16 DCT, performs arithmetic operations according to a determinant equation (70) obtained by decompressing and rearranging the equation (22). The value $h_0$ to value $h_{15}$ in the determinant equation (69) are given by the equation (71) and the value $g_0$ to value $g_{15}$ in the determinant equation (70) are given by the equation (72).

$$\frac{1}{2}\begin{bmatrix} f_0 + f_8 \\ f_1 + f_9 \\ f_2 + f_{10} \\ f_3 + f_{11} \\ f_4 + f_{12} \\ f_5 + f_{13} \\ f_6 + f_{14} \\ f_7 + f_{15} \\ f_0 - f_8 \\ f_1 - f_9 \\ f_2 - f_{10} \\ f_3 - f_{11} \\ f_4 - f_{12} \\ f_5 - f_{13} \\ f_6 - f_{14} \\ f_7 - f_{15} \end{bmatrix} = \begin{bmatrix} h_0 + h_8 & h_4 & h_{12} & h_2 & h_6 & h_{10} & h_{14} \\ h_0 - h_8 & -h_{12} & h_4 & -h_{10} & h_2 & -h_{14} & -h_6 \\ h_0 - h_8 & h_{12} & -h_4 & -h_6 & h_{14} & -h_2 & h_{10} \\ h_0 + h_8 & -h_{14} & -h_{12} & h_{14} & h_{10} & -h_6 & h_2 \\ h_0 + h_8 & -h_4 & -h_{12} & h_{14} & -h_{10} & h_6 & -h_2 \\ h_0 - h_8 & h_{12} & -h_4 & h_6 & -h_{14} & -h_2 & -h_{10} \\ h_0 - h_8 & -h_{12} & h_4 & h_{10} & h_2 & h_{14} & h_6 \\ h_0 + h_8 & h_4 & -h_{12} & -h_2 & -h_6 & h_{10} & h_{14} \\ h_1 & h_3 & h_5 & h_7 & h_9 & h_{11} & h_{13}\,h_{15} \\ -h_{11} & h_1 & -h_9 & h_{13} & h_3 & -h_7 & -h_{15}\,h_5 \\ h_{13} & -h_7 & h_1 & h_5 & h_{11} & h_{15} & h_9\,h_3 \\ h_9 & -h_5 & -h_{13} & h_1 & -h_{15} & -h_3 & h_{11}\,h_7 \\ h_7 & -h_{11} & -h_3 & h_{15} & h_1 & h_{13} & -h_5\,h_9 \\ -h_3 & -h_9 & -h_{15} & h_{11} & h_5 & h_1 & -h_7\,h_{13} \\ h_5 & h_{15} & -h_7 & -h_3 & -h_{13} & h_9 & h_1\,h_{11} \\ -h_{15} & h_{13} & -h_{11} & h_9 & -h_7 & h_5 & -h_3\,h_1 \end{bmatrix} \begin{bmatrix} P_7 \\ P_{11} \\ P_3 \\ P_{13} \\ P_9 \\ P_5 \\ P_1 \\ P_{14} \\ P_{12} \\ P_{10} \\ P_8 \\ P_6 \\ P_4 \\ P_2 \\ P_0 \end{bmatrix} \quad (69)$$

$$\begin{bmatrix} f_0 \\ f_2 \\ f_4 \\ f_6 \\ f_8 \\ f_{10} \\ f_{12} \\ f_{14} \\ f_1 \\ f_3 \\ f_5 \\ f_7 \\ f_9 \\ f_{11} \\ f_{13} \\ f_{15} \end{bmatrix} = \begin{bmatrix} i_0 + i_7 & i_2 & i_5 & i_1 & i_3 & i_4 & i_6 \\ i_0 - i_7 & -i_5 & i_2 & -i_4 & i_1 & -i_6 & -i_3 \\ i_0 - i_7 & i_5 & -i_2 & -i_3 & i_6 & i_1 & i_4 \\ i_0 + i_7 & -i_2 & -i_5 & -i_6 & i_4 & -i_3 & i_1 \\ i_0 + i_7 & -i_2 & -i_5 & i_6 & -i_4 & i_3 & -i_1 \\ i_0 - i_7 & i_5 & -i_2 & i_3 & -i_6 & -i_1 & -i_4 \\ i_0 - i_7 & -i_5 & i_2 & i_4 & -i_1 & i_6 & i_3 \\ i_0 + i_7 & i_2 & -i_5 & -i_1 & -i_3 & -i_4 & -i_6 \\ i_8 + i_{15} & i_{10} & i_{13} & i_9 & i_{11} & i_{12} & i_{14} \\ i_8 - i_{15} & -i_{13} & i_{10} & -i_{12} & i_9 & -i_{14} & -i_{11} \\ i_8 - i_{15} & i_{13} & -i_{10} & -i_{11} & i_{14} & i_9 & i_{12} \\ i_8 + i_{15} & -i_{10} & -i_{13} & -i_{14} & i_{12} & -i_{11} & i_9 \\ i_8 + i_{15} & -i_{10} & -i_{13} & i_{14} & -i_{12} & i_{11} & -i_9 \\ i_8 - i_{15} & i_{13} & -i_{10} & i_{11} & -i_{14} & -i_9 & -i_{12} \\ i_8 - i_{15} & -i_{13} & i_{10} & i_{12} & -i_9 & i_{14} & i_{11} \\ i_8 + i_{15} & i_{10} & i_{13} & -i_9 & -i_{11} & -i_{12} & -i_{14} \end{bmatrix} \begin{bmatrix} P_7 \\ P_{11} \\ P_3 \\ P_{13} \\ P_9 \\ P_5 \\ P_1 \end{bmatrix} \quad (70)$$

$$\left.\begin{matrix} h_0 = F_0, & h_2 = F_2, & h_4 = F_4, & h_6 = F_6, \\ h_8 = F_8, & h_{10} = F_{10}, & h_{12} = F_{12}, & h_{14} = F_{14}, \\ h_1 = F_1, & h_3 = F_3, & h_5 = F_5, & h_7 = F_7, \\ h_9 = F_9, & h_{11} = F_{11}, & h_{13} = F_{13}, & h_{15} = F_{15} \end{matrix}\right\} \quad (71)$$

$$i_0 = F_0 + F_8, \quad i_1 = F_1 + F_9, \quad i_2 = F_2 + F_{10}, \quad i_3 = F_3 + F_{11},$$
$$i_4 = F_5 + F_{13}, \quad i_5 = F_6 + F_{14}, \quad i_6 = F_7 + F_{15}, \quad i_7 = F_4 + F_{12},$$
$$i_8 = F_0 - F_8, \quad i_9 = F_1 - F_9, \quad i_{10} = F_2 - F_{10}, \quad i_{11} = F_3 - F_{11},$$
$$i_{12} = F_5 - F_{13}, \quad i_{13} = F_6 - F_{14}, \quad i_{14} = F_7 - F_{15}, \quad i_{15} = F_4 - F_{12},$$

(72)

Moreover, the $P_0$ to $P_{15}$ in the equation (69) and equation (70) are same as the $P_0$ to $P_{15}$ in the equation (65) and equation (66).

The MUX 312, in the case of the 16-16 IDCT, selectively outputs sixteen pieces of data contained in each line for the primary IDCT out of 16×16 transformation coefficient data (hereafter called "data") on which the 16-16 IDCT is performed or each data of sixteen pieces of data $F_0$ to data $F_{15}$ contained in each line constituting the 16×16 data obtained through the primary IDCT to corresponding register $14_0$ to register $14_{15}$ and, in the case of the 2-8-16 IDCT, stores data $F_0$ out of the sixteen pieces of data $F_0$ to data $F_{15}$ into the register $14_1$ contained in the first register group 313, data $F_8$ to the register $14_2$, data $F_1$ to the register $14_3$, data $F_9$ to the register $14_4$, data $F_2$ to the register $14_5$, data $F_{10}$ to the register $14_6$, data $F_3$ to the register $14_7$, data $F_{11}$ to the register $14_8$, data $F_5$ to the register $14_9$, data $F_{13}$ to the register $14_{10}$ data $F_6$ to the register $14_{11}$, data $F_{14}$ to the register $14_{12}$, data $F_7$ to the register $14_{13}$, data $F_{15}$ to the register $14_{14}$, data $F_4$ to the register $14_{15}$ and data $F_{12}$ to the register $14_{16}$.

Each of the MUXs $16_1$ to $16_8$, $16_{92}$, $16_{102}$, $16_{112}$, $16_{122}$, $16_{132}$, $16_{142}$, $16_{152}$ and $16_{162}$, in the case of the 16-16 IDCT, selects "0" data and, in the case of 2-8-16 IDCT, selects each of the registers $14_2$, $14_4$, $14_6$, $14_8$, $14_{10}$, $14_{12}$, $14_{14}$ and $14_{16}$. Each of the MUXs $16_{91}$, $16_{101}$, $16_{111}$, $16_{121}$, $16_{131}$, $16_{141}$, $16_{151}$ and $16_{161}$, in the case of the 16-16 IDCT, selects each of the registers $14_3$, $14_7$, $14_9$, $14_{13}$, $14_{14}$, $14_8$, $14_{10}$ and $14_{14}$ and, in the case of the 2-8-16 IDCT, selects each of the registers $14_1$, $14_3$, $14_5$, $14_7$, $14_9$, $14_{11}$, $14_{13}$ and $14_{15}$.

The adding circuit $18_1$ constituting a first adding circuit group 317 adds data output from the register $14_1$ to data output from the MUX $16_1$, the adding circuit $18_2$ adds data output from the register $14_3$ to data output from the MUX $16_2$, the adding circuit $18_3$ adds data output from the register $14_5$ to data output from the MUX $16_3$, the adding circuit $18_4$ adds data output from the register $14_7$ to data output from the MUX $16_4$, the adding circuit $18_5$ adds A data output from the register $14_9$ to data output from the MUX $16_5$, the adding circuit $18_6$ adds data output from the register $14_{11}$ to data output from the MUX $16_6$, the adding circuit $18_7$ adds data output from the register $14_{13}$ to data output from the MUX $16_7$ and the adding circuit $18_8$ adds data output from the register $14_{15}$ to data output from the MUX $16_8$.

The subtracting circuit $20_1$ constituting a subtracting circuit group 319 performs subtracting operations on data output from the MUX $16_{91}$ and data output from the MUX $16_{92}$, the subtracting circuit $20_2$ performs subtracting operations on data output from the MUX $16_{101}$ and data output from the MUX $16_{102}$, the subtracting circuit $20_3$ performs subtracting operations on data output from the MUX $16_{111}$ and data output from the MUX $16_{112}$, the subtracting circuit $20_4$ performs subtracting operations on data output from the MUX $16_{121}$ and data output from the MUX $16_{122}$, the subtracting circuit $20_5$ performs subtracting operations on data output from the MUX $16_{131}$ and data output from the MUX $16_{132}$, the subtracting circuit $20_6$ performs subtracting operations on data output from the MUX $16_{141}$ and data output from the MUX $16_{142}$, the subtracting circuit $20_7$ performs subtracting operations on data output from the MUX $16_{151}$ and data output from the MUX $16_{152}$ and the subtracting circuit $20_8$ performs subtracting operations on data output from the MUX $16_{161}$ and data output from the MUX $16_{162}$.

Data output from each of the adding circuit $18_1$ to adding circuit $18_8$ is stored into each of the corresponding register $22_1$ to register $22_8$ contained in a second register group 321 and data output from each of the subtracting circuit $20_1$ to subtracting circuit $20_8$ is stored into each of the corresponding register $22_9$ to register $22_{16}$.

The MUX $324_1$ constituting a second MUX group is connected to an output of each of the register $22_1$ to register $22_8$ and, in the case of both the 16-16 IDCT and 2-8-16 IDCT, selects the register $22_1$ eight times and sequentially outputs eight pieces of data. The MUX $324_2$, in the case of the 16-16 IDCT, selects the register $22_5$ eight times and sequentially outputs eight pieces of data and, in the case of the 2-8-16 IDCT, selects the register $22_8$ and sequentially outputs eight pieces of data.

The MUX $324_3$, in the case of the 16-16 IDCT, selects the register in the order of the registers $22_3$, $22_7$, $22_7$, $22_3$, $22_3$, $22_7$, $22_7$ and $22_3$ and sequentially outputs eight pieces of data and, in the case of the 2-8-16 IDCT, selects the register in the order of the register $22_3$, $22_6$, $22_6$, $22_3$, $22_3$, $22_6$, $22_6$ and $22_3$ and sequentially outputs eight pieces of data.

The MUX $324_4$, in the case of the 16-16 IDCT, selects the register in the order of the registers $22_7$, $22_3$, $22_3$, $22_7$, $22_7$, $22_3$ $22_3$ and $22_7$ and sequentially outputs eight pieces of data and, in the case of the 2-8-16 IDCT, selects the register in the order of the register $22_6$, $22_3$, $22_3$, $22_6$, $22_6$, $22_3$, $22_3$ and $22_3$ and sequentially outputs eight pieces of data.

The MUX $324_5$, in the case of the 16-16 IDCT, selects the register in the order of the registers $22_2$, $22_6$, $22_4$, $22_8$, $22_8$, $22_4$, $22_6$ and $22_2$ and sequentially outputs eight pieces of data and, in the case of the 2-8-16 IDCT, selects the register in the order of the register $22_2$, $22_5$, $22_4$, $22_7$, $22_7$, $22_4$, $22_5$ and $22_2$ and sequentially outputs eight pieces of data.

The MUX $324_6$, in the case of the 16-16 IDCT, selects the register in the order of the registers $22_4$, $22_2$, $22_8$, $22_6$, $22_6$, $22_8$, $22_2$ and $22_4$ and sequentially outputs eight pieces of data and, in the case of the 2-8-16 IDCT, selects the register in the order of the register $22_4$, $22_2$, $22_7$, $22_5$, $22_5$, $22_7$, $22_2$ and $22_4$ and sequentially outputs eight pieces of data.

The MUX $324_7$, in the case of the 16-16 IDCT, selects the register in the order of the registers $22_6$, $22_8$, $22_2$, $22_4$, $22_4$, $22_2$, $22_8$ and $22_6$ and sequentially outputs eight pieces of data and, in the case of the 2-8-16 IDCT, selects the register in the order of the register $22_5$, $22_7$, $22_2$, $22_4$, $22_4$, $22_2$, $22_7$ and $22_5$ and sequentially outputs eight pieces of data.

The MUX $324_8$, in the case of the 16-16 IDCT, selects the register in the order of the registers $22_8$, $22_4$, $22_6$, $22_2$, $22_2$, $22_6$, $22_4$ and $22_8$ and sequentially outputs eight pieces of data and, in the case of the 2-8-16 IDCT, selects the register in the order of the register $22_7$, $22_4$, $22_5$, $22_2$, $22_2$, $22_5$, $22_4$ and $22_7$ and sequentially outputs eight pieces of data.

The MUX $324_9$, in the case of the 16-16 IDCT, selects the register in the order of the registers $22_9$, $22_{14}$, $22_{15}$, $22_{13}$, $22_{12}$, $22_{10}$, $22_{11}$ and $22_{16}$ and sequentially outputs eight pieces of data and, in the case of the 2-8-16 IDCT, selects the register $22_{16}$ eight times repeatedly and sequentially outputs eight pieces of data.

The MUX $324_{10}$, in the case of the 16-16 IDCT, selects the register in the order of the registers $22_{10}$, $22_9$, $22_{12}$, $22_{11}$, $22_{14}$, $22_{13}$, $22_{16}$ and $22_{15}$ and sequentially outputs eight pieces of data and, in the case of the 2-8-16 IDCT, selects the register in the order of the register $22_{11}$, $22_{14}$, $22_{14}$, $22_{11}$, $22_{11}$, $22_{14}$, $22_{14}$ and $22_{11}$ and sequentially outputs eight pieces of data.

The MUX $324_{11}$, in the case of the 16-16 IDCT, selects the register in the order of the registers $22_{11}$, $22_{13}$, $22_9$, $22_{15}$, $22_{10}$, $22_{16}$, $22_{12}$ and $22_{14}$ and sequentially outputs eight pieces of data and, in the case of the 2-8-16 IDCT, selects the register in the order of the register $22_{14}$, $22_{11}$, $22_{11}$, $22_{14}$, $22_{14}$, $22_{11}$, $22_{11}$ and $22_{14}$ and sequentially outputs eight pieces of data.

The MUX $324_{12}$, in the case of the 16-16 IDCT, selects the register in the order of the registers $22_{12}$, $22_{15}$, $22_{11}$, $22_9$, $22_{16}$, $22_{14}$, $22_{10}$ and $22_{13}$ and sequentially outputs eight pieces of data and, in the case of the 2-8-16 IDCT, selects the register in the order of the register $22_{10}$, $22_{13}$, $22_{12}$, $22_{15}$, $22_{15}$, $22_{12}$, $22_{13}$ and $22_{10}$ and sequentially outputs eight pieces of data.

The MUX $324_{13}$, in the case of the 16-16 IDCT, selects the register in the order of the registers $22_{13}$, $22_{10}$, $22_{14}$, $22_{16}$, $22_9$, $22_{11}$, $22_{15}$ and $22_{12}$ and sequentially outputs eight pieces of data and, in the case of the 2-8-16 IDCT, selects the register in the order of the register $22_{12}$, $22_{10}$, $22_{15}$, $22_{13}$, $22_{13}$, $22_{15}$, $22_{10}$ and $22_{12}$ and sequentially outputs eight pieces of data.

The MUX $324_{14}$, in the case of the 16-16 IDCT, selects the register in the order of the registers $22_{14}$, $22_{12}$, $22_{16}$, $22_{10}$, $22_{15}$, $22_9$, $22_{13}$ and $22_{11}$ and sequentially outputs eight pieces of data and, in the case of the 2-8-16 IDCT, selects the register in the order of the register $22_{13}$, $22_{15}$, $22_{10}$, $22_{12}$, $22_{12}$, $22_{10}$, $22_{15}$ and $22_{13}$ and sequentially outputs eight pieces of data.

The MUX $324_{15}$, in the case of the 16-16 IDCT, selects the register in the order of the registers $22_{15}$, $22_{16}$, $22_{13}$, $22_{14}$, $22_{11}$, $22_{12}$, $22_9$ and $22_{10}$ and sequentially outputs eight pieces of data and, in the case of the 2-8-16 IDCT, selects the register in the order of the register $22_{15}$, $22_{12}$, $22_{13}$, $22_{10}$, $22_{10}$, $22_{13}$, $22_{12}$ and $22_{15}$ and sequentially outputs eight pieces of data.

The MUX $324_{16}$, in the case of the 16-16 IDCT, selects the register in the order of the registers $22_{16}$, $22_{11}$, $22_{10}$, $22_{12}$, $22_{13}$, $22_{15}$, $22_{14}$ and $22_9$ and sequentially outputs eight pieces of data and, in the case of the 2-8-16 IDCT, selects the register $22_{16}$ eight times repeatedly and sequentially outputs eight pieces of data.

The adding/subtracting circuit $326_1$ constituting the first adding/subtracting circuit group 325 performs adding operations on eight pieces of data output sequentially from the MUX $324_1$ in a first order, fourth order, fifth order and eighth order and on eight pieces of data output sequentially from the MUX $324_2$ in the first order, fourth order, fifth order and eighth order and performs subtracting operations on eight pieces of data output sequentially from the MUX $324_1$ in a second order, third order, sixth order and seventh order and on eight pieces of data output sequentially from the MUX $324_2$ in the second order, third order, sixth order and seventh order. In the subtracting operations by the adding/subtracting circuit $326_1$, data output from the MUX $324_2$ is subtracted from data output from the MUX $324_1$.

The adding/subtracting circuit $326_2$ constituting the first adding/subtracting circuit group 325 performs adding operations on eight pieces of data output sequentially from the MUX $324_9$ in a first order, fourth order, fifth order and eighth order and on eight pieces of data output sequentially from the MUX $324_{16}$ in the first order, fourth order, fifth order and eighth order and performs subtracting operations on eight pieces of data output sequentially from the MUX $324_1$ in a second order, third order, sixth order and seventh order and on eight pieces of data output sequentially from the MUX $324_2$ in the second order, third order, sixth order and seventh order. In the subtracting operations by the adding/subtracting circuit $326_2$, data output from the MUX $324_{16}$ is subtracted from data output from the MUX $324_9$.

The MUX $28_1$ constituting the second MUX group 327, in the case of the 16-16 IDCT, selects sequentially eight pieces of data output from the MUX $324_9$ and, in the 2-8-16 IDCT, selects sequentially eight pieces of data output from the adding/subtracting circuit $326_2$. The MUX $28_2$, in the case of the 16-16 IDCT, sequentially selects eight pieces of data output from the MUX $324_{15}$ and, in the case of the 2-8-16 IDCT, selects "0" data eight times and outputs them. The MUX $28_3$, in the case of the 16-16 IDCT, selects sequentially eight pieces of data output from the MUX $324_{16}$ and outputs them and, in the case of the 2-8-16 IDCT, selects sequentially eight pieces of data output from the adding/subtracting circuit $324_{15}$ and sequentially outputs them.

The register $30_1$ constituting a second register group 329 stores sequentially eight pieces of operation results output in order from the adding/subtracting circuit $326_1$. The register $30_2$ stores eight pieces of data selected sequentially and output from the MUX $324_3$. The register $30_3$ stores eight pieces of data selected sequentially and output from the MUX $324_4$. The register $30_4$ stores eight pieces of data selected sequentially and output from the MUX $324_5$. The register $30_5$ stores eight pieces of data selected sequentially and output from the MUX $324_6$. The register $30_6$ stores eight pieces of data selected sequentially and output from the MUX $324_7$. The register $30_7$ stores eight pieces of data selected sequentially and output from the MUX $324_8$.

The register $30_8$ stores eight pieces of data selected sequentially and output from the MUX $28_1$. The register $30_9$ stores eight pieces of data selected sequentially and output from the MUX $324_{10}$. The register $30_{10}$ stores eight pieces of data selected sequentially and output from the MUX $324_{11}$. The register $30_{11}$ stores eight pieces of data selected sequentially and output from the MUX $324_{12}$. The register $30_{12}$ stores eight pieces of data selected sequentially and output from the MUX $324_{13}$. The register $30_{13}$ stores eight pieces of data selected sequentially and output from the MUX $324_{14}$. The register $30_{14}$ stores eight pieces of data selected sequentially and output from the MUX $28_2$. The register $30_{15}$ stores eight pieces of data selected sequentially and output from the MUX 283.

The $P_7$ coefficient multiplying circuit $232_1$ multiplies each of eight pieces of data output from the register $30_1$ by a fixed coefficient $P_7$. The $P_{11}$ coefficient multiplying circuit $232_2$ multiplies each of eight pieces of data output from the register $30_2$ by a fixed coefficient $P_{11}$. The $P_3$ coefficient multiplying circuit $232_3$ multiplies each of eight pieces of data output from the register $30_3$ by a fixed coefficient $P_3$. The $P_{13}$ coefficient multiplying circuit $232_4$ multiplies each of eight pieces of data output from the register $30_4$ by a fixed coefficient $P_{13}$. The $P_9$ coefficient multiplying circuit $232_5$ multiplies each of eight pieces of data output from the register $30_5$ by a fixed coefficient $P_9$. The $P_5$ coefficient multiplying circuit $232_6$ multiplies each of eight pieces of data output from the register $30_6$ by a fixed coefficient $P_5$. The $P_1$ coefficient multiplying circuit $232_7$ multiplies each of eight pieces of data output from the register $30_7$ by a fixed coefficient $P_1$.

The $P_{14}/P_7$ coefficient multiplying circuit $232_8$, in the case of the 16-16 DCT, multiplies each of eight pieces of data output sequentially from the register $30_8$ by a fixed coefficient $P_{14}$ and, in the case of the 2-8-16 DCT, multiplies each of the eight pieces of data output sequentially from the register $30_8$ by a fixed coefficient $P_7$. The $P_{12}/P_{11}$ coefficient multiplying circuit $232_9$, in the case of the 16-16 DCT, multiplies each of eight pieces of data output sequentially from the register $30_9$ by a fixed coefficient $P_{12}$ and, in the case of the 2-8-16 DCT, multiplies each of the eight pieces of data output sequentially from the register $30_9$ by a fixed coefficient $P_{11}$. The $P_{10}/P_3$ coefficient multiplying circuit $232_{10}$, in the case of the 16-16 DCT, multiplies each of eight pieces of data output sequentially from the register $30_{10}$ by a fixed coefficient $P_{10}$ and, in the case of the 2-8-16 DCT, multiplies each of the eight pieces of data output sequentially from the register $30_{10}$ by a fixed coefficient $P_3$. The $P_8/P_{13}$ coefficient multiplying circuit $232_{11}$, in the case of the 16-16 DCT, multiplies each of eight pieces of data output sequentially from the register $30_{11}$ by a fixed coefficient $P_8$ and, in the case of the 2-8-16 DCT, multiplies each of the eight pieces of data output sequentially from the register $30_{11}$ by a fixed coefficient $P_{13}$.

The $P_6/P_9$ coefficient multiplying circuit $232_{12}$, in the case of the 16-16 DCT, multiplies each of eight pieces of data output sequentially from the register $30_{12}$ by a fixed coefficient $P_6$ and, in the case of the 2-8-16 DCT, multiplies each of the eight pieces of data output sequentially from the register $30_{12}$ by a fixed coefficient $P_9$. The $P_4/P_5$ coefficient multiplying circuit $232_{13}$, in the case of the 16-16 DCT, multiplies each of eight pieces of data output sequentially from the register $30_{13}$ by a fixed coefficient $P_4$ and, in the case of the 2-8-16 DCT, multiplies each of the eight pieces of data output sequentially from the register $30_{13}$ by a fixed coefficient $P_5$.

The $P_2$ coefficient multiplying circuit $232_{14}$, in the case of the 16-16 DCT, multiplies each of eight pieces of data output sequentially from the register $30_{14}$ by a fixed coefficient $P_2$. The $P_0/P_1$ coefficient multiplying circuit $232_{15}$, in the case of the 16-16 DCT, multiplies each of eight pieces of data output sequentially from the register $30_{15}$ by a fixed coefficient $P_0$ and, in the case of the 2-8-16 DCT, multiplies each of the eight pieces of data output sequentially from the register $30_{15}$ by a fixed coefficient $P_1$.

The register $334_1$ constituting a fourth register group 333, in the case of both the 16-16 IDCT and the 2-8-16 IDCT, sequentially stores each of eight pieces of data output, in order, from the $P_7$ coefficient multiplying circuit $232_1$ and outputs data to be output sequentially in a first order to eighth order as positive values. The register $334_2$, in the case of both the 16-16 IDCT and the 2-8-16 IDCT, sequentially stores each of eight pieces of data output, in order, from the $P_{11}$ coefficient multiplying circuit $232_2$ and outputs data to be output sequentially in a first order, third order, sixth order and eighth order as positive values and outputs data to be output sequentially in a second order, fourth order, fifth order and seventh order as negative values. The register $334_3$, in the case of both the 16-16 IDCT and the 2-8-16 IDCT, sequentially stores each of eight pieces of data output, in order, from the $P_3$ coefficient multiplying circuit $232_3$ and outputs data to be output sequentially in a first order, second order and seventh order as positive values and outputs data to be output sequentially in a third order to sixth order and eighth order as negative values.

The register $334_4$ stores each of eight pieces of data output sequentially from the $P_{13}$ coefficient multiplying circuit $232_4$ and, in the case of the 16-16 IDCT, outputs data to be output in a first order, fourth order to seventh order as positive values and outputs data to be output in a second order, third order and eighth order as negative values, and in the case of the 2-8-16 IDCT, outputs data to be output in the first order, fifth order to seventh order as positive values and outputs data to be output in the second order to fourth order and eighth order as negative values. The register $334_5$ stores each of eight pieces of data output sequentially from the $P_9$ coefficient multiplying circuit $232_5$ and, in the case of the 16-16 IDCT, outputs data to be output in a first order to fourth order and seventh order as positive values and outputs data to be output in a fifth order, sixth order and eighth order as negative values, and in the case of the 2-8-16 IDCT, outputs data to be output in the first order to fourth order as positive values and outputs data to be output in the fifth order to eighth order as negative values. The register $334_6$ stores each of eight pieces of data output sequentially from the $P_5$ coefficient multiplying circuit $232_6$ and, in the case of the 16-16 IDCT, outputs data to be output in a first order, fifth order, seventh order and eighth order as positive values and outputs data to be output in a second order to fourth order and sixth order as negative values, and in the case of the 2-8-16 IDCT, outputs data to be output in the first order, third order, fifth order and seventh order as positive values and outputs data to be output in the second order, fourth order, sixth order and eighth order as negative values. The register $334_7$ stores each of eight pieces of data output sequentially from the $P_1$ coefficient multiplying circuit $232_7$ and, in the case of the 16-16 IDCT, outputs data to be output in a first order, third order, fourth order, seventh order and eighth order as positive values and outputs data to be output in a second order, fifth order and sixth order as negative values, and in the case of the 2-8-16 IDCT, outputs data to be output in the first order, third order, fourth order and seventh order as positive values and outputs data to be output in the second order, fifth order, sixth order and eighth order as negative values. The register $334_8$ stores each of eight pieces of data output sequentially from the $P_{14}/P_7$ coefficient multiplying circuit $232_8$ and, in the case of the 16-16 IDCT, outputs data to be output in a first order, third order to fifth order and seventh order as positive values and outputs data to be output in a second order, sixth order and eighth order as negative values, and in the case of the 2-8-16 IDCT, outputs data to be output in the first order to eighth order as positive values. The register $334_9$ stores each of eight pieces of data output sequentially from the $P_{12}/P_{11}$ coefficient multiplying circuit $232_9$ and, in the case of the 16-16 IDCT, outputs data to be output in a first order, second order, seventh order and eighth order as positive values and outputs data to be output in a second order to sixth order as negative values, and in the case of the 2-8-16 IDCT, outputs data to be output in the first order, third order, sixth order and eighth order as positive values and outputs data to be output in the second order, fourth order, fifth order and seventh order as negative values. The register $334_{10}$ stores each of eight pieces of data output sequentially from the $P_{10}/P_3$ coefficient multiplying circuit $232_{10}$ and, in the case of the 16-16 IDCT, outputs data to be output in a first order and third order as positive values and outputs data to be output in a second order, fourth order to eighth order as negative values, and in the case of the 2-8-16 IDCT, outputs data to be output in the first order, second order, seventh order and eighth order as positive values and outputs data to be output in the third order to sixth order as negative values. The register $334_{11}$ stores each of eight pieces of data output sequentially from the $P_8/P_{13}$ coefficient multiplying circuit $232_{11}$ and, in the case of the 16-16 IDCT, outputs data to be output in a first order, fourth order to sixth order and eighth order as positive values and outputs data to be output in a second order, third order and seventh order as negative values, and in the case of the 2-8-16 IDCT, outputs data to be output in the first order, fifth order to seventh order as positive values and outputs data to be output in the second to fourth order and eighth order as negative values. The register $334_{12}$ stores each of eight pieces of data output sequentially from the $P_6/P_9$ coefficient multiplying circuit $232_{12}$ and, in the case of the 16-16 IDCT, outputs data to be output in a first order to third order, fifth order and sixth order as positive values and outputs data to be output in a fourth order, seventh order and eighth order as negative values, and in the case of the 2-8-16 IDCT, outputs data to be output in the first order to fourth order as positive values and outputs data to be output in the fifth order to eighth order as negative values. The register $334_{13}$ stores each of eight pieces of data output sequentially from the $P_4/P_5$ coefficient multiplying circuit $232_{13}$ and, in the case of the 16-16 IDCT, outputs data to be output in a first order, third order, fifth order to eighth order as positive values and outputs data to be output in a second order and fourth order as negative values, and in the case of the 2-8-16 IDCT, outputs data to be output in the first order, third order, fifth order and seventh order as positive values and outputs data to be output in the second order, fourth order, sixth order and eighth order as negative values. The register $334_{14}$ stores each of eight pieces of data output sequentially from the P2 coefficient multiplying circuit $232_{14}$ and, in the case of both the 16-16 IDCT and the 2-8-16 IDCT, outputs data to be output in the first order, fourth order, sixth order and seventh order as positive values and outputs data output in a second order, third order, fifth order and eighth order as negative values. The register $334_{15}$ stores each of eight pieces of data output sequentially from the $P_0/P_1$ coefficient multiplying circuit $232_{15}$ and, in the case of the 16-16 IDCT, outputs data to be output in a first order to fourth order and sixth order to eighth order as positive values and outputs data to be output in a fifth order as negative values, and in the case of the 2-8-16 IDCT, outputs data to be output in the first order, third order, fourth order and seventh order as positive values and outputs data to be output in the second order, fifth order, sixth order and eighth order as negative values.

The adding circuit $338_3$, in the case of both the 16-16 IDCT and 2-8-16 IDCT, performs adding operations on eight pieces of data output sequentially from the register $334_1$ to register $334_7$. The register $40_3$ stores data output from the adding circuit $338_3$.

The adding circuit $338_4$, in the case of both the 16-16 IDCT and 2-8-16 IDCT, performs adding operations on eight pieces of data output sequentially from the register $334_8$ to register $334_{15}$. The register $40_4$ stores data output from the adding circuit $36_4$.

Data from the register $40_3$ is fed to a summand input of the adding circuit 44 and a minuend input of the subtracting circuit 42 and data from the register $40_4$ is fed to a summand input of the adding circuit 44 and to a minuend input of the subtracting circuit 42. Data output from the subtracting circuit 42 is fed to the register 46 contained in the sixth register group 45 and data output from the adding circuit 44 is fed to the register 48 contained in the sixth register group 45. Other configurations of the fourth embodiment are same as those in the third embodiment and same reference numbers as given to FIG. 13 and FIG. 14 are assigned to components shown in FIG. 15 and FIG. 16, and related descriptions are omitted.

Operations in the fourth embodiment will be described by referring to FIG. 15 and FIG. 16. First, the operations for the 16-16 DCT will be explained.

Each of sixteen pieces of picture element data $f_0$ to picture element data $f_{15}$ for each string constituting the 16×16 transformation coefficient data transmitted after being compressed by performing the 16-16 DCT on the 16×16 picture elements sequentially from the MUX 312, is stored into each of register $14_1$ to register $14_{16}$ constituting the first register group 313 which corresponds to each of sixteen pieces of data $F_0$ to data $F_{15}$.

Since the MUXs $16_1$ to $16_8$, $16_{92}$, $16_{102}$, $16_{112}$, $16_{122}$, $16_{132}$, $16_{142}$, $16_{152}$, $16_{162}$ have selected "0" data respectively, and the MUXs $16_{91}$, $16_{101}$, $16_{111}$, $16_{121}$, $16_{131}$, $16_{141}$, $16_{151}$ and $16_{161}$ have selected the registers $14_3$, $14_7$, $14_9$, $14_{13}$, $14_4$, $14_{10}$ and $14_{14}$, respectively, data $F_0=h_0$ is output from the adding circuit $18_1$, data $F_2=h_2$ from the adding circuit $18_2$, data $F_4=h_4$ from the adding circuit $18_3$, data $F_6=h_6$ from the adding circuit $18_4$, data $F_8=h_8$ from the adding circuit $18_5$, data $F_{10}=h_1$ from the adding circuit $18_5$, data $F_{10}=h_{10}$ from the adding circuit $18_6$, data $F_{12}=h_{12}$ from the adding circuit $18_7$, data $F_{14}=h_{14}$ from the adding circuit $18_8$, data $F_1=h_1$ from the subtracting circuit $20_1$, data $F_3=h_3$ from the subtracting circuit $20_2$, data $F_5=h_5$ from the subtracting circuit $20_3$, data $F_7=h_7$ from the subtracting circuit $20_4$, data $F_9=h_9$ from the subtracting circuit $20_5$, data $F_{11}=h_{11}$ from the subtracting circuit $20_6$, data $F_{13}=h_{13}$ from the subtracting circuit $20_7$ and data $F_{15}=h_{15}$ from the subtracting circuit $20_8$.

Data $h_0$ output from the adding circuit $18_1$ is stored into the register $22_1$, data $h_2$ output from the adding circuit $18_2$ is stored into the register $22_2$, data $h_4$ output from the adding circuit $18_3$ is stored into the register $22_3$, data $h_6$ output from the adding circuit $18_4$ is stored into the register $22_4$, data $h_8$ output from the adding circuit $18_5$ is stored into the register $22_5$, data $h_{10}$ output from the adding circuit $18_6$, data $h_{12}$ output from the register $22_6$ is stored into the adding circuit $18_7$ and $h_{14}$ output from the register $22_7$ is stored into the adding circuit $18_8$.

Data $h_1$ output from the subtracting circuit $20_1$ is stored into the register $22_9$, data $h_3$ output from the subtracting circuit $20_2$ is stored into the register $22_{10}$, data $h_5$ output from the subtracting circuit $20_3$ is stored into the register $22_{11}$, data $h_7$ output from the subtracting circuit $20_4$ is stored into the register $22_{12}$, data $h_9$ output from the subtracting circuit $20_6$ is stored into the register $22_{13}$, data $h_{11}$ output from the subtracting circuit $20_7$ is stored into the register $22_{15}$ and data $h_{15}$ output from the subtracting circuit $20_8$ is stored into the register $22_{16}$.

Data $h_0$ output from the register $22_1$ is selected by the MUX $324_1$ in every operation cycle out of eight operation cycles and is fed to the adding/subtracting circuit $326_1$, and data $h_8$ output from the register $22_5$ is selected by the MUX $324_2$ in every operation cycle out of eight operation cycles and is fed to the adding/subtracting circuit $326_1$ and then each of data $h_0+h_8$, data $h_0-h_8$, data $h_0-h_8$, data $h_0+h_8$, data $h_0+h_8$, data $h_0-h_8$, data $h_0-h_8$ and data $h_0+h_8$ is output from the adding/subtracting circuit $326_1$ sequentially in every operation cycle out of eight operation cycles and is stored into the register $30_1$. Data $h_0$, $h_2$, $h_4$, $h_6$, $h_8$, $h_{10}$, $h_{12}$ and $h_{14}$ output from the register $22_1$ to register $22_8$ in every operation cycle out of eight operation cycles is selected by the MUX $324_3$ in every operation cycle out of the eight operation cycles and each of data $h_4$, $h_{12}$, $h_{12}$, $h_4$, $h_4$, $h_{12}$, $h_{12}$ and $h_4$ is output sequentially from the MUX $324_3$ and stored into the register $30_2$. Data $h_0$, $h_2$, $h_4$, $h_6$, $h_8$, $h_{10}$, $h_{12}$ and $h_{14}$ output from the register $22_1$ to register $22_8$ in every operation cycle out of eight operation cycles is selected by the MUX $324_4$ in every operation cycle out of the eight operation cycles and each of data $h_{12}$, $h_4$, $h_4$, $h_{12}$, $h_{12}$, $h_4$, $h_4$ and $h_{12}$ is output sequentially from the MUX $324_4$ and stored into the register $30_3$. Data $h_0, h_2, h_4, h_6, h_8, h_{10}, h_{12}$ and $h_{14}$ output from the register $22_1$ to register $22_8$ in every operation cycle out of eight operation cycles is selected by the MUX $324_5$ in every operation cycle out of the eight operation cycles and each of data $h_2, h_{10}, h_6, h_{14}, h_{14}, h_6, h_{10}$ and $h_2$ is output sequentially from the MUX $324_4$ and stored into the register $30_4$. Data $h_0, h_2, h_4, h_6, h_8, h_{10}, h_{12}$ and $h_{14}$ output from the register $22_1$ to register $22_8$ in every operation cycle out of eight operation cycles is selected by the MUX $324_6$ in every operation cycle out of the eight operation cycles and each of data $h_6, h_2, h_{14}, h_{10}, h_{10}, h_{14}, h_2$ and $h_6$ is output sequentially from the MUX $324_4$ and stored into the register $30_5$. Data $h_0, h_2, h_4, h_6, h_8, h_{10}$ of $h_{12}$ and $h_{14}$ output from the register $22_1$ to register $22_8$ in every operation cycle out of eight operation cycles is selected by the MUX $324_7$ in every operation cycle out of the eight operation cycles and each of data $h_{10}, h_{14}, h_2, h_6, h_6, h_2, h_{14}$ and $h_{10}$ is output sequentially from the MUX $324_7$ and stored into the register $30_5$. Data $h_0, h_2, h_4, h_6, h_8, h_{10}, h_{12}$ and $h_{14}$ output from the register $22_1$ to register $22_8$ in every operation cycle out of 8 operation cycles is selected by the MUX $324_8$ in every operation cycle out of the eight operation cycles and each of data $h_{14}, h_6, h_{10}, h_2, h_2, h_{10}, h_6$ and $h_{14}$ is output sequentially from the MUX $324_7$ and stored into the register $30_7$.

Data $h_1, h_3, h_5, h_7, h_9, h_{11}, h_{13}$ and $h_{15}$ output from the register $22_9$ to register $22_{16}$ in every operation cycle out of eight operation cycles is selected by the MUX $324_9$ in every operation cycle out of the eight operation cycles and each of data $h_1, h_{11}, h_{13}, h_9, h_7, h_3, h_5$ and $h_{15}$ is output sequentially from the MUX $324_9$ and stored into the register $30_8$. Data $h_1, h_3, h_5, h_7, h_9, h_{11}, h_{13}$ and $h_{15}$ output from the register $22_9$ to register $22_{16}$ in every operation cycle out of eight operation cycles is selected by the MUX $324_{12}$ in every operation cycle out of the eight operation cycles and each of data $h_7, h_{13}, h_5, h_1, h_{15}, h_{11}, h_3$ and $h_9$ is output sequentially from the MUX $324_{12}$ and stored into the register $30_{11}$. Data $h_1, h_3, h_5, h_7, h_9, h_1, h_{13}$ and $h_{15}$ output from the register $22_9$ to register $22_{16}$ in every operation cycle out of eight operation cycles is selected by the MUX $324_{12}$ in every operation cycle out of the eight operation cycles and each of data $h_9, h_3, h_{11}, h_{15}, h_1, h_5, h_{13}$ and $h_7$ is output sequentially from the MUX $324_{13}$ and stored into the register $30_{12}$. Data $h_1, h_3, h_5, h_7, h_9, h_{11}, h_{13}$ and $h_{15}$ output from the register $22_9$ to register $22_{16}$ in every operation cycle out of eight operation cycles is selected by the MUX $324_{14}$ in every operation cycle out of the eight operation cycles and each of data $h_{11}, h_7, h_{15}, h_3, h_{13}, h_1, h_9$ and $h_5$ is output sequentially from the MUX $324_{14}$ and stored into the register $30_{13}$. Data $h_1, h_3, h_5, h_7, h_9, h_{11}, h_{13}$ and $h_{15}$ output from the register $22_9$ to register $22_{16}$ in every operation cycle out of eight operation cycles is selected by the MUX $324_{15}$ in every operation cycle out of the eight operation cycles and each of data $h_{13}, h_{15}, h_9, h_{11}, h_5, h_7, h_1$ and $h_3$ is output sequentially from the MUX $324_{15}$ and stored into the register $30_{14}$. Data $h_1, h_3, h_5, h_7, h_9, h_{11}, h_{13}$ and $h_{15}$ output from the register $22_9$ to register $22_{16}$ in every operation cycle out of eight operation cycles is selected by the MUX $324_{16}$ in every operation cycle out of the eight operation cycles and each of data $h_{15}, h_5, h_3, h_7, h_9, h_{13}, h_{11}$ and $h_1$ is output sequentially from the MUX $324_{15}$ and stored into the register $30_{15}$.

Each of data output from the register $30_1$ to register $30_7$ in every operation cycle out of eight operation cycles is multiplied by a corresponding coefficient $P_7, P_{11}, P_3, P_{13}, P_9, P_5$ and $P_1$ in the corresponding fixed coefficient multiplying circuit $232_1$ to fixed coefficient multiplying circuit $232_7$ in every operation cycle out of the eight operation cycles and stored into the register $334_1$ to register $334_7$. Each of data stored into each of the corresponding register $334_1$ to register $334_7$ undergoes adding operations in the adding circuit $338_3$ in every operation cycle out of the eight operation cycles and is stored in the register $40_3$.

Data on which adding operations are performed in a first operation cycle out of the eight operation cycles in the adding circuit $338_3$ and which is stored into the register $40_3$ is $(h_0+h_8)P_7+h_4P_{11}+h_{12}P_3+h_2P_{13}+h_6P_6+h_{10}P_5+h_{14}P_1$. Data stored in the register $40_3$ in the first operation cycle is the operation value $f_0+f_8$ in the equation (69). Data on which adding operations are performed in a second operation cycle out of the eight operation cycles in the adding circuit $338_3$ and which is stored into the register $40_3$ is $(h_0-h_8)P_7-h_{12}P_{11}+h_4P_3-h_{10}P_{13}+h_2P_9-h_{14}P_5-h_6P_1$. Data stored in the register $40_3$ in the second operation cycle is the operation value $f_1+f_9$ in the equation (69). Data on which adding operations are performed in a third operation cycle out of the eight operation cycles in the adding circuit $338_3$ and which is stored into the register $40_3$ is $(h_0-h_8)P_7+h_{12}P_{11}-h_4P_3-h_6P_{13}+h_1P_9-h_2P_5+h_{10}P_1$. Data stored in the register $40_3$ in the third operation cycle is the operation value $f_2+f_{10}$ in the equation (69). Data on which adding operations are performed in the third operation cycle out of the eight operation cycles in the adding circuit $338_3$ and which is stored into the register $40_3$ is $(h_0+h_8)P_7-h_4P_{11}-h_{12}P_3+h_{14}\ P_{13}+h_{10}P_9-h_6P_5+h_2P_1$. Data stored in the register $40_3$ in the third operation cycle is the operation value $f_3+f_{11}$ in the equation (69). Data on which adding operations are performed in the fifth operation cycle out of the eight operation cycles in the adding circuit $338_3$ and which is stored into the register $40_3$ is $(h_0+h_8)P_7-h_4P_{11}-h_{12}P_3+h_{14}P_{13}-h_{10}P_9+h_6P_5-h_2P_1$. Data stored in the register $40_3$ in the fifth operation cycle is the operation value $f_4+f_{12}$ in the equation (69). Data on which adding operations are performed in the sixth operation cycle out of the eight operation cycles in the adding circuit $338_3$ and which is stored into the register $40_3$ is $(h_0-h_8)P_7+h_{12}P_{11}-h_4P_3+h_6P_{13}-h_{14}P_9-h_2P_5-h_{10}P_1$. Data stored in the register $40_3$ in the fifth operation cycle is the operation value $f_5+f_{13}$ in the equation (69). Data on which adding operations are performed in the seventh operation cycle out of the eight operation cycles in the adding circuit $338_3$ and which is stored into the register $40_3$ is $(h_0-h_8)P_7-h_{12}P_{11}+h_4P_3+h_{10}P_{13}+h_2P_9+h_{14}P_5+h_6P_1$. Data stored in the register $40_3$ in the fifth operation cycle is the operation value $f_6+f_{14}$ in the equation (69). Data on which adding operations are performed in the eighth operation cycle out of the eight operation cycles in the adding circuit $338_3$ and which is stored into the register $40_3$ is $(h_0+h_8)P_7+h_4P_{11}-h_{12}P_3-h_2P_{13}-h_6P_9+h_{10}P_5+h_{14}P_1$. Data stored in the register $40_3$ in the eighth operation cycle is the operation value $f_7+f_{15}$ in the equation (69).

Each of data output from the register $30_8$ to register $30_{15}$ in every operation cycle out of eight operation cycles is multiplied by a corresponding coefficient $P_{14}, P_{12}, P_{10}, P_8, P_4, P_2$ and $P_0$ in the corresponding fixed coefficient multiplying circuit $232_8$ to fixed coefficient multiplying circuit $232_{15}$ in every operation cycle out of the eight operation cycles and stored into the register $334_8$ to register $334_{15}$. Each of data stored into each of the corresponding register $334_8$ to register $334_{15}$ undergoes adding operations in the adding circuit $338_4$ in every operation cycle out of the eight operation cycles and is stored in the register $40_4$.

Data on which adding operations are performed in a second operation cycle out of the eight operation cycles in the adding circuit $338_4$ and which is stored into the register $40_3$ is $-h_1P_{14}+h_1P_{12}-h_9P_{10}-h_{13}P_8+h_3P_6-h_7P_4-h_{15}P_2+h_5P_0$. Data stored in the register $40_4$ in the second operation cycle is the operation value $f_1-f_9$ in the equation (69). Data on which adding operations are performed in a third operation cycle out of the eight operation cycles in the adding circuit $338_4$ and which is stored into the register $40_4$ is $h_{13}P_{14}-h_7P_{12}+h_1P_{10}-h_5P_8+h_{11}P_6+h_{15}P_4-h_9P_2+h_3P_0$. Data stored in the register $40_4$ in the third operation cycle is the operation value $f_2-f_{10}$ in the equation (69). Data on which adding operations are performed in a fourth operation cycle out of the eight operation cycles in the adding circuit $338_4$ and which is stored into the register $40_4$ is $h_9P_{14}-h_5P_{12}-h_{13}P_{10}+h_1P_8-h_{15}P_6-h_3P_4+h_{11}P_2+h_7P_0$. Data stored in the register $40_4$ in the fourth operation cycle is the operation value $f_3-f_{11}$ in the equation (69). Data on which adding operations are performed in a fifth operation cycle out of the eight operation cycles in the adding circuit $338_4$ and which is stored into the register $40_4$ is $h_7P_{14}-h_{11}P_{12}-h_3P_{10}+h_{15}P_8+h_1P_6+h_{13}P_4-h_5P_2-h_9P_0$. Data stored in the register $40_4$ in the fifth operation cycle is the operation value $f_4-f_{12}$ in the equation (69). Data on which adding operations are performed in a sixth operation cycle out of the eight operation cycles in the adding circuit $338_4$ and which is stored into the register $40_4$ is $-h_3P_{14}-h_9P_{12}-h_{15}P_{10}+h_{11}P_8+h_5P_6+h_1P_4+h_7P_2+h_{13}P_0$. Data stored in the register $40_4$ in the sixth operation cycle is the operation value $f_5-f_{13}$ in the equation (69). Data on which adding operations are performed in a seventh operation cycle out of the eight operation cycles in the adding circuit $338_4$ and which is stored into the register $40_4$ is $h_5P_{14}+h_{15}P_{12}-h_7P_{10}-h_3P_8-h_{13}P_6+h_9P_4+h_1P_2+h_{11}P_0$. Data stored in the register $40_4$ in the seventh operation cycle is the operation value $f_6-f_{14}$ in the equation (69). Data on which adding operations are performed in a eighth operation cycle out of the eight operation cycles in the adding circuit $338_4$ and which is stored into the register $40_4$ is $-h_{15}P_{14}+h_{13}P_{12}-h_{11}P_{10}+h_9P_8-h_7P_6+h_5P_4-h_3P_2+h_1P_0$. Data stored in the register $40_4$ in the eighth operation cycle is the operation value $f_7-f_{15}$ in the equation (69).

Adding operations are performed on eight pieces of data output sequentially from the register $40_3$ and on eight pieces of data output sequentially from the register $40_4$ in the adding circuit 42 and the resulting data $f_0, f_1, f_2, f_3, f_4, f_5, f_6$ and $f_7$ are output from the adding circuit 42 and then is stored sequentially into the register 46. The data $f_0, f_1, f_2, f_3, f_4, f_5, f_6$ and $f_7$ are shown in a lower part of an output line of the register 46 in FIG. 16. Adding operations are performed on eight pieces of data output sequentially from the register $40_3$ and on eight pieces of data output sequentially from the register $40_4$ in the adding circuit 44 and the resulting data $f_8, f_9, f_{10}, f_{11}, f_{12}, f_{13}, f_{14}$ and $f_{15}$ are output from the adding circuit 44 and then is stored sequentially into the register 46. The data $f_8, f_9, f_{10}, f_{11}, f_{12}, f_{13}, f_{14}$ and $f_{15}$ are shown in a lower part of an output line of the register 46 in FIG. 16.

By completing the above arithmetic operations, the primary 16-16 IDCT on sixteen pieces of data in one string constituting the 16×16 data block transmitted after having undergone the DCT is terminated. The same primary 16-16 IDCT as described above is performed on each of strings subsequent to a next string constituting the 16×16 data block and thereafter, and the primary 16-6 IDCT on all sixteen string constituting the 16×16 data block is terminated in the similar manner. After the completion of the primary 16-16 IDCT on the all sixteen strings, a secondary 16-16 IDCT is performed on each string of sixteen data strings constituting the 16×16 data block (transposed data for DCT). By completing the secondary 16-16 IDCT, original image pictures transmitted after having undergone the 16-16 DCT can be reproduced.

Next, the operations for the 2-8-16 IDCT will be explained.

Each of sixteen pieces of picture element data $f_0$ to picture element data $f_{15}$ contained in each string constituting the block composed of 16×16 pieces of data transmitted after having undergone the 16-16 DCT on the 16×16 picture elements sequentially from the MUX 312, is stored into each of register $14_1$ to register $14_{16}$ constituting the first register group 313 which corresponds to each of sixteen pieces of data $F_0$ to data $F_{15}$.

Data $F_0$ out of sixteen pieces of data $F_0$ to data $F_{15}$ is stored into the register $14_1$ constituting a first register group 313, data $F_8$ into the register $14_2$, data $F_1$ into the register $14_3$, data $F_9$ into the register $14_4$, data $F_2$ into the register $14_5$, data $F_{10}$ into the register $14_6$, data $F_3$ into the register $14_7$, data $F_{11}$ into the register $14_8$, data $F_5$ into the register $14_9$, data $F_{13}$ into the register $14_{10}$, data $F_6$ into the register $14_{11}$, data $F_{14}$ into the register $14_{12}$, data $F_7$ into the register $14_{13}$, data $F_{15}$ into the register $14_{14}$, data $F_4$ into the register $14_{15}$ and data $F_{12}$ into the register $14_{16}$.

Since the MUXs $16_1$ to $16_8$, $16_{92}$, $16_{102}$, $16_{112}$, $16_{122}$, $16_{132}$, $16_{142}$, $16_{152}$ and $16_{162}$ have selected the registers $14_2$, $14_4$, $14_6$, $14_8$, $14_{10}$, $14_{12}$, $14_{14}$ and $14_{16}$ respectively, and the MUX $16_{91}$, $16_{101}$, $16_{111}$, $16_{121}$, $16_{131}$, $16_{141}$, $16_{151}$ and $16_{161}$ have selected the registers $14_1$, $14_3$, $14_5$, $14_7$, $14_9$, $14_{11}$, $14_{13}$ and $14_{14}$ respectively, data $F_0+F_8=i_0$ is output from the adding circuit $18_1$, data $F_1+F_9=i_1$ from the adding circuit $18_2$, data $F_2+F_{10}=i_2$ from the adding circuit $18_3$, data $F_3+F_{11}=i_3$ from the adding circuit $18_4$, data $F_5+F_{13}=i_4$ from the adding circuit $18_5$, data $F_6+F_{14}=i_5$ from the adding circuit $18_6$, data $F_7+F_{15}=i_6$ from the adding circuit $18_7$, data $F_4+F_{12}=i_7$ from the adding circuit $18_8$, $F_0-F_8=i_8$ from the subtracting circuit $20_1$, data $F_1-F_9=i_9$ from the subtracting circuit $20_2$, $F_2-F_{10}=i_{10}$ from the subtracting circuit $20_3$, data $F_3-F_{11}=i_{11}$ from the subtracting circuit $20_4$, data $F_5-F_{13}=i_{12}$ from the subtracting circuit $20_5$, data $F_6-F_{14}=i_{13}$ from the subtracting circuit $20_6$, $F_7-F_{15}=i_{14}$ from the subtracting circuit $20_7$ and $F_4-F_{12}=i_{15}$ from the subtracting circuit $20_8$.

Data $i_0$ output from the adding circuit $18_1$ is stored into the register $22_1$, data $i_1$ is output from the adding circuit $18_2$ is stored into the register $22_2$, data $i_2$ output from the adding circuit $18_3$ is stored into the register $22_3$, data $i_3$ output from the adding circuit $18_4$ is stored into the register $22_4$, data $i_4$ output from the adding circuit $18_5$ is stored into the register $22_5$, data $i_5$ output from the adding circuit $18_6$ is stored into the register $22_6$, data $i_6$ output from the adding circuit $18_7$ is stored into the register $22_7$ and data $i_7$ output from the adding circuit $18_8$ is stored into the register $22_8$.

Data $i_8$ output from the subtracting circuit $20_1$ is stored into the register $22_9$, data $i_9$ output from the subtracting circuit $20_2$ is stored into the register $22_{10}$, data $i_{10}$ output from the subtracting circuit $20_3$ is stored into the register $22_{11}$, data $i_{11}$ output from the subtracting circuit $20_4$ is stored into the register $22_{12}$, data $i_{12}$ output from the subtracting circuit $20_5$ is stored into the register $22_{13}$, data $i_{13}$ output from the subtracting circuit $20_6$ is stored into the register $22_{14}$, data $i_{14}$ output from the subtracting circuit $20_7$ iS stored into the register $22_{15}$ and data $i_{15}$ output from the subtracting circuit $20_8$ is stored into the register $22_{16}$.

Data $i_0$ to data $i_8$ output from the register $22_1$ to register $22_8$ in every operation cycle out of eight operation cycles is selected in the MUX $324_1$ in every operation cycle out of the eight operation cycles, and the data $i_0$ is output sequentially from the MUX $324_1$ eight times and is fed to the adding/subtracting circuit $326_1$. Data $i_0$ to data $i_7$ output from the register $22_1$ to register $22_8$ in every operation cycle out of eight operation cycles is selected in the MUX $324_2$ in every operation cycle out of the eight operation cycles, and the data $i_7$ is output sequentially from the MUX $324_2$ eight times and is fed to the adding/subtracting circuit $326_1$ and each of data $i_0+i_7$, $i_0-i_7$, $i_0-i_7$, $i_0+i_7$, $i_0+i_7$, $i_0-i_7$, $i_0-i_7$ and $i_0+i_7$ is output sequentially from the adding/subtracting circuit $326_1$ in every operation cycle out of the eight operation cycles and stored into the register $30_1$.

Each of data $i_0$ to data $i_7$ output from the register $22_1$ to register $22_8$ in every operation cycle out of eight operation cycles is selected in the MUX $324_3$ in every operation out of the eight operation cycles and each of data $i_2$, $i_5$, $i_5$, $i_2$, $i_2$, $i_5$, $i_5$ and $i_2$ is output sequentially and stored into the register $30_2$. Each of data $i_0$ to data $i_7$ output from the register $22_1$ to register $22_8$ in every operation cycle out of the eight operation cycles is selected in the MUX $324_4$ in every operation out of the 8 operation cycles and each of data $i_5$, $i_2$, $i_2$, $i_5$, $i_5$, $i_2$, $i_2$ and $i_5$ is output sequentially and stored into the register $30_3$. Each of data $i_0$ to data $i_7$ output from the register $22_1$ to register $22_8$ in every operation cycle out of the eight operation cycles is selected in the MUX $324_5$ in every operation out of the eight operation cycles and each of data $i_1$, $i_4$, $i_3$, $i_6$, $i_6$, $i_3$, $i_4$ and $i_1$ is output sequentially and stored into the register $30_4$. Each of data $i_0$ to data $i_7$ output from the register $22_1$ to register $22_8$ in every operation cycle out of the eight operation cycles is selected in the MUX $324_6$ in every operation out of the eight operation cycles and each of data $i_3$, $i_1$, $i_6$, $i_4$, $i_4$, $i_6$, $i_1$ and $i_3$ is output sequentially and stored into the register $30_5$. Each of data $i_0$ to $i_7$ output from the register $22_1$ to register $22_8$ in every operation cycle out of the eight operation cycles is selected in the MUX $324_7$ in every operation out of the eight operation cycles and each of data $i_4$, $i_6$, $i_1$, $i_3$, $i_3$, $i_1$, $i_6$ and $i_4$ is output sequentially and stored into the register $30_6$. Each of data $i_0$ to $i_7$ output from the register $22_1$ to register $22_8$ in every operation cycle out of the eight operation cycles is selected in the MUX $324_8$ in every operation out of the eight operation cycles and each of data $i_6$, $i_3$, $i_4$, $i_1$, $i_1$, $i_4$, $i_3$ and $i_6$ is output sequentially and stored into the register $30_7$.

Each of data $i_8$ to data $i_{15}$ output from the register $22_9$ to register $22_{16}$ in every operation cycle out of eight operation cycles is selected in the MUX $324_9$ in every operation cycle out of the eight operation cycles, and data $i_8$ is sequentially output from the MUX $324_9$ eight times and fed to the adding/subtracting circuit $326_1$ while each of data $i_8$ to data $i_{15}$ output from the register $22_9$ to register $22_{16}$ is selected in the MUX $324_{16}$ in every operation cycle out of the eight operation cycles and data $i_{15}$ is sequentially output from the MUX $324_{16}$ eight times and is fed to the adding/subtracting circuit $326_1$, and each of data $i_8+i_{15}$, data $i_8-i_{15}$, data $i_8-i_{15}$, data $i_8+i_{15}$, data $i_8+i_{15}$, data $i_8-i_{15}$ and data $i_8+i_{15}$ is output sequentially in every operation cycle out of the eight operation cycles and stored into the register $30_8$ through the MUX $28_1$.

Each of data $i_8$ to data $i_{15}$ output from the register $22_9$ to register $22_{16}$ in every operation cycle out of eight operation cycles is selected in the MUX $324_{10}$ in every operation cycle out of the eight operation cycles and each of data $i_{10}$, $i_{13}$, $i_{13}$, $i_{10}$, $i_{10}$, $i_{13}$, $i_{13}$ and $i_{10}$ is output sequentially from the MUX $324_{10}$ and stored into the register $30_9$.

Each of data $i_8$ to data $i_{15}$ output from the register $22_9$ to register $22_{16}$ in every operation cycle out of eight operation cycles is selected in the MUX $324_{11}$ in every operation cycle out of the eight operation cycles and each of data $i_{13}$, $i_{10}$, $i_{10}$, $i_{13}$, $i_{13}$, $i_{10}$, $i_{10}$ and $i_{13}$ is output sequentially from the MUX $324_{11}$ and stored into the register $30_{10}$. Each of data $i_8$ to data $i_{15}$ output from the register $22_9$ to register $22_{16}$ in every operation cycle out of eight operation cycles is selected in the MUX $324_{12}$ in every operation cycle out of the 8 operation cycles and each of data $i_9$, $i_{12}$, $i_{11}$, $i_{14}$, $i_{14}$, $i_{11}$, $i_{12}$ and $i_{15}$ output sequentially from the MUX $324_{12}$ and stored into the register $30_{11}$. Each of data $i_8$ to data $i_{15}$ output from the register $22_9$ to register $22_{16}$ in every operation cycle out of eight operation cycles is selected in the MUX $324_{12}$ in every operation cycle out of the eight operation cycles and each of data $i_9$, $i_{12}$, $i_{11}$, $i_{14}$, $i_{14}$, $i_{11}$, $i_{12}$ and $i_9$ is output sequentially from the MUX $324_{12}$ and stored into the register $30_{11}$. Each of data $i_8$ to data $i_{15}$ output from the register $22_9$ to register $22_{16}$ in every operation cycle out of eight operation cycles is selected in the MUX $324_{14}$ in every operation cycle out of the eight operation cycles and each of data $i_{12}$, $i_{14}$, $i_9$, $i_{11}$, $i_{11}$, $i_{19}$, $i_{14}$ and $i_{12}$ is output sequentially from the MUX $324_{13}$ and stored into the register $30_{11}$.

Each of data $i_8$ to data $i_{15}$ output from the register $22_9$ to register $22_{16}$ in every operation cycle out of eight operation cycles is selected in the MUX $324_{15}$ in every operation cycle out of the eight operation cycles and each of data $i_{14}$, $i_{11}$, $i_{12}$, $i_9$, $i_9$, $i_{12}$, $i_{11}$ and $i_{14}$ is output sequentially from the MUX $324_{15}$ and stored into the register $30_{15}$ through the MUX $28_3$. Since the MUX $28_2$ has selected "0" data, all data output from the MUX $324_{15}$ are stored as "0" data into the register $334_{14}$.

Each of data output from the register $30_1$ to register $30_7$ in every operation cycle out of eight operation cycles undergoes adding operations in the adding circuit $338_3$ in every operation cycle out of the eight operation cycles and is stored into the register $40_3$. Data that undergoes adding operations in the adding circuit $338_3$ in a first operation cycle out of the eight operation cycles and is stored in the register $40_3$ is $(i_0+i_7)P_7+i_2P_{11}+i_5P_3+i_1P_{13}+i_{13}P_9+i_4P_5+i_6P_1$. Data stored into the register $40_3$ in the first operation cycle represents the operation value $f_0$ in the equation (70) which is shown as $f_0$ in a lower part of the output line of the register $40_3$ in FIG. 16. Data that undergoes adding operations in the adding circuit $338_3$ in a second operation cycle out of the eight operation cycles and is stored in the register $40_3$ is $(i_0-i_7)P_7-i_5P_{11}+i_2P_3-i_4P_{13}+i_1P_9-i_6P_5-i_3P_1$. Data stored into the register $40_3$ in the second operation cycle represents the operation value $f_0$ in the equation (70) which is shown as $f_2$ in a lower part of an output line of the register $40_3$ in FIG. 16. Data that undergoes adding operations in the adding circuit $338_3$ in a third operation cycle out of the eight operation cycles and is stored in the register $40_3$ is $(i_0-i_7)P_7+i_5P_{11}-i_2P_3-i_3P_{13}+i_6P_9+i_1P_5+i_4P_1$. Data stored into the register $40_3$ in the third operation cycle represents the operation value $f_4$ in the equation (70) which is shown as $f_2$ in a lower part of an output line of the register $40_3$ in FIG. 16. Data that undergoes adding operations in the adding circuit $338_3$ in a fourth operation cycle out of the eight operation cycles and is stored in the register $40_3$ is $(i_0+i_7)P_7-i_2P_{11}-i_5P_3-i_6P_{13}+i_4P_9-i_3P_5+i_1P_1$. Data stored into the register $40_3$ in the fourth operation cycle represents the operation value $f_6$ in the equation (70) which is shown as $f_6$ in a lower part of the output line of the register $40_3$ in FIG. 16. Data that undergoes adding operations in the adding circuit $338_3$ in a fifth operation cycle out of the eight operation cycles and is stored in the register $40_3$ is $(i_0+i_7)P_7-i_2P_{11}-i_5P_3-i_6P_{13}-i_4P_9+i_3P_5-i_1P_1$. Data stored into the register $40_3$ in the fifth operation cycle represents the operation value $f_8$ in the equation (70) which is shown as $f_8$ in the lower part of the output line of the register $40_3$ in FIG. 16. Data that undergoes adding operations in the adding circuit $338_3$ in a sixth operation cycle out of the eight operation cycles and is stored in the register $40_3$ is $(i_0-i_7)P_7+i_5P_{11}-i_2P_3+i_6P_{13}-i_6P_9-i_1P_5-i_4P_1$. Data stored into the register $40_3$ in the sixth operation cycle represents the operation value $f_{10}$ in the equation (70) which is shown as $f_{10}$ in the lower part of the output line of the register $40_3$ in FIG. 16. Data that undergoes adding operations in the adding circuit $338_3$ in a seventh operation cycle out of the eight operation cycles and is stored in the register $40_3$ is ($i_0-i_7$) $P_7-i_5P_{11}+i_2P_3+i_4P_{13}-i_1P_9+i_6P_5+i_3P_1$. Data stored into the register $40_3$ in the sixth operation cycle represents the operation value $f_{12}$ in the equation (70) which is shown as $f_{12}$ in the lower part of the output line of the register $40_3$ in FIG. 16. Data that undergoes adding operations in the adding circuit $338_3$ in an eighth operation cycle out of the eight operation cycles and is stored in the register $40_3$ is ($i_0+i_7$) $P_7+i_2P_{11}-i_5P_3-i_1P_{13}-i_3P_9-i_4P_5-i_6P_1$. Data stored into the register $40_3$ in the eighth operation cycle represents the operation value $f_{14}$ in the equation (70) which is shown as $f_{14}$ in the lower part of the output line of the register $40_3$ in FIG. 16.

Each of data output from the register $334_8$ to register $334_{15}$ in every operation cycle out of eight operation cycles undergoes adding operations in the adding circuit $338_4$ in every operation cycle out of the eight operation cycles and is stored into the register $40_4$.

Data that undergoes adding operations in the adding circuit $338_4$ in a first operation cycle out of the eight operation cycles and is stored in the register $40_4$ is ($i_8+i_{15}$) $P_7+i_{10}P_{11}+i_{13}P_3+i_9P_{13}+i_{11}P_9+i_{12}P_5+i_{14}P_1$. Data stored into the register $40_4$ in the first operation cycle represents the operation value $f_1$ in the equation (70) which is shown as $f_1$ in a lower part of the output line of the register $40_4$ in FIG. 16. Data that undergoes adding operations in the adding circuit $338_4$ in a second operation cycle out of the eight operation cycles and is stored in the register $40_4$ is ($i_8-i_5$) $P_7-i_{13}P_{11}+i_{10}P_3-i_{12}P_{13}+i_9P_9-i_{14}P_5-i_{14}P_1$. Data stored into the register $40_4$ in the first operation cycle represents the operation value $f_3$ in the equation (70) which is shown as $f_3$ in the lower part of the output line of the register $40_4$ in FIG. 16. Data that undergoes adding operations in the adding circuit $338_4$ in a third operation cycle out of the eight operation cycles and is stored in the register $40_4$ is ($i_8-i_{15}$) $P_7+i_{13}P_{11}-i_{10}P_3-i_{11}P_{13}+i_{14}P_9+i_9P_5+i_{12}P_1$. Data stored into the register $40_4$ in the first operation cycle represents the operation value $f_5$ in the equation (70) which is shown as $f_5$ in the lower part of the output line of the register $40_4$ in FIG. 16. Data that undergoes adding operations in the adding circuit $338_4$ in a fourth operation cycle out of the eight operation cycles and is stored in the register $40_4$ is ($i_8+i_{15}$) $P_7-i_{10}P_{11}-i_{13}P_3-i_{14}P_{13}+i_{12}P_9-i_{11}P_5+i_9P_1$. Data stored into the register $40_4$ in the fourth operation cycle represents the operation value $f_7$ in the equation (70) which is shown as $f_7$ in the lower part of the output line of the register $40_4$ in FIG. 16. Data that undergoes adding operations in the adding circuit $338_4$ in a fifth operation cycle out of the eight operation cycles and is stored in the register $40_4$ is ($i_8+i_{15}$) $P_7-i_{10}P_{11}-i_{13}P_3+i_{14}P_{13}-i_{12}P_9+i_{11}P_5-i_9P_1$. Data stored into the register $40_4$ in the fifth operation cycle represents the operation value $f_9$ in the equation (70) which is shown as $f_9$ in the lower part of the output line of the register $40_4$ in FIG. 16. Data that undergoes adding operations in the adding circuit $338_4$ in a sixth operation cycle out of the eight operation cycles and is stored in the register $40_4$ is ($i_8-i_{15}$) $P_7+i_{13}P_{11}-i_{10}P_3+i_{11}P_{13}-i_{14}P_9-i_9P_5-i_{12}P_1$. Data stored into the register $40_4$ in the sixth operation cycle represents the operation value $f_{11}$ in the equation (70) which is shown as $f_{11}$ in the lower part of the output line of the register $40_4$ in FIG. 16. Data that undergoes adding operations in the adding circuit $338_4$ in a seventh operation cycle out of the eight operation cycles and is stored in the register $40_4$ is ($i_8-i_{15}$) $P_7-i_{13}P_{11}+i_{10}P_3+i_{12}P_{13}-i_9P_9+i_{14}P_5+i_{11}P_1$. Data stored into the register $40_4$ in the seventh operation cycle represents the operation value $f_{13}$ in the equation (70) which is shown as $f_{13}$ the a lower part of the output line of the register $40_4$ in FIG. 16. Data that undergoes adding operations in the adding circuit $338_4$ in an eighth operation cycle out of the eight operation cycles and is stored in the register $40_4$ is ($i_8+i_{15}$) $P_7+i_{10}P_{11}+i_{13}P_3-i_9P_{13}-i_{11}P_9-i_{12}P_5-i_{14}P_1$. Data stored into the register $40_4$ in the eighth operation cycle represents the operation value $f_{15}$ in the equation (70) which is shown as $f_{15}$ in the lower part of the output line of the register $40_4$ in FIG. 16.

By completing the above arithmetic operations, the primary 2-8-16 IDCT on sixteen pieces of data in one string constituting the 16×16 data block transmitted after having undergone the 2-8-16 DCT is terminated. The same primary 2-8-16 IDCT as described above is performed on each of strings subsequent to a next string constituting the 16×16 data block and thereafter, and the primary 2-8-16 IDCT on all sixteen string constituting the 16×16 data block is terminated in the similar manner. After the completion of the primary 2-8-16 IDCT on the all sixteen strings, a secondary 2-8-16 IDCT is performed on each string of sixteen data strings constituting the 16×16 data block (transposed data for DCT). By completing the primary 2-8-16 IDCT and secondary 2-8-16 IDCT on each 16×16 data, original image pictures transmitted after having undergone the 2-816 DCT can be reproduced.

Thus, according to the present invention, since the 16-16 IDCT and 2-8-16 IDCT device are so configured that a part of the fixed coefficient multiplying circuit used in the 16-16 IDCT circuit can be used, by being switched, as a fixed coefficient multiplying circuit required in the 2-8-16 DCT, a high-speed calculating characteristic obtained through the pipeline processing type arithmetic operation in the 16-16 IDCT can be maintained in the 2-8-16 IDCT and the high-speed calculating characteristic can be still maintained in even miniaturized 16-16 IDCT devices and 2-8-16 IDCT devices.

Based on the above first embodiment to fourth embodiment, following conclusions can be drawn:

An equation (74) can be obtained by developing an equation (73) and arranging it with respect to "N" in the same manner as in the case of the first embodiment and third embodiment. Therefore, by performing an operation expressed by the equation (74) to each line and each string constituting the $2^N \times 2^N$ picture element data in the same manner as in the case of the first embodiment and second embodiment, an operation for $2\text{-}2^{N-1}\text{-}2^N$ DCT can be performed.

$$\left. \begin{aligned} F(h, v) &= C(v)C(h) \sum_{z=0}^{2^{N-1}-1} \sum_{x=0}^{N} \{f(x, 2z) + \\ & \quad f(x, 2z+1)\} \cos\delta \cdot \cos\varepsilon \\ F(h, v+4) &= C(v)C(h) \sum_{z=0}^{2^{N-1}-1} \sum_{x=0}^{N} \{f(x, 2z) + \\ & \quad f(x, 2z+1)\} \cos\delta \cdot \cos\varepsilon \end{aligned} \right\} \quad (73)$$

where v=0, 1, . . . ; 7 z=integer of y/2

$$C(h) = \frac{1}{2\sqrt{2}} \quad (h=0), \quad C(v) = \frac{1}{2\sqrt{2}} \quad (v=0)$$

$$C(h) = \frac{1}{2} \quad (h=1,2,\ldots,7), \quad C(v) = \frac{1}{2} \quad (v=1,2,\ldots,7)$$

$$\delta = \frac{\pi v(2z+1)}{N/2}, \quad \varepsilon = \frac{\pi h(2x+1)}{N}$$

(74)

First, matrices in the right position on the right side in the equation (74) are described.

Out of components contained in the matrix in the right position on the right side in the equation (74), components given with final numbers $P_1$, $P_5$, $P_9$, $P_{13}$, ..., and components expressed in the equation (75) are coefficients obtained by selecting every other "i" having cases where i=1 to i=$2^{N-1}$−1, where the coefficients are expressed as the fixed coefficient Pi (i=0, 1, 2, ..., $2^{N-1}$−1) as shown in the equation (76). By selecting the coefficient which can be obtained when i=$2^N$−3 to i=$2^{N-1}$−1 by choosing every other "1" which is left after selecting the coefficients except the fixed coefficients obtained by choosing every other "1" where i=1 to i=$2^{N-1}$−1 and consequently by selecting the fixed coefficient obtained by choosing every other "1" which is still left and, thereafter, each component contained in the matrices in the right position in the right side in the equation (74) can be determined. In the present application, the fixed coefficient that can be determined as above is called "a fixed coefficient that can be determined according to a discrete cosine transformation rule."

$$P_{2^N-3} \quad (75)$$

$$\left.\begin{array}{l} P_i = \cos\left(\frac{(N-1-i)\pi}{2^{N+1}}\right) \\ 0 \leq k \leq 2^{N-1}-2 \\ \text{where } k = 2^{N-1}-1 \text{ is excluded;} \\ P_{2^{N-1}-1} = \frac{1}{\sqrt{2}} \\ (k = 2^{N-1}-1) \end{array}\right\} \quad (76)$$

A first string on a first line contained in a matrix existing on an upper side in a left position on the right side in the equation (74) is given by an equation (77) and each term of values kj (j=0, 1, 2, ..., $2^{N-1}$−1) in the equation (77) is given by an equation (78).

A first string on a first line contained in a matrix existing on a lower side in a left position on the right side in the equation (74) is given by an equation (79) and each term of values kj (j=$2^{N-1}$, $2^{N-1}$+1, $2^{N-1}$+2, ..., $2^N$−1) in the equation (79) is given by an equation (80).

A cell shown in the equation (74) out of each component in the matrix on an upper side in the left position on the left side in the equation (74) represents one component. All of components not shown by the cell are "0". As shown in the equation (74), a first string on the second line is one component.

Frames shown by "$2^1 \times 2^1$" to a frame shown by "$2^{N-3} \times 2^{N-3}$" are arranged toward a lower right direction, and from the frame shown "$2^{N-3} \times 2^{N-3}$" to another frame shown by "$2^{N-2} \times 2^{N-2}$" are arranged toward a lower right direction.

Components $2^1 \times 2^1$ ($2^1 \times 2^1$ pieces of cells) are contained in the frame shown by "$2^1 \times 2^1$", that is, by the third line and fourth line and by the second string and third string. Components $2^2 \times 2^2$ ($2^2 \times 2^2$ pieces of cells) are contained in the frame shown by "$2^2 \times 2^2$", that is, by the fifth line and eighth line and by the fourth string and seventh string. Components $2^{N-3} \times 2^{N-3}$ ($2^{N-3} \times 2^{N-3}$ pieces of cells) are contained in the frame shown by "$2^{N-3} \times 2^{N-3}$". Components $2^{N-2} \times 2^{N-2}$ ($2^{N-2} \times 2^{N-2}$ pieces of cells) are contained in the frame shown by "$2^{N-3} \times 2^{N-3}$".

$$k_0 + k_1 + k_2 + \ldots + k_{2^{N-1}-1} \tag{77}$$

$$k_0 = f_0 + f_1, \ k_1 = f_2 + f_3, \ k_2 = f_4 + f_5, \ \ldots, \ k_{2^{N-1}-1} = f_{2^N-1} \tag{78}$$

$$k_{2^{N-1}} + k_{2^{N-1}+1} + k_{2^{N-1}+1} + \ldots + k_{2^N-1} \tag{79}$$

$$k_{2^{N-1}} = f_0 - f_1, \ k_{2^{N-1}+1} = f_2 - f_3, \ k_{2^{N-1}+2} = f_4 - f_5, \ \ldots, \ k_{2^N-1} = f_{2^N-2} + f_{2^N-1}\} \tag{80}$$

Each of components composed of the second line and first string in the matrix on an upper side in the equation (74) and each of components contained in each of the frame shown by "$2^1 \times 2^1$" to the frame shown by $2^{N-2} \times 2^{N-2}$ is given by an adding and subtracting equation $[kjm]_{N-2}$ (a value other than a subscript j selected out of m=j) of each kj expressed by the equation (78). Moreover, each of components composed of the second line and first string in the matrix on a lower side in the equation (74) and each of components contained in each of the frame shown by "$2^1 \times 2^1$" to the frame shown by $2^{N-2} \times 2^{N-2}$ is given by an adding and subtracting equation $[kjn]_{N-2}$ (a value other than a subscript j selected out of m=j) of each kj expressed by the equation (80).

Operations of determinants in a matrix in the left position on the right side and in the right position on the right side in the equation (74) will be described. The component on the first line and first string and on the second line and first string is multiplied by a first component in the matrix on the right side. Each component in each string contained in the frame shown by $2^1 \times 2^1$ is multiplied by the second component and by the third component in the matrix on the right side. Each component in each string contained in the frame shown by $2^2 \times 2^2$ is multiplied by the fourth component to seventh component in the matrix on the right side. Each component in each string contained in the frame shown by $2^{N-3} \times 2^{N-3}$ is multiplied by the $2^{N-3}$-th to $(1+2^1+2^2+\ldots, 2^{N-4})$-th component in the matrix on the right side. This relation can be applied to the matrix on the upper side and on the lower side.

A sum of each product of each of components obtained in each line by operations of the determinant of the matrix in the left position on the right side and of the matrix in the right position on the right side in the equation (74) represents a component (transformation coefficient data, that is, data shown as F in the equation (74)) corresponding to a determinant shown on the right side in the equation (74).

Each component to be multiplied by the fixed coefficient Pi with odd numbers described above is picture element data (that is, data shown as "f" in the equation (78) and equation (80)).

Though it is impossible to express which component out of kj constituting the matrix described above comes by a general formula and/or general expression form. However, in the same manner as done in the equation (51) and equation (66), by developing and rearranging the equation (73) with respect to a specified value of N, the above described adding and subtracting equation $[Kjm]_{N-2}$ and adding and subtracting equation $[kjn]_{N-2}$ can be determined for the specified value of N.

Also, in the case of the transformation coefficient data being 32×32, in the same manner as done in the second embodiment and fourth embodiment, by obtaining the equation (82) by developing and rearranging the equation (81) with respect to N and by performing the operation expressed in the equation (82) to data contained in each line or each string of the $2^N \times 2^N$ transformation coefficient data in the same manner as in the second embodiment and fourth embodiment, operations for the other $2$-$2^{N-1}$-$2^N$ IDCT can be performed. The number N expressed in the equation (82) is a natural number. The matrix shown on the left side in the determinant on the upper side in the equation (82) is picture element with odd numbers and the matrix shown on the left side in the determinant on the lower side in the equation (82) is picture element with even numbers.

The first string of the matrix [lop] on the upper side in the left position on the right side in the equation (82) and the matrix [loq] on the lower side is expressed as a sum or difference between the transformation coefficient data $F_0$ and the equation (83) while other component is expressed by a matrix having component $F_k (1 \leq k \geq 2^{N-1}-2)$ excluding the transformation coefficient data expressed in the equation (83).

$$f(x, 2z) = \sum_{z=0}^{2^{N-1}-1} \sum_{x=0}^{N} \{C(v)C(h)(F(h,v) + F(h, v+4))\}\cos\delta \cdot \cos\varepsilon \tag{81}$$

$$f(x, 2z+1) = \sum_{y=0}^{2^{N-1}-1} \sum_{x=0}^{N} \{C(v)C(h)(F(h,v) - F(h, v+4))\}\cos\delta \cdot \cos\varepsilon$$

where v=0, 1, . . . , 7 z=integer of y/2

$$C(h) = \frac{1}{\sqrt{2}} \ (h=0), \quad C(v) = \frac{1}{2\sqrt{2}} \ (v=0), \tag{82}$$

$$C(h) = \frac{1}{\pi v(2z+1)}1, 2, \ldots \frac{7}{\pi h(2x+1)}, \frac{C(v)}{2} = \frac{1}{2} \ (v=1, 2, \ldots, 7)$$

$$\delta \equiv \frac{\pi v(2z+1)}{N/2}, \quad \varepsilon \equiv \frac{\pi h(2x+1)}{N}$$

$$2^{N-1} \left\{ \begin{bmatrix} f_0 \\ f_2 \\ f_4 \\ f_6 \\ \vdots \\ f_{2^{N-1}-2} \end{bmatrix} = \begin{bmatrix} 2^{N-1}-1 \\ \ldots \\ [l_{op}] \\ \ldots \end{bmatrix} \begin{bmatrix} P_{\frac{N}{2}-1} \\ \vdots \\ P_{2^N-3} \\ \vdots \\ P_{13} \\ P_9 \\ P_5 \\ P_1 \end{bmatrix} \right\} 2^{N-1}-1$$

$$2^{N-1} \left\{ \begin{bmatrix} f_1 \\ f_3 \\ f_5 \\ f_7 \\ \vdots \\ f_{1^{N-1}-1} \end{bmatrix} = \begin{bmatrix} 2^{N-1}-1 \\ \ldots \\ [l_{oq}] \\ \ldots \end{bmatrix} \begin{bmatrix} P_{\frac{N}{2}-1} \\ \vdots \\ P_{2^N-3} \\ \vdots \\ P_{13} \\ P_9 \\ P_5 \\ P_1 \end{bmatrix} \right\} 2^{N-1}-1$$

$$F_{2^{N-1}-1} \tag{83}$$

The $2^N$-$2^N$ DCT is performed in accordance with an equation (84) and the $2^N$-$2^N$ IDCT in accordance with an equation (85). Both characters and notation used in the matrix on the left side and the right side in the equation (84) and those used in the matrix on the left side and the right side in the equation (85) correspond almost to equation (74) and equation (82). Each of components contained in the matrix in the left position on the right side in the equation (84) and equation (85) differs from that in the equation (74) and equation (82) as shown below:

data in the $2^N$-$2^N$ IDCT. The meanings of v, w and x used in each of the components $[C_{vw}]$ and $[D_{vx}]$ contained in the equation (85) correspond to those of o, p and q in the equation (82).

$$a_0 = f_0 + f_{2^N-1},\ a_1 = f_1 + f_{2^N-2},\ \ldots,\ a_{2^{N-1}-1} = f_{2^{N-1}-1} + f_{2^N-1},$$
$$a_{2^{N-1}} = f_0 - f_{2^N-1} = f_1 + f_{2^N-2},\ \ldots,\ a_{2^N-1} = f_{2^{N-1}-1} + f_{2^N-1}\} \tag{86}$$
$$f_{2^{N-1}} \tag{87}$$

Therefore, by using a part of the circuit used to perform the $2^N$-$2^N$ DCT, the $2$-$2^{N-1}$-$2^N$ DCT can be carried out on (84)

$$\begin{bmatrix} F_0 \\ F_{2^{N-1}} \\ \vdots \\ F_{2^N-2} \end{bmatrix} = \begin{bmatrix} \ldots & & & 0 \\ & & & \\ & & \ddots & \\ 0 & & & [A_{st}]_{N-2} \end{bmatrix} \begin{bmatrix} P_{2^{N-1}-1} \\ \vdots \\ P_{2^N-3} \\ \vdots \\ P_{13} \\ P_9 \\ P_5 \\ P_1 \end{bmatrix}$$

$$\begin{bmatrix} F_1 \\ F_3 \\ F_5 \\ F_7 \\ \vdots \\ F_{2^N-5} \\ F_{2^N-3} \\ F_{2^N-1} \end{bmatrix} = \begin{bmatrix} [2^{N-1} \times 2^{N-1}]\text{matrix} \\ = [B_{sv}]_{N-1} \end{bmatrix} \begin{bmatrix} P_{2^N-2} \\ P_{2^N-4} \\ P_{2^N-6} \\ P_{2^N-8} \\ \vdots \\ P_4 \\ P_2 \\ P_0 \end{bmatrix}$$

(85)

$$\frac{1}{2}\begin{bmatrix} f_0 + f_{2^{N-1}} \\ f_1 + f_{2^{N-1}+1} \\ f_2 + f_{2^{N-1}+2} \\ f_3 + f_{2^{N-1}+3} \\ \vdots \\ f_{2^{N-1}-2} + f_{2^N-2} \\ f_{2^{N-1}-1} + f_{2^N-1} \end{bmatrix} = \begin{bmatrix} 2^{N-1} & [C_{vw}] \end{bmatrix} \begin{bmatrix} P_{\frac{N}{2}-1} \\ \vdots \\ P_{2^N-3} \\ \vdots \\ P_5 \\ P_1 \end{bmatrix}$$

$$\frac{1}{2}\begin{bmatrix} f_0 - f_{2^{N-1}} \\ f_1 - f_{2^{N-1}+1} \\ f_2 - f_{2^{N-1}+2} \\ \vdots \\ f_{2^{N-1}-2} + f_{2^N-2} \\ f_{2^{N-1}-1} + f_{2^N-1} \end{bmatrix} = \begin{bmatrix} 2^{N-1} & [D_{vx}] \end{bmatrix} \begin{bmatrix} P_{\frac{N}{2}-1} \\ \vdots \\ P_{2^N-3} \\ \vdots \\ P_{13} \\ P_9 \\ P_5 \\ P_1 \end{bmatrix}$$

Each of components $[A_{st}]_{N-2}$ and $[B_{su}]_{N-1}$ contained in the equation (84) is given by an equation (86). The meanings of s, t and u used in each of the components $[A_{st}]_{N-2}$ and $[B_{su}]_{N-1}$ contained in the equation (84) correspond to those of j, m and n. The picture element data $f_0$ to $f_{2^N-1}$ are picture element data given in the equation (86). Each of components $[C_{vw}]$ and $[D_{vx}]$ is given as the transformation coefficient the $2^N$-$2^N$ picture element data. Also, by using a part of the circuit used to perform the $2^N$-$2^N$ IDCT, the $2$-$2^{N-1}$-$2^N$ IDCT can be carried out on the $2^N$-$2^N$ transformation coefficient data.

As described above, according to the present invention, by selecting a first set of picture element data and second set of picture element data composed of $2^N$ pieces of picture element data to be multiplied by a fixed coefficient Pk ($0 \leq k \leq 2^N-1$) with k having an odd number which is determined in accordance with the discrete cosine transformation rule, in a same order or in a different order, from $2^N$ pieces of picture element data contained in one line or one string out of $2^N \times 2^N$ (N is a natural number) pieces of picture element data, by multiplying both the selected first set of picture element data, by multiplying both the selected element data corresponding to the fixed coefficient with k having the odd number by the fixed coefficient with k having the odd number to produce a product, by adding the product to the corresponding fixed coefficient, and by outputting, based on the added values, a predetermined number of transformation coefficient data out of transformation coefficient data Pk corresponding to the added value, the $2-2^{N-1}-2^N$ DCT can be performed at a high speed in a pipeline format.

The $2-2^{N-1}-2^N$ IDCT, since it is configured in the same manner as in the case of the $2-2^{N-1}-2^N$ DCT, can be performed on the $2^N \times 2^N$ pieces of transformation coefficient data.

It is apparent that the present invention is not limited to the above embodiments but may be changed and modified without departing from the scope and spirit of the invention. For example, when not only 32×32 pieces of picture element data but also 32×32 pieces of transformation coefficient data are used, the same effects as attained in the first embodiment to fourth embodiment can be achieved. Moreover, in the above first embodiment, the operations for both the 8-8 DCT and 2-4-8 DCT are described, in the second embodiment, operations for both the 8-8 IDCT and 2-4-8 IDCT are described, in the third embodiment, operations for both the 16-16 DCT and 2-8-16 IDCT are described and in the fourth embodiment, operations for both the 16-16 DCT and 2-8-16 IDCT are described. However, the 2-4-8 DCT, 2-4-8 IDCT, 2-8-16 DCT and 2-8-16 IDCT can be performed singly and independently. Also, the 8-8 DCT, 2-4-8 DCT, 8-8 IDCT and 2-4-8 IDCT can be performed in one device by switching the MUX and codes of data output from the register without using a separate device. If a discrete cosine transformation speed of the image signal is not of great importance, the above operations for the DCT and IDCT can be performed by software. The timing before operations and after operations in the MUX in each of the embodiment described above, for example, the timing of inputting to the MUX $24_1$ to MUX $24_8$ and the timing of operations subsequent to the inputting of the MUX $24_1$ to MUX $24_8$ can be $1:2^{N-1}$. Furthermore, in the above embodiments, a sum and/or difference is used, however, as disclosed in the Japanese Patent Application Laid-open No. Hei5-181896, by using a selecting format of signals, the present invention can be implemented equally.

Thus, according to the present invention, since the $2^N-2^N$ DCT and $2-2^{N-1}-2^N$ DCT device are so configured that a part of the fixed coefficient multiplying circuit used in the $2^N-2^N$ DCT circuit can be used, by being switched, as the fixed coefficient multiplying circuit required in the $2-2^{N-1}-2^N$ DCT, a high-speed calculating characteristic obtained through the pipeline processing type arithmetic operation in the $2^N-2^N$ DCT can be maintained in the $2-2^{N-1}-2^N$ DCT and the high-speed calculating characteristic can be still maintained in even miniaturized $2^N-2^N$ DCT devices and $2-2^{N-1}2^N$ DCT devices. The same effects as above can be achieved in the $2^N-2^N$ IDCT devices and $2-2^{N-1}-2^N$ IDCT devices according to the present invention.

What is claimed is:

1. A method for compressing image signals comprising:
a selection process of selecting $2^N$ pieces of picture element data fj ($0 \leq j \leq 2^N-1$) contained in one line or one string constituting a block of $2^N \times 2^N$ (N being a natural number) pieces of picture element data forming image data, for each of fixed coefficients Pk given in equation (1) and equation (2) and determined in accordance with a discrete cosine transformation rule;
a multiplication process of multiplying each piece of selected said picture element data by each of corresponding said fixed coefficients Pk to obtain products;
an addition/subtraction process of performing adding operations and/or subtracting operations between products obtained by said multiplication process and determined in accordance with said discrete cosine transformation rule; and
an output process of outputting a value obtained by said addition/subtraction process as transformation coefficient data Fj for each line or each string constituting said block of $2^N \times 2^N$ picture element data;
wherein, in said selection process, first set and second set of picture element data composed of $2^N$ pieces of picture element data contained in one line or one string constituting said block of $2^N \times 2^N$ pieces of picture element data are selected for each of fixed coefficients, out of said fixed coefficients Pk, with k in odd-numbered positions in said equation (1) and said equation (2), in a predetermined order, and wherein, in said multiplication process, said first set and said second set of picture element data selected for each of said fixed coefficients with k in odd-numbered positions in said equation (1) and said equation (2) are multiplied by each of said fixed coefficients with k in odd-numbered positions in said equation (1) and said equation (2) to obtain said product;

$$P_k = \cos\left(\frac{(N-1-k)\pi}{2^{N+1}}\right) \quad (1)$$

$0 \leq k \leq 2^{N-1}-2$ where $k=2^{N-1}-1$ is excluded;

$$P_k = \frac{1}{\sqrt{2}} \quad (2)$$

($k=2^{N-1}-1$).

2. The method for compressing image data according to claim 1, wherein a sum of $2^N$ pieces of picture element data having "j" data contained in said picture element data fj, one being lower-numbered data and the other being the next lower-numbered data, and thereafter in the same manner, is selected as said first set of picture element data to be selected in said selection process and wherein a difference between $2^N$ pieces of picture element data having "j" data contained in said picture element data fj, one being lower-numbered data and the other being the next lower-numbered data, and thereafter in the same manner, is selected as said second set of picture element data to be selected in said selection process.

3. A method for decompressing image signals comprising:
a selection process of selecting $2^N$ pieces of transformation coefficient data Fj ($0 \leq j \leq 2^N-1$) contained in one line or one string constituting a block of $2^N \times 2^N$ (N being a natural number) pieces of transformation coefficient data block forming transformation coefficient data transmitted after being transformed by a discrete cosine transformation method, for each of fixed coefficients Pk given in equation (3) and equation (4) and determined in accordance with a discrete cosine transformation rule;

a multiplication process of multiplying each of said selected transformation coefficient data by each of said corresponding fixed coefficients Pk to obtain products;

an addition/subtraction process of performing adding operations and/or subtracting operations between products obtained by said multiplication process which is determined in accordance with said discrete cosine transformation rule;

an output process of outputting a value obtained by said addition/subtraction process as picture element data fj for each line or each string constituting said block of $2^N \times 2^N$ picture element data;

wherein, in said selection process, first set and second set of transformation coefficient data composed of $2^N$ pieces of transformation coefficient data contained in one line or one string constituting said block of $2^N \times 2^N$ pieces of transformation coefficient data are selected for each of fixed coefficients, out of said fixed coefficients Pk, with k in odd-numbered positions in said equation (3) and said equation (4), in a predetermined order, and wherein, in said multiplication process, each of said first set and said second set of transformation coefficient data selected for each of said fixed coefficients with k in odd-numbered positions in said equation (3) and said equation (4) is multiplied by each of said fixed coefficients with k in odd-numbered positions in said equation (3) and said equation (4) to obtain said product;

$$P_k = \cos\left(\frac{(N-1-k)\pi}{2^{N+1}}\right) \quad (3)$$

$$0 \leq k \leq 2^{N-1}-2$$

where $k=2^{N-1}-1$ is excluded;

$$P_k = \frac{1}{\sqrt{2}} \quad (4)$$

$(k=2^{N-1}-1)$.

4. The method for decompressing image signals according to claim 3, wherein said first set of transformation coefficient data is a sum of transformation coefficient data composed of one data selected from a first transformation data set containing "j" data constituting first half of said $2^N$ pieces of transformation coefficient data Fj and containing $2^{N-1}$ pieces of transformation coefficient data and transformation coefficient data composed of one data selected from a second transformation data set containing "j" data constituting second half of said $2^N$ pieces of transformation coefficient data Fj and containing $2^{N-1}$ pieces of transformation coefficient data and wherein said second set of transformation data is a difference between transformation coefficient data composed of one data selected from said first transformation data set and transformation coefficient data composed of one data selected from said second transformation data set.

5. A method for compressing image signals comprising:

a selection process of selecting $2^N$ pieces of picture element data fj ($0 \leq j \leq 2^N-1$) contained in one line or one string constituting a block of $2^N \times 2^N$ (N being a natural number) pieces of picture element data block forming image data, for each of fixed coefficients Pk given in equation (5) and equation (6) and determined in accordance with a discrete cosine transformation rule;

a multiplication process of multiplying each of said selected picture element data by each of said corresponding fixed coefficients Pk to obtain products;

an addition/subtraction process of performing adding operations and/or subtracting operations between products obtained by said multiplication process and determined in accordance with said discrete cosine transformation rule; and an output process of outputting a value obtained by said addition/subtraction process as transformation coefficient data Fj for each line or each string constituting said block of $2^N \times 2^N$ picture element data;

wherein, in said selection process, in the case of $2^N$-$2^N$ discrete cosine transformation, $2^N$ pieces of picture element data are selected from $2^N$ pieces of picture element data contained in one line or one string constituting said block of $2^N \times 2^N$ picture element data for each of said fixed coefficients Pk determined by said $2^N$-$2^N$ discrete cosine transformation in a predetermined order and wherein, in said selection process, in the case of $2$-$2^{N-1}$-$2^N$ discrete cosine transformation, each of first set and second set of picture element data each being composed of $2^N$ pieces of picture element data to be multiplied by each of fixed coefficients, out of said fixed coefficients Pk, with k in odd-numbered positions in said equation (5) and said equation (6), is selected from $2^N$ pieces of picture element data contained in one line or one string constituting said block of $2^N \times 2^N$ pieces of picture element data in a predetermined order, wherein, in said multiplication process, in the case of said $2^N$-$2^N$ discrete cosine transformation, each of said $2^N$ pieces of picture element data selected in said selection process is multiplied by each of said corresponding fixed coefficients out of said fixed coefficients Pk to obtain products and wherein, in the case of said $2$-$2^{N-1}$-$2^N$ discrete cosine transformation, each of said first set and second set of picture element data selected based on corresponding fixed coefficient, out of said fixed coefficient Pk, with k in odd-numbered positions in said equation (5) and said equation (6) is multiplied by said fixed coefficients, out of said fixed coefficients Pk, with k in odd-numbered positions in said equation (5) and said equation (6); and wherein, in said addition/subtraction process, in the case of said $2^N$-$2^N$ discrete cosine transformation, said adding operations and/or said subtracting operations are performed between products obtained by said multiplication process and determined in accordance with said $2^N$-$2^N$ discrete cosine transformation and wherein, in the case of said $2$-$2^{N-1}$-$2^N$ discrete cosine transformation, said adding operations and/or said subtracting operations are performed between products obtained by said multiplication process and determined in accordance with said $2$-$2^{N-1}$-$2^N$ discrete cosine transformation rule;

$$P_k = \cos\left(\frac{(N-1-k)\pi}{2^{N+1}}\right) \quad (5)$$

$0 \leq k \leq 2^{N-1}-2$ where $k=2^{N-1}-1$ is excluded;

$$P_k = \frac{1}{\sqrt{2}} \quad (6)$$

($k=2^{N-1}-1$).

6. The method for compressing image signals according to claim 5, wherein said picture element data to be selected in said block of $2^N$-$2^N$ discrete cosine transformation includes said first set of picture element data composed of said $2^N$ pieces of picture element data contained in one line or one string constituting said block of $2^N \times 2^N$ pieces of picture element data to be multiplied by each of said fixed coefficients, out of said fixed coefficients Pk, with k in odd-numbered positions in said equation (5) and equation (6) and said second set of picture element data composed of said $2^N$ pieces of picture element data to be multiplied by each of fixed coefficients, out of said fixed coefficients Pk, with k in odd-numbered positions in said equation (5) and equation (6).

7. The method for compressing image signals according to claim 5 or claim 6, wherein said picture element data selected in said selection process is a sum and difference between picture element data constituting a predetermined pair of picture element data.

8. The method for compressing image signals according to claim 7, wherein said picture element data constituting said predetermined pair of picture element data, in the case of said $2-2^{N-1}-2^N$ discrete cosine transformation, are $2^N$ pieces of picture element data having "j" data contained said picture element data fj, one being lower-numbered data and the other being the next lower-numbered data.

9. The method for compressing image signals according to claim 7, wherein said picture element data constituting said predetermined pair of picture element data, in the case of said $2^N$-$2^N$ discrete cosine transformation, are picture element data composed of one data selected from said first transformation data set containing "j" data which constitutes first half of said $2^N$ pieces of picture element data Fj and containing $2^{N-1}$ pieces of picture element data and picture element data composed of one data selected from said second picture element data set containing "j" data which constitutes second half of said $2^N$ pieces of picture element data fj and containing $2^{N-1}$ pieces of picture element data.

10. A method for decompressing image signals comprising:
a selection process of selecting $2^N$ pieces of transformation coefficient data Fj ($0 \leq j \leq 2^N-1$) contained in one line or one string constituting a block of $2^N \times 2^N$ (N being a natural number) pieces of transformation coefficient data block forming transformation coefficient data transmitted after being transformed by a discrete cosine transformation method, for each of fixed coefficients Pk given in equation (7) and equation (8) and determined in accordance with a discrete cosine transformation rule;
a multiplication process of multiplying each of said selected transformation coefficient data by each of said corresponding fixed coefficients Pk to obtain products;
an addition/subtraction process of performing adding operations and/or subtracting operations between products obtained by said multiplication process and determined in accordance with said discrete cosine transformation rule; and
an output process of outputting a value obtained by said addition/subtraction process as picture element data fj for each line or each string constituting said block of $2^N \times 2^N$ transformation coefficient data;
wherein, in said selection process, in the case of $2^N$-$2^N$ inverse discrete cosine transformation, each of said $2^N$ pieces of transformation coefficient data is selected from $2^N$ pieces of transformation coefficient data contained in one line or one string constituting said block of $2^N \times 2^N$ transformation coefficient data for each of said fixed coefficients Pk determined by said $2^N$-$2^N$ inverse discrete cosine transformation method in a predetermined order, and wherein, in said selection process, in the case of $2-2^{N-1}-2^N$ inverse discrete cosine transformation, first set and second set of transformation coefficient data each being composed of $2^N$ pieces of transformation coefficient data contained in one line or one string constituting said block of $2^N \times 2^N$ pieces of transformation coefficient data are selected for each of fixed coefficients, out of said fixed coefficients Pk, with k in odd-numbered positions in said equation (7) and said equation (8) in a predetermined order,
wherein, in said multiplication process, in the case of said $2^N$-$2^N$ inverse discrete cosine transformation, each of said $2^N$ pieces of picture element data selected in said selection process is multiplied by each of corresponding fixed coefficients out of said fixed coefficients Pk to obtain products and wherein, in the case of said $2-2^{N-1}-2^N$ inverse discrete cosine transformation, each of said first set and second set of transformation coefficient data selected based on each of corresponding fixed coefficients, out of said fixed coefficients Pk, with k in odd-numbered positions in said equation (7) and said equation (8) is multiplied by each of said fixed coefficients, out of said fixed coefficients Pk, with k in odd-numbered positions in said equation (7) and said equation (8) to obtain products,
wherein, in said addition/subtraction process, in the case of said $2^N$-$2^N$ inverse discrete cosine transformation, said adding operations and/or subtracting operations are performed between products obtained by said multiplication process and determined in accordance with said $2^N$-$2^N$ discrete cosine transformation rule and wherein, in the case of said $2-2^{N-1}-2^N$ inverse discrete cosine transformation, said adding operations and/or said subtracting operations are performed between products obtained by said multiplication process and determined in accordance with said $2-2^{N-1}-2^N$ discrete cosine transformation rule;

$$P_k = \cos\left(\frac{(N-1-k)\pi}{2^{N+1}}\right) \quad (7)$$

$0 \leq k \leq 2^{N-1}-2$ where k=$2^{N-1}$−1 is excluded;

$$P_k = \frac{1}{\sqrt{2}} \quad (8)$$

(k=$2^{N-1}$−1).

11. The method for decompressing image signals according to claim 10, wherein said transformation coefficient data to be selected in said $2^N$-$2^N$ inverse discrete cosine transformation includes said first set of transformation coefficient data composed of said $2^N$ pieces of transformation coefficient data contained in one line or one string constituting said block of $2^N \times 2^N$ pieces of transformation coefficient data to be multiplied by each of said fixed coefficients, out of said fixed coefficients Pk, with k in odd-numbered positions in said equation (7) and said equation (8) and said second set of transformation coefficient data composed of said $2^N$ pieces of transformation coefficient data to be multiplied by each of fixed coefficients, out of said fixed coefficients Pk, with k in odd-numbered positions in said equation (7) and said equation (8).

12. A device for compressing image signals comprising:
 a selection circuit for selecting $2^N$ pieces of picture element data fj (0≦j≦$2^N$−1) contained in one line or one string constituting a block of $2^N \times 2^N$ (N being a natural number) pieces of picture element data block forming image data, for each of fixed coefficients Pk given in equation (9) and equation (10) and determined in accordance with a discrete cosine transformation rule;
 a multiplication circuit for multiplying each of said selected picture element data by each of said corresponding fixed coefficients Pk to obtain products;
 an addition/subtraction circuit for performing adding operations and/or subtracting operations between products obtained by said multiplication process and determined in accordance with said discrete cosine transformation rule; and
 an output circuit for outputting a value obtained by said adding operations and/or subtracting operations as transformation coefficient data Fj for each line or each string constituting said block of $2^N \times 2^N$ picture element data;
 wherein said selection circuit is that each of said first set and second set of picture element data composed of $2^N$ pieces of picture element data contained in one line or one string constituting said block of $2^N \times 2^N$ pieces of picture element data is selected for each of fixed coefficients, out of said fixed coefficients Pk, with k in odd-numbered positions in said equation (9) and said equation (10), in a predetermined order, and wherein, in said multiplication process, each of said first set and second set of picture element data selected for each of said fixed coefficients with k in odd-numbered positions in said equation (9) and said equation (10) is multiplied by said fixed coefficient with k in odd-numbered positions in said equation (9) and said equation (10) to obtain said product;

$$P_k = \cos\left(\frac{(N-1-k)\pi}{2^{N+1}}\right) \quad (9)$$

0≦k≦$2^{N-1}$−2 where k=$2^{N-1}$−1 is excluded;

$$P_k = \frac{1}{\sqrt{2}} \quad (10)$$

(k=$2^{N-1}$−1).

13. The device for compressing image signals according to claim 12, wherein a sum of $2^N$ pieces of picture element data having "j" data contained in said picture element data fj, one being lower-numbered data and the other being the next lower-numbered data, and thereafter in the same manner, is selected by said selection circuit as said first set of picture element data and wherein a difference between $2^N$ pieces of picture element data having "j" data contained in said picture element data fj, one being lower-numbered data and the other being the next lower-numbered data and thereafter
 in the same manner, is selected by said selection circuit as said second set of picture element.

14. A device for decompressing image signals comprising:
 a selection circuit for selecting $2^N$ pieces of transformation coefficient data Fj (0≦j≦$2^N$−1) contained in one line or one string constituting a block of $2^N \times 2^N$ (N being a natural number) pieces of transformation coefficient data block forming transformation coefficient data transmitted after being transformed by a discrete cosine transformation method, for each of fixed coefficients Pk given in equation (11) and equation (12) and determined in accordance with a discrete cosine transformation rule;
 a multiplication circuit for multiplying each of said selected transformation coefficient data by each of said corresponding fixed coefficient Pk to obtain products;
 an addition/subtraction circuit for performing adding operations and/or subtracting operations between products obtained by said multiplication process which is determined in accordance with said discrete cosine transformation rule; and
 an output circuit for outputting a value obtained by said adding operations and/or subtracting operations as picture element data fj for each line or each string constituting said block of $2^N \times 2^N$ picture element data;
 wherein said selection circuit is that each of first set and second set of transformation coefficient data composed of $2^N$ pieces of transformation coefficient data contained in one line or one string constituting said block of $2^N \times 2^N$ pieces of transformation coefficient data block is selected for each of fixed coefficients, out of said fixed coefficients Pk, with k in odd-numbered positions in said equation (11) and said equation (12), in a predetermined order, and wherein said multiplication circuit is that each of said first set and second set of transformation coefficient data selected for each of said fixed coefficients with k in odd-numbered positions in said equation (11) and said equation (12) is multiplied by each of said fixed coefficients with k in odd-numbered positions in said equation (11) and said equation (12) to obtain said product;

$$P_k = \cos\left(\frac{(N-1-k)\pi}{2^{N+1}}\right) \quad (11)$$

0≦k≦$2^{N-1}$−2 where k=$2^{N-1}$–1 is excluded;

$$P_k = \frac{1}{\sqrt{2}} \quad (12)$$

(k=$2^{N-1}$–1).

15. The device for decompressing image signals according to claim 14, wherein said selection circuit, selects, as said first set of transformation coefficient data, a sum of transformation coefficient data composed of one data selected from a first transformation data set containing "j" data which constitutes first half of said $2^N$ pieces of transformation coefficient data Fj and containing $2^{N-1}$ pieces of transformation coefficient data and transformation coefficient data composed of one data selected from a second transformation data set containing "j" data which constitutes second half of said $2^N$ pieces of transformation coefficient data Fj and containing $2^{N-1}$ pieces of transformation coefficient data and wherein said selection circuit, selects, as said second set of transformation data, a difference between transformation coefficient data composed of one data selected from said first transformation data set and transformation coefficient data composed of one data selected from said second transformation data set.

16. A device for compressing image signals comprising:

a selection circuit for selecting $2^N$ pieces of picture element data fj (0≤j≤$2^N$–1) contained in one line or one string constituting a block of $2^N \times 2^N$ (N being a natural number) pieces of picture element data block forming image data, for each of fixed coefficients Pk given in equation (13) and equation (14) and determined in accordance with a discrete cosine transformation rule;

a multiplication circuit for multiplying each of said selected picture element data by each of said corresponding fixed coefficients Pk to obtain products;

an addition/subtraction circuit for performing adding operations and/or subtracting operations between products obtained by said multiplication circuit and determined in accordance with said discrete cosine transformation rule; and an output circuit for outputting a value obtained by said adding operations and/or subtracting operations as transformation coefficient data Fj for each line or each string constituting said block of $2^N \times 2^N$ picture element data;

wherein said selection circuit, in the case of $2^N$-$2^N$ discrete cosine transformation, selects $2^N$ pieces of picture element data from $2^N$ pieces of picture element data contained in one line or one string constituting said block of $2^N \times 2^N$ picture element data block for each of said fixed coefficients Pk determined by said $2^N$-$2^N$ discrete cosine transformation method in a predetermined order and wherein said selection circuit, in the case of 2-$2^{N-1}$-$2^N$ discrete cosine transformation, selects each of first set and second set of picture element data each being composed of $2^N$ pieces of picture element data to be multiplied by each of fixed coefficients, out of said fixed coefficients Pk, with k in odd-numbered positions in said equation (13) and equation (14), from $2^N$ pieces of picture element data contained in one line or one string constituting said block of $2^N \times 2^N$ pieces of picture element data block in a predetermined order, wherein said multiplication circuit, in the case of said $2^N$-$2^N$ discrete cosine transformation, multiplies each of said $2^N$ pieces of picture element data selected by said selection circuit by each of corresponding fixed coefficients out of said fixed coefficients Pk to obtain products and wherein said multiplication circuit, in the case of said 2-$2^{N-1}$-$2^N$ discrete cosine transformation, multiplies each of said first set and said second set of picture element data selected based on each of corresponding fixed coefficients, out of said fixed coefficients Pk, with k in odd-numbered positions in said equation (13) and said equation (14) by each of said fixed coefficients, out of said fixed coefficients Pk, with k in odd-numbered positions in said equation (13) and said equation (14), and wherein said addition/subtraction circuit, in the case of said $2^N$-$2^N$ discrete cosine transformation, performs said adding operations and/or said subtracting operations between products obtained by said multiplication process and determined in accordance with said $2^N$-$2^N$ discrete cosine transformation and wherein said addition/subtraction circuit, in the case of said 2-$2^{N-1}$-$2^N$ discrete cosine transformation, performs said adding operations and/or said subtracting operations between products obtained by said multiplication process and determined in accordance with said 2-$2^{N-1}$-$2^N$ discrete cosine transformation rule;

$$P_k = \cos\left(\frac{(N-1-k)\pi}{2^{N+1}}\right) \quad (13)$$

0≤k≤$2^{N-1}$–2 where k=$2^{N-1}$–1 is excluded;

$$P_k = \frac{1}{\sqrt{2}} \quad (14)$$

(k=$2^{N-1}$–1).

17. The device for compressing image signals according to claim 16, wherein said picture element data to be selected in said $2^N$-$2^N$ discrete cosine transformation includes said first set of picture element data composed of said $2^N$ pieces of picture element data contained in one line or one string constituting said block of $2^N \times 2^N$ pieces of picture element data block to be multiplied by each of said fixed coefficients, out of said fixed coefficients Pk, with k in odd-numbered in said equation (13) and said equation (14) and said second set of picture element data composed of said $2^N$ pieces of picture element data to be multiplied by each of fixed coefficients, out of said fixed coefficients Pk, with k in odd-numbered positions in said equation (13) and said equation (14).

18. The device for compressing image signals according to claim 16, wherein said selection circuit, selects, as said picture element data, a sum and difference between picture element data constituting a predetermined pair of picture elements.

19. The device for compressing image signals according to claim 18, wherein said selection circuit selects, as said picture element data constituting said predetermined pair of picture element data, in the case of said 2-$2^{N-1}$-$2^N$ discrete cosine transformation, $2^N$ pieces of picture element data having "j" data contained in said picture element data fj, one being lower-numbered data and the other being the next lower-numbered data.

20. The device for compressing image signals according to claim 18, wherein said selection circuit selects, as said picture element data constituting said predetermined pair of picture element data, in the case of said $2^N$-$2^N$ discrete cosine transformation, picture element data composed of one data selected from said first transformation data set containing "j" data constituting first half of said $2^N$ pieces of picture element data Fj and containing $2^{N-1}$ pieces of picture element data and picture element data composed of one data selected from said second picture element data set containing "j" data constituting second half of said $2^N$ pieces of picture element data fj and containing $2^{N-1}$ pieces of picture element data.

21. A device for decompressing image signals comprising:

a selection circuit for selecting $2^N$ pieces of transformation coefficient data Fj ($0 \leq j \leq 2^N-1$) contained in one line or one string constituting a block of $2^N \times 2^N$ (N being a natural number) pieces of transformation coefficient data block forming transformation coefficient data transmitted after being transformed by a discrete cosine transformation method, for each of fixed coefficients Pk given in equation (15) and equation (16) and determined in accordance with a discrete cosine transformation rule;

a multiplication circuit for multiplying each of said selected transformation coefficient data by each of said corresponding fixed coefficients Pk to obtain products;

an addition/subtraction circuit for performing adding operations and/or subtracting operations between products obtained by said multiplication circuit and determined in accordance with said discrete cosine transformation rule; and an output circuit for outputting a value obtained by said adding operations and/or subtracting operations as picture element data fj for each line or each string constituting said block of $2^N \times 2^N$ transformation coefficient data;

wherein said selection circuit, in the case of $2^N$-$2^N$ inverse discrete cosine transformation, selects $2^N$ pieces of transformation coefficient data from $2^N$ pieces of transformation coefficient data contained in one line or one string constituting said block of $2^N \times 2^N$ transformation coefficient data for each of said fixed coefficients Pk determined by said $2^N$-$2^N$ inverse discrete cosine transformation rule in a predetermined order, and wherein said selection circuit, in the case of 2-$2^{N-1}$-$2^N$ inverse discrete cosine transformation, selects first set and second set of transformation coefficient data each being composed of $2^N$ pieces of transformation coefficient data contained in one line or one string constituting said block of $2^N \times 2^N$ pieces of transformation coefficient data for each of fixed coefficients, out of said fixed coefficients Pk, with k in odd-numbered positions in said equation (15) and said equation (16) in a predetermined order, wherein, said multiplication circuit, in the case of said $2^N$-$2^N$ inverse discrete cosine transformation, multiplies each of $2^N$ pieces of picture element data selected in said selection process by each of corresponding fixed coefficients, out of said fixed coefficients Pk, to obtain products and wherein said multiplication circuit, in the case of said 2-$2^{N-1}$-$2^N$ inverse discrete cosine transformation, multiplies each of said first set and said second set of transformation coefficient data selected based on each of corresponding fixed coefficients, out of said fixed coefficients Pk, with k in odd-numbered positions in said equation (15) and said equation (16) by each of said fixed coefficients, out of said fixed coefficients Pk, with k in odd-numbered positions in said equation (15) and said equation (16) to obtain products, wherein, said addition/subtraction circuit, in the case of said $2^N$-$2^N$ inverse discrete cosine transformation, performs said adding operations and/or said subtracting operations between products obtained by said multiplication circuit and determined in accordance with said $2^N$-$2^N$ discrete cosine transformation and wherein, said addition/subtraction circuit, in the case of said 2-$2^{N-1}$-$2^N$ inverse discrete cosine transformation, performs said adding operations and subtracting/or operations between products obtained by said multiplication process and determined in accordance with said 2-$2^{N-1}$-$2^N$ discrete cosine transformation;

$$P_k = \cos\left(\frac{(N-1-k)\pi}{2^{N+1}}\right) \quad (15)$$

$$0 \leq k \leq 2^{N-1}-1$$

where k=$2^{N-1}$-1 is excluded;

$$P_k = \frac{1}{\sqrt{2}} \quad (16)$$

(k=$2^{N-1}$-1).

22. The device for decompressing image signals according to claim 21, wherein said selection circuit, in said $2^N$-$2^N$ inverse discrete cosine transformation, as said transformation coefficient data, selects said first set of transformation coefficient data composed of said $2^N$ pieces of transformation coefficient data contained in one line or one string constituting said block of $2^N \times 2^N$ pieces of transformation coefficient data to be multiplied by each of said fixed coefficients, out of said fixed coefficients Pk, with k in odd-numbered positions in said equation (15) and said equation (16) and said second set of transformation coefficient data composed of said $2^N$ pieces of transformation coefficient data to be multiplied by each of fixed coefficients, out of said fixed coefficients Pk, with k in even-numbered positions in said equation (15) and said equation (16).

* * * * *

UNITED STATES PATENT AND TRADEMARK OFFICE
CERTIFICATE OF CORRECTION

PATENT NO.     : 6,420,979 B1
DATED          : July 16, 2002
INVENTOR(S)    : Yoichi Katayama It is certified that error appears in the above-identified patent and that said Letters Patent is hereby corrected as shown below:

<u>Title page,</u>
Insert -- Item [30], Foreign Application Priority Data
November 16, 1999   Japan 11-326188 --

Signed and Sealed this

Tenth Day of December, 2002

JAMES E. ROGAN
*Director of the United States Patent and Trademark Office*